(12) United States Patent
Murakami et al.

(10) Patent No.: US 7,947,342 B2
(45) Date of Patent: May 24, 2011

(54) POLARIZER PROTECTIVE FILM, MANUFACTURING METHOD THEREOF, POLARIZING PLATE AND LIQUID CRYSTAL DISPLAY

(75) Inventors: Takashi Murakami, Hachioji (JP); Kunio Shimizu, Otsuki (JP); Minori Tamagawa, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 930 days.

(21) Appl. No.: 11/787,369

(22) Filed: Apr. 16, 2007

(65) Prior Publication Data

US 2007/0254115 A1 Nov. 1, 2007

(30) Foreign Application Priority Data

Apr. 25, 2006 (JP) ................................. 2006-120359

(51) Int. Cl.
*G02B 5/30* (2006.01)
(52) U.S. Cl. .......................... 428/1.33; 349/96; 349/122
(58) Field of Classification Search ................. 428/1.33; 349/96, 122
See application file for complete search history.

(56) References Cited

U.S. PATENT DOCUMENTS

| | | | |
|---|---|---|---|
| 3,291,625 A * | 12/1966 | Faraone et al. ............ | 106/18.18 |
| 3,313,639 A * | 4/1967 | Davis et al. ................ | 106/162.7 |
| 5,219,510 A | 6/1993 | Machell et al. | |
| 5,516,920 A | 5/1996 | Nesvadba et al. | |
| 6,569,927 B1 * | 5/2003 | Gelbin ........................ | 524/111 |
| 2003/0171458 A1 * | 9/2003 | Buchanan et al. ............ | 524/32 |
| 2006/0062935 A1 | 3/2006 | Murakami | |

(Continued)

FOREIGN PATENT DOCUMENTS

CN 1106809 A 8/1995

(Continued)

*Primary Examiner* — Sophie Hon
(74) *Attorney, Agent, or Firm* — Holtz, Holtz, Goodman & Chick PC

(57) ABSTRACT

A polarizer protective film comprising: a cellulose ester; a saccharide ester having an ester of compound (A), the compound (A) having one furanose structure or one pyranose structure in the molecule, wherein all or a part of OH groups in the compound (A) are esterified, or an ester of compound (B), the compound (B) having two to twelve of at least one of a furanose structure and a pyranose structure bonded in the molecule, wherein all or a part of OH groups in the compound (B) are esterified; and a compound represented by Formula (R) or (Ra):

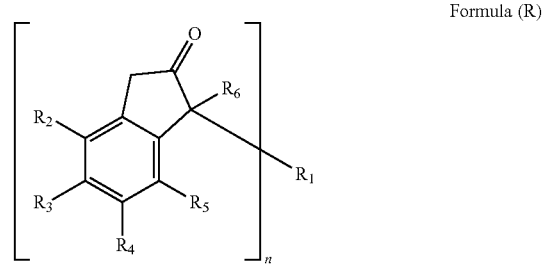

Formula (R)

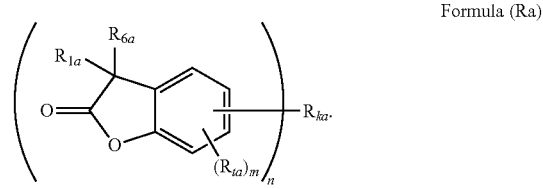

Formula (Ra)

12 Claims, 6 Drawing Sheets

U.S. PATENT DOCUMENTS

2006/0115608 A1* 6/2006 Saito et al. .................... 428/1.3

FOREIGN PATENT DOCUMENTS

| | | |
|---|---|---|
| CN | 1748980 A | 3/2006 |
| JP | 6-501040 A | 2/1994 |
| JP | 2000-352620 A | 12/2000 |
| JP | 2003-270442 A | 9/2003 |
| JP | 2005-515285 | 5/2005 |
| WO | WO 03/062314 A1 | 7/2003 |

* cited by examiner

POLARIZER PROTECTIVE FILM, MANUFACTURING METHOD THEREOF, POLARIZING PLATE AND LIQUID CRYSTAL DISPLAY

This application is based on Japanese Patent Application No. 2006-120359 filed on Apr. 25, 2006 in Japanese Patent Office, the entire content of which is hereby incorporated by reference.

FIELD OF THE INVENTION

The present invention relates to a polarizer protective film employing a cellulose ester film, a manufacturing method thereof, a polarizing plate and a liquid crystal display.

BACKGROUND OF THE INVENTION

In recent years development of a thinner and lighter-weighted note type personal computer having a larger image plane and a higher definition is in progress. Accordingly, a protective film for varieties of displays, specifically, a protective film for a liquid crystal display is also more and more intensively required to be thinner and wider, and to have higher quality. Generally, as polarizer protective film, a cellulose ester film is widely utilized. Cellulose ester film is generally wound around a core to form a film master roll, which is stored and transported.

Heretofore, this cellulose ester film has been primarily manufactured by a solution casting method. In a solution casting method, cellulose ester dissolved in a solvent is cast on a support to form a film, followed by evaporating the solvent to dry the film, and thus a film is obtained. Since the film obtained by a solution casting method has excellent flatness, a liquid crystal display exhibiting a high image quality without unevenness can be obtained by using the cellulose ester film.

However, a solution casting method requires a large amount of an organic solvent, which has been a problem in view of the large environmental load. Since cellulose ester film is cast by use of a halogen-containing solvent because of the excellent solubility characteristics, decrease of the using amount of a solvent is particularly required. Accordingly, it has become difficult to produce a larger amount of cellulose ester film by a solution casting method.

Further, since it is necessary to remove a solvent remaining in the film interior, facility investment to the manufacturing line such as a drying line, a drying energy and apparatuses for recover and regeneration of an evaporated solvent; and a manufacturing cost have been enormous, and reduction thereof is also an important subject.

In recent years, attempts to melt cast a cellulose ester have been made, for application in silver halide photography or as a polarizer protective film. However, since cellulose ester is a polymer having a very high viscosity at molten state and has a high glass transition temperature, it has been found that a cellulose ester film produced by melting a cellulose ester and extruding the melt from a die to be cast on a cooling drum or on a cooling belt may have problems that (i) leveling of the film is not fully easy; and (ii) the optical or mechanical property of the film is sometimes inferior to that of a cellulose ester film produced by a solution casting method (for example, refer to Patent Documents 1 and 2).

For example, a polarizer protective having a retardation function has been disclosed, which was produced by stretching a cellulose derivative film instead of a TAC film to obtain a retardation function, followed by being saponified and then being laminated with a polyvinyl alcohol polarizer (for example, refer to Patent Documents 3). However, when a melt cast cellulose ester film is used as a polarizer protective film of this type, the variation of retardation values due to a humidity change tends to be large, resulting in a practical disadvantage such as uneven contrast.

Therefore, it has been found that, when a melt cast film is stored for a long period in a state of being wound on a core, there is a problem of easy generation of horseback defects, and defects called as a "core set" and wrinkles in the film at the start of winding of a film master roll. In recent years, a film master roll is desired to have a wider width and a longer length of film in accordance with the popularization of a larger image screen. Therefore, there is a tendency that the width of a film master roll becomes wider and the weight of a film master roll becomes heavier, and this situation easily causes the above defects. Accordingly, an improvement is strongly desired.

Patent Document 1 Japanese Translation of PCT International-Application Publication No. 6-501040
Patent Document 2 Japanese Patent Application Publication, hereinafter, referred to as JP-A) No. 2000-352620
Patent Document 3 JP-A No. 2003-270442

SUMMARY OF THE INVENTION

An object of the present invention is to provide a polarizer protective film employing a cellulose ester film exhibiting a stable property, in which variation of retardation values due to humidity change is reduced, and exhibiting reduced deformation defects of a film master roll such as a horseback defect or a convex defect even after a long term storage, a manufacturing method of the polarizer protective film, a polarizing plate employing the polarizer protective film, and a liquid crystal display utilizing the polarizing plate.

One of the aspects of the present invention to achieve the above object is a polarizer protective film comprising: a cellulose ester; a saccharide ester having an ester of compound (A), the compound (A) having one furanose structure or one pyranose structure in the molecule, wherein all or a part of OH groups in the compound (A) are esterified, or an ester of compound (B), the compound (B) having two to twelve of at least one of a furanose structure and a pyranose structure bonded in the molecule, wherein all or a part of OH groups in the compound (B) are esterified; and a compound represented by Formula (R) or (Ra):

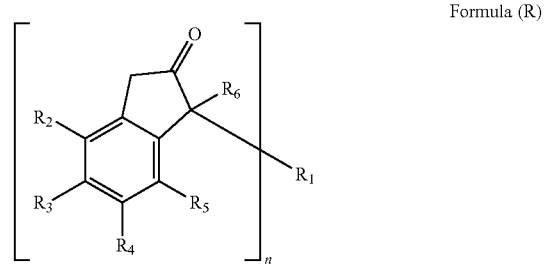

Formula (R)

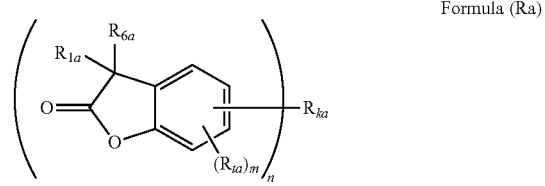

Formula (Ra)

DESCRIPTION OF THE PREFERRED EMBODIMENTS

Figure 1:
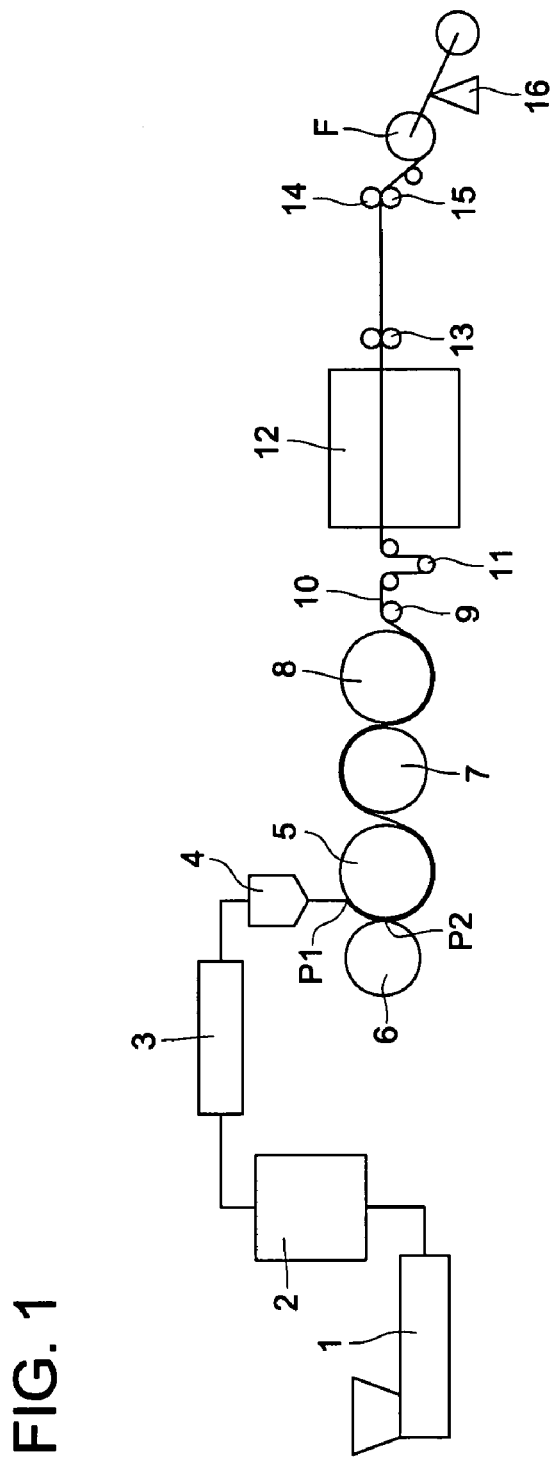
FIG. 1 is a schematic flow sheet to show an embodiment to practice a manufacturing method of cellulose ester film according to the present invention.

The above object of the present invention is achieved by the following structures.

(1) A polarizer protective film comprising:

a cellulose ester;

a saccharide ester having:

an ester of compound (A), the compound (A) having one furanose structure or one pyranose structure in the molecule, wherein all or a part of OH groups in the compound (A) are esterified, or an ester of compound (B), the compound (B) having two to twelve of at least one of a furanose structure and a pyranose structure bonded in the molecule, wherein all or a part of OH groups in the compound (B) are esterified; and a compound represented by Formula (R) or (Ra):

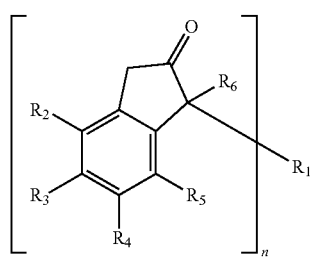

Formula (R)

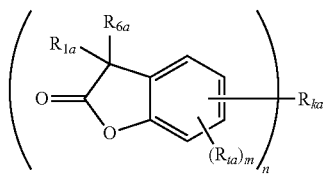

Formula (Ra)

wherein n represents an integer of 2 to 4; m represents an integer of 1-3; $R_{1a}$ and $R_{6a}$ each independently represent a hydrogen atom or a substituent; $R_{ta}$ represents a hydrogen atom or a substituent; a plurality of $R_{ta}$ may be combined to form a ring; and $R_{ka}$ represents a di- to tetra-valent linkage group.

(2) The polarizer protective film of Item (1), wherein
$R_1$ in Formula (R) is a conjugated substituent when n is 1;
or
$R_{1a}$ in Formula (Ra) is a conjugated substituent when n is 1.

(3) The polarizer protective film of Item (1) or (2), wherein the compound represented by Formula (R) is a compound represented by Formula (R-1):

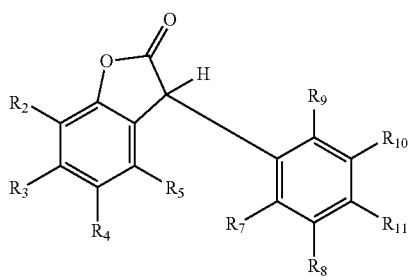

Formula (R-1)

wherein $R_2$ to $R_5$ each independently represent a hydrogen atom or a substituent; $R_7$ to $R_{11}$ each independently represent a hydrogen atom, an alkyl group having 1 to 18 carbon atoms or an alkoxy group having 1 to 18 carbon atoms.

(4) The polarizer protective film of any one of Items (1) to (3), wherein a sum of Hammett's σp values of $R_7$ to $R_{11}$ is 0 or less.

(5) The polarizer protective film of any one of Items (1) to (4), wherein the compound represented by Formula (R) is a compound represented by Formula (R-2):

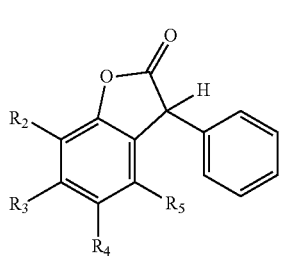

Formula (R-2)

wherein $R_2$ to $R_5$ each independently represent a hydrogen atom or a substituent.

(6) The polarizer protective film of any one of Items (1) to (5), wherein $R_5$ in Formula (R) is a hydrogen atom.

(7) The polarizer protective film of any one of Items (1) to (6), wherein the compound represented by Formula (Ra) is a compound represented by Formula (R-3):

wherein $R_2$ to $R_5$ each independently represent a hydrogen atom or a substituent; $R_2$ and $R_3$, $R_3$ and $R_4$, and $R_4$ and $R_5$ may be combined to form a ring; $R_6$ represents a hydrogen atom or a substituent; n represents an integer of 1 or 2; when n equals to 1, $R_1$ represents a substituent; and when n is 2, $R_1$ represents a divalent linkage group, Formula (R-3)

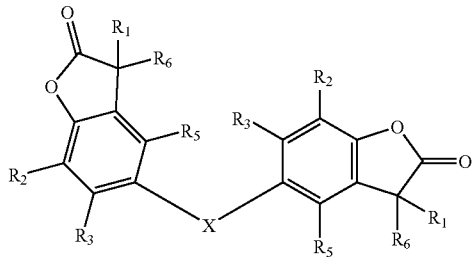

wherein $R_1$, $R_2$, $R_3$, $R_5$ and $R_6$ each independently represent a hydrogen atom or a substituent; $R_2$ and $R_3$ may be combined to form a ring; and X represents a divalent linkage group.

(8) The polarizer protective film of any one of Items (1) to (7) further comprising a phosphonite compound.
(9) The polarizer protective film of Item (8) further comprising a hindered phenol compound.
(10) The polarizer protective film of any one of Items (1) to (9), wherein a content of the saccharide ester is 1 to 35% by weight based on a weight of the polarizer protective film.
(11) The polarizer protective film of any one of Items (1) to (10), wherein the compound (A) is glucose, galactose, mannose, fructose, xylose, or arabinose.
(12) The polarizer protective film of any one of Items (1) to (10), wherein the compound (B) comprises at least one furanose structure and at least one pyranose structure bonded in the molecule of the compound (B).
(13) The polarizer protective film of any one of Items (1) to (10), wherein the compound (B) is lactose, sucrose, nystose, 1F-fructosylnystose, stachyose, maltitol, lactitol, lactulose, cellobiose, maltose, cellotriose, maltotriose, raffinose, kestose, gentiobiose, gentiotriose, gentiotetraose, xylotriose or galactosyl-sucrose.
(14) The polarizer protective film of Item (13), wherein the compound (B) is sucrose.
(15) A polarizing plate comprising a polarizer and the polarizer protective film of any one of Items (1) to (14) provided on at least one surface of the polarizer.
(16) A liquid crystal display comprising a liquid crystal cell and the polarizing plate of Item (15) provided on at least one surface of the liquid crystal cell.
(17) A method to produce a polarizer protective film comprising the steps of:
  (i) melting a mixture of:
    (a) a cellulose ester,
    (b) a saccharide ester having:
    an ester of compound (A), the compound (A) having one furanose structure or one pyranose structure in the molecule, wherein all or a part of OH groups in the compound (A) are esterified, or
    an ester of compound (B), the compound (B) having two to twelve of at least one of a furanose structure and a pyranose structure bonded in the molecule, wherein all or a part of OH groups in the compound (B) are esterified, and
    (c) a compound represented by Formula (R) or (Ra);
  (ii) extruding the melt of the mixture from a die to form a film;
  (iii) cooling the extruded film on a cooling drum;
  (iv) peeling the cooled film from the cooling drum;
  (v) stretching the peeled film;
  (vi) winding the stretched film in a roll:

Formula (R)

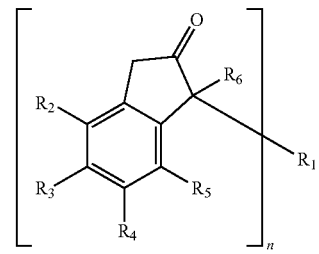

wherein $R_2$ to $R_5$ each independently represent a hydrogen atom or a substituent; $R_2$ and $R_3$, $R_3$ and $R_4$, and $R_4$ and $R_5$ may be combined to form a ring; $R_6$ represents a hydrogen atom or a substituent; n represents an integer of 1 or 2; when n equals to 1, $R_1$ represents a substituent; and when n is 2, $R_1$ represents a divalent linkage group Formula (Ra)

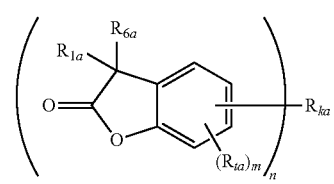

wherein n represents an integer of 2 to 4; m represents an integer of 1-3; $R_{1a}$ and $R_{6a}$ each independently represent a hydrogen atom or a substituent; $R_{ta}$ represents a hydrogen atom or a substituent; a plurality of $R_{ta}$ may be combined to form a ring; and $R_{ka}$ represents a di- to tetra-valent linkage group.
(18) The method of Item (17), wherein
  $R_1$ in Formula (R) is a conjugated substituent when n is 1; or
  $R_{1a}$ in Formula (Ra) is a conjugated substituent when n is 1.
(19) The method of Item (17) or (18), wherein the compound represented by Formula (R) is a compound represented by Formula (R-1):

Formula (R-1)

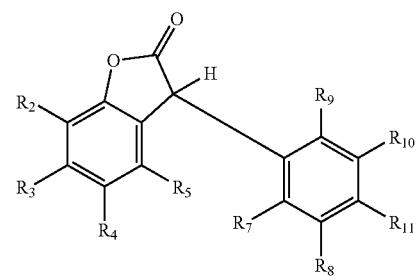

wherein $R_2$ to $R_5$ each independently represent a hydrogen atom or a substituent; $R_7$ to $R_{11}$ each independently represent a hydrogen atom, an alkyl group having 1 to 18 carbon atoms or an alkoxy group having 1 to 18 carbon atoms.
(20) The method of any one of Items (17) to (19), wherein a sum of Hammett's σp values of $R_7$ to $R_{11}$ is 0 or less.
(21) The method of any one of Items (17) to (20), wherein the compound represented by Formula (R) is a compound represented by Formula (R-2):

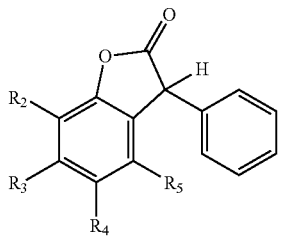

Formula (R-2)

wherein $R_2$ to $R_5$ each independently represent a hydrogen atom or a substituent.

(22) The method of any one of Items (17) to (21), wherein $R_5$ in Formula (R) is a hydrogen atom.
(23) The method of any one of Items (17) to (22), wherein the compound represented by Formula (Ra) is a compound represented by Formula (R-3):

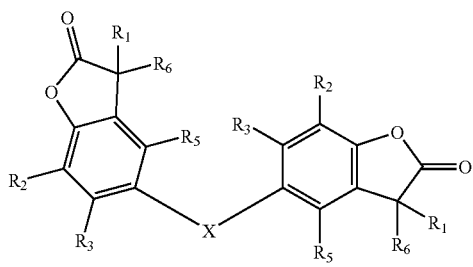

Formula (R-3)

wherein $R_1$, $R_2$, $R_3$, $R_5$ and $R_6$ each independently represent a hydrogen atom or a substituent; $R_2$ and $R_3$ may be combined to form a ring; and X represents a divalent linkage group.
(24) The method of any one of Items (17) to (23), wherein the polarizer protective film further comprises a phosphonite compound.
(25) The method of Item (24), wherein the polarizer protective film further comprises a hindered phenol compound.
(26) The method of any one of Items (17) to (25), wherein a content of the saccharide ester is 1 to 35% by weight based on a weight of the cellulose ester in the polarizer protective film.
(27) The method of any one of Items (17) to (26), wherein the compound (A) is glucose, galactose, mannose, fructose, xylose, or arabinose.
(28) The method of any one of Items (17) to (26), wherein the compound (B) comprises at least one furanose structure and at least one pyranose structure bonded in the molecule of the compound (B).
(29) The method of any one of Items (17) to (26), wherein the compound (B) is lactose, sucrose, nystose, 1F-fructosylnystose, stachyose, maltitol, lactitol, lactulose, cellobiose, maltose, cellotriose, maltotriose, raffinose, kestose, gentiobiose, gentiotriose, gentiotetraose, xylotriose or galactosyl-sucrose.
(30) The method of Item (29), wherein the compound (B) is sucrose.

According to the present invention, provided are: a polarizer protective film employing a cellulose ester film exhibiting a stable property, in which variation of retardation values due to humidity change is reduced, and exhibiting reduced deformation defects of a film master roll such as a horseback defect or a convex defect even after a long term storage; a manufacturing method of the polarizer protective film; a polarizing plate employing the polarizer protective film; and a liquid crystal display utilizing the polarizing plate.

The most preferred embodiments of the present invention will now be detailed below, however, the present invention is not limited thereto. In the specification of the present invention, the polarizer protective film of the present may occasionally be referred to as merely a cellulose ester film.

<<Compound Represented by Formula (R) or (Ra)>>

In the present invention, the polarizer protective film composed of a cellulose ester film is characterized in that the cellulose ester film contains a compound represented by Formula (R) or (Ra).

In Formula (R), $R_2$-$R_5$ each independently is a hydrogen atom or a substituent, $R_6$ is a hydrogen atom or a substituent, n is 1 or 2, and $R_1$ is a substituent when n is 1, while $R_1$ is a divalent linkage group when n is 2.

Substituents represented by $R_1$-$R_6$ are not specifically limited, however, include an alkyl group (such as a methyl group, an ethyl group, a propyl group, an isopropyl group, a t-butyl group, a pentyl group, a hexyl group, an octyl group, a dodecyl group and trifluoromethyl group), a cycloalkyl group (such as a cyclopentyl group and a cyclohexyl group), an aryl group (such as a phenyl group and a naphthyl group), an acylamino group (such as an acetylamino group and a benzoylamino group), an alkylthio group (such as a methylthio group and an ethylthio group), an arylthio group (such as a phenylthio group and a naphthylthio group), an alkenyl group (such as a vinyl group, a 2-propenyl group, a 3-butenyl group, a 1-methyl-3-propenyl group, a 3-pentenyl group, a 1-methyl-3-butenyl group, a 4-hexenyl group and a cyclohexenyl group), a halogen atom (such as a fluorine atom, a chlorine atom, a bromine atom and an iodine atom), an alkynyl group (such as a propalgyl group), a heterocyclic group (such as a pyridyl group, a thiazolyl group, an oxazolyl group and an imidazolyl group), an alkylsulfonyl group (such as a methylsulfonyl group and an ethylsulfonyl group), an arylsulfonyl group (such as a phenylsulfonyl group and a naphthylsulfonyl group), an alkylsulfinyl group (such as a methylsulfinyl group), an arylsulfinyl group (such as a phenylsulfinyl group), a phosphono group, an acy group (such as an acetyl group, a pivaloyl group and a benzoyl group), a carbamoyl group (such as an aminocarbonyl group, a methylaminocarbonyl group, a dimethylaminocarbonyl group, a butylaminocarbonyl group, a cyclohexylaminocarbonyl group, a phenylaminocarbonyl group and a 2-pyridylaminocarbonyl group), a sulfamoyl group (such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group), a sulfonamide group (such as a methanesulfonamide group and a benzenesulfonamido group), a cyano group, an alkoxy group (such as a methoxy group, an ethoxy group and a propoxy group), an aryloxy group (such as a phenoxy group and a naphthyloxy group), a heterocyclicoxy group, a siloxy group, an acyloxy group (such as an acetyloxy group and a benzoyloxy group), a sulfonic acid group, a salt of sulfonic acid, an aminocarbonyloxy group, an amino group (such as an amino group, an ethylamino group, a dimethylamino group, a butylamino group, a cyclopentylamino group, a 2-ethylhexylamino group and a dodecylamino group), an anilino group (such as a phenylamino group, a chlorophenylamino group, a toluidino group, an anisidino group, a naphthylamino group and a 2-pyridylamino group), an imido group, an ureido group (such as a methylureido group, an ethylureido group, a pentylureido group, a cyclohexlureido group, an octylureido group, a dodecylureido group, a phenylureido group, a naphthylureido group and a 2-pyridylureido group), an alkoxycarbonylamino group (such as a methyoxycarbonylamino group and a phenoxycarbonylamino group), an aryloxycarbonylamino group (such as a phenoxycarbonylamino group), a heterocyclicthio group, a thioureido group, a carboxyl group, a salt of carboxylic acid, a hydroxyl group, a mercapto group and a nitro group. These groups may be further substituted by a similar substituent.

In aforesaid Formula (R), $R_2$-$R_5$ is preferably a hydrogen atom or an alkyl group.

In aforesaid Formula (R), $R_6$ is a hydrogen atom or a substituent, and a substituent represented by $R_6$ includes substituents similar to substituents represented by $R_2$-$R_5$. $R_5$ may be a substituent, however, is preferably a hydrogen atom. Particularly, $R_6$ is preferably a hydrogen atom.

In aforesaid Formula (R), n is an integer of 1-4, and $R_1$ is a substituent when n is 1, as explained above, while $R_1$ each is corresponding 2-4 valent connecting group when n is an integer of 2-4.

Herein, $R_1$ is preferably a substituent of a conjugate type when n is 1. Examples of a substituent of a conjugate type include ethylene, acetylene, butadiene; aromatic hydrocarbon and a heterocyclic ring such as pyridine, anthrathene, pyrene, furan, benzene and naphtharene and preferably aromatic hydrocarbon such as benzene and naphthalene.

When $R_1$ is a 2-4 valent connecting group, a divalent connecting group includes, for example, a divalent alkylene group which may be provided with a substituent, a divalent arylene group which may be provided with a substituent, an oxygen atom, a nitrogen atom, a sulfur atom or combinations of these connecting groups.

In aforesaid Formula (R), n is preferably 1 and $R_1$ is preferably a phenyl group which may be substituted or unsubstituted. More specifically, it is preferably aforesaid Formula (R-1). In aforesaid Formula (R-1), $R_2$-$R_5$ each independently are a hydrogen atom or a substituent. $R_7$-$R_{11}$ each independently are a hydrogen atom, an alkyl group having a carbon number of 1-18, or an alkoxy group having a carbon number of 1-18.

In aforesaid Formula (R-1), the total sum of Hammett's σp value of $R_7$-$R_{11}$ is preferably not more than 0. Herein, σp value described in this patent publication will be explained. Hammett's rule is an empirical rule proposed by L. P. Hammett in 1935 to discuss the influence of a substituent on a reaction or equilibrium of a benzene derivative, and is widely recognized to be valid nowadays. The coefficient of a substituent determined by Hammett's rule includes σp value and σm value, which can be referred to general literatures and are detailed in "Lange's Handbook of Chemistry" the 12th edition, edited by J. A. Dean (1979) (McGraw-Hill) and "Kagaku No Ryoiki", Special No. 122, pp. 96-103 (1979) (Nankodo). In the present invention, each substituent will be limited or explained based on Hammett's coefficient of substituent σp value, however, this does not necessarily mean to be limited to substituents, the values of which are already known in literatures, but naturally includes substituent the value of which supposed to be in the range when measured based on Hammett's rule. In this patent, σp value represents this meaning.

An example of aforesaid Formula (R-1) includes compounds of aforesaid Formula (R-2). In aforesaid Formula (R-2), $R_2$-$R_5$ each independently are a hydrogen atom or a substituent.

Next, compounds of Formula (Ra) of the present invention will be explained.

In aforesaid Formula (Ra), n is an integer of 2-4 and m is an integer of 1-3. $R_{1a}$ and $R_{6a}$ each independently are a hydrogen atom or a substituent. $R_{ta}$ is a hydrogen atom or a substituent. Herein, $R_{ta}$ may bond to each other to form a ring. $R_{ka}$ is a 2-4 valent connecting group.

As specific examples of $R_{1a}$ and $R_{6a}$, the explanations of $R_1$ and $R_6$ described above can be applied. Herein, $R_{1a}$ is preferably a substituent of a conjugate type when n is 1. Examples of a conjugated substituent include ethylene, acetylene and butadiene; an aromatic hydrocarbon and a heterocyclic ring such as pyridine, anthrathene, pyrene, furan, benzene and naphthalene. Among them, aromatic hydrocarbon such as benzene and naphthalene are preferable.

An example of aforesaid Formula (Ra) includes a compound of aforesaid Formula (R-3). In Formula (R-3), $R_1$, $R_2$, $R_3$, $R_5$ and $R_6$ each independently are a hydrogen atom or a substituent. Herein, $R_2$ and $R_3$ may bond to each other to form a ring. X is a divalent connecting group.

The compound represented by Formula (R) of the present invention will further be explained in more detail.

In Formula (R), n represents an integer of 1 or 2: when n is 1, $R_1$ represents a naphthyl group, a phenanthryl group, an anthryl group, 5,6,7,8-tetrahydro-2-naphthyl group, 5,6,7,8-tetrahydro-1-naphthyl group, a thienyl group, a benzo[b]thienyl group, a naphtho[2,3-b]thienyl group, a thianthrenyl group, a dibenzofuryl group, a chromenyl group, a xanthenyl group, a phenoxantinyl group, a pyrrolyl group, an imidazolyl group, a pyrazolyl group, a pyrazinyl group, a pyrimidinyl group, a pyridazinyl group, an indolizinyl group, an isoindolyl group, an indolyl group, an indazolyl group, a purinyl group, a quinolidinyl group, an isoquinolyl group, a quinolyl group, a phthalazinyl group, a naphthyridinyl group, a quinoxalinyl group, a quinazolinyl group, a connolyl group, a pteridinyl group, a carbazolyl group, b-carbolinyl group, a phenanthyridinyl group, an acrydinyl group, a perimidinyl group, a phenanthrolinyl group, a phenadinyl group, an isothiazolyl group, a phenothiadinyl machine, an isoxazolyl group, a furazanyl group, a biphenyl group, a terphenyl group, a fluorenyl group or a phenoxadinyl group, each of which is unsubstituted or substituted with an alkyl group having 1-4 carbon atoms, an alkoxy group having 1-4 carbon atoms, an alkylthio group having 1-4 carbon atoms, a hydroxy group, a halogen atom, an amino group, an alkylamino group having 1-4 carbon atoms, a phenylamino group or a di-(alkyl having 1-4 carbon atoms)-amino group, or $R_1$ represents a group represented the following formula (II);

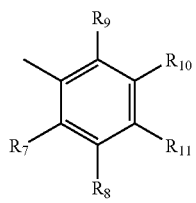

(II)

when n=2, $R_1$ represents a phenylene group or a naphthylene group, each of which is unsubstituted or substituted with an alkyl group having 1-4 carbon atoms or a hydroxyl group, or $R_1$ represents —$R_{12}$—X—$R_{13}$— (in the group, X represents a direct bond, an oxygen atom, a sulfur atom or —NR31-; $R_2$, $R_3$, $R_4$, and $R_5$ each independently represent a hydrogen atom, a chlorine atom, a hydroxyl group, an alkyl group having 1-25 carbon atoms, a phenylalkyl group having 7-9 carbon atoms, a phenyl group which is unsubstituted or substituted with an alkyl group having 1-4 carbon atoms, a cycloalkyl group having 5-8 carbon atoms which is unsubstituted or substituted with an alkyl group having 1-4 carbon atoms, an alkoxy group having 1-18 carbon atoms, an alkylthio group having 1-18 carbon atoms, an alkylamino group having 1-4 carbon atoms, a di(alkyl having a carbon number of 1-4)amino group, an alkanoyloxy group having 1-25 carbon atoms, an alkanoylamino group having 1-25 carbon atoms, an alkenoyloxy group having 3-25 carbon atoms, an alkanoyloxy group having a carbon number of 3-25 which contains an oxygen atom, a sulfur atom or —N($R_{14}$)— in the carbon chain, a cycloalkylcarbonyloxy group having 6-9 carbon atoms, a benzoyloxy group, or an (alkyl having a carbon number of 1-12)-substituted benzoyloxy group; or substituents $R_2$ and $R_3$, $R_3$ and $R_4$, or $R_4$ and $R_5$ may bond to each other to form a ring; $R_4$ further is —$(CH_2)_p$—$COR_{15}$ or —$(CH_2)_q$OH (wherein, p is 0, 1 or 2, q is 1, 2, 3, 4, 5 or 6); or when $R_3$, $R_5$ and $R_6$ each are a hydrogen atom, $R_4$ further is a group represented by following formula (III)

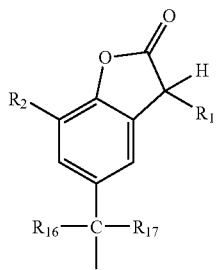

(III)

(wherein, $R_1$ is identical to those defined above in the case of n=1); $R_6$ is a hydrogen atom or a group represented by following formula (IV)

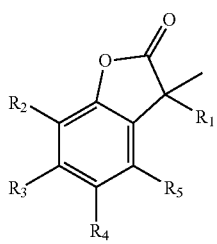

(IV)

(wherein, $R_4$ is not a group of formula (III) but is identical to those defined above as $R_4$ in the case of n=1); $R_7$, $R_8$, $R_9$ and $R_{10}$ each independently are a hydrogen atom, a halogen atom, a hydroxyl group, an alkyl group having a carbon number of 1-25; an alkyl group having a carbon number of 2-25 which contains an oxygen atom, a sulfur atom or —N($R_{14}$)— in the carbon chain; an alkoxy group having a carbon number of 2-25 which contains an oxygen atom, a sulfur atom or —N($R_{14}$)— in the carbon chain; an alkylthio group having a carbon number of 1-25, an alkenyl group having a carbon number of 3-25, an alkenyloxy group having a carbon number of 3-25, an alkynyl group having a carbon number of 3-25, an alkynyloxy group having a carbon number of 3-25, a phenylalkyl group having a carbon number of 7-9, a phenylalkoxy group having a carbon number of 7-9; an unsubstituted or an (alkyl having a carbon number of 1-4)-substituted phenyl group; an unsubstituted or an (alkyl having a carbon number of 1-4)-substituted phenoxy group; an unsubstituted or an (alkyl having a carbon number of 1-4)-substituted cycloalkyl group having a carbon number of 5-8, an unsubstituted or an (alkyl having a carbon number of 1-4)-substituted cycloalkoxy group having a carbon number of 5-8; an alkylamino group having a carbon number of 1-4, a di(alkyl having a carbon number of 1-4)amino group, an alkanoyl group having a carbon number of 1-25; an alkanoyl group having a carbon number of 3-25 which contains an oxygen atom, a sulfur atom or —N($R_{14}$)— in the carbon chain; an alkanoyloxy group having a carbon number of 1-25; an alkanoyloxy group having a carbon number of 3-25 which contains an oxygen atom, a sulfur atom or —N($R_{14}$)— in the carbon chain; an alkanoylamino group having a carbon number of 1-25, an alkenoyl group having a carbon number of 3-25, an alkenoyl group having a carbon number of 3-25 which contains an oxygen atom, a sulfur atom or —N($R_{14}$)— in the carbon chain; an alkenoyloxy group having a carbon number of 3-25; an alkenoyloxy group having a carbon number of 3-25 which contains an oxygen atom, a sulfur atom or —N($R_{14}$)— in the carbon chain; a cycloalkylcarbonyl group having a carbon number of 6-9, a cycloalkylcarbonyloxy group having a carbon number of 6-9, a benzoyl group or an (alkyl having a carbon number of 1-12)-substituted benzoyl group; a benzoyloxy group or an (alkyl having a carbon number of 1-12)-substituted benzoyloxy group;

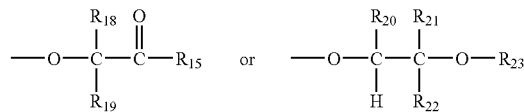

and further, in formula (II), each pair of substituents $R_7$ and $R_8$, or $R_8$ and $R_{11}$ may form a benzene ring together with the bonded carbon atoms; $R_{11}$ represents a hydrogen atom, an alkyl group having 1-25 carbon atoms, an alkylthio group having 1-25 carbon atoms, an alkenyl group having 3-25 carbon atoms, an alkynyl group having 3-25 carbon atoms, a phenylalkyl group having 1-25 carbon atoms, an unsubstituted or an (alkyl having a carbon number of 1-4)-substituted phenyl group; an unsubstituted or an (alkyl having a carbon number of 1-4)-substituted cycloalkyl group having a carbon number of 5-8, an alkylamino group having a carbon number of 1-4, a di(alkyl having a carbon number of 1-4)amino group, an alkanoyl group having a carbon number of 1-25; an alkanoyl group having a carbon number of 3-25 which contains an oxygen atom, a sulfur atom or —N($R_{14}$)— in the carbon chain; an alkanoylamino group having a carbon number of 1-25, an alkenoyl group having a carbon number of 3-25, an alkenoyl group having a carbon number of 3-25 which contains an oxygen atom, a sulfur atom or —N($R_{14}$)— in the carbon chain; a cycloalkylcarbonyl group having a carbon number of 6-9, a benzoyl group or an (alkyl having a carbon number of 1-12)-substituted benzoyl group; at least one of $R_7$, $R_8$, $R_9$, $R_{10}$ and $R_{11}$ is not a hydrogen atom; $R_{12}$ and $R_{13}$ each independently are an unsubstituted or an (alkyl having a carbon number of 1-4)-substituted phenylene group or naphthalene group; $R_{14}$ is a hydrogen atom or an alkyl group having a carbon number of 1-8; $R_{15}$ is a hydroxyl group, the following group

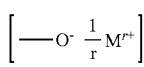

(wherein, M is r-valent metal cation and r is 1, 2 or 3), an alkoxy group having a carbon number of 1-18 or

$R_{16}$ and $R_{17}$ each independently are a hydrogen atom, $CF_3$, an alkyl group having a carbon number of 1-12 or a phenyl group, or $R_{16}$ and $R_{17}$ form a cycloalkylidene ring having a carbon number of 5-8, which is unsubstituted or substituted by 1-3 alkyl groups having a carbon number of 1-4, together with the bonded carbon atoms; $R_{18}$ and $R_{19}$ each independently are a hydrogen atom, an alkyl group having a carbon number of 1-4, or a phenyl group; $R_{20}$ is a hydrogen atom, an alkyl group having a carbon number of 1-4, $R_{21}$ is a hydrogen atom, an unsubstituted or an (alkyl having a carbon number of 1-4)-substituted phenyl group, an alkyl group having a carbon number of 1-25 which contains an oxygen atom, a sulfur atom or —$N(R_{14})$— in the carbon chain; a phenylalkyl group having a carbon number of 7-9 which is unsubstituted or substituted by 1-3 alkyl groups having a carbon number of 1-4 at the phenyl portion; a phenylalkyl group having a carbon number of 7-25 which contains an oxygen atom, a sulfur atom or —$N(R_{14})$— in the carbon chain and is unsubstituted or substituted by 1-3 alkyl groups having a carbon number of 1-4 at the phenyl portion; or $R_{20}$ and $R_{21}$ form a cycloalkylene ring having a carbon number of 5-12, which is unsubstituted or substituted by 1-3 alkyl groups having a carbon number of 1-4 together with the bonded carbon atoms; $R_{22}$ is a hydrogen atom or an alkyl group having a carbon number of 1-4; $R_{23}$ is an alkanoyl group having a carbon number of 1-25, an alkenoyl group having a carbon number of 3-25, an alkanoyl group having a carbon number of 3-25 which contains an oxygen atom, a sulfur atom or —$N(R_{14})$— in the carbon chain; an alkanoyl group having a carbon number of 2-25 which is substituted by di(alkyl having a carbon number of 1-6)-phosphonate group; a cycloalkylcarbonyl group having a carbon number of 6-9, a thenoyl group, a furoyl group, a benzoyl group or an (alkyl having a carbon number of 1-12)-substituted benzoyl group;

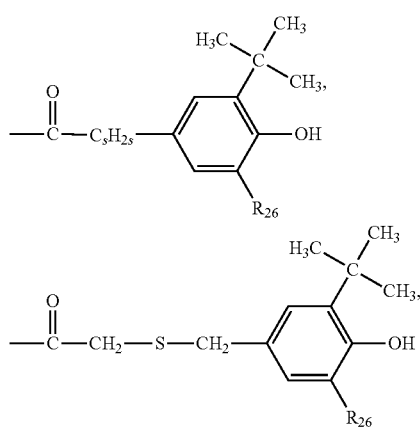

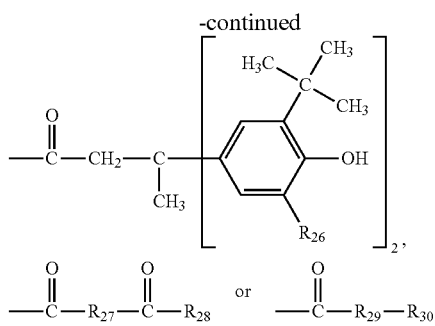

(wherein, s is 1 or 2); $R_{24}$ and $R_{25}$ each independently are a hydrogen atom or an alkyl group having a carbon number of 1-18; R26 is a hydrogen atom or an alkyl group having a carbon number of 1-8; $R_{27}$ is a direct bond or an alkylene group having a carbon number of 1-18; an alkylene group having a carbon number of 2-18 which contains an oxygen atom, a sulfur atom or —$N(R_{14})$— in the carbon chain; an alkenylene group having a carbon number of 2-18, an alkylidene group having a carbon number of 2-20, a phenylalkylidene group having a carbon number of 7-20, a cycloalkylene group having a carbon number of 5-8, a bicycloalkylene group having a carbon number of 7-8, an unsubstituted or an (alkyl having a carbon number of 1-4)-substituted phenylene group,

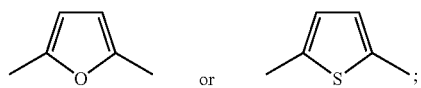

$R_{28}$ is a hydroxyl group,

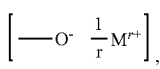

an alkoxy group having a carbon number of 1-18 or

$R_{29}$ is an oxygen atom, —NH— or

$R_{30}$ is an alkyl group having a carbon number of 1-18 or a phenyl group; $R_{31}$ is a hydrogen atom or an alkyl group having a carbon number of 1-18.

When n is 1, $R_1$ is preferably a group represented by aforesaid formula (II); a naphthyl group, a phenanthryl group, an anthoryl group, a 5,6,7,8-tetrahydro-2-naphthyl group, a 5,6,7,8-tetrahydro-1-naphthyl group, a thienyl group, a benzo[b]thienyl group, a naphtho[2,3-b]thienyl group, a thianthrenyl group, a dibenzofuryl group, a chromenyl group, a xanthenyl group, a phenoxanthinyl group, a pyrrolyl group, an imidazolyl group, a pyrazolyl group, a pyradinyl group, a pyridinyl group, a pyridazinyl group, an indolydinyl group, an isoindolyl group, an indolyl group, an indazolyl group, a purinyl group, a quinolizinyl group, an isoquinolyl group, a quinolyl group, a phthalazinyl group, a naphthylizinyl group, a quinoxalinyl group, a quinazolinyl group, a cinnolyl group, a butedinyl group, a carbazolyl group, a β-carbolinyl group, a phenanthyridinyl group, an acridinyl group, a perimidinyl group, a phenanthrolinyl group, a phenaziyl group, an isothiazolyl group, a phenothiazinyl, an isoxazolyl group, a furazanyl group, a biphenyl group, a terphenyl group, a fluorenyl group or a phenoxazinyl group; each of which is unsubstituted or substituted by an alkyl group having a carbon number of 1-4, an alkoxy group having a carbon number of 1-4, an alkylthio group having a carbon number of 1-4, a hydroxyl group, a halogen atom, an amino group, an alkylamino group having a carbon number of 1-4 or di(alkyl having a carbon number of 1-4)-amino group; typically, a 1-naphtyl group, a 2-naphthyl group, a 1-phenylamino-4-naphthyl group, a 1-methylnaphthyl group, a 2-methylnaphthyl group, a 1-methoxy-2-naphthyl group, a 2-methoxy-1-naphthyl group, a 1-dimethylamino-2-naphthyl group, a 1,2-dimethyl-4-naphthyl group, a 1,2-dimethyl-6-naphthiyl group, a 1,2-dimethyl-7-naphthiyl group, a 1,3-dimethyl-6-naphthiyl group, a 1,4-dimethyl-6-naphthiyl group, a 1,5-dimethyl-2-naphthiyl group, a 1,6-dimethyl-2-naphthiyl group, a 1-hydroxy-2-naphthyl group, a 2-hydroxy-1-naphthyl group, a 1,4-dihydroxy-2-naphthyl group, a 7-phenanthryl group, a 1-anthryl group, a 2-anthryl group, a 9-anthryl group, a 3-benzo[b]thienyl group, a 5-benzo[b]thienyl group, a 2-benzo[b]thienyl group, a 4-dibenzofuryl group, a 4,7-dibenzofuryl group, a 4-methyl-7-benzofuryl group, a 2-xanthenyl group, a 8-methyl-2-xanthenyl group, a 3-xanthenyl group, a 2-phenoxanthinyl group, a 2,7-phenoxanthinyl group, a 2-pyrrolyl group, a 3-pyrrolyl group, a 5-methyl-3-pyrrolyl group, a 2-imidazolyl group, a 4-imidazolyl group, a 5-imidazolyl group, a 2-methyl-4-imidazolyl group, a 2-ethyl-4-imidazolyl group, a 2-ethyl-5-imidazolyl group, a 3-pyrazolyl group, a 1-methyl-3-pyrazolyl group, a 1-propyl-4-pyrazolyl group, a 2-pyrazinyl group, a 5,6-dimethyl-2-pyrazinyl, a 2-indolizinyl group, a 2-methyl-3-isoindolyl group, a 2-methyl-1-isoindolyl group, a 1-methyl-2-indolyl group, a 1-methyl-3-indolyl group, a 1,5-dimethyl-2-indolyl group, a 1-methyl-3-indazolyl group, a 2,7-dimethyl-8-purinyl group, a 2-methoxy-7-methyl-8-purinyl group, a 2-quinolizinyl group, a 3-isoquinolyl group, a 6-isoquinolyl group, a 7-isoquinolyl group, an isoquinolyl group, a 3-methoxy-6-isoquinolyl group, a 2-quinolyl group, a 6-quinolyl group, a 7-quinolyl group, a 2-methoxy-3-quinolyl group, a 2-methoxy-6-quinolyl group, a 6-phthalazinyl, a 7-phthalazinyl group, a 1-methoxy-6-phthalazinyl group, a 1,4-dimethoxy-6-phthalazinyl group, 1,8-naphthylizini-2-yl group, a 2-quinoxalinyl group, a 6-quinoxalinyl group, a 2,3-dimethyl-6-quinoxalinyl group, a 2,3-dimethoxy-6-quinoxalinyl group, a 2-quinazolinyl group, a 7-quinazolinyl group, a 2-dimethylamino-6-quinazolinyl group, a 3-cinnolinyl group, a 6-cinnolinyl group, a 7-cinnolinyl group, a 3-methoxy-7-cinnolinyl group, a 2-pteridinyl group, a 6-pteridinyl group, a 7-pteridinyl group, a 6,7-dimethoxy-2-pteridinyl group, a 2-carbazolyl group, a 9-methyl-2-carbazolyl group, a 9-methyl-3-carbazolyl group, a β-carbolini-3-yl group, a 1-methyl-β-carbolini-3-yl group, a 1-methyl-β-carbolini-6-yl group, a 3-phenyanthrizinyl group, a 2-acridinyl group, a 3-acridinyl group, a 2-perimidinyl group, a 1-methyl-5-perimidinyl group, a 5-phenanthrolinyl group, a 6-phenanthrolinyl group, a 1-phenazinyl group, a 2-phenazinyl group, a 3-isothiazolyl group, a 4-isothiazolyl group, a 5-isothiazolyl group, a 2-phenothiazinyl group, a 3-phenothiazinyl group, a 10-methyl-3-phenothiazinyl group, a 3-isoxazolyl group, a 4-isoxazolyl group, a 5-isoxazolyl group, a 4-methyl-3-furazanyl group, a 2-phenoxazinyl group or a 10-methyl-2-phenoxazinyl group.

Specifically preferable as the above-described substituents are, a group represented by aforesaid formula (II); a naphthyl group, a phenanthryl group, an anthryl group, a 5,6,7,8-tetrahydro-2-naphthyl group, a 5,6,7,8-tetrahydro-1-naphthyl group, a thienyl group, a benzo[b]thienyl group, a naphtho[2,3-b]thienyl group, a thianthrenyl group, a dibenzofuryl group, a chromenyl group, a xanthenyl group, a phenoxanthinyl group, a pyrrolyl group, an isoindolyl group, an indolyl group, a phenothiazinyl, a biphenyl group, a terphenyl group, a fluorenyl group or a phenoxazinyl group, each of which is unsubstituted or substituted by an alkyl group having a carbon number of 1-4, an alkoxy group having a carbon number of 1-4, an alkylthio group having a carbon number of 1-4, a hydroxyl group, a phenylamino group or di(alkyl having a carbon number of 1-4)amino group; typically, a 1-naphtyl group, a 2-naphthyl group, a 1-phenylamino-4-naphthyl group, a 1-methylnaphthyl group, a 2-methylnaphthyl group, a 1-methoxy-2-naphthyl group, a 2-methoxy-1-naphthyl group, a 1-dimethylamino-2-naphthyl group, a 1,2-dimethyl-4-naphthyl group, a 1,2-dimethyl-6-naphthiyl group, a 1,2-dimethyl-7-naphthiyl group, a 1,3-dimethyl-6-naphthiyl group, a 1,4-dimethyl-6-naphthyl group, a 1,5-dimethyl-2-naphthyl group, a 1,6-dimethyl-2-naphthyl group, a 1-hydroxy-2-naphthyl group, a 2-hydroxy-1-naphthyl group, a 1,4-dihydroxy-2-naphthyl group, a 7-phenanthryl group, a 1-anthryl group, a 2-anthryl group, a 9-anthryl group, a 3-benzo[b]thienyl group, a 5-benzo[b]thienyl group, a 2-benzo[b]thienyl group, a 4-dibenzofuryl group, a 4,7-dibenzofuryl group, a 4-methyl-7-dibenzofuryl group, a 2-xanthenyl group, a 8-methyl-2-xanthenyl group, a 3-xanthenyl group, a 2-phenoxanthinyl group, a 2,7-phenoxanthinyl group, a 2-pyrrolyl group, a 3-pyrrolyl group, a 2-phenothiazinyl group, a 3-phenothiazinyl group and a 10-methyl-3-phenothiazinyl group.

A halogen substituent is preferably a chlorine substituent, a bromine substituent or an iodine substituent, and more preferably a chlorine substituent.

An alkanoyl group having a carbon number of up to 25 is a branched or un-branched group, and is, for example, a formyl group, an acetyl group, a propionyl group, a butanoyl group, a pentanoyl group, a hexanoyl group, a heptanoyl group, an octanoyl group, a nonanoyl group, a decanoyl group, an undecanoyl group, a dodecanoyl group, a tridecanoyl group, a tetradecanoyl group, a pentadecanoyl group, a hexadecanoyl group, a heptadecanoyl group, an octadecanoyl group, an eicosanoyl group or a docosanoyl group. Preferable is an alkanoyl group having a carbon number of 2-18, more preferably of 2-12 and specifically preferably of 2-6. An acetyl group is specifically preferable.

An alkanoyl group having a carbon number of 2-25, which is substituted by di(alkyl having a carbon number of 1-6) phosphonate group, is typically $(CH_3CH_2O)_2POCH_2CO-$, $(CH_3O)_2POCH_2CO-$, $(CH_3CH_2CH_2CH_2O)_2POCH_2CO-$, $(CH_3CH_2O)_2POCH_2CH_2CO-$, $(CH_3O)_2POCH_2CH_2CO-$, $(CH_3CH_2CH_2CH_2O)_2POCH_2CH_2CO-$, $(CH_3CH_2O)_2PO(CH_2)_4CO-$, $(CH_3CH_2O)_2PO(CH_2)_8CO-$ or $(CH_3CH_2O)_2PO(CH_2)_{17}CO-$.

An alkanoyloxy group having a carbon number of up to 25 is a branched or un-branched group, and is, for example, a formyloxy group, an acetoxy group, a propionyloxy group, a butanoyloxy group, a pentanoyloxy group, a hexanoyloxy group, a heptanoyloxy group, an octanoyloxy group, a nonanoyloxy group, a decanoyloxy group, an undecanoyloxy group, a dodecanoyloxy group, a tridecanoyloxy group, a tetradecanoyloxy group, a pentadecanoyloxy group, a hexadecanoyloxy group, a heptadecanoyloxy group, an octadecanoyloxy group, an eicosanoyloxy group or a docosanoyloxy group. Preferable is an alkanoyloxy group having a carbon number of 2-18, more preferably of 2-12 and for example of 2-6. An acetoxy group is specifically preferred.

An alkenoyl group having a carbon number of 3-25 is a branched or un-branched group, and, for example, includes a propenoyl group, a 2-butenoyl group, a 3-butenoyl group, an isobutenoyl group, an n-2,4-pentadienoyl group, a 3-methyl-2-butenoyl group, an n-2-octenoyl group, an n-2-dodecenoyl group, an iso-dodecenoyl group, an oleoyl group, an n-2-octadecanoyl group or an n-4-octadecanoyl group. Preferable is an alkenoyl group having a carbon number of 3-18, more preferably of 3-12, for example of 3-6 and specifically preferably of 3-4.

An alkenoyl group having a carbon number of 3-25, which contains an oxygen atom, a sulfur atom or —N($R_{14}$)— in the carbon chain, is typically $CH_3OCH_2CH_2CH$=$CHCO$— or $CH_3OCH_2CH_2OCH$=$CHCO$—.

An alkenoyloxy group having a carbon number of 3-25 is a branched or un-branched group, and, for example, includes a propenoyloxy group, a 2-butenoyloxy group, a 3-butenoyloxy group, an isobutenoyloxy group, an n-2,4-pentadiennoyloxy group, a 3-methyl-2-butenoyloxy group, an n-2-octenoyloxy group, an n-2-dodecenoyloxy group, an iso-dodecenoyloxy group, an oleoyloxy group, a n-2-octadecenoyloxy group or an n-4-octadecenoyloxy group. Preferable is an alkenoyloxy group having a carbon number of 3-18, more preferably 3-12, typically 3-6 and most preferably 3-4.

An alkenoyloxy group having a carbon number of 3-25, which contains an oxygen atom, a sulfur atom or —N($R_{14}$)— in the carbon chain, is typically $CH_3OCH_2CH_2CH$=$CHCOO$— or $CH_3OCH_2CH_2OCH$=$CHCOO$—.

An alkanoyl group having a carbon number of 3-25, which contains an oxygen atom, a sulfur atom or —N($R_{14}$)— in the carbon chain, is typically $CH_3$—O—$CH_2CO$—, $CH_3$—S—$CH_2CO$—, $CH_3$—NH—$CH_2CO$—, $CH_3$—N($CH_3$)—$CH_2CO$—, $CH_3$—O—$CH_2CH_2$—O$CH_2CO$—, $CH_3$—(O—$CH_2CH_2$)$_2$—O—$CH_2CO$—, $CH_3$—(O—$CH_2CH_2$)$_3$O—$CH_2CO$— or $CH_3$—(O—$CH_2CH_2$)$_4$O—$CH_2CO$—.

An alkanoyloxy group having a carbon number of 3-25 which contains an oxygen atom, a sulfur atom or —N($R_{14}$)— in the carbon chain, is typically $CH_3$—O—$CH_2COO$—, $CH_3$—S—$CH_2COO$—, $CH_3$—NH—$CH_2COO$—, $CH_3$—N($CH_3$)—$CH_2COO$—, $CH_3$—O—$CH_2CH_2$—O$CH_2COO$—, $CH_3$—(O—$CH_2CH_2$)$_2$O—$CH_2COO$—, $CH_3$—(O—$CH_2CH_2$)$_3$O—$CH_2COO$— or $CH_3$—(O—$CH_2CH_2$)$_4$O—$CH_2COO$—.

Examples of a cycloalkylcarbonyl group having a carbon number of 6-9 are preferably a cyclopentylcarbonyl group, a cyclohexylcarbonyl group, a cycloheptylcarbonyl group and a cyclooctylcarbonyl group. And a cyclohexylcarbonyl group is preferred.

Examples of a cycloalkylcarbonyloxy group having a carbon number of 6-9 are preferably a cyclopentylcarbonyloxy group, a cyclohexylcarbonyloxy group, a cycloheptylcarbonyloxy group and a cyclooctylcarbonyloxy group. And a cyclohexylcarbonyloxy group is preferred.

An (alkyl having a carbon number of 1-12)-substituted benzoyl group, which is provided with preferably 1-3 and most preferably 1-2 alkyl groups, is a o-, m- or p-methylbenzoyl group, a 2,3-dimethylbenzoyl group, a 2,4-dimethylbenzoyl group, a 2,5-dimethylbenzoyl group, a 2,6-dimethylbenzoyl group, a 3,4-dimethylbenzoyl group, a 3,5-dimethylbenzoyl group, a 2-methyl-6-ethylbenzoyl group, a 4-tert-butylbenzoyl group, a 2-ethylbenzoyl group, a 2,4,6-trimethylbenzoyl group, a 2,6-dimethyl-4-tert-butylbenzoyl group or a 3,5-di(tert-butyl)benzoyl group. The preferable substituents are alkyl groups provided with a carbon number of 1-8 and most preferably of 1-4.

An alkyl having a carbon number of 1-12 substituted benzoyloxy group, which is provided with preferably 1-3 and most preferably 1-2 alkyl groups, is a o-, m- or p-methylbenzoyloxy group, a 2,3-dimethylbenzoyloxy group, a 2,4-dimethylbenzoyloxy group, a 2,5-dimethylbenzoyloxy group, a 2,6-dimethylbenzoyloxy group, a 3,4-dimethylbenzoyloxy group, a 3,5-dimethylbenzoyloxy group, a 2-methyl-6-ethylbenzoyloxy group, a 4-tert-butylbenzoyloxy group, a 2-ethylbenzoyloxy group, a 2,4,6-trimethylbenzoyloxy group, a 2,6-dimethyl-4-tert-butylbenzoyloxy group or a 3,5-di(tert-butyl)benzoyloxy group. The preferable substituents are alkyl groups provided with a carbon number of 1-8 and most preferably of 1-4.

An alkyl group having a carbon number of up to 25 is a branched or un-branched group, and, for example, a methyl group, an ethyl group, a propyl group, an isopropyl group, a n-butyl group, a secondary butyl group, an isobutyl group, a tertiary butyl group, a 2-ethylbutyl group, a n-pentyl group, an isopentyl group, a 1-methylpentyl group, a 1,3-dimethylbutyl group, a n-hexyl group, a 1-methylhexyl group, a n-heptyl group, an isoheptyl group, a 1,1,3,3-tetramethylbutyl group, a 1-methylheptyl group, a 3-methylheptyl group, an n-octyl group, a 2-ethylhexyl group, a 1,1,3-trimethylhexyl group, a 1,1,3,3-tetramethylpentyl group, a nonyl group, a decyl group, an undecyl group, a 1-methylundecyl group, a dodecyl group, a 1,1,3,3,5,5-hexamethylhexyl group, a tridecyl group, a tetradecyl group, a pentadecyl group, a hexadecyl group, a heptadecyl group, an octadecyl group, an eicosyl group or a docosyl group. Preferable $R_2$ and $R_4$ are typically an alkyl group having a carbon number of 1-18. Specifically preferable $R_4$ is an alkyl group having a carbon number of 1-4.

An alkenyl group having a carbon number of 3-25 is a branched or un-branched group, and, for example, includes a propenyl group, a 2-butenyl group, a 3-butenyl group, an isobutenyl group, an n-2,4-pentadienyl group, a 3-methyl-2-butenyl group, an n-2-octenyl group, an n-2-dodecenyl group, an iso-dodecenyl group, an oleyl group, an n-2-octadecanyl group or an n-4-octadecanyl group. Preferable is an alkenyl group having a carbon number of 3-18, more preferably of 3-12, typically of 3-6 and most preferably of 3-4.

An alkenyloxy group having a carbon number of 3-25 is a branched or un-branched group, and, for example, includes a propenyloxy group, a 2-butenyloxy group, a 3-butenyloxy group, an isobutenyloxy group, an n-2,4-pentadienyloxy group, a 3-methyl-2-butenyloxy group, an n-2-octenyloxy group, an n-2-dodecenyloxy group, an iso-dodecenyloxy group, an oleyloxy group, an n-2-octadecanyloxy group or an n-4-octadecanyloxy group. Preferable is an alkenyloxy group having a carbon number of 3-18, more preferably of 3-12, typically of 3-6 and most preferably of 3-4.

An alkynyl group having a carbon number of 3-25 is an branched or un-branched group, and, for example, includes a propynyl group (—$CH_2$—C≡CH), a 2-butynyl group, a 3-butynyl group, an n-2-octynyl group and an n-2-dodecynyl group. Preferable is an alkynyl group having a carbon number of 3-18, more preferably of 3-12, typically of 3-6 and most preferably of 3-4.

An alkynyloxy group having a carbon number of 3-25 is a branched or un-branched group, and for example, includes a propynyloxy group (—OCH$_2$—C≡CH), a 2-butynyloxy group, a 3-butynyloxy group, an n-2-octynyloxy group and an n-2-dodecynyloxy group. Preferable is an alkynyloxy group having a carbon number of 3-18, more preferably of 3-12, typically of 3-6 and most preferably of 3-4.

An alkyl group having a carbon number of 2-25, which contains an oxygen atom, a sulfur atom or —N(R$_{14}$)— in the carbon chain, is typically CH$_3$—O—CH$_2$—, CH$_3$—S—CH$_2$—, CH$_3$—NH—CH$_2$—, CH$_3$—N(CH$_3$)—CH$_2$—, CH$_3$—O—CH$_2$CH$_2$—OCH$_2$—, CH$_3$—(O—CH$_2$CH$_2$)$_2$O—CH$_2$—, CH$_3$—(O—CH$_2$CH$_2$)$_3$O—CH$_2$— or CH$_3$—(O—CH$_2$CH$_2$)$_4$O—CH$_2$—.

A phenylalkyl group having a carbon number of 7-9 is typically a benzyl group, a α-methylbenzyl group, a α,α-dimethylbenzyl group and 2-phenylethyl group. A benzyl group and a α,α-dimethylbenzyl group are preferred.

A phenylalkyl group having a carbon number of 7-9, which is unsubstituted or substituted by 1-3 alkyl groups having a carbon number of 1-4 at the phenyl portion, is typically a benzyl group, a α-methylbenzyl group, a α,α-dimethylbenzyl group and 2-phenylethyl group, a 2-methylbenzyl group, a 3-methylbenzyl group, a 4-methylbenzyl group, a 2,4-dimethylbenzyl group, a 2,6-dimethylbenzyl group or a 4-tert-butylbenzyl group. A benzyl group is preferred.

A phenylalkyl group having a carbon number of 7-9, which contains an oxygen atom, a sulfur atom or —N(R$_{14}$)— in the carbon chain, and is unsubstituted or substituted by 1-3 alkyl groups having a carbon number of 1-4 at the phenyl portion, is, for example, a branched or un-branched group such as a phenoxymethyl group, a 2-methylphenoxymethyl group, a 3-methylphenoxymethyl group, a 4-methylphenoxymethyl group, a 2,4-methylphenoxymethyl group, a 2,3-methylphenoxymethyl group, a phenylthiomethyl group, a N-methyl-N-phenyl-methyl group, a N-ethyl-N-phenyl-methyl group, a 4-tert-butyl-phenoxymethyl group, a 4-tert-butyl-phenylethoxymethyl group, a 2,4-di-tert-butyl-phenoxymethyl group, a 2,4-di-tert-butyl-phenoxyethoxymethyl group, a phenoxyethoxyethoxyethoxymethyl group, a benzyloxymethyl group, a benzyloxyethoxymethyl group, a N-benzyl-N-ethylmethyl group or an N-benzyl-N-isopropylmethyl group.

A phenylalkoxy group having a carbon number of 7-9 is typically a benzyloxy group, a α-methylbenzyloxy group, a α,α-dimethylbenzyloxy group and 2-phenylethoxy group. A benzyloxy group is preferred.

Examples of a phenyl group, which is substituted by an alkyl group having a carbon number of 1-4 and contains preferably 1-3 and specifically preferably 1 or 2 alkyl groups, are an o-, m- or p-methylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 2-methyl-6-ethylphenyl group, a 4-tert-butylphenyl group, a 2-ethylphenyl group and a 2,6-diethylphenyl group.

Examples of a phenoxy group, which is substituted by preferably 1-3 and specifically preferably 1 or 2 alkyl groups having a carbon number of 1-4, are an o-, m- or p-methylphenoxy group, a 2,3-dimethylphenoxy group, a 2,4-dimethylphenoxy group, a 2,5-dimethylphenoxy group, a 2,6-dimethylphenoxyl group, a 3,4-dimethylphenoxy group, a 3,5-dimethylphenoxy group, a 2-methyl-6-ethylphenoxy group, a 4-tert-butyl-phenoxy group, a 2-ethylphenoxy group and a 2,6-diethylphenoxy group.

Examples of a cycloalkyl group having a carbon number of 5-8, which is unsubstituted or substituted by an alkyl group having a carbon number of 1-4, are a cyclopentyl group, a methylcyclopentyl group, a dimethylcyclopentyl group, a cyclohexyl group, a methylcyclohexyl group, a dimethylcyclohexyl group, a trimethylcyclohexyl group, a tert-butyl-cyclohexyl group, a cycloheptyl group and a cyclooctyl group. A cyclohexyl group and a tert-butyl-cyclohexyl group are preferred.

Examples of a cycloalkoxy group having a carbon number of 5-8, which is unsubstituted or substituted by an alkyl group having a carbon number of 1-4, are a cyclopentoxy group, a methylcyclopentoxy group, a dimethylcyclopentoxy group, a cyclohexoxy group, a methylcyclohexoxy group, a dimethylcyclohexoxy group, a trimethylcyclohexoxy group, a tert-butyl-cyclohexoxy group, a cycloheptoxy group and a cyclooctoxy group. A cyclohexoxy group and a tert-butyl-cyclohexoxy group are preferred.

An alkoxy group having a carbon number of up to 25 is a branched or un-branched group, and for example, is a methoxy group, an ethoxy group, a propoxy group, an isopropoxy group, a n-butoxy group, an isobutoxy group, a pentoxy group, an isopentoxy group, a hexoxy group, a heptoxy group, an octoxy group, a decyloxy group, a tetradecyloxy group, a hexadecyloxy group or an octadecyloxy group. An alkoxy group having a carbon number of 1-12, preferably of 1-8 and for example of 1-6 is preferred.

An alkoxy group having a carbon number of 2-25, which contains an oxygen atom, a sulfur atom or —N(R$_{14}$)— in the carbon chain, is typically CH$_3$—O—CH$_2$CH$_2$O—, CH$_3$SS—CH$_2$CH$_2$O—, CH$_3$—NH—CH$_2$CH$_2$O—, CH$_3$—N(CH$_3$)—CH$_2$CH$_2$O—, CH$_3$—O—CH$_2$CH$_2$—OCH$_2$CH$_2$O—, CH$_3$—(O—CH$_2$CH$_2$)$_2$O—CH$_2$CH$_2$O—, CH$_3$—(O—CH$_2$CH$_2$)$_3$O—CH$_2$CH$_2$O— or CH$_3$—(O—CH$_2$CH$_2$)$_4$O—CH$_2$CH$_2$O—.

An alkylthio group having a carbon number of up to 25 is a branched or un-branched group, and for example, is a methylthio group, an ethylthio group, a propylthio group, an isopropylthio group, an n-butylthio group, an isobutylthio group, a pentylthio group, an isopentylthio group, a hexylthio group, a heptylthio group, an octylthio group, a decylthioy group, a tetradecylthio group, a hexadecylthio group or an octadecylthio group. An alkythio group having a carbon number of 1-12, preferably of 1-8 and for example of 1-6 is preferred.

An alkylamino group having a carbon number of up to 4 is a branched or unbranched group, and, for example, is a methylamino group, an ethylamino group, a propylamino group, an isopropylamino group, an n-butylamino group, an isobutylamino group or a tert-butylamino group.

A di(alkylamino group having a carbon number of 1-4) group is also a group in which each two portions independent from the other are branched or unbranched, and typically is a dimethylamino group, a methylethylamino group, a diethylamino group, a methyl-n-propylamino group, a methylisopropylamino group, a methyl-n-butylamino group, a methyl-isobutylamino group, an ethylisopropylamino group, an ethyl-n-butylamino group, an ethylisobutylamino group, an ethyl-tert-butylamino group, a diethylamino group, a diisopropylamino group, an isopropyl-n-butylamino group, an isopropylisobutylamino group, a di-n-butylamino group or a diisobutylamino group.

An alkanoylamino group having a carbon number of up to 25 is a branched or unbranched group, and for example, is a formylamino group, an acetylamino group, a propionylamino group, a butanoylamino group, a pentanoylamino group, a hexanoylamino group, a heptanoylamino group, an octanoylamino group, a nonanoylamino group, a decanoylamino group, an undecanoylamino group, a dodecanoylamino group, a tridecanoylamino group, a tetradecanoylamino group, a pentadecanoylamino group, a hexadecanoylamino group, a heptadecanoylamino group, an octadecanoylamino group, an eicosanoylamino group or a docosanoylamino group. An alkanoylamino group having a carbon number of 2-18, preferably 2-12 and for example 2-6 is preferred.

An alkylene group having a carbon number of 1-18 is a branched or unbranched group, and for example, is a methylene group, an ethylene group, a propylene group, a trimethylene group, a tetramethylene group, a pentamethylene group, a hexamethylene group, a heptamethylene group, an octamethylene group, a decamethylene group, a dodecamethylene group or an octadecamethylene group. An alkylene group having a carbon number of 1-12 and specifically of 1-8 is preferable.

An example of a cycloalkylene ring having a carbon number of 5-12, which contains 1 or 2 branched or unbranched groups and is substituted by an alkyl having a carbon number of 1-4, is a cyclopentylene, methylcyclopentylene, dimethylcyclopentylene, cyclohexylene, methylcyclohexylene, dimethylcyclohexylene, trimethylcyclohexylene, tert-butyl-cyclohexylene, cycloheptylene, cyclooctylene or cyclodecylene ring. Cyclohexylene and tert-butyl-cyclohexylene rings are preferred.

Examples of an alkylene group having a carbon number of 2-18, which contains an oxygen atom, a sulfur atom or —N($R_{14}$)— in the carbon chain, are —$CH_2$—O—$CH_2$—, —$CH_2$—S—$CH_2$—, —$CH_2$—NH—$CH_2$—, —$CH_2$—N($CH_3$)—$CH_2$—, —$CH_2CH_2$—O—$CH_2$—, —$CH_2$—(O—$CH_2CH_2$—)$_2$O—$CH_2$—, —$CH_2$—(O—$CH_2CH_2$—)$_3$O—$CH_2$—, —$CH_2$—(O—$CH_2CH_2$—)$_4$O—$CH_2$— and —$CH_2CH_2$—S—$CH_2CH_2$—.

An alkenylene group having a carbon number of 1-18 is typically a vinylene group, a methylvinylene group, an octenylethylene group or a dodecenylethylene group. An alkenylene group having a carbon number of 2-8 is preferred.

Alkylidene groups having a carbon number of 2-20 are typically an ethylidene group, a propylidene group, a butylidene group, a pentylidene group, a 4-methylpentylidene group, a heptylidene group, a nonylidene group, a tridecylidene group, a nonadecylidene group, a 1-methylethylidene group, a 1-ethylpropylidene group and a 1-ethylpentylidene group. An alkylidene group having a carbon number of 2-8 is preferred.

Examples of a phenylalkylidene group having a carbon number of 7-20 are a benzylidene group, a 2-phenylethylidene group and a 1-phenyl-2-hexylidene group. A phenylalkylidene group having a carbon number of 7-9 is preferred.

A cycloalkylene group having a carbon number of 5-8 is an unsaturated hydrocarbon group, which is provided with two free electrons and at least one ring unit, and for example, is a cyclopentylene group, a cyclohexylene group, a cycloheptylene group or a cyclooctylene group. A cyclohexylene group is preferred.

Bicycloalkylene groups having a carbon number of 7-8 are bicycloheptylene group and a bicyclooctylene group.

An example of an unsubstituted or an (alkyl having a carbon number of 1-4)-substituted phenylene group or naphthylene group is a 1,2-, 1,3- or 1,4-phenylene group; a 1,2-, 1,3-, 1,4-, 1,6-, 1,7-, 2,6- or 2,7-naphthylene group. A 1,4-phenylene group is preferred.

Examples of an (alkyl group having a carbon number of 1-4)-substituted cycloalkylidene ring having a carbon number of 5-8, which contains preferably 1-3 and most preferably 1 or 2 branched or unbranched alkyl groups, are cyclopentylidene, methylcyclopentylidene, dimethylcyclopentylidene, cyclohexylidene, methylcyclohexylidene, dimethylcyclohexylidene, trimethylcyclohexylidene, tertiary-butylcyclohexylidene, cycloheptylidene and cyclooctylidene rings. Cyclohexylidene and tertiary-butylcyclohexylidene rings are preferred.

A mono-, di- or tri-valent metal cation is preferably an alkali metal cation, an alkali earth metal cation or an aluminum cation, and for example, is $Na^+$, $K^+$, $Mg^{++}$, $Ca^{++}$ or $Al^{+++}$.

A preferable compound represented by Formula (I) is a compound in which, when n is 1, $R_1$ is a phenyl group each of which is unsubstituted or substituted at the para-position by an alkoxy group having a carbon number of 1-18, an alkylthio group having a carbon number of 1-18 or a di(alkyl having a carbon number of 1-4)-amino group; an alkylphenyl group which is substituted by 1-5 alkyl groups simultaneously containing carbon atoms of up to 18 in the alkyl groups; a naphthyl group, a biphenyl group, a terphenyl group, a phenanthryl group, an anthryl, a fluorenyl group, a carbazolyl group, a thienyl group, a pyrrolyl group, a phenothiazinyl group or a 5,6,7,8-tetrahydronaphthyl group, each of which is unsubstituted or substituted by an alkyl group having a carbon number of 1-4, an alkoxy group an alkylthio group having a carbon number of 1-4, a hydroxyl group or an amino group.

Another preferable compound represented by Formula (R) is, a compound in which, when n is 2, $R_1$ is —$R_{12}$—X—$R_{13}$—; $R_{12}$ and $R_{13}$ is a phenylen group; X is an oxygen atom or —$NR_{31}$—; and $R_{31}$ is an alkyl group having a carbon number of 1-4.

A further preferable compound represented by Formula (R) is a compound, in which, when n is 1, $R_1$ each is a naphthyl group, a phenanthryl group, a thienyl group, a dibenzofuryl group, a carbazolyl group, a fluorenyl group, or a group represented by formula (II)

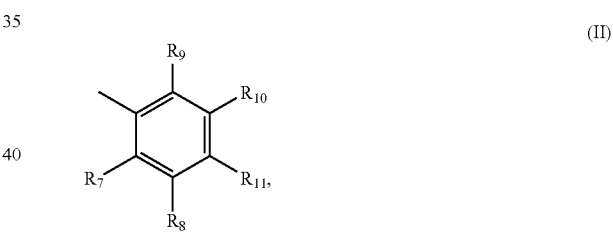

(II)

each of which is unsubstituted or substituted by an alkyl group having a carbon number of 1-4, an alkoxy group having a carbon number of 1-4, an alkylthio group having a carbon number of 1-4, a hydroxyl group, a halogen atom, an amino group, an alkylamino group having a carbon number of 1-4 or a di(alkyl having a carbon number of 1-4)-amino group; $R_7$, $R_8$, $R_9$ and $R_{10}$ each are a hydrogen atom, a chlorine atom, a bromine atom, a hydroxyl group, an alkyl group having a carbon number of 1-18; an alkyl group having a carbon number of 2-18, which is disconnected by an oxygen atom or a sulfur atom; an alkoxy group having a carbon number of 1-18; an alkoxy group having a carbon number of 2-18, which is disconnected by an oxygen atom or a sulfur atom; an alkylthio group having a carbon number of 1-18, an alkenyloxy group having a carbon number of 3-12, an alkynyloxy group having a carbon number of 3-12, a phenylalkyl group having a carbon number of 7-9, a phenylalkoxy group having a carbon number of 7-9, an unsubstituted or an (alkyl having a carbon number of 1-4)-substituted phenyl group, a phenoxy group, a cyclohexyl group, a cycloalkoxy group having a carbon number of 5-8, an alkylamino group having a carbon number of 1-4, a di(alkyl having a carbon number of 1-4)amino group, an alkanoyl group having a carbon number of 1-12; an alkanoyl group having a carbon number of 3-12, which is disconnected by an oxygen atom or a sulfur atom; an alkanoyloxy group having a carbon number of 3-12; an alkanoyloxy group having a carbon number of 3-12, which is disconnected by an oxygen atom or a sulfur atom; an alkanoylamino group having a carbon number of 1-12, an alkenoyl group having a carbon number of 3-12, an alkenoyloxy group having a carbon number of 3-12, a cyclohexylcarbonyl group, a cyclohexylcarbonyloxy group, a benzoyl group or an (alkyl having a carbon number of 1-4)-substituted benzoyl group; a benzoyloxy group or an (alkyl having a carbon number of 1-4)-substituted benzoyloxy group;

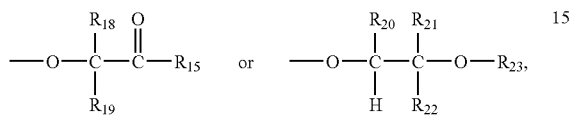

or in formula (II), each pair of substituents $R_7$ and $R_8$ or $R_8$ and $R_{11}$ may form a benzene ring together with the bonded carbon atoms; $R_{11}$ represents a hydrogen atom, an alkyl group having 1-18 carbon atoms, an alkylthio group having 1-18 carbon atoms, a phenylalkyl group having 7-9 carbon atoms, an unsubstituted or an (alkyl having a carbon number of 1-4)-substituted phenyl group, a cyclohexyl group, an alkylamino group having a carbon number of 1-4, a di(alkyl having a carbon number of 1-4)amino group, an alkanoyl group having a carbon number of 1-12, an alkanoyl group having a carbon number of 3-12 which contains an oxygen atom or a sulfur atom in the carbon chain, an alkanoylamino group having a carbon number of 1-12, an alkenoyl group having a carbon number of 3-12, a cyclohexylcarbonyl group, a benzoyl group or an (alkyl having a carbon number of 1-12)-substituted benzoyl group; at least one of $R_7$, $R_8$, $R_9$, $R_{10}$ and $R_{11}$ is not a hydrogen atom; $R_{15}$ is a hydroxyl group, an alkoxy group having a carbon number of 1-12 or

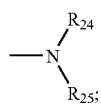

$R_{18}$ and $R_{19}$ each independently are a hydrogen atom or an alkyl group having a carbon number of 1-4; $R_{20}$ is a hydrogen atom; $R_{21}$ is a hydrogen atom, a phenyl group, an alkyl group having a carbon number of 1-18, an alkyl group having a carbon number of 2-18 which is disconnected by an oxygen atom or a sulfur atom, a phenylalkyl group having a carbon number of 7-9, an phenylalkyl group having a carbon number of 7-18 which is disconnected by an oxygen atom or a sulfur atom and is substituted by 1-3 alkyl groups having a carbon number of 1-4 at the phenyl portion; or $R_{20}$ and $R_{21}$ form a cyclohexylene ring, which is unsubstituted or substituted by an alkyl group having a carbon number of 1-4 together with the bonded carbon atoms; $R_{22}$ is a hydrogen atom or an alkyl group having a carbon number of 1-4; $R_{23}$ is a hydrogen atom or an alkanoyl group having a carbon number of 1-18, or an alkenoyl group having a carbon number of 3-12; an alkanoyl group having a carbon number of 3-12 which is disconnected by an oxygen atom or a sulfur atom; an alkanoyl group having a carbon number of 2-12 which is substituted by a di(alkyl having a carbon number of 1-6)-phosphonate group; a cycloalkylcarbonyl group having a carbon number of 6-9, a benzoyl group;

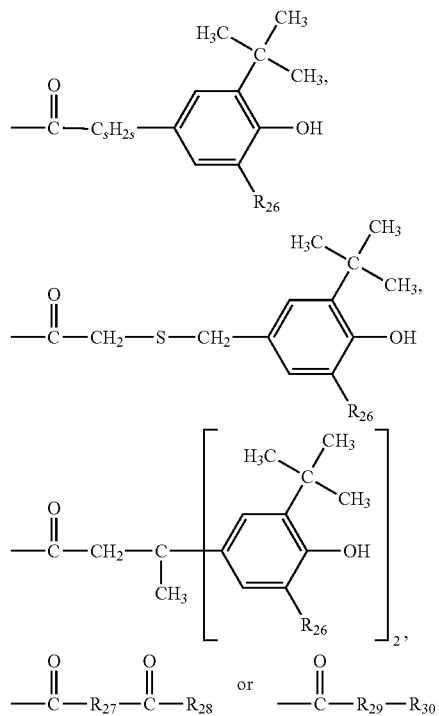

(wherein, s is 1 or 2); $R_{24}$ and $R_{25}$ each independently are a hydrogen atom or an alkyl group having a carbon number of 1-12; $R_{26}$ is a hydrogen atom or an alkyl group having a carbon number of 1-4; $R_{27}$ is a hydrogen atom or an alkylene group having a carbon number of 1-12, an alkenylene group having a carbon number of 2-8, an alkylidene group having a carbon number of 2-8, a phenylalkylidene group having a carbon number of 7-12, an cycloalkenylene group having a carbon number of 5-8, or a phenylene group; $R_{28}$ is a hydroxyl group or an alkoxy group having a carbon number of 1-12 or

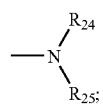

$R_{28}$ is an oxygen atom or —NH—; $R_{30}$ is a carbon atom, an alkyl group having a carbon number of 1-18 or a phenyl group.

Further, preferable is a compound represented by Formula (R), in which, when n is 1, $R_1$ is a phenanthryl group, a thienyl group, a dibenzofuryl group; an unsubstituted or (alkyl having a carbon number of 1-4)-substituted carbazolyl group; or a fluorenyl group, or a group represented by formula (II)

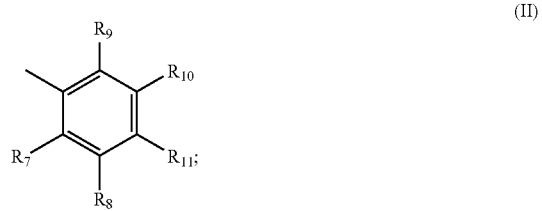

$R_7$, $R_8$, $R_9$ and $R_{10}$ each independently are a hydrogen atom, a chlorine atom, a hydroxyl group, an alkyl group having a carbon number of 1-18, an alkoxy group having a carbon number of 1-18, an alkylthio group having a carbon number of 1-18, an alkenyloxy group having a carbon number of 3-4, an alkynyloxy group having a carbon number of 3-4, a phenyl group, a benzoyl group, a benzoyloxy group or

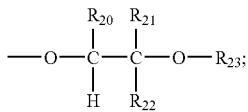

$R_{11}$ represents a hydrogen atom, an alkyl group having 1-18 carbon atoms, an alkylthio group having 1-18 carbon atoms, a phenyl group or a cyclohexyl group; at least one of $R_7$, $R_8$, $R_9$, $R_{10}$ and $R_{11}$ is not a hydrogen atom; $R_{20}$ is a hydrogen atom; $R_{21}$ is a hydrogen atom, a phenyl group, an alkyl group having a carbon number of 1-18; or $R_{20}$ and $R_{21}$ form cyclohexylene ring which is unsubstituted or substituted with 1-3 alkyl groups having a carbon number of 1-4 together with the bonded carbon atoms; $R_{22}$ is a hydrogen atom or an alkyl group having a carbon number of 1-4; $R_{23}$ is a hydrogen atom or an alkanoyl group having a carbon number of 1-12 or a benzoyl group.

A compound represented by Formula (R), in which $R_7$, $R_8$, $R_9$ and $R_{10}$ each independently are a hydrogen atom or an alkyl group having a carbon number of 1-4; $R_{11}$ represents a hydrogen atom, an alkyl group having a carbon number of 1-4, an alkylthio group having a carbon number of 1-4 or a phenyl group; and at least one of $R_7$, $R_8$, $R_9$, $R_{10}$ and $R_{11}$ is not a hydrogen atom, is specifically preferable.

A still further preferable compound represented by Formula (R) is a compound, in which $R_2$, $R_3$, $R_4$ and $R_5$ each independently are a hydrogen atom, a chlorine atom, a hydroxyl group, an alkyl group having a carbon number of 1-18, a benzyl group, a phenyl group, a cycloalkyl group having a carbon number of 5-8, an alkoxy group having a carbon number of 1-18, an alkylthio group having a carbon number of 1-18, an alkanoyloxy group having a carbon number of 1-18, an alkanoylamino group having a carbon number of 1-18, an alkenoyloxy group having a carbon number of 3-18 or a benzoyloxy group (wherein, when $R_2$ is a hydrogen atom or a methyl group, R7 and R9 do not represent a hydroxyl group or an alkanoyloxy group having a carbon number of 1-25); or substituents $R_2$ and $R_3$, $R_3$ and $R_4$, or $R_4$ and $R_5$ form a benzene ring together with the bonded carbon atoms; $R_4$ further is $-(CH_2)_p-COR_{15}$ or $-(CH_2)_q-OH$ (wherein, p is 1 or 2; q is 2, 3, 4, 5 or 6); or $R_4$ is a group represented by formula (III) when $R_3$, $R_5$ and $R_6$ each are a hydrogen atom; $R_{15}$ is a hydroxyl group, an alkoxy group having a carbon number of 1-12 or

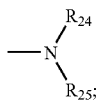

$R_{16}$ and $R_{17}$ are a methyl group or form a cycloalkylidene ring having a carbon number of 5-8, which is unsubstituted or substituted with 1-3 alkyl groups having a carbon number of 1-4, together with the bonded carbon atoms; $R_{24}$ and $R_{25}$ each independently are a hydrogen atom or an alkyl group having a carbon number of 1-12.

Specifically preferable compound represented by Formula (R) further is a compound, in which at least two of $R_2$, $R_3$, $R_4$ and $R_5$ are a hydrogen atom.

Another specifically preferable compound represented by Formula (R) is also a compound, in which $R_3$ and $R_5$ each are a hydrogen atom.

Very specifically preferable compound represented by Formula (R) further is a compound, in which $R_2$ is an alkyl group having a carbon number of 1-4; $R_3$ is a hydrogen atom; $R_4$ is an alkyl group having a carbon number of 1-4 or when $R_6$ is a hydrogen atom, $R_4$ further is a group represented by formula (III); $R_5$ is a hydrogen atom; and $R_{16}$ and $R_{17}$ form a cyclohexylidene together with bonded carbon atoms.

Next, a compound of Formula (R-1) of the present invention will be detailed.

In Formula (R-1), $R_2$-$R_5$ are identical with $R_2$-$R_5$ in aforesaid Formula (R), and each independently are a hydrogen atom or a substituent. A substituent represented by $R_2$-$R_5$ is not specifically limited, however, includes groups similar to the substituents represented by $R_2$-$R_5$ in aforesaid Formula (R).

In aforesaid Formula (R-1), when $R_2$-$R_5$ are substituents, a substituent is preferably an unsubstituted or substituted alkyl group having a carbon number of 1-18, more preferably an unsubstituted or substituted alkyl group having a carbon number of 1-8 and specifically preferably an unsubstituted or substituted alkyl group having a carbon number of 1-4.

$R_7$-$R_{11}$ each independently are a hydrogen atom, an alkyl group having a carbon number of 1-18 or an alkoxy group having a carbon number of 1-18.

Next a compound of Formula (R-2) according to the present invention will be detailed.

In Formula (R-2), $R_2$-$R_5$ are identical with $R_2$-$R_5$ in aforesaid Formula (R), and each independently are a hydrogen atom or a substituent. A substituent represented by $R_2$-$R_5$ is not specifically limited, however, includes groups similar to the substituents represented by $R_2$-$R_5$ in aforesaid Formula (R).

In aforesaid Formula (R-2), when $R_2$-$R_5$ are substituents, a substituent is preferably an unsubstituted or substituted alkyl group having a carbon number of 1-18, more preferably an unsubstituted or substituted alkyl group having a carbon number of 1-8 and specifically preferably an unsubstituted or substituted alkyl group having a carbon number of 1-4.

In Formula (R-3), $R_1$, $R_2$, $R_3$, $R_5$ and $R_6$ each dependently represent a hydrogen atom or a substituent. $R_2$ and $R_3$ may be combined to form a ring. The substituent is common to the substituents represented by $R_1$-$R_6$ in Formula (R). $R_6$ is preferably a hydrogen atom. X represents a divalent linkage group. Examples of a divalent linkage group include a divalent alkylene group which may be substituted, a divalent arylene group which may be substituted, an oxygen atom, a sulfur atom and a combination of these linkage groups.

The addition amount of a compound represented by Formulas (R), (Ra), (R-1), (R-2) or (R-3) according to the present invention is preferably 0.01-10 weight %, more preferably 0.1-5 weight % and most preferably 0.2-2 weight %, based on the weight of the polarizer protective film. These compounds may be utilized in combination of at least two types.

A compound represented by Formulas (R), (Ra), (R-1), (R-2) and (R-3) of the present invention can be manufactured by a method well known in the art.

Specific examples of a compound represented by Formulas (R), (Ra), (R-1), (R-2) and (R-3) will be shown below, however, the present invention is not limited thereto.

| 27 | 28 |
|---|---|
| 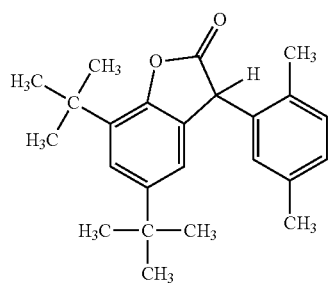 | 101 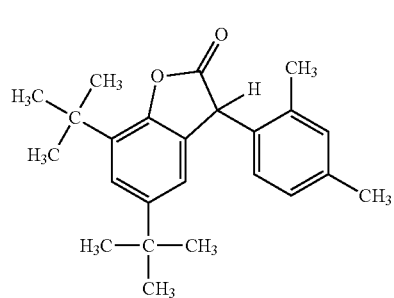 102 |
| 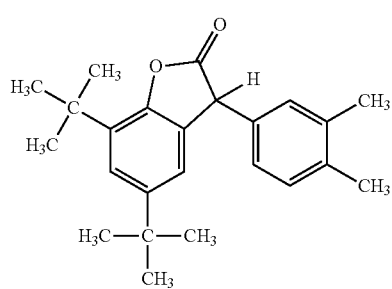 103 | 104 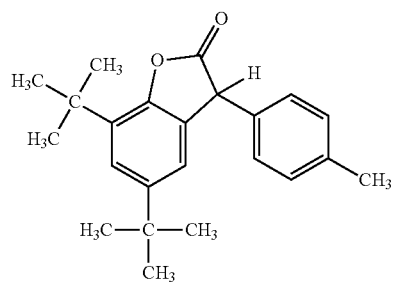 |
| 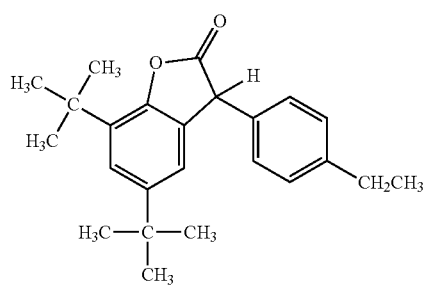 105 | 106 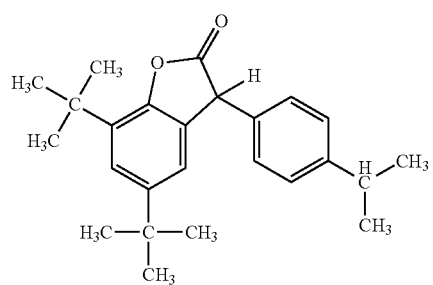 |
| 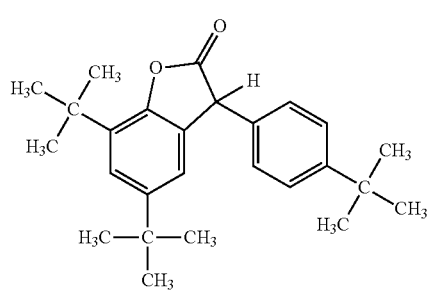 107 | 108 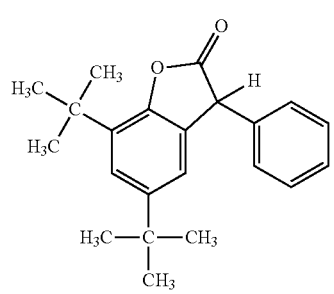 |
| 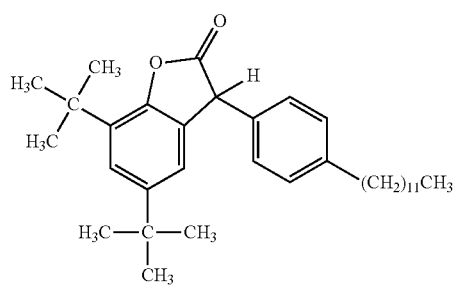 109 | 110 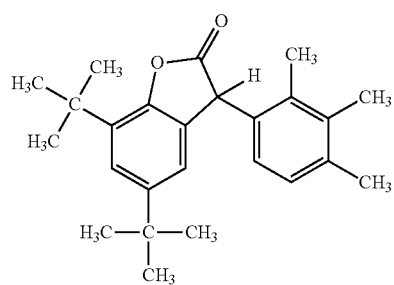 |

-continued
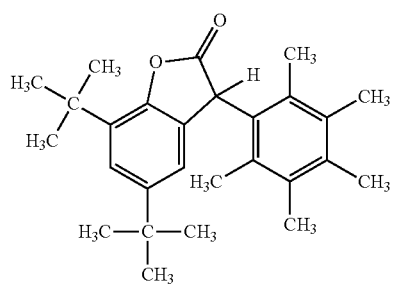
111
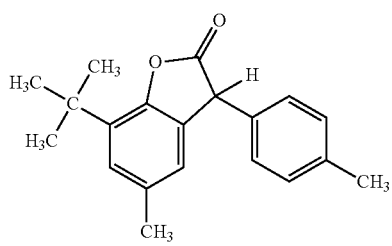
112
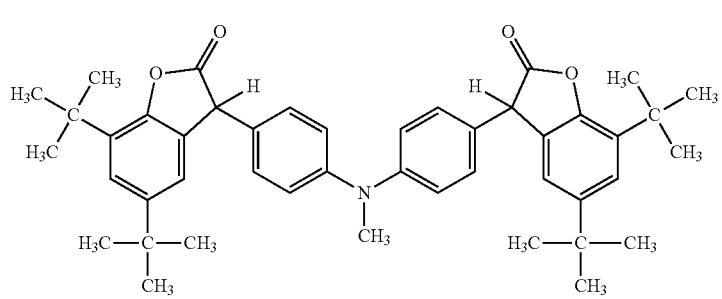
113
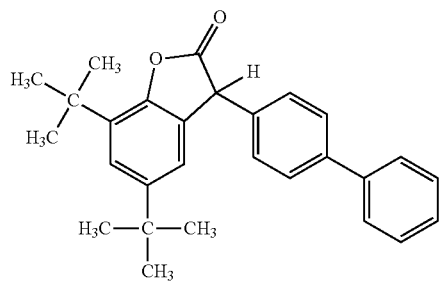
114
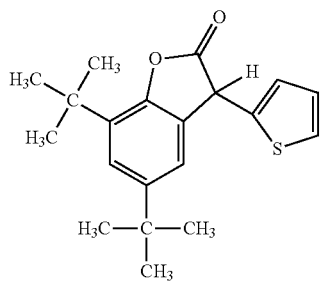
115
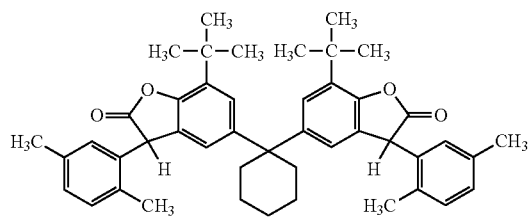
116
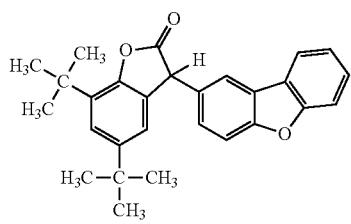
117
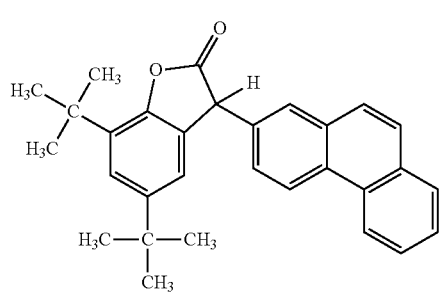
118

-continued
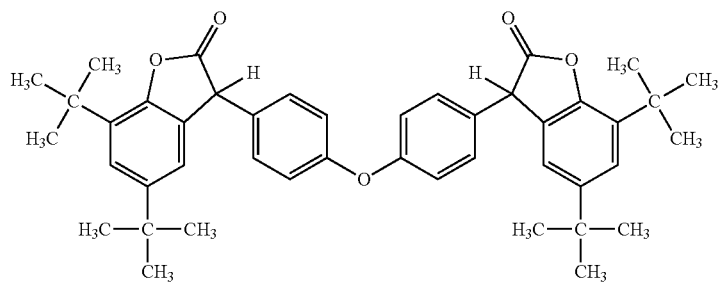
119
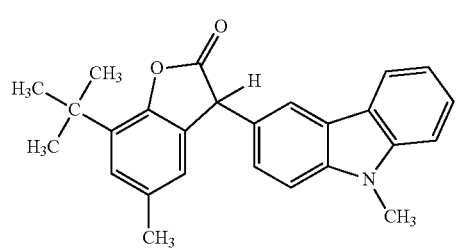
120
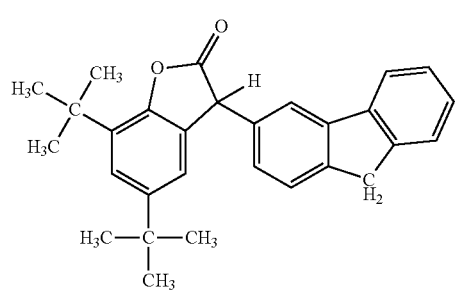
121
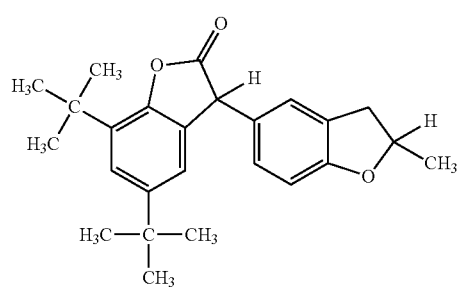
122
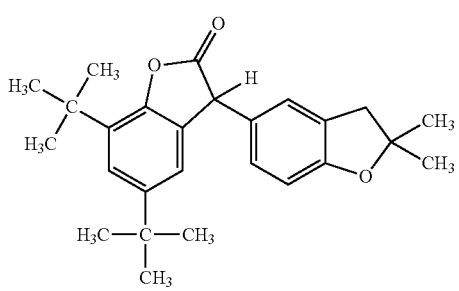
123
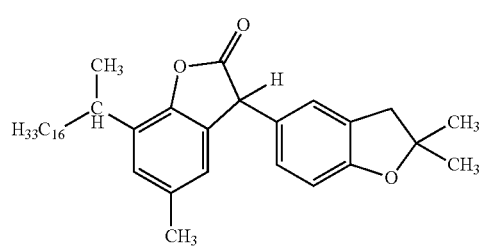
124
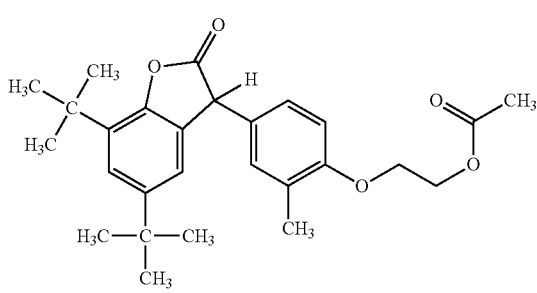
125
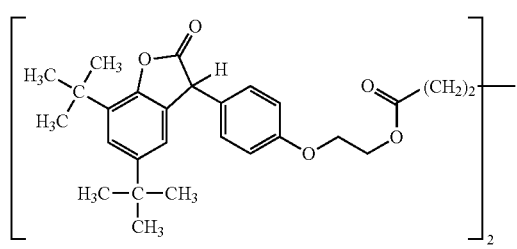
126
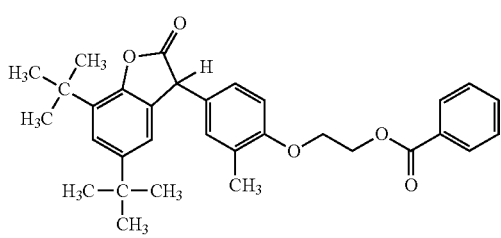
127

-continued
| | |
|---|---|
| 128 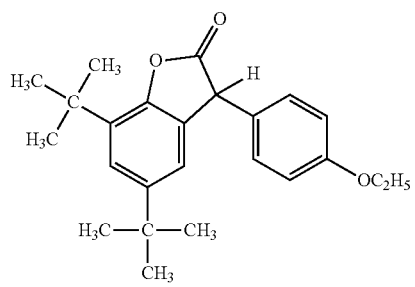 | 129 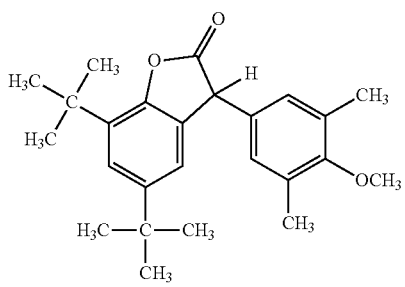 |
| 130 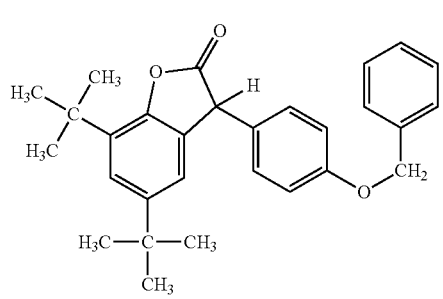 | 131 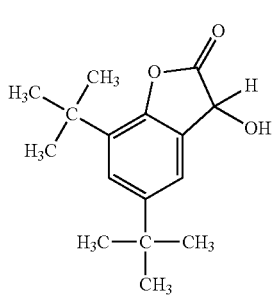 |
| 132 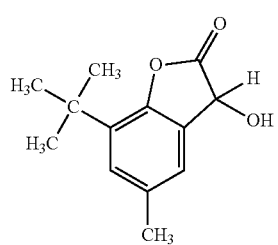 | 133 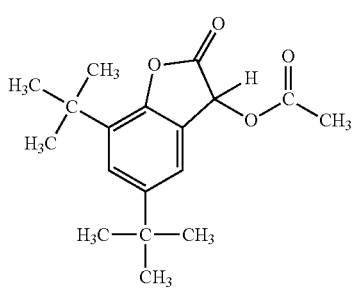 |
| 134 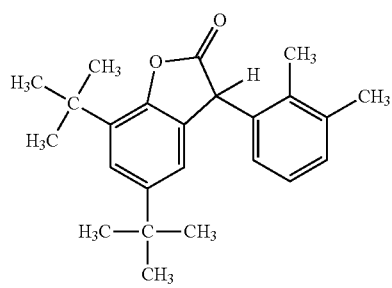 | 135 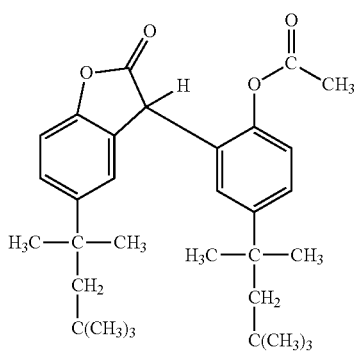 |
| 136 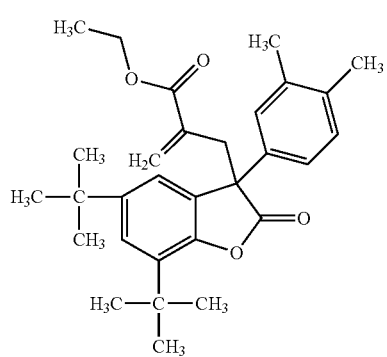 | 137 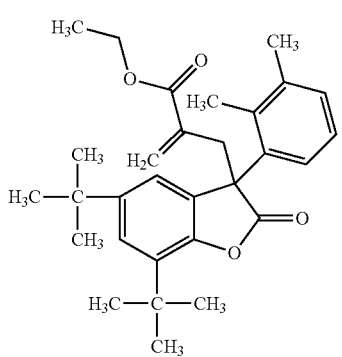 |

138
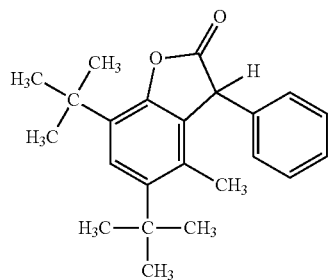
139
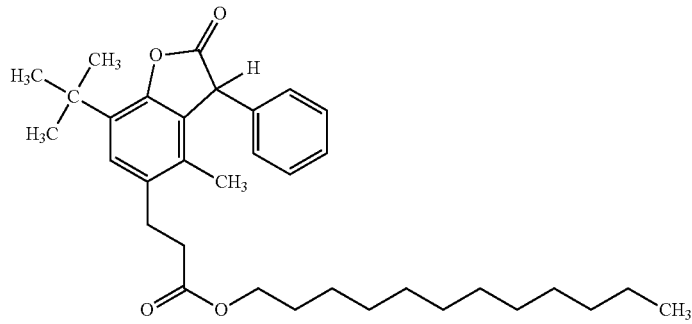
140
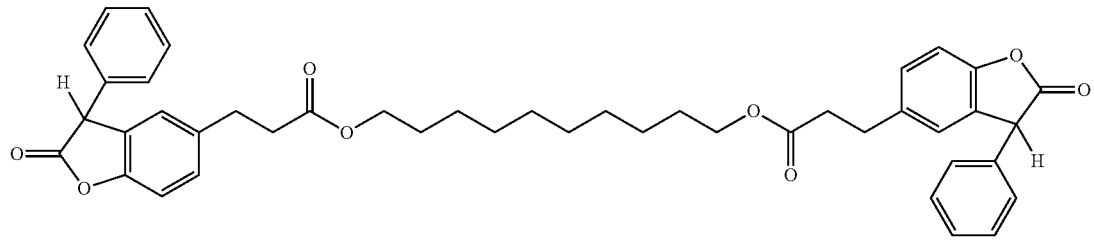
141
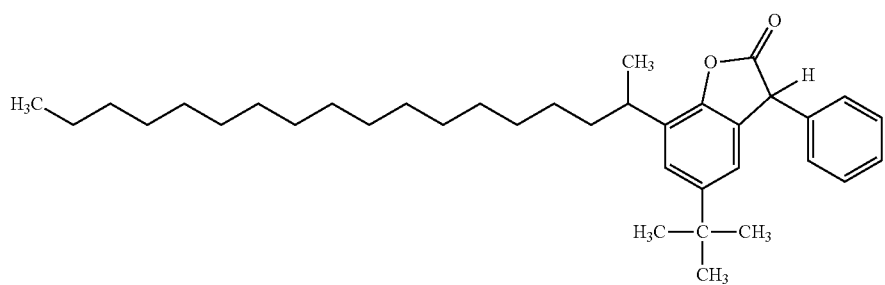
142
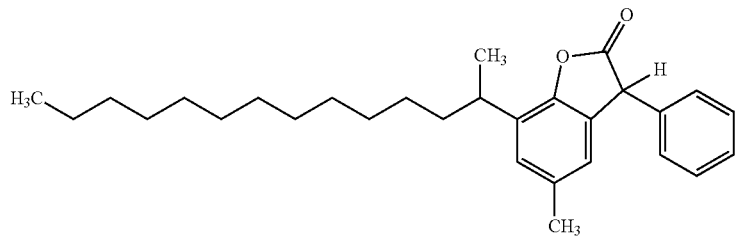
143
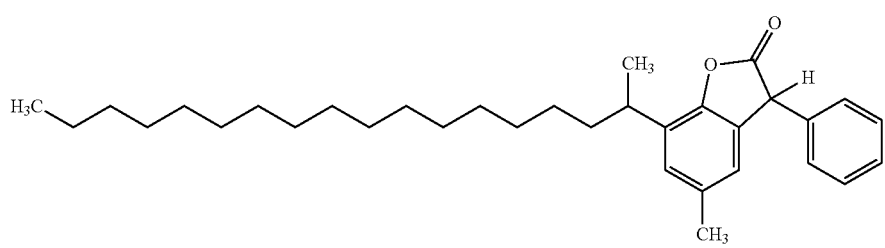

-continued
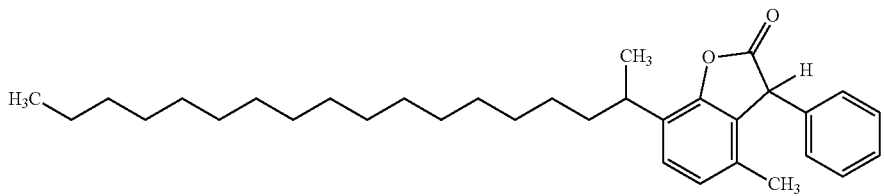
144
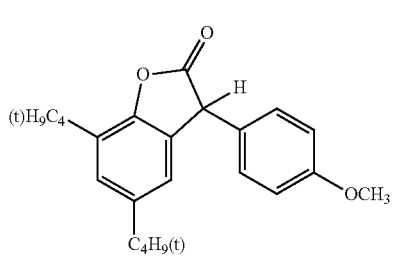
145
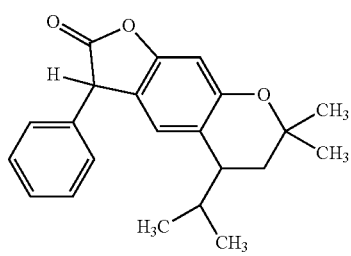
146
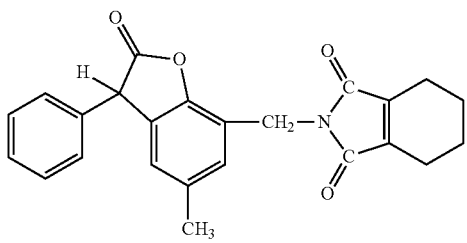
147
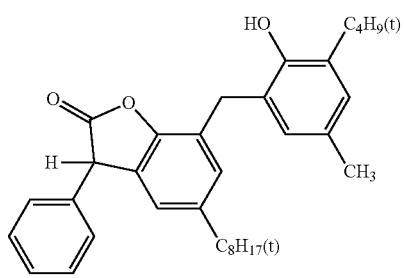
148
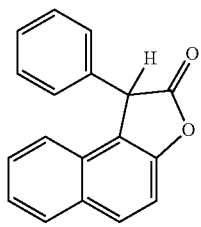
149
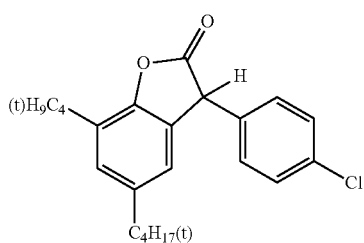
150
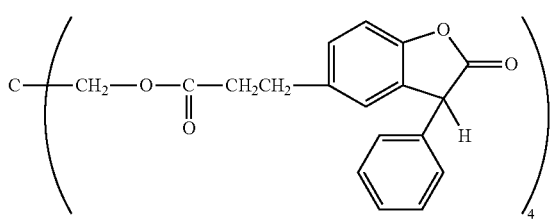
151

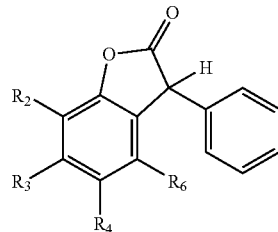

| compound No. | R$_2$ | R$_3$ | R$_4$ | R$_5$ |
|---|---|---|---|---|
| 152 | —CH$_3$ | —H | —C$_4$H$_9$(s) | —H |
| 153 | —C$_4$H$_9$(s) | —H | —C$_4$H$_9$(t) | —H |
| 154 | —C$_4$H$_9$(s) | —H | —C$_5$H$_{11}$(t) | —H |
| 155 | —C$_5$H$_{11}$(t) | —H | —C$_6$H$_{11}$(t) | —H |
| 156 | —C$_4$H$_9$(t) | —H | —C$_5$H$_{11}$(t) | —H |
| 157 | —C$_4$H$_9$(s) | —H | —C$_4$H$_9$(s) | —H |
| 158 | —C$_4$H$_9$(t) | —H | —(CH$_2$)$_2$CO$_2$C$_8$H$_{17}$(n) | —H |
| 159 | —C$_4$H$_9$(t) | —H | —(CH$_2$)$_2$CO$_2$C$_8$H$_{17}$(i) | —H |
| 160 | —C$_4$H$_9$(t) | —H | —(CH$_2$)$_2$CO$_2$(CH$_2$)$_2$OC$_4$H$_9$(n) | —H |
| 161 | —C$_{12}$H$_{25}$ | —H | —CH$_3$ | —H |
| 162 | —C$_8$H$_{17}$ | —H | —CH$_3$ | —H |
| 163 | —C$_{16}$H$_{33}$ | —H | —CH$_4$ | —H |
| 164 | —C$_{24}$H$_{49}$ | —H | —CH$_6$ | —H |
| 165 | —C$_4$H$_9$(t) | —H | —Cl | —H |
| 166 | —C$_4$H$_9$(t) | —H | —OCH$_3$ | —H |
| 167 | —C$_4$H$_9$(t) | —H | —O—C$_8$H$_{17}$(n) | —H |
| 168 | H$_3$C—C(CH$_3$)—C(CH$_3$)$_2$—CH$_3$ | —H | H$_3$C—C(CH$_3$)—C(CH$_3$)$_2$—CH$_3$ | —H |
| 169 | —H | —H | —OC$_4$H$_9$(n) | —H |
| 170 | —H | —H | —OCH$_3$ | —H |
| 171 | —H | —H | —CH$_3$ | —H |
| 172 | —H | —H | —C$_4$H$_9$(t) | —H |
| 173 | —H | —H | —C$_5$H$_{11}$(t) | —H |
| 174 | —H | —H | —C$_8$H$_{17}$(t) | —H |
| 175 | —C$_4$H$_8$(t) | —H | —CH$_3$ | —H |
| 176 | H$_3$C—C(CH$_3$)—C(CH$_3$)$_2$—CH$_3$ | —H | —C$_8$H$_{17}$(t) | —H |
| 177 | H$_3$C—C(CH$_3$)—C(CH$_3$)$_2$—CH$_3$ | —H | —C$_9$H$_{19}$ | —H |
| 178 | H$_3$C—C(CH$_3$)—C(CH$_3$)$_2$—CH$_3$ | —H | —C$_{12}$H$_{25}$ | —H |
| 179 | H$_3$C—C(CH$_3$)—C(CH$_3$)$_2$—CH$_3$ | —H | —(CH$_2$)$_2$CO$_2$C$_8$H$_{17}$(n) | —H |

-continued

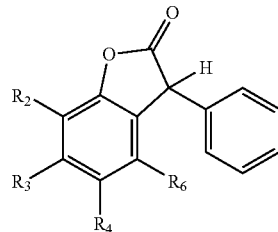

| compound No. | $R_2$ | $R_3$ | $R_4$ | $R_5$ |
|---|---|---|---|---|
| 180 | —H | —H | 2-CH2-C(CH3)2-CH3 branched group) | —H |
| 181 | —H | —O—$C_8H_{17}$(n) | —H | —H |
| 182 | —H | —O—$C_8H_{17}$(i) | —H | —H |
| 183 | —H | —NHCO$C_4H_9$(n) | —H | —H |
| 184 | —H | —O—$C_8H_{17}$(n) | —Cl | —H |
| 185 | —$CH_3$ | —O—$C_8H_{17}$(n) | —H | —H |
| 186 | —$CH_3$ | —O—$C_8H_{17}$(i) | —H | —Cl |
| 187 | —H | —O—$C_8H_{17}$(n) | —H | —Cl |
| 188 | —H | —N$(CH_3)_2$ | —H | —H |
| 189 | —NH—C(=O)—C$_6$H$_5$ | —H | —$C_8H_{17}$(t) | —H |
| 190 | —H | —$CH_3$ | —$CH_3$ | —H |
| 191 | —H | —H | —$(CH_2)_2$OH | —H |
| 192 | —H | —H | —$(CH_2)_2$OCO$C_7H_{15}$(n) | —H |
| 193 | —H | —H | —$(CH_2)_3$OH | —H |
| 194 | —$C_4H_9$(t) | —H | —$(CH_2)_2$OH | —H |
| 195 | —$C_4H_9$(t) | —H | —$(CH_2)_2$OCO$CH_3$ | —H |
| 196 | —H | —O$(CH_2)_2$OH | —$C_4H_9$(t) | —H |
| 197 | —H | —H | —$C_3H_7$(i) | —H |
| 198 | —H | —O$(CH_2)_2$OCH$_3$ | —H | —H |
| 199 | —O$C_2H_5$ | —H | —H | —H |
| 200 | —H | —H | —O—CH(C$_6$H$_5$)H | —H |
| 201 | —H | —H | —C$_6$H$_5$ | —H |
| 202 | —Cl | —H | —Cl | —H |
| 203 | —H | —Cl | —Cl | —H |
| 204 | —$C_4H_9$(t) | —H | —H | —H |
| 205 | —H | —H | —F | —H |
| 206 | —H | —H | —CN | —H |
| 207 | —$CH_3$ | —H | —$CH_3$ | —H |
| 208 | —O$CH_3$ | —H | —$C_2H_5$ | —H |
| 209 | —H | —H | —CO$CH_3$ | —H |
| 210 | —H | —H | —$CO_2C_4H_9$(n) | —H |
| 211 | —H | —H | —O—C$_6$H$_5$ | —H |
| 212 | —H | —H | —$CH_2$OH | —H |
| 213 | —H | —H | —$CH_2$OH | —H |
| 214 | —H | —H | —$SO_2C_8H_{17}$(i) | —H |

-continued
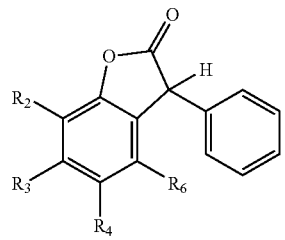
| compound No. | R₂ | R₃ | R₄ | R₅ |
|---|---|---|---|---|
| 215 | —H | —C₁₅H₃₁(n) | —H | —H |
| 216 | —C₉H₁₉ | —H | —C₉H₁₉ | —H |
| 217 | —CF₃ | —H | —H | —H |
| 218 | —CH(CH₃)(C₆H₅) | —H | —Cl | —H |
| 219 | —H | —H | —CH(cyclohexyl) | —H |
| 220 | —H | —C₄H₉(t) | —H | —C₄H₉(t) |
| 221 | —H | —H | —NHC(O)—C₆H₄—C(CH₃)₃ | —H |
| 222 | —H | —H | —H | —H |
| 223 | —H | —C₄H₉(t) | —H | —H |
| 224 | —H | —CH₃ | —H | —CH₃ |
| 225 | —H | —H | —(CH₂)₂CO₂C₁₈H₃₅(n) | —H |
| 226 | —C₄H₉(t) | —H | —H | —C₄H₉(t) |
| 227 | —H | —CH₃ | —H | —H |
| 228 | —C₆H₅ | —H | —H | —H |
| 229 | —H | —OCH₃ | —H | —H |
| 230 | —H | —OH | —H | —H |
| 231 | —H | —OCOC₁₇H₃₅ | —H | —H |
| 232 | —H | —OH | —C(O)C₆H₅ | —H |
| 233 | —C₈H₁₇(t) | —H | —C₈H₁₇(t) | —H |
234
235

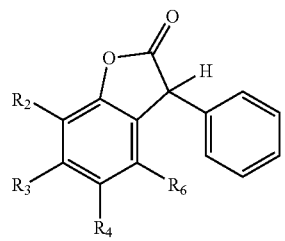

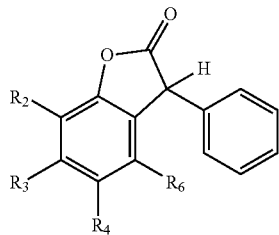
compound
No.　　　R₂　　　R₃　　　R₄　　　R₅
242
243
244
245
246
247

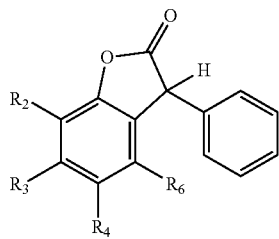
| compound No. | $R_2$ | $R_3$ | $R_4$ | $R_5$ |
|---|---|---|---|---|
| 248 | 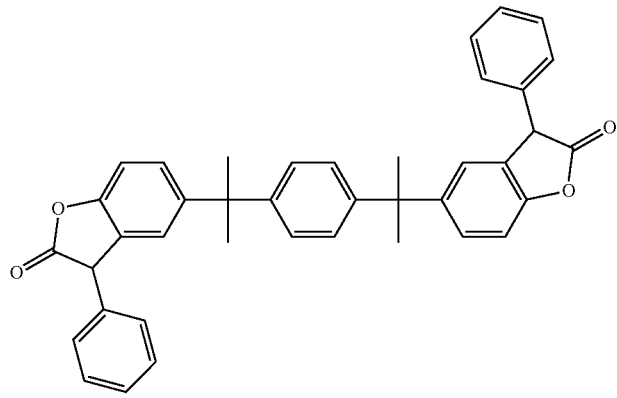 | | | |
| 249 | 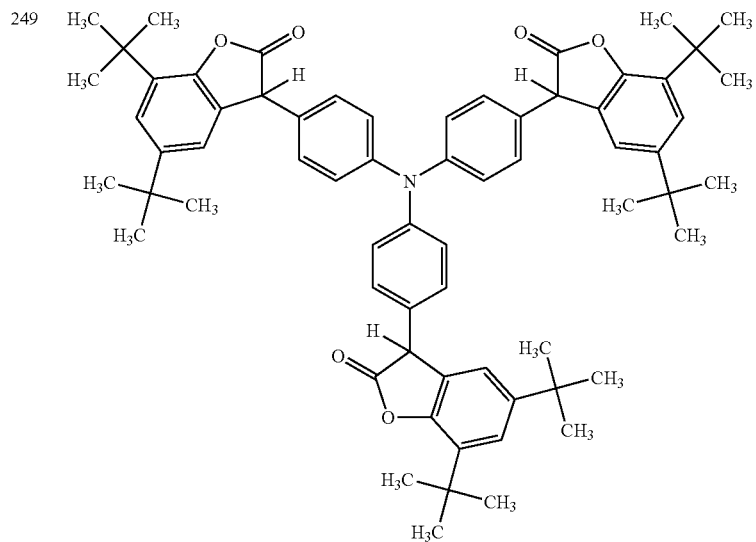 | | | |

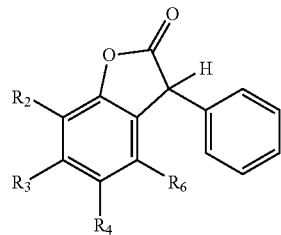

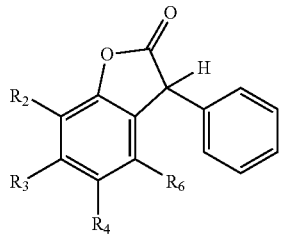

| compound No. | $R_2$ | $R_3$ | $R_4$ | $R_5$ |
|---|---|---|---|---|
| 255 | | | | |
| 256 | | | | |
| 257 | | | | |
| 258 | | | | |

<<Compound Having a Furanose Structure or a Pyranose Structure to be Used in the Invention>>

A polarizer protective film of the present invention is characterized by containing: a cellulose ester; a saccharide ester compound in which all or a part of OH groups in a compound (A) having one of a furanose structure and a pyranose structure or in a compound (B) in which two to twelve of at least one type of a furanose structure and a pyranose structure are bonded, are esterified; and a compound represented by Formula (R) or (Ra).

As preferable examples of the compound (A) and the compound (B), for example, the following compounds can be listed, however, the present invention is not limited to those compounds.

As preferable examples of the compound (A), glucose, galactose, mannose, fructose, xylose, and arabinose can be usable.

As an ester of the compound (B), preferable is a compound in which all or a part of OH groups in the the compound (B) having two to twelve of at least one of a furanose structure and a pyranose structure bonded in the molecule are esterified, and more preferable is a compound in which all or a part of OH groups in the the compound (B) having two or three of at least one of a furanose structure and a pyranose structure bonded in the molecule are esterified.

As preferable examples of the compound (B), lactose, sucrose, nystose, 1F-fructosylnystose, Stachyose, Maltitol, and lactitol, lactulose, cellobiose, maltose, cellotriose, maltotriose, raffinose and kestose can be cited. Other examples of the compound (B) include gentiobiose, gentiotriose, gentiotetraose, xylotriose and galactosyl-sucrose.

Among the compound (B), a compound having at least one furanose structure and at least one pyranose structure bonded in the molecule of the compound (B) is preferable. Preferable examples of the compound having both of the furanose structure and the pyranose structure include sucrose, kestose, nystose, 1F-fructosylnystose and stachyose. Of these, sucrose is more preferable.

Monocarboxylic acid to be used to esterify all or a part of OH groups of the compound (A) or the compound (B), is not specifically limited and known an aliphatic monocarboxylic acid, an alicyclic monocarboxylic acid and an aromatic monocarboxylic acid can be used. The monocarboxylic acid may be used singly or in combination of two or more kinds thereof.

Examples of preferable aliphatic monocarboxylic acid include a saturated fatty acid such as acetic acid, propionic acid, butylic acid, isobutylic acid, valerianic acid, capronic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanic acid, arachidic acid, behenic acid, lignoceric acid, cerotic acid, heptacosanoic acid, montanic acid and melissic acid, and a unsaturated fatty acid such as undecylic acid, oleic acid, sorbic acid, linolic acid, linolenic acid, arachidonic acid and octenic acid.

As examples of preferable alicyclic monocarboxylic acid, cyclopentene carboxylic acid, cyclohexane carboxylic acid, cycloctane carboxylic acid and derivatives thereof can be cited.

Examples of the aromatic monocarboxylic acid include benzoic acid, an aromatic monocarboxylic acid formed by introducing one to five alkyl or alkoxy groups into the benzene ring of benzoic acid such as toluic acid, an aromatic monocarboxylic acid having two or more benzene rings such as cinnamic acid, benzilic acid, biphenyl carboxylic acid, naphthalene carboxylic acid, tetralin carboxylic acid and derivatives thereof. Specific examples of such an aromatic monocarboxylic acid include xylic acid, hemellitic acid, mesitylenic acid, prehnitylic acid, γ-isodurylic acid, isodurylic acid, mesitoic acid, α-isodurylic acid, cuminic acid, α-toluic acid, hydratropic acid, atropic acid, cinnamic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asaronic acid, mandelic acid, homoanisic acid, Homovanillic acid, homoveratric acid, o-homoveratric acid, phthalonic acid and p-coumaric acid. Of these benzoic acid is specifically preferable.

Among the esterified compound of the compound (A) and the compound (B) (saccharide ester compound), an acetylated compound in which acetyl groups are introduced by esterification, is preferable.

Details of the production method of the above acetylated compounds are described in JP-A No. 8-245678.

In addition to the esterified compound of the compound (A) and the compound (B), an esterified compound of oligosaccharide can be employed as an esterified compound of a compound in which three to twelve of at least one type of a furanose structure and a pyranose structure are bonded.

The oligosaccharide can be produced by acting a ferment such as amylase to starch, cane sugar and so on. As a oligosaccharide usable for the invention, marthe oligosaccharide, isomarthe oligosaccharide, fructo oligosaccharide, galact oligosaccharide, and xylo oligosaccharide may be listed.

The oligosaccharide can be acetylated with the same method as that for the above compositions (A) and (B).

Next, a production example of a saccharide ester compound is described.

Two hundreds ml of acetic anhydride was dropped into a solution in which 100 ml of pyridine was added into 29.8 g, 166 mmol of glucose and a reaction among them was conducted for 24 hours. Subsequently, the resultant solution was condensed with an evaporator and the condensed solution was put in iced water. After leaving it alone for one hour, the solution was filtered with a glass filter so as to separate a solid and water, and then the solid on the glass filter was dissolved with chloroform, and the solution is separated with chilled water until the solution became neutrality. After separating an organic layer, it was dried with anhydrous sodium sulfate. Further, after removing the anhydrous sodium sulfate by filtration, chloroform was removed with an evaporator, and then conducting drying under reduced pressure, whereby glucose penta acetate (58.8 g, 150 mmol, 90.9%) was obtained.

Incidentally, the above monocarboxylic acid can be used instead of the above-mentioned acetic anhydride.

Concrete examples of the esterified compound of the present invention are listed below but the invention is not limited thereto.

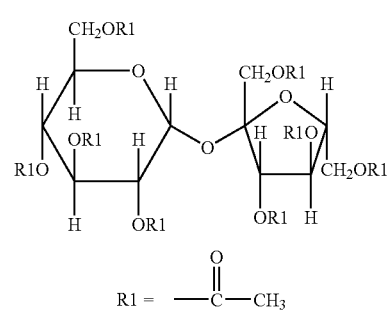

Compound 1

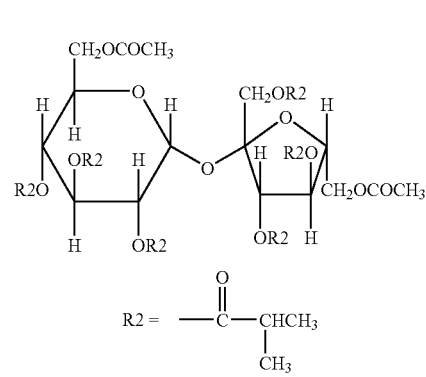

Compound 2

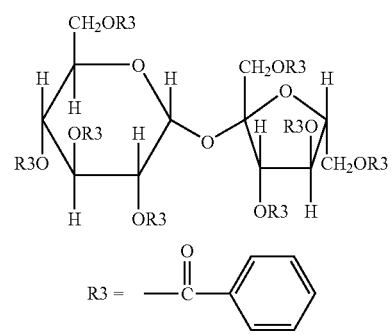

Compound 3

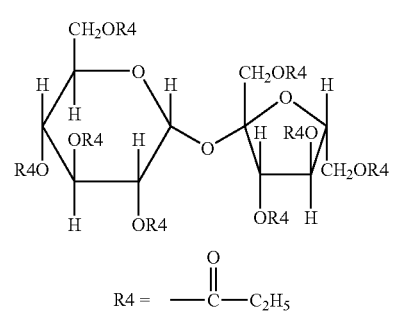

Compound 4

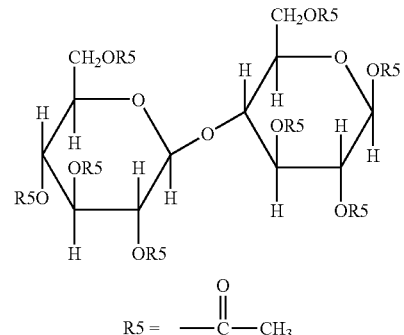

Compound 5

Compound 6
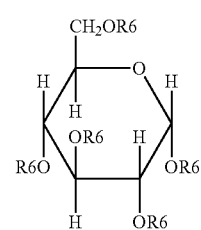
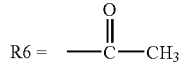
Compound 7
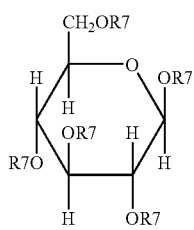
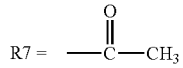
Compound 8
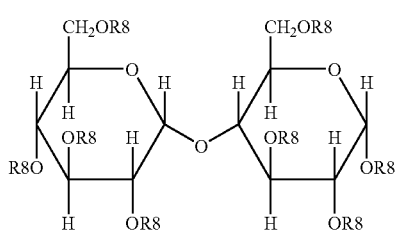
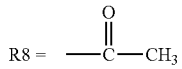
Compound 9
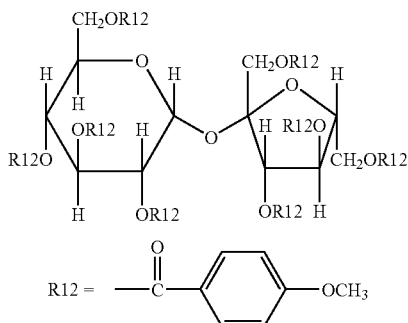
Compound 10
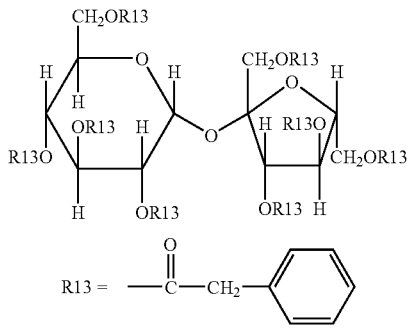
Compound 11
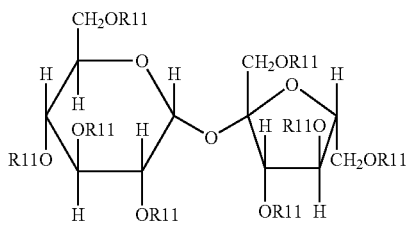
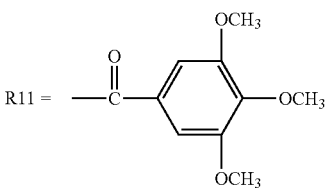
Compound 12
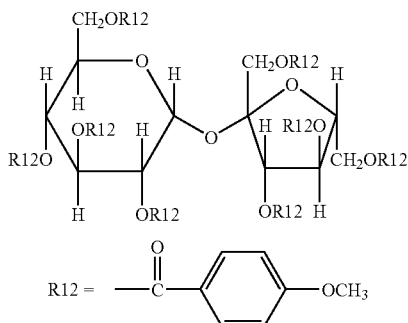
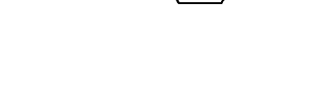
Compound 13
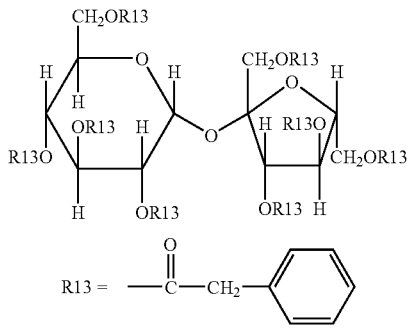
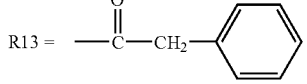
Compound 14
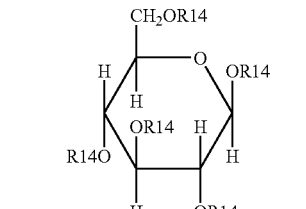
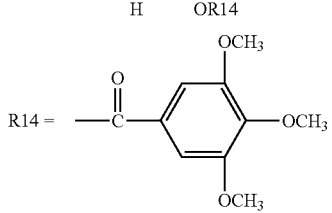

Compound 15
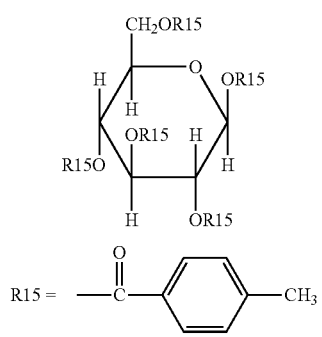
Compound 16
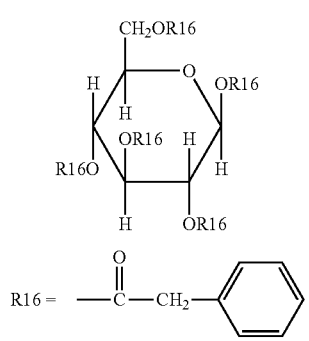
Compound 17
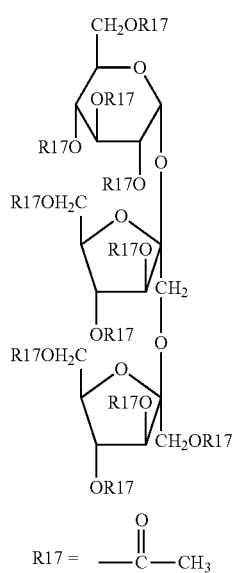
Compound 18
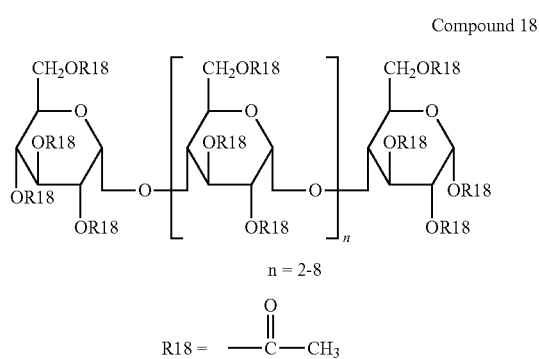
n = 2-8
Compound 19
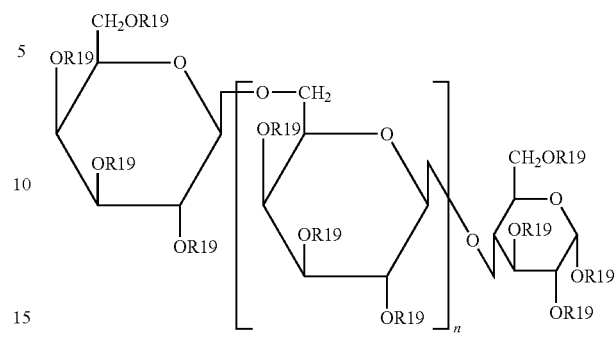
n = 1-8
Compound 20
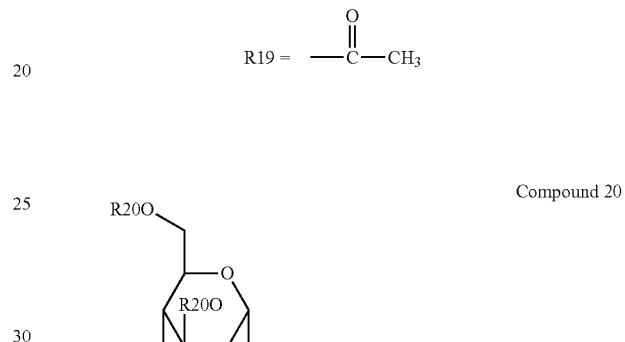
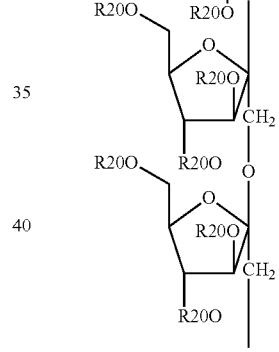
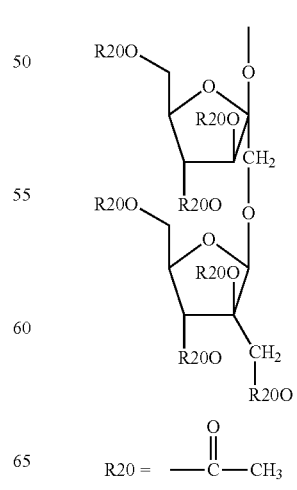

-continued

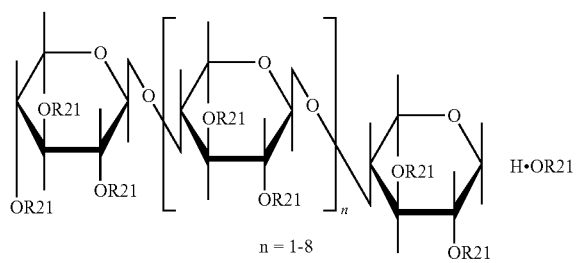

Compound 21 n = 1-8

R21 = —C(=O)—CH$_3$

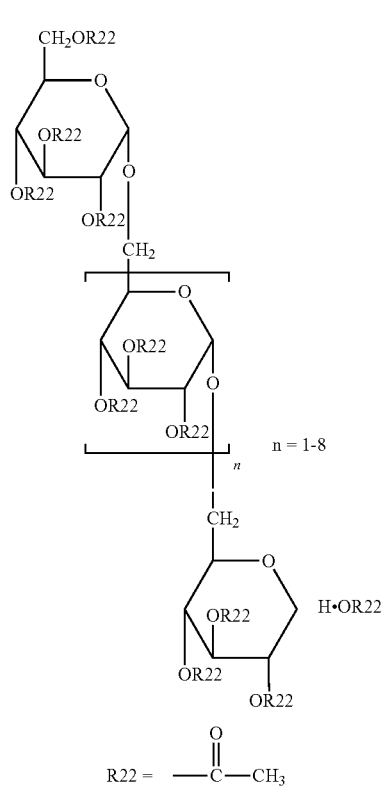

Compound 22 n = 1-8

R22 = —C(=O)—CH$_3$

In order to stabilize a display quality, the polarizer protective film of the present invention preferably contains a saccharide ester compound in which all or a part of OH groups in a compound (A) consisting of one of a furanose structure and a pyranose structure or in a compound (B) consisting of two to twelve of at least one type of a furanose structure and a pyranose structure which are bonded are esterified, in an amount of 1 to 35% by weight and preferably 5 to 30% by weight, based on the weight of the polarizer protective film. By containing the esterified compound within the above range, the superior effects of the present invention can be obtained, and also bleed-out can be avoided.

<Cellulose Ester>

The following describes the details of the cellulose ester used in the present invention:

The cellulose ester film used in the present invention is produced by a solution casting method or a melt casting method. In the solution casting method, a solution (dope) with a cellulose ester dissolved in a solvent is cast on the support member and the solvent is evaporated to produce a film. In the melt casting, a cellulose ester is melted by heating, and the resultant product (melt) is extruded from a die to form a film and the extruded film is cooled on a cooling drum. The melt casting method permits a substantial reduction in the amount of the organic solvent used to produce the film. As compared with the solution casting method requiring use of a great amount of conventional organic solvent, the melt casting method provides a film characterized by a substantial improvement in environmental adaptability. Thus, the cellulose ester film is preferably manufactured by the melt casting method.

The melt casting method of the present invention is a method of producing a film by heating and melting a cellulose ester up to the temperature wherein it becomes fluid, virtually without using a solvent. It is exemplified by the method of producing a film by extruding fluid cellulose ester through a die. The solvent may be used in part of the process of preparing the molten cellulose ester. In the melt film formation process for forming a film product, film forming operation is performed virtually without using solvent.

There is no restriction to the cellulose ester constituting the polarizer protective film if it is a cellulose ester that can be molten to form a film. It is used for aromatic carboxylic acid ester and others. When the film properties obtained such as optical properties are taken into account, the lower fatty acid ester of cellulose is preferably used. In the present invention, the lower fatty acid in lower fatty acid ester cellulose is defined as a fatty acid containing 5 or less carbon atoms. Cellulose acetate, cellulose propionate, cellulose butyrate and cellulose pivalate can be mentioned as preferable lower fatty acid esters of cellulose. Although the cellulose ester replaced by the fatty acid containing six or more carbon atoms has a good melt film formation property, the cellulose ester film having been obtained therefrom has poor dynamic characteristics. This cellulose ester can hardly be used as an optical film. To ensure compatibility between the dynamic characteristics and melt casting film formation property, it is preferred to use a mixed fatty acid ester such as cellulose acetate propionate and cellulose acetate butyrate.

The cellulose ester constituting the cellulose ester film of the present invention contains an acyl group having 2 or more carbon atoms, and the total number of the carbon atoms contained in the acyl groups in one glucose unit of the cellulose ester is preferably 6.1 to 7.5. The total number of the carbon atoms contained in the acyl groups is more preferably 6.5 to 7.2 and further more preferably 6.7 to 7.1. The total number of the carbon atoms contained in the acyl groups is the sum of each product of the substitution degree of each acyl group multiplied by the number of carbon atoms contained in the acyl group, in the cellulose ester. Further, the number of carbon atoms contained in the aliphatic acyl group is preferably 2 through 6 from the viewpoint of productivity and cost in cellulose synthesis.

Cellulose acylate is a polymer in which all or a part of hydroxyl groups bonded to the carbon atoms at 2-, 3- and 6-positions of the glucose unit are esterified by an acyl group. The "substitution degree by acyl group" is a measure representing the number of the hydroxyl groups bonded with the acyl groups among 3n hydroxyl groups (n is polymerization degree). The substitution degree is represented by the average number of hydroxyl groups substituted with an acyl group among the three hydroxyl groups at 2-, 3 and 6-positions per glucose unit. Accordingly, the substitution degree comes up to the maximum of 3.0 when the three hydroxyl groups are entirely esterified by the acyl groups. The portion not replaced by acyl group is normally present as a hydroxyl group. This can be synthesized by the method known in the conventional art.

Examples of the acyl group include: an acetyl group, a propionyl group, a butyryl group, a pentanate group and a hexanate group. The cellulose ester is exemplified by cellulose propionate, cellulose butyrate and cellulose pentanate. So long as the aforementioned number of carbon atoms contained in the side chain is satisfied, it is also possible to use a mixed fatty acid ester such as cellulose acetate propionate, cellulose acetate butyrate, cellulose acetate pentanate. Of these, cellulose acetate propionate and cellulose acetate butyrate are preferable.

Generally, the mechanical property and saponifiability of the cellulose ester film and melt casting film formation property of the cellulose ester are kept in a trade-off relationship with respect to the total substitution degree in the acyl group of cellulose ester. For example, in the cellulose acetate propionate, an increase in the overall substitution degree of the acyl group results in a decrease in the mechanical property and improvement in melt casting film formation property. Thus, compatibility is difficult to achieve. In the present invention, the total number of carbon atoms contained in the acyl group of the cellulose ester is 6.1 through 7.5, whereby compatibility among the film mechanical property, saponifiability and melt casting film formation property can be ensured, according to the findings by the present inventors. Although the details of this arrangement are not very clear, it is considered that there are differences in the degree of impact upon the film mechanical property, saponification property and melt casting film formation property, depending on the number of carbon atoms contained in the acyl group. Namely, when the substitution degree of a cellulose ester is the same, an acyl group having a longer carbon chain such as a propionyl group or a butyryl group compared to an acetyl group gives more hydrophobic property of the cellulose ester, resulting in improving the melt casting property. Accordingly, in order to obtain the same level of melt casting film formation property, the acyl substitution degree of cellulose propionate or cellulose butyrate may be lower than the acetyl substitution degree of cellulose acetate. Thus, the mechanical property and the saponification property is improved.

In the cellulose ester preferably used in the present invention, the ratio of the weight average molecular weight Mw to number average molecular weight Mn is 1.0 through 5.5. This ratio is more preferably 1.4 through 5.0, still more preferably 2.0 through 3.0. Further, the Mw is preferably 50,000 through 500,000, more preferably 100,000 through 300,000.

The average molecular weight of cellulose ester and the distribution of the molecular weight can be measured by the high performance liquid chromatography according to the conventionally known method. This is used to calculate the number average molecular weight and weight average molecular weight. The following describes the measuring requirements:
Solvent: Methylene chloride
Column: Shodex K806, K805, K803 (produced by Showa Denko Co., Ltd.) were connected to be used
Column temperature: 25° C.
Sample concentration: 0.1% by weight
Detector: RI Model 504 (produced by GL Science)
Pump: L6000 (produced by Hitachi, Ltd.).
Flow rate: 1.0 ml/min.
Calibration curve: Thirteen samples of Standard polystyrene STK (Produced by Toso, Corp.), the Mw being in the range of 500-1000000, are used to obtain a calibration curve. The thirteen samples of uniform intervals are preferably used.

The cellulose material of the cellulose ester used in the present invention can be either a wood pulp or cotton linter. The wood pulp can be either a conifer or a broad-leaved tree. The conifer is more preferred. When a film is manufactured, a cotton linter is preferably utilized from the viewpoint of separability. The cellulose esters manufactured therefrom can be mixed properly and used, or can be used independently.

For example, the ratio of the cotton linter-derived cellulose ester to the wood pulp (conifer)-derived cellulose ester to the wood pulp (broad-leaved tree)-derived cellulose ester can be 100:0:0, 90:10:0, 85:15:0, 50:50:0, 20:80:0, 10:90:0, 0:100:0, 0:0:100, 80:10:10, 85:0:15, and 40:30:30.

The cellulose ester can be obtained, for example, by replacing the hydroxyl group of the material cellulose by the acetic anhydride, anhydrous propionic acid and/or anhydrous butyric acid according to the normal method in such a way that the acetyl group, propionyl group and/or butyl group are kept within the aforementioned range. There is no restriction to the method of synthesizing such a cellulose ester. For example, it can be synthesized by using the method disclosed in the Japanese JP-A No. 10-45804, or Published Japanese Translation of PCT International Publication No. 6-501040.

The substitution degree of acyl group such as acetyl group, propionyl group and butyl group can be measured according to the ASTM-D817-96.

From the industrial viewpoint, cellulose ester is synthesized using sulfuric acid as a catalyst. This, sulfuric acid is not completely removed, and the remaining sulfuric acid causes various forms of decomposition reaction at the time of melt casting film formation. This will affect the quality of the cellulose ester film to be obtained. Thus, the amount of the residual sulfuric acid contained in the cellulose ester used in the present invention is 0.1 through 40 ppm in terms of the sulfur element. They are considered to be included as salts. The amount of the residual sulfuric acid contained therein of 40 ppm or less is preferable since the deposition on the die lip at the time of heat-melting is reduced and the film tends not to split off at the time of thermal stretching or slitting subsequent to thermal stretching. The amount of the residual sulfuric acid contained therein should be reduced as much as possible, but when it is to be reduced below 0.1, the load on the cellulose ester washing process will be excessive and the material tends to be damaged easily. This should be avoided. This may be because an increase in the frequency of washing affects the resin, but the details are not yet clarified. Further, the preferred amount is in the range of 0.1 through 30 ppm. The amount of the residual sulfuric acid can be measured according to the ASTM-D817-96 in the similar manner.

The total amount of the residual amount of acid (e.g., acetic acid) is preferably 1000 ppm or less, more preferably 500 ppm or less, still more preferably 100 ppm or less.

The amount of the residual acid can be kept within the aforementioned range if the synthesized cellulose ester is washed more carefully than in the case of the solution casting method. Then, when a film is manufactured by the melt casting, the amount of depositions on the lip portion will be reduced so that a film characterized by a high degree of flatness is produced. Such a film will be further characterized by excellent resistance to dimensional changes, mechanical strength, transparency, resistance to moisture permeation, Rth value (to be described later) and Ro value. Further, the cellulose ester can be washed using water as well as a poor solvent such as methanol or ethanol. It is also possible to use a mixture between a poor solvent and a good solvent if it is a poor solvent as a result. This will remove the inorganic substance other than residual acid, and low-molecular organic impurities. The cellulose ester is washed preferably in the presence of an antioxidant such as a hindered amine and phosphorous acid ester. This will improve the heat resistance and film formation stability of the cellulose ester.

To improve the heat resistance, mechanical property and optical property of the cellulose ester, the cellulose ester is settled again in the poor solvent, subsequent to dissolution of the good solvent of the cellulose ester. This will remove the low molecular weight component and other impurities of the cellulose ester. In this case, similarly to the aforementioned case of washing the cellulose ester, washing is preferably carried out in the presence of an antioxidant.

Subsequent to re-settling of the cellulose ester, another polymer or low molecular weight compound may be added.

The cellulose ester used in the present invention is preferred to be such that there are few bright defects when formed into a film. The bright defect can be defined as follows: Two polarizing plates are arranged perpendicular to each other (crossed-Nicols), and a cellulose ester film is inserted between them. Light of the light source is applied from one of the surfaces, and the cellulose ester film is observed from the other surface. In this case, a spot formed by the leakage of light from the light source. This spot is referred to as a bright detect. The polarizing plate employed for evaluation in this case is preferably made of the protective film free of a bright defect. A glass plate used to protect the polarizer is preferably used for this purpose. The bright defect may be caused by non-acetified cellulose or cellulose with a low degree of acetification contained in the cellulose ester. It is necessary to use the cellulose ester containing few bright defects (use the cellulose ester with few distributions of substitution degree), or to filter the molten cellulose ester. Alternatively, the material in a state of solution is passed through a similar filtering step in either the later process of synthesizing the cellulose ester or in the process of obtaining the precipitate, whereby the bright defect can be removed. The molten resin has a high degree of viscosity, and therefore, the latter method can be used more efficiently.

The smaller the film thickness, the fewer the number of bright defects per unit area and the fewer the number of the cellulose esters contained in the film. The number of the bright defects having a bright spot diameter of 0.01 mm or more is preferably 200 pieces/cm$^2$ or less, more preferably 100 pieces/cm$^2$ or less, still more preferably 50 pieces/cm$^2$ or less, further more preferably 30 pieces/cm$^2$ or less, still further more preferably 10 pieces/cm$^2$ or less. The most desirable case is that there is no bright defect at all. The number of the bright defects having a bright spot diameter of 0.005 through 0.01 mm is preferably 200 pieces/cm$^2$ or less, more preferably 100 pieces/cm$^2$ or less, still more preferably 50 pieces/cm$^2$ or less, further more preferably 30 pieces/cm$^2$ or less, still further more preferably 10 pieces/cm$^2$ or less. The most desirable case is that there is no bright defect at all.

When the bright defect is to be removed by melt filtration, the bright defect is more effectively removed by filtering the cellulose ester composition mixed with a plasticizer, anti-deterioration agent and antioxidant, rather than filtering the cellulose ester melted independently. It goes without saying that, at the time of synthesizing the cellulose ester, the cellulose ester can be dissolved in a solvent, and the bright defect can be reduced by filtering. Alternatively, the cellulose ester mixed with an appropriate amount of ultraviolet absorber and other additive can be filtered. At the time of filtering, the viscosity of the melt including the cellulose ester is preferably 10000 P or less, more preferably 5000 P or less, still more preferably 1000 P or less, further more preferably 500 P or less. A conventionally known medium including a fluoride resin such as a glass fiber, cellulose fiber, filter paper and tetrafluoroethylene resin is preferably used as a filter medium. Particularly, ceramics and metal can be used in preference. The absolute filtration accuracy is preferably 50 µm or less, more preferably 30 µm or less, still more 10 µm or less, further more preferably 5 µm or less. They can be appropriately combined for use. Either a surface type or depth type filter medium can be used. The depth type is more preferably used since it has a greater resistance to clogging.

In another embodiment, it is also possible that the cellulose ester as a material is dissolved in a solvent at least once, and is dried and used. In this case, the cellulose ester is dissolved in the solvent together with one or more of the plasticizer, ultraviolet absorber, anti-deterioration agent, antioxidant and matting agent, and is dried and used. Such a good solvent as methylene chloride, methyl acetate or dioxolane that is used in the solution casting method can be used as the solvent. At the same time, the poor solvent such as methanol, ethanol or butanol can also be used. In the process of dissolution, it can be cooled down to −20° C. or less or heated up to 80° C. or more. Use of such a cellulose ester allows uniform additives to be formed in the molten state, and the uniform optical property is ensured in some cases.

The polarizer protective film of the present invention can be made of an adequate mixture of high polymer components other than the cellulose ester. The high polymer components to be mixed are preferably characterized by excellent compatibility with the cellulose ester compatibility. When formed into a film, the transmittance is preferably 80% or more, more preferably 90% or more, still more preferably 92% or more.

(Antioxidant)

Since decomposition of cellulose ester is accelerated not only by heat but also by oxygen, it is preferable to incorporate an antioxidant as a stabilizer in a polarizer protective film of the present invention.

Specifically, under a high temperature environment such as in a melt casting process, decomposition of the material for forming a cellulose ester film is accelerated by heat and oxygen, accordingly, an antioxidant is preferably incorporated in the film forming material.

In the present invention, it is also preferable to use an antioxidant in a suspension-washing process of cellulose ester using a poor solvent. Any antioxidant are employable without limitation, as far as the antioxidant contained in a poor solvent inactivates radicals generated in cellulose ester, or the antioxidant restrains deterioration of cellulose ester due to oxygen added to the generated radicals.

An antioxidant utilized in the suspension-washing of cellulose ester may remain in cellulose ester after washing. The remaining amount is preferably 0.01-2,000 ppm, more preferably 0.05-1,000 ppm and furthermore preferably 0.1-100 ppm.

As a useful antioxidant in the present invention, a compound which restrains deterioration of the material for forming a cellulose ester film due to oxygen can be utilized without limitation, however, examples of a useful compound include: phenol, hindered amine, a phosphorus-containing compound, a sulfur-containing compound, a heat resistant processing stabilizer and an oxygen scavenger. Specifically preferable among them are phenol, hindered amine and a phosphorus-containing compound. By blending such a compound, it is possible to prevent coloring and strength decrease of a cellulose ester film while keeping the transparency or heat resistance of the film. These antioxidants each can be utilized alone or in combination of two types or more.

A phenol type compound is a compound well known in the art and is described, for example, in columns 12-14 of U.S. Pat. No. 4,839,405 including 2,6-dialkylphenol derivative compounds. Among these compounds, examples of a preferable compound include those represented by Formula (A).

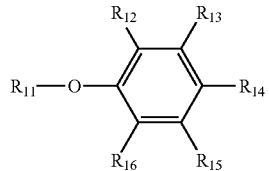

Formula (A)

In Formula (A), $R_{11}$-$R_{16}$ each represent a substituent. Examples of the substituent include: a hydrogen atom, a halogen atom (for example, a fluorine atom and a chlorine atom), an alkyl group (for example, a methyl group, an ethyl group, an isopropyl group, a hydroxyethyl group, a methoxy methyl group, a trifluoro methyl group and a t-butyl group), a cycloalkyl group (for example, a cyclopentyl group and a cyclohexyl group), an aralkyl group (for example, a benzyl group and a 2-phenethyl group), an aryl group (for example, a phenyl group, a naphthyl group, p-tolyl group and a p-chlorophenyl group), an alkoxy group (for example, a methoxy group, an ethoxy group, an isopropoxy group and a butoxy group), an aryloxy groups (for example, a phenoxy group), a cyano group, an acylamino group (for example, an acetylamino group and a propionylamino group), an alkylthio group (for example, a methylthio group, an ethylthio group and a butylthio group), an arylthio group (for example, a phenylthio group), a sulfonylamino group (for example, a methanesulfonylamino group and a benzene sulfonyl amino group), an ureido group (for example, a 3-methylureido group, a 3,3-dimethylureido group and a 1,3-dimethylureido group), a sulfamoylamino group (for example, a dimethylsulfamoyl amino group), a carbamoyl group (for example, a methylcarbamoyl group, an ethylcarbamoyl group and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group, (for example, a phenoxycarbonyl group), a sulfonyl group (for example, a methanesulfonyl group, a butane sulfonyl group and a phenylsulfonyl group), an acyl group (for example, an acetyl group, a propanoyl group and a butyroyl group), an amino group (for example, a methylamino group, an ethylamino group and a dimethylamino group), a cyano group, a hydroxy group, a nitro group, a nitroso group, an amineoxide group (for example, a pyridine oxide group), an imide group (for example, a phthalimide group), disulfide group (for example, a benzene disulfide group and a benzothiazolyl-2-disulfide group), a carboxyl group, a sulfo group and a heterocycle group (for example, a pyrrole group, a pyrrolidyl group, a pyrazolyl group, an imidazolyl group, a pyridyl group, a benzimidazolyl group, a benzthiazolyl group and a benzoxazolyl group). These substituents may be further substituted.

Further, $R_{11}$ is preferably a hydrogen atom, and R12 and R16 each are preferably a t-butyl group which is a phenol compound. Examples of the phenol compound include: n-octadecyl-3-(3,5-di-t-butyl-4-hydroxyphenyl)propionate, n-octadecyl-3-(3,5-di-t-butyl-4-hydroxyphenyl)acetate, n-octadecyl-3,5-di-t-butyl-4-hydroxybenzoate, n-hexyl-3,5-di-t-butyl-4-hydroxyphenylbenzoate, n-dodecyl-3,5-di-butyl-4-hydroxyphenylbenzoate, neo-dodecyl-3-(3,5-di-t-butyl-4-hydroxyphenyl)propionate, dodecyl-β-(3,5-di-t-butyl-4-hydroxyphenyl)propionate, ethyl-α-(4-hydroxy-3,5-di-t-butylphenyl)isobutyrate, octadecyl-α-(4-hydroxy-3,5-di-t-butylphenyl)isobutyrate, octadecyl-α-(4-hydroxy-3,5-di-t-butyl-4-hydroxyphenyl)propionate, 2-(n-octylthio)ethyl-3,5-di-t-butyl-4-hydroxy-benzoate, 2-(n-octylthio)ethyl-3,5-di-t-butyl-4-hydroxyphenylacetate, 2-(n-octadecylthio)ethyl-3,5-di-t-butyl-4-hydroxyphenylacetate, 2-(n-octadecylthio)ethyl-3,5-di-t-butyl-4-hydroxybenzoate, 2-(2-hydroxyethylthio)-ethyl-3,5-di-t-butyl-4-hydroxybenzoate, diethylglycol-bis-(3,5-di-t-butyl-4-hydroxyphenyl)propionate, 2-(n-octadecylthio)ethyl-3,5-di-t-butyl-4-hydroxyphenyl)-propionate, stearamide-N,N-bis-[ethylene-3-(3,5-di-t-butyl-4-hydroxyphenyl)propionate], N-butylimino-N,N-bis-[ethylene-3-(3,5-di-t-butyl-4-hydroxyphenyl)propionate], 2-(2-stearoyloxyethylthio)ethyl-3,5-di-t-butyl-4-hydroxybenzoate, 2-(2-stearoyloxyethylthio)ethyl-7-(3-methyl-5-t-butyl-4-hydroxyphenyl)heptanoate, 1,2-propyleneglycol-bis-[3-(3,5-di-t-butyl-4-hydroxyphenyl)propionate], ethyleneglycol-bis-[3-(3,5-di-t-butyl-4-hydroxyphenyl)propionate], neopentylglycol-bis-[3-(3,5-di-t-butyl-4-hydroxyphenyl)propionate], ethyleneglycol-bis-(3,5-di-t-butyl-4-hydroxyphenylacetate), glycerol-1-n-octadecanoate-2,3-bis-(3,5-di-t-butyl-4-hydroxyphenylacetate), pentaerythritoltetrakis[3-(3',5'-di-t-butyl-4'-hydroxyphenyl)propionate], 1,1,1-trimethylolethane-tris-[3-(3,5-di-t-butyl-4-hydroxyphenyl)propionate], sorbitol-hexa-[3-(3,5-di-t-butyl-4-hydroxyphenyl)propionate], 2-hydroxyethyl-7-(3-methyl-5-t-butyl-4-hydroxyphenyl)propionate, 2-stearoyloxyethyl-7-(3-methyl-5-t-butyl-4-hydroxyphenyl)heptanoate, 1,6-n-hexanediol-bis-[(3',5'-di-butyl-4-hydroxyphenyl)propionate] and pentaerythritoltetrakis(3,5-di-t-butyl-4-hydroxyhydrocinnamate). Above phenol compounds have been commercialized, for example, as "Irganox1076" and "Irganox1010" from Ciba Specialty Chemicals, Inc.

(Hindered Amine Compound)

In the present invention, a hindered amine compound represented by Formula (B) is preferably used as one of the useful antioxidants.

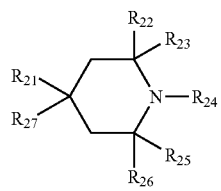

Formula (B)

In Formula (B), $R_{21}$-$R_{27}$ each represent a substituent. Examples of the substituent are common to the substituents $R_{11}$-$R_{16}$ described for Formula (A). $R_{24}$ is preferably a hydrogen atom or a methyl group, $R_{27}$ is preferably a hydrogen atom and $R_{22}$, $R_{23}$, $R_{25}$ and $R_{26}$ each are preferably a methyl group.

Examples of a hindered amine compound include: bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl)-2-(3,5-di-t-butyl-4-hydroxybenzyl)-2-butylmalonate, bis(1-acroyl-2,2,6,6-tetramethyl-4-piperidyl)-2,2-bis(3,5-di-t-butyl-4-hydroxybenzyl)-2-butylmalonate, bis(1,2,2,6,6-pentamethyl-4-piperidyl)decanedioate, 2,2,6,6-tetramethyl- 4-piperidylmethacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propioneamide, tetrakis(2,2,6,6-tetramethyl-4-piperidyl)-1,2,3,4-butanetetracarboxylate and tetrakis(1,2,2,6,6-pentamethyl-4-piperidyl)-1,2,3,4-butanetetracarboxylate.

Also, a polymer compound is preferable, examples of which include: N,N',N'',N'''-tetrakis[4,6-bis-[butyl(N-methyl-2,2,6,6-tetramethylpiperidine-4-yl)amino]-triazine-2-yl]-4,7-diazadecane-1,10-diamine; a polycondensation compound of dibutylamine, 1,3,5-triazine N,N'-bis(2,2,6,6-tetramethyl-4-piperidyl)-1,6-hexamethylenediamine and N-(2,2,6,6-tetramethyl-4-piperidyl)butylamine; a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; a polycondensation compound of 1,6-hexanediamine-N,N'-bis(2,2,6,6-tetramethyl-4-piperidyl) and morpholine-2,4,6-trichloro-1,3,5-triazine; a high molecular weight HALS in which plurality of piperidine rings are combined via a triazine moiety, such as poly[(6-morpholino-s-triazine-2,4-diyl)][(2,2,6,6-tetramethyl-4-piperidyl)imino]-hexamethylene[(2,2,6,6-tetramethyl-4-piperidyl)imino]]; a polymer of dimethyl succinate and 4-hydroxy-2,2,6,6-tetramethyl-1-piperidineethanol; and a compound in which a piperizine ring is combined via a ester bond, such as a mixed ester compound of 1,2,3,4-butanetetracarboxylic acid, 1,2,2,6,6-pentamethyl-4-piperizinol and 3,9-bis(2-hydroxy-1,1-dimethylethyl)-2,4,8,10-tetraoxaspiro[5,5]undecane, however, the present invention is not limited thereto.

Among these compounds, preferable are, for example, a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; and a polymer of dimethyl succinate and 4-hydroxy-2,2,6,6-tetramethyl-1-piperidine ethanol, which have a number average molecular weight (Mn) of 2,000-5,000.

(Hindered Phenol Antioxidants)

The hindered phenol antioxidant is a structure having a large branched alkyl group at the ortho position of the hydroxide group of the phenol compound.

Examples of the antioxidant include known hindered phenol antioxidant compounds such as 2-6-dialkyl phenol derivatives and the like which are described in columns 12-14 of the specification of U.S. Pat. No. 4,839,405. These compounds include those represented by the Formula (1) below.

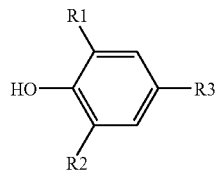

Formula (E)

In the formula, R1, R2 and R3 represent an alkyl group substituent which may or may not be further substituted. Specific examples of the hindered phenol compound include n-octadyl 3-(3,5-di-t-butyl-4-hydroxyphenyl)-propionate, n-octadyl 3-(3,5-di-t-butyl-4-hydroxyphenyl)-acetate, n-octadecyl 3,5-di-t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neo-dodecyl 3-(3,5-di-t-butyl-4-hydroxyphenyl)propionate, dodecyl β(3,5-di-t-butyl-4-hydroxyphenyl)propionate, ethyl α-(4-hydroxy 3,5-di-t-butylphenyl)isobutyrate, octadecyl α-(4-hydroxy 3,5-di-t-butylphenyl)isobutyrate, octadecyl α-(4-hydroxy 3,5-di-t-butyl-4-hydroxyphenyl)propionate, 2-(n-octylthio)ethyl 3,5-di-t-butyl-4-hydroxy-benzoate, 2-(n-octyl thio)ethyl 3,5-di-t-butyl-4-hydroxy-phenyl acetate, 2-(n-octadecyl thio)ethyl 3,5-di-t-butyl-4-hydroxy-phenyl-acetate, 2-(n-octadecyl thio)ethyl 3,5-di-t-butyl-4-hydroxy-benzoate, 2-(2-hydroxy ethyl thio)ethyl 3,5-di-t-butyl-4-hydroxy-benzoate, diethyl glycol bis(3,5-di-t-butyl-4-hydroxy-phenyl)propionate, 2-(n-octadecyl thio)ethyl 3-(3,5-di-t-butyl-4-hydroxy-phenyl)propionate, stearamide N,N-bis-[ethylene 3-(3,5-di-t-butyl-4-hydroxy-phenyl)propionate], n-butyl imino N,N-bis-[ethylene 3-(3,5-di-t-butyl-4-hydroxy-phenyl)propionate], 2-(2stearoyloxyethylthio)ethyl 3,5-di-t-butyl-4-hydroxy benzoate, 2-(2-stearoyloxyethylthio)ethyl 7-(3-methyl-5-t-butyl-4-hydroxy-phenyl)heptanoate, 1,2-propylene glycol bis-[3-(3,5-di-t-butyl-4-hydroxy-phenyl)propionate], ethylene glycol bis-[3-(3,5-di-t-butyl-4-hydroxy-phenyl)propionate], neopentyl glycol bis-[3-(3,5-di-t-butyl-4-hydroxy-phenyl)propionate], ethylene glycol bis-(3,5-di-t-butyl-4-hydroxy-phenyl acetate), glycerine-1-n-octadecanoate-2,3-bis-(3,5-di-t-butyl-4-hydroxyphenyl acetate), pentaerythritol-tetrakis[3-(3',5'-di-t-butyl-4'-hydroxy-phenyl)propionate], 1,1,1-trimethyrol ethane tris[3-(3,5-di-t-butyl-4-hydroxy-phenyl)propionate], sorbitol hexa-[3-(3,5-di-t-butyl-4-hydroxy-phenyl)propionate], 2-hydroxyyethyl 7-(3-methyl-5-t-butyl-4-hydroxy-phenyl)propionate, 2-stearoyloxyethyl 7-(3-methyl-5-t-butyl-4-hydroxy-phenyl)heptanoate, 1,6-n-hexane diole bis[(3',5'-di-t-butyl-4-hydroxy-phenyl)propionate], pentaerythritol-tetrakis(3,5-di-t-butyl-4-hydroxy hydroxinamate). The hindered phenol based antioxidant compounds of the type listed above are commercially available as Tinuvin 144, Tinuvin770, and Irganox 1010 manufactured by Ciba Specialty Chemicals, or as ADK-STAB LA-52 manufactured by ADEKA Corp.

(Phosphorus-Containing Compound)

A compound having a substructure represented by Formula (C-1), (C-2), (C-3), (C-4) or (C-5) is preferably used as one of the preferable antioxidants in the present invention.

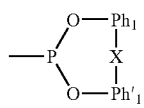

Formula (C-1)

In Formula (C-1), $Ph_1$ and $Ph'_1$ each represent a divalent substituent. More preferably, $Ph_1$ and $Ph'_1$ each represent a phenylene group, and the hydrogen atom of the phenylene group may be replaced with a phenyl group, an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_1$ and $Ph'_1$ may be mutually the same, or may be different. X represents a single bond, a sulfur atom, or a —CHR6-group. R6 represents a hydrogen atom, an alkyl group having 1 to 8 carbon atoms, or a cycloalkyl group having 5 to 8 carbon atoms. Further, these groups may be substituted with one of the substituents which are common to the substituents $R_{11}$-$R_{16}$ described in Formula (A).

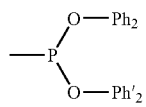

Formula (C-2)

Ph$_2$ and Ph'$_2$ each represent one of the substituents which are common to the substituents R$_{11}$-R$_{16}$ described in Formula (A). Ph$_2$ and Ph'$_2$ may be mutually the same or may be different, and Ph$_2$ and Ph'$_2$ may further be substituted with one of the substituents which are common to the substituents R$_{11}$-R$_{16}$ described in Formula (A).

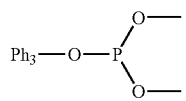

Formula (C-3)

Ph$_3$ represents one of the substituents which are common to the substituents R$_{11}$-R$_{16}$ described in Formula (A). More preferably, Ph$_3$ represents a phenyl group or a biphenyl group. The hydrogen atom of the phenyl group or the biphenyl group may be replaced with an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. Ph$_3$ may further be substituted with one of the substituents which are common to the substituents R$_{11}$-R$_{16}$ described in Formula (A).

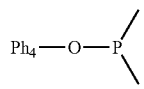

Formula (C-4)

Ph$_4$ represents one of the substituents which are common to the substituents R$_{11}$-R$_{16}$ described in Formula (A). More preferably, Ph$_4$ represents an alkyl group or a phenyl group each having 1 to 20 carbon atoms. The alkyl group or the phenyl group may further be substituted with one of the substituents which are common to the substituents R$_{11}$-R$_{16}$ described in Formula (A).

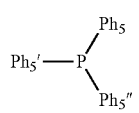

Formula (C-5)

Ph$_5$, Ph'$_5$, and Ph"$_5$ each represent a substituent. Example of the substiture are common to the substituents R$_{11}$-R$_{16}$ described in Formula (A). More preferably, Ph$_5$, Ph'$_5$, and Ph"$_5$ each represent an alkyl group or a phenyl group each having 1 to 20 carbon atoms. The alkyl group or the phenyl group may further be substituted with one of the substituents which are common to the substituents R$_{11}$-R$_{16}$ described in Formula (A).

Specific examples of a phosphorus-containing compound include: mono-phosphite compounds such as triphenyl phosphate, diphenylisodecyl phosphate, phenyldiisodecyl phosphate, tris(nonylphenyl)phosphate, tris(dinonylphenyl)phosphate, tris(2,4-di-t-butylphenyl)phosphite, 10-(3,5-di-t-butyl-4-hydroxybenzyl)-9,10-dihydro-9-oxa-10-phosphaphenanthrene-10-oxide, 6-[3-(3-t-butyl-4-hydroxy-5-methylphenyl)propoxy]-2,4,8,10-tetra-t-butyldibenz[d,f][1.3.2]dioxaphosphepin and tridecyl phosphite; diphosphite compounds such as 4,4'-butylidene-bis(3-methyl-6-butylphenyl-di-tridecyl phosphite) and 4,4'-isopropylidene-bis(phenyl-di-alkyl(C12-C15)phosphite); phosphonite compounds such as triphenyl phosphonite, tetrakis(2,4-di-tert-butylphenyl)[1,1-biphenyl]-4,4'-diylbisphosphonite and tetrakis(2,4-di-tert-butyl-5-methylphenyl)[1,1-biphenyl]-4,4'-diylbisphosphonite; phosphinite compounds such as triphenyl phosphinite and 2,6-dimethylphenyldiphenyl phosphinite; and phosphine compounds such as triphenyl phosphine and tris(2,6-dimethoxyphenyl)phosphine. Specifically, phosphonite compounds are preferable. Phosphonite compounds will now be described further in more detail.

(Phosphonite Compound)

Conventionally known phosphonite compounds are employable in the present invention, however, the phosphonite compounds represented by Formula (F) or (G) are preferable.

$$R_1P(OR_2)_2 \qquad \text{Formula (F)}$$

(in the formula, R$_1$ represents a phenyl group which may have a substituent or a thienyl group which may have a substituent; R$_2$ represents an alkyl group which may have a substituent, a phenyl group which may have a substituent or a thienyl group which may have a substituent; and a plurality of R$_2$ may be combined each other to form a ring.)

$$(R_4O)_2PR_3-R_3P(OR_4)_2 \qquad \text{Formula (G)}$$

(in the formula, R$_3$ represents a phenylene group which may have a substituent or a thienylene group which may have a substituent; R$_4$ represents an alkyl group which may have a substituent, a phenyl group which may have a substituent or a thienyl group which may have a substituent; and a plurality of R$_4$ may be combined each other to form a ring.)

In above Formula (F), R$_1$ represents a phenyl group which may have a substituent which may further be substituted or unsubstituted or a thienyl group which may have a substituent; R$_2$ represents an alkyl group which may have a substituent having 1-6 carbon atoms, a phenyl group which may have a substituent, a thienyl group which may have a substituent or a phenyl group having 1-5 substituents of which total carbon number is 1-14; and a plurality of R$_2$ may be combined each other to form a ring, however, R$_2$ is preferably a phenyl group substituted with an alkyl group having 1-9 carbon atoms.)

R$_2$ is preferably a substituted phenyl group, total carbon atoms of the substituent being preferably 9-14 and more preferably 9-11.

When two or more R$_2$ are combined to form a ring, the total number of carbon atoms on the phenyl ring is preferably 10-30.

The substituent is not specifically limited, however, examples of a substituent include: an alkyl group (such as a methyl group, an ethyl-group, a propyl group, an isopropyl group, a t-butyl group, a pentyl group, a hexyl group, an octyl group, a dodecyl group and trifluoromethyl group), a cycloalkyl group (such as a cyclopentyl group and a cyclohexyl group), an aryl group (such as a phenyl group and a naphthyl group), an acylamino group (such as an acetylamino group and a benzoylamino group), an alkylthio group (such as a methylthio group and an ethylthio group), an arylthio group (such as a phenylthio group and a naphthylthio group), an alkenyl group (such as a vinyl group, a 2-propenyl group, a 3-butenyl group, a 1-methyl-3-propenyl group, a 3-pentenyl group, a 1-methyl-3-butenyl group, a 4-hexenyl group and a cyclohexenyl group), a halogen atom (such as a fluorine atom, a chlorine atom, a bromine atom and an iodine atom), an alkynyl group (such as a propalgyl group), a heterocyclic group (such as a pyridyl group, a thiazolyl group, an oxazolyl group and an imidazolyl group), an alkylsulfonyl group (such as a methylsulfonyl group and an ethylsulfonyl group), an arylsulfonyl group (such as a phenylsulfonyl group and a naphthylsulfonyl group), an alkylsulfinyl group (such as a methylsulfinyl group), an arylsulfinyl group (such as a phenylsulfinyl group), a phosphono group, an acy group (such as an acetyl group, a pivaloyl group and a benzoyl group), a carbamoyl group (such as an aminocarbonyl group, a methylaminocarbonyl group, a dimethylaminocarbonyl group, a butylaminocarbonyl group, a cyclohexylaminocarbonyl group, a phenylaminocarbonyl group and a 2-pyridylaminocarbonyl group), a sulfamoyl group (such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group), a sulfonamide group (such as a methanesulfonamide group and a benzenesulfonamido group), a cyano group, an alkoxy group (such as a methoxy group, an ethoxy group and a propoxy group), an aryloxy group (such as a phenoxy group and a naphthyloxy group), a heterocyclicoxy group, a siloxy group, an acyloxy group (such as an acetyloxy group and a benzoyloxy group), a sulfonic acid group, a salt of sulfonic acid, an aminocarbonyloxy group, an amino group (such as an amino group, an ethylamino group, a dimethylamino group, a butylamino group, a cyclopentylamino group, a 2-ethylhexylamino group $R_3$ represents and a dodecylamino group), an anilino group (such as a phenylamino group, a chlorophenylamino group, a toluidino group, an anisidino group, a naphthylamino group and a 2-pyridylamino group), an imido group, an ureido group (such as a methylureido group, an ethylureido group, a pentylureido group, a cyclohexlureido group, an octylureido group, a dodecylureido group, a phenylureido group, a naphthylureido group and a 2-pyridylaminoureido group), an alkoxycarbonylamino group (such as a methyoxycarbonylamino group and a phenoxycarbonylamino group), an aryloxycarbonylamino group (such as a phenoxycarbonylamino group), a heterocyclicthio group, a thioureido group, a carboxyl group, a salt of carboxylic acid, a hydroxyl group, a mercapto group and a nitro group. These groups may be further substituted by a similar substituent.

In above Formula (G), $R_3$ represents a phenylene group which may have a substituent which may further be substituted or unsubstituted or a thienylene group; $R_4$ represents an alkyl group which may have a substituent having 1-6 carbon atoms, a phenyl group which may have a substituent, a thienyl group which may have a substituent or a phenyl group having 1-5 substituents of which total carbon number is 1-14; and a plurality of $R_4$ may be combined each other to form a ring, however, $R_4$ is preferably a phenyl group substituted with an alkyl group having 1-9 carbon atoms.)

$R_4$ is preferably a substituted phenyl group, total carbon atoms of the substituent being preferably 9-14 and more preferably 9-11. When two or more $R_4$ are combined to form a ring, the total number of carbon atoms on the phenyl ring is preferably 10-30.

The above-mentioned substituents are common to those described for $R_2$.

Examples of a phosphonite compound represented by Formula (F) include: dialkylphenyl phosphonites, such as dimethylphenyl phosphonite, and di-t-butylphenyl phosphonite; di-phenyl derivative phosphonites, such as diphenylphenyl phosphonite, di-(4-pentyl-phenyl)-phenyl phosphonite, di-(2-t-butyl-phenyl)-phenyl phosphonite, a di-(2-methyl-3-pentyl-phenyl)-phenyl phosphonite, di-(2-methyl-4-octyl-phenyl)-phenyl phosphonite, di-(3-butyl-4-methyl-phenyl)-phenyl phosphonite, di-(3-hexyl-4-ethyl-phenyl)-phenyl phosphonite, di-(2,4,6-trimethylphenyl)-phenyl phosphonite, di-(2,3-dimethyl-4-ethyl-phenyl)-phenyl phosphonite, di-(2,6-diethyl-3-butyl-phenyl)-phenyl phosphonite, di-(2,3-dipropyl-5-butyl-phenyl)-phenyl phosphonite and di-(2,4,6-tri-t-butyl-phenyl)-phenyl phosphonite.

Examples of a phosphonite compound represented by Formula (G) include: tetrakis(2,4-di-tert-butylphenyl)-4,4'-biphenylene diphosphonite, tetrakis(2,5-di-tert-butylphenyl)-4,4'-biphenylene diphosphonite, tetrakis(3,5-di-tert-butylphenyl)-4,4'-biphenylene diphosphonite, tetrakis(2,3,4-trimethylphenyl)-4,4'-biphenylene diphosphonite, tetrakis(2,3,4-trimethylphenyl)-4,4'-biphenylene diphosphonite, tetrakis(2,3-dimethyl-5-ethylphenyl)-4,4'-biphenylene diphosphonite, tetrakis(2,3-dimethyl-4-propylphenyl)-4,4'-biphenylene diphosphonite, tetrakis(2,3-dimethyl-5-t-butylphenyl)-4,4'-biphenylene diphosphonite, tetrakis(2,5-dimethyl-4-t-butylphenyl)-4,4'-biphenylene diphosphonite, tetrakis(2,3-diethyl-5-methylphenyl)-4,4'-biphenylene diphosphonite, tetrakis(2,6-diethyl-4-methylphenyl)-4,4'-biphenylene diphosphonite, tetrakis(2,4,5-triethylphenyl)-4,4'-biphenylene diphosphonite, tetrakis(2,6-diethyl-4-propylphenyl)-4,4'-biphenylene diphosphonite, tetrakis(2,5-diethyl-6-butylphenyl)-4,4'-biphenylene diphosphonite, tetrakis(2,3-diethyl-5-t-butylphenyl)-4,4'-biphenylene diphosphonite, tetrakis(2,5-diethyl-6-t-butylphenyl)-4,4'-biphenylene diphosphonite, tetrakis(2,3-dipropyl-5-methylphenyl)-4,4'-biphenylene diphosphonite, tetrakis(2,6-dipropyl-4-methylphenyl)-4,4'-biphenylene diphosphonite, tetrakis(2,6-dipropyl-5-ethylphenyl)-4,4'-biphenylene diphosphonite, tetrakis(2,3-dipropyl-6-butylphenyl)-4,4'-biphenylene diphosphonite, tetrakis(2,6-dipropyl-5-butylphenyl)-4,4'-biphenylene diphosphonite, tetrakis(2,3-dibutyl-4-methylphenyl)-4,4'-biphenylene diphosphonite, tetrakis(2,5-dibutyl-3-methylphenyl)-4,4'-biphenylene diphosphonite, tetrakis(2,6-dibutyl-4-methylphenyl)-4,4'-biphenylene diphosphonite, tetrakis(2,4-di-t-butyl-3-methylphenyl)-4,4'-biphenylene diphosphonite, tetrakis(2,4-di-t-butyl-5-methylphenyl)-4,4'-biphenylene diphosphonite, tetrakis(2,4-di-t-butyl-6-methylphenyl)-4,4'-biphenylene diphosphonite, tetrakis(2,5-di-t-butyl-3-methylphenyl)-4,4'-biphenylene diphosphonite, tetrakis(2,5-di-t-butyl-4-methylphenyl)-4,4'-biphenylene diphosphonite, tetrakis(2,5-di-t-butyl-6-methylphenyl)-4,4'-biphenylene diphosphonite, tetrakis(2,6-di-t-butyl-3-methylphenyl)-4,4'-biphenylene diphosphonite, tetrakis(2,6-di-t-butyl-4-methylphenyl)-4,4'-biphenylene diphosphonite, tetrakis(2,6-di-t-butyl-5-methylphenyl)-4,4'-biphenylene diphosphonite, tetrakis(2,3-dibutyl-4-ethylphenyl)-4,4'-biphenylene diphosphonite, tetrakis(2,4-dibutyl-3-ethylphenyl)-4,4'-biphenylene diphosphonite, tetrakis(2,5-dibutyl-4-ethylphenyl)-4,4'-biphenylene diphosphonite, tetrakis(2,4-di-t-butyl-3-ethylphenyl)-4,4'-biphenylene diphosphonite, tetrakis(2,4-di-t-butyl-5-ethylphenyl)-4,4'-biphenylene diphosphonite, tetrakis(2,4-di-t-butyl-6-ethylphenyl)-4,4'-biphenylene diphosphonite, tetrakis(2,5-di-t-butyl-3-ethylphenyl)-4,4'-biphenylene diphosphonite, tetrakis(2,5-di-t-butyl-4-ethylphenyl)-4,4'-biphenylene diphosphonite, tetrakis(2,5-di-t-butyl-6-ethylphenyl)-4,4'- biphenylene diphosphonite, tetrakis(2,6-di-t-butyl-3-ethylphenyl)-4,4'-biphenylene diphosphonite, tetrakis(2,6-di-t-butyl-4-ethylphenyl)-4,4'-biphenylene diphosphonite, tetrakis(2,6-di-t-butyl5-ethylphenyl)-4,4'-biphenylene diphosphonite, tetrakis(2,3,4-tributylphenyl)-4,4'-biphenylene diphosphonite and tetrakis(2,4,6-tri-t-butylphenyl)-4,4'-biphenylene diphosphonite.

In the present invention, the phosphonite compound represented by Formula (G) is preferable.

Of these, 4,4'-biphenylene diphosphonite compounds are preferable and specifically preferable is tetrakis(2,4-di-t-butyl-5-methylphenyl)-4,4'-biphenylene diphosphonite.

Specifically preferable phosphonite compounds will be shown below.

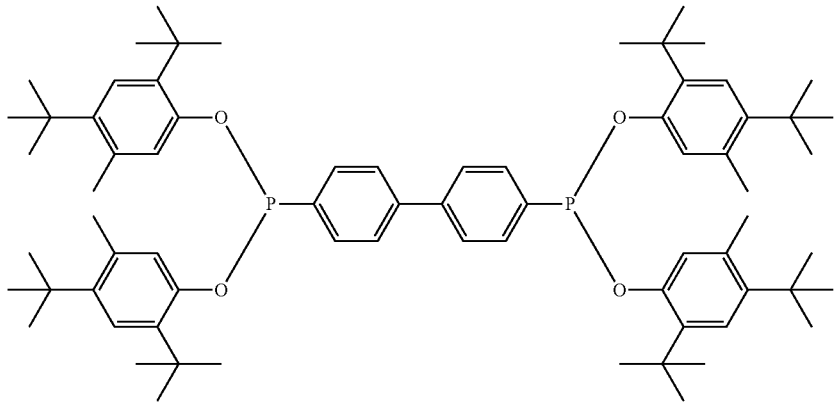

PN-1

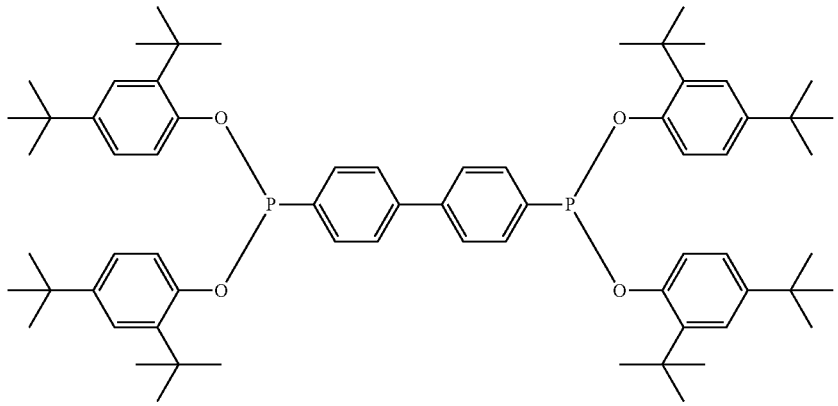

PN-2

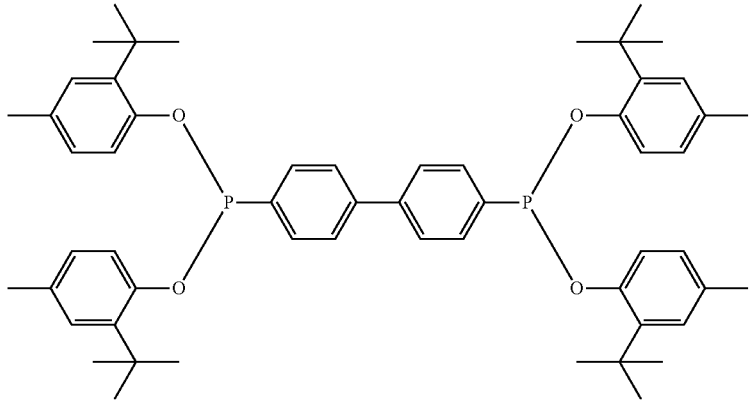

PN-3

-continued
PN-4
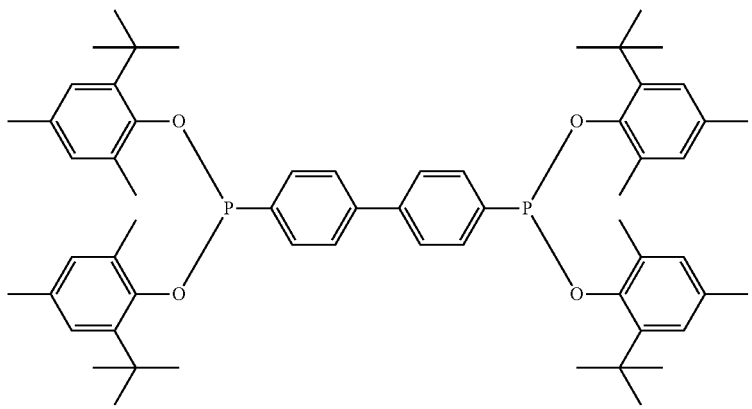
PN-5
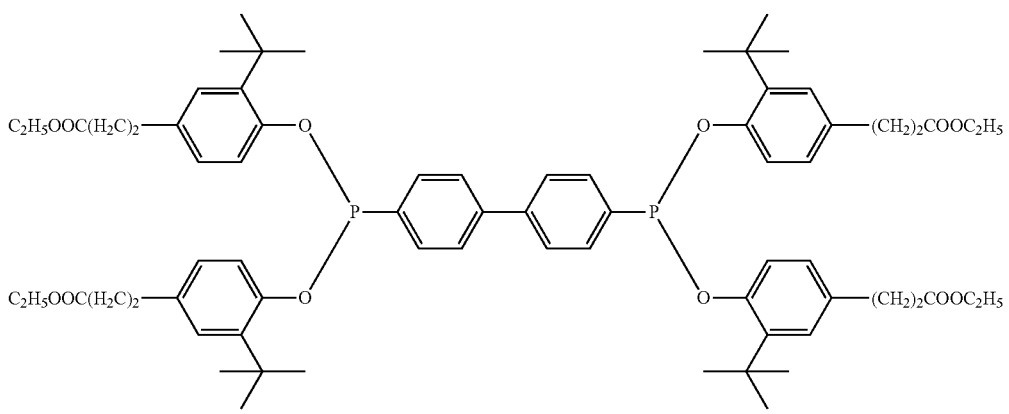
PN-6
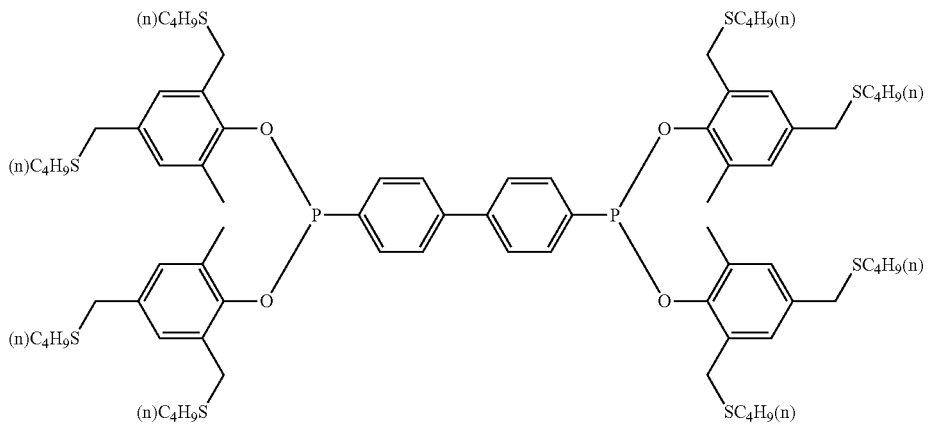
PN-7
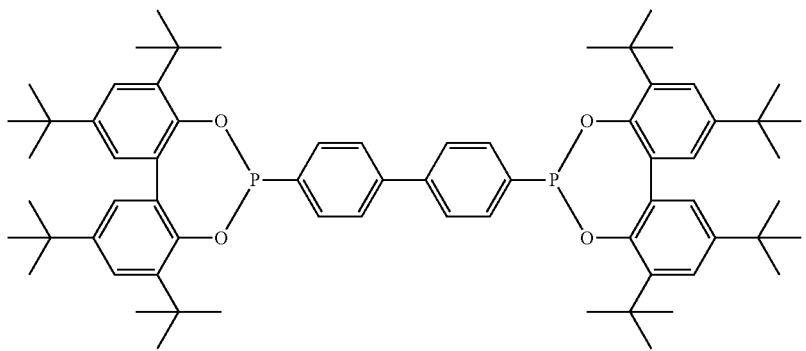

-continued
PN-8
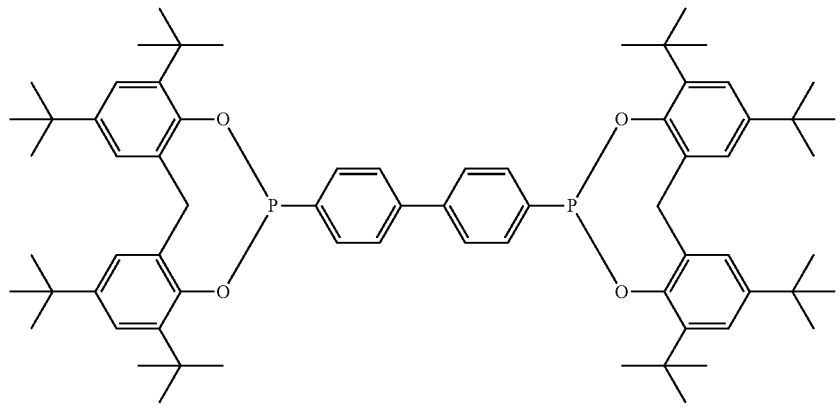
PN-9
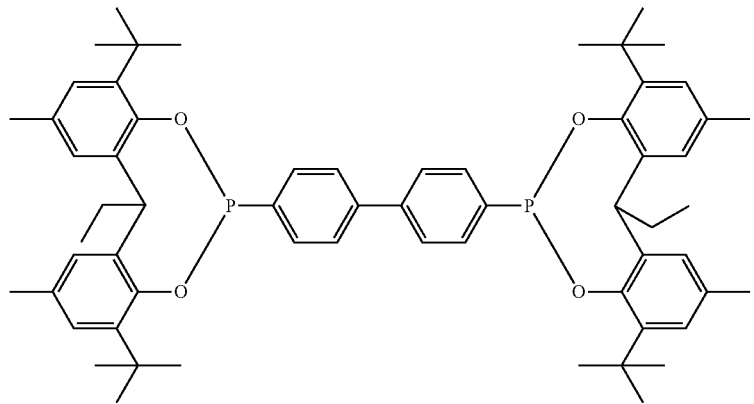
PN-10
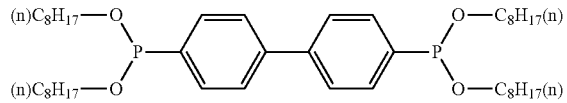
PN-11
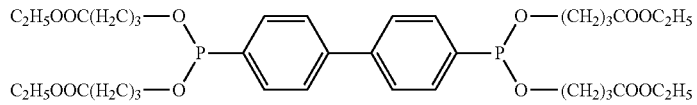
PN-12  PN-13
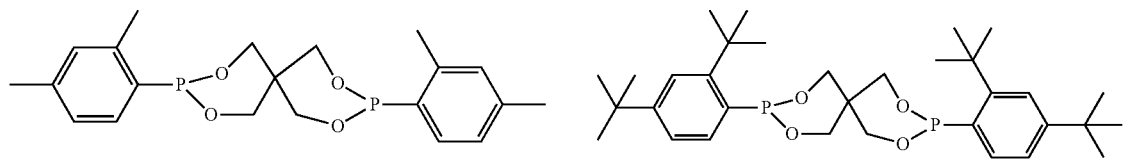

-continued
PN-14
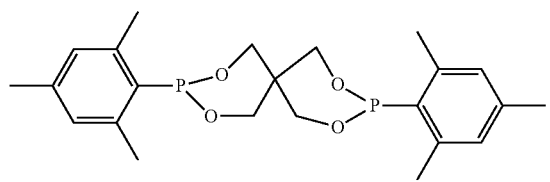
PN-15
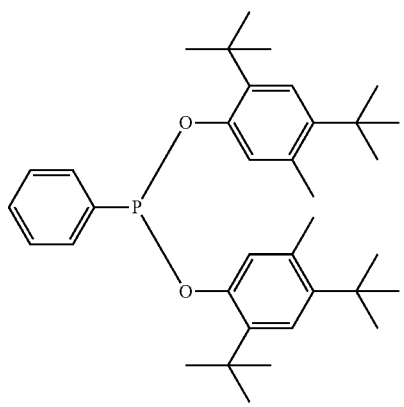
PN-16
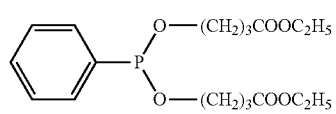
PN-17
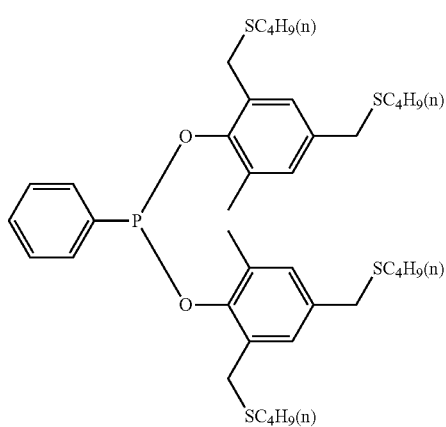
PN-18
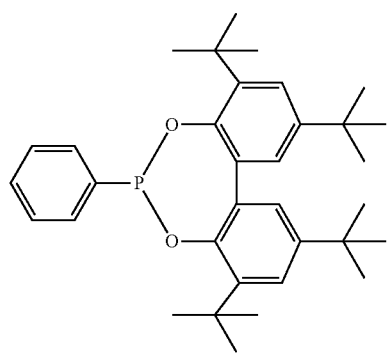
PN-19
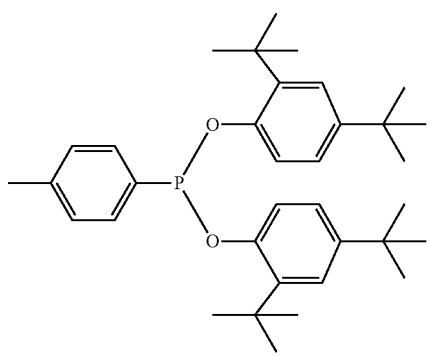
PN-20
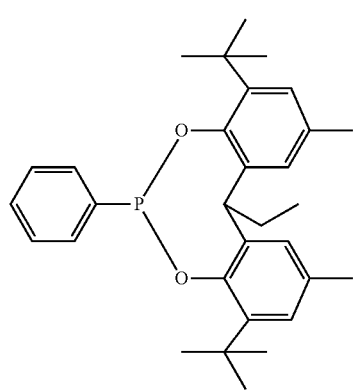

-continued
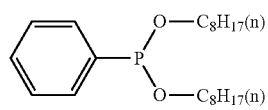
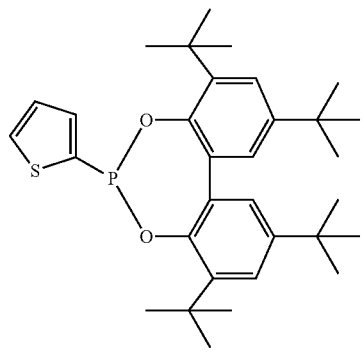
PN-22
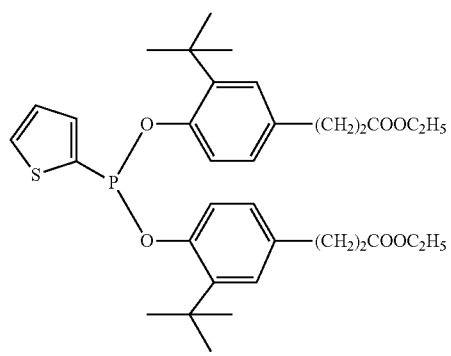
PN-23
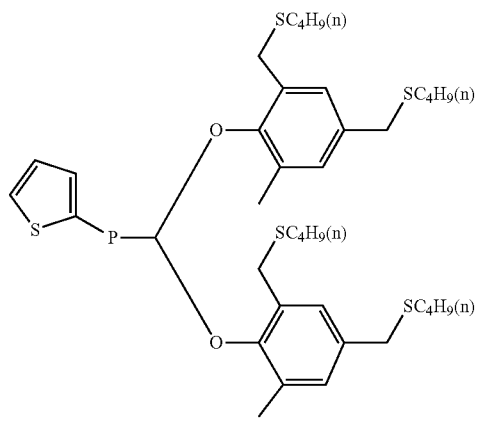
PN-24
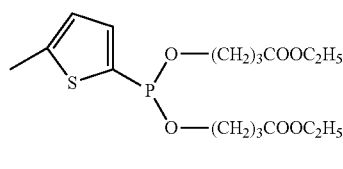
PN-25
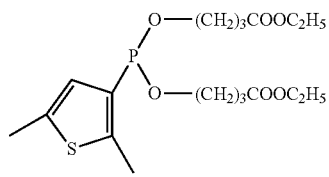
PN-26
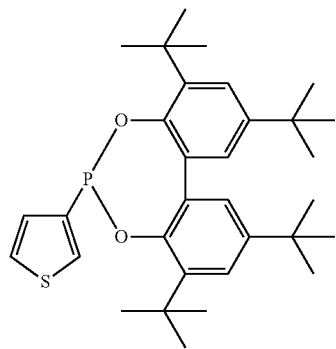
PN-27
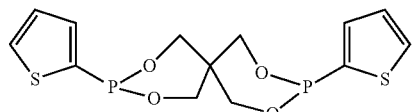
PN-28

PN-29

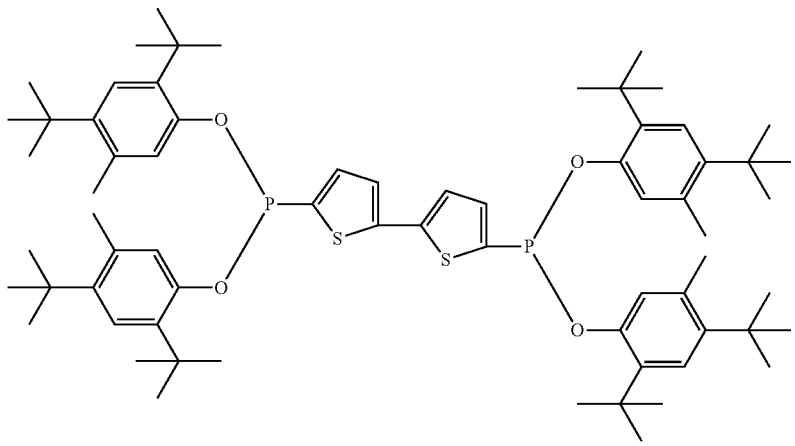

PN-30

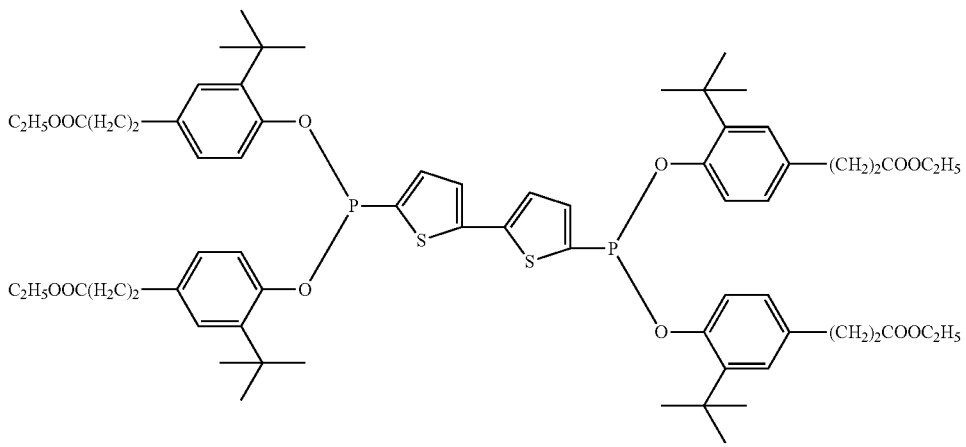

The content of the phosphonite compound is 0.001-10.0 weight %, preferably 0.01-5.0 weight % and still more preferably 0.1-1.0 weight %, based on the weight of the polarizer protective film.

Examples of commercially available phosphorus-containing compounds employable in the present invention include: "Sumilizer GP" from Sumitomo Chemical Co., Ltd.; "ADK STAB PEP-24G", "ADK STAB PEP-36" and "ADK STAB 3010" from ADEKA Corp.; "IRGAFOS P-EPQ" and "IRGAFOS 38" from Ciba Specialty Chemicals, Inc.; and GSY-P-101 from Yoshitomi Fine Chemicals CO., LTD.

Also, the following compounds are cited.

P1

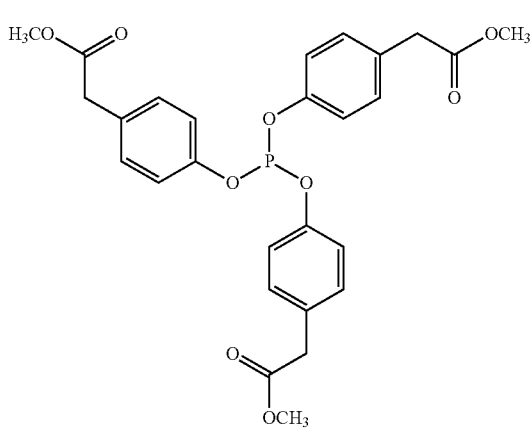

P2

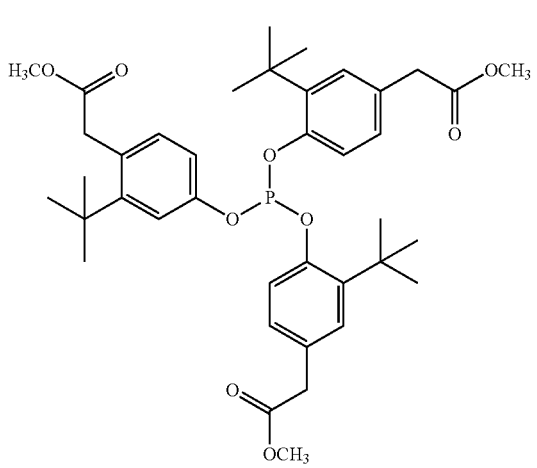

-continued
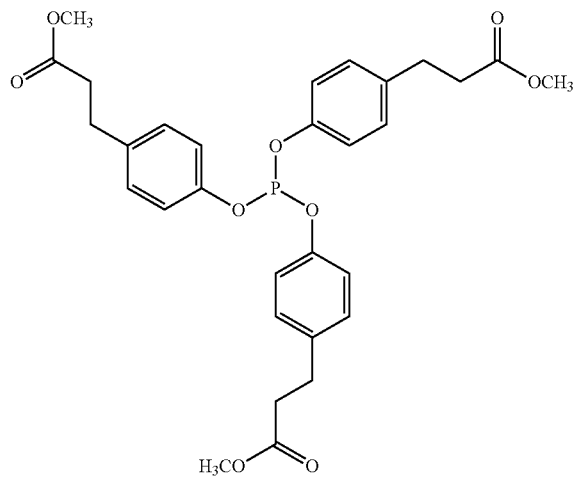
P3
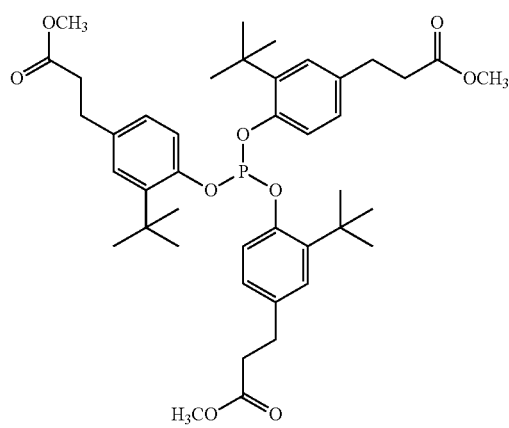
P4
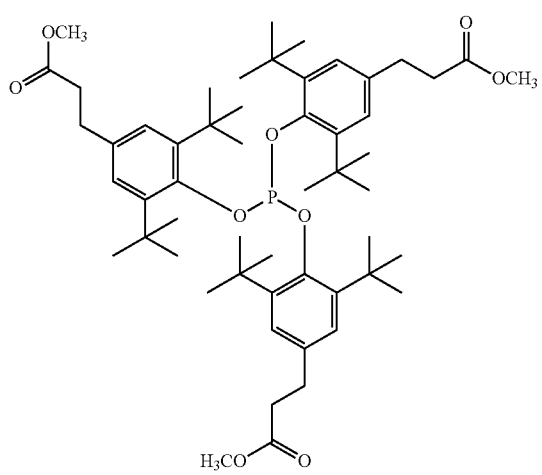
P5
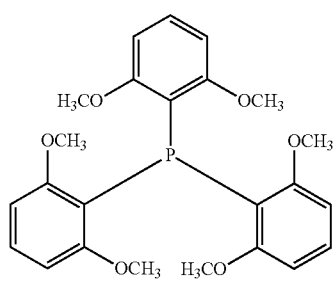
P6
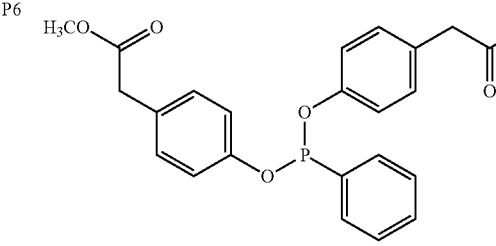
P7
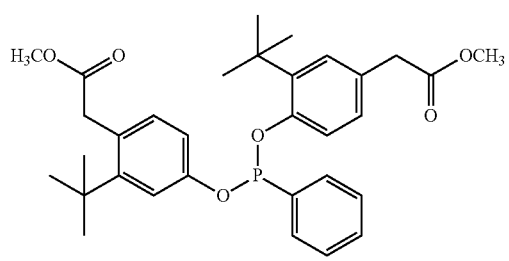
P8
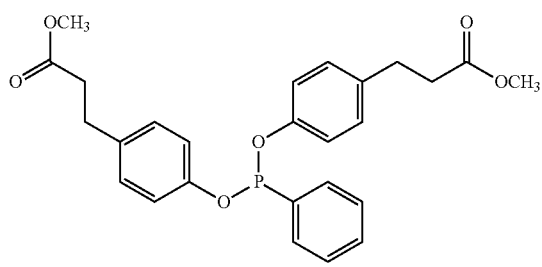
P9

-continued
P10
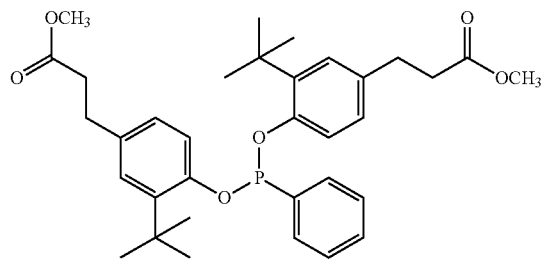
P11
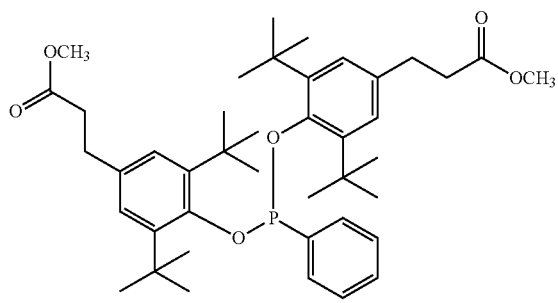
P12
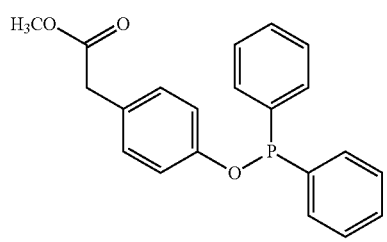
P13
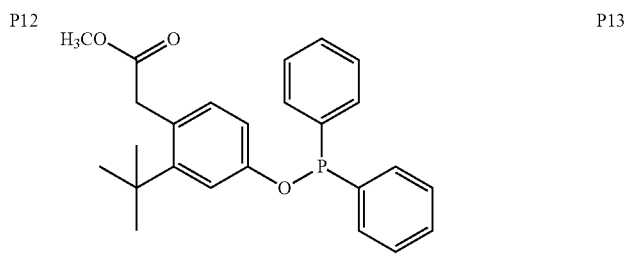
P14
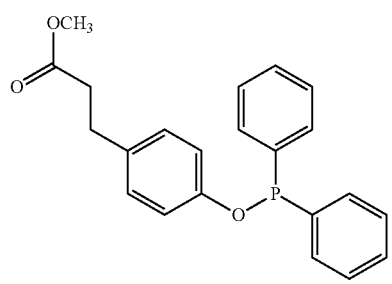
P15
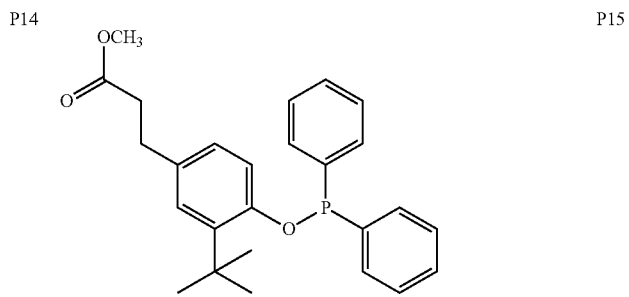
P16
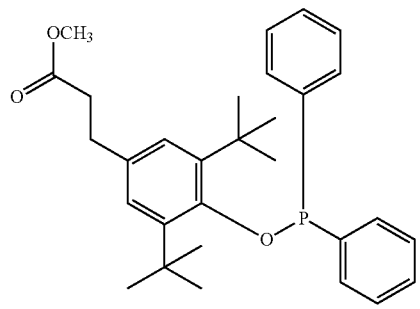
P17
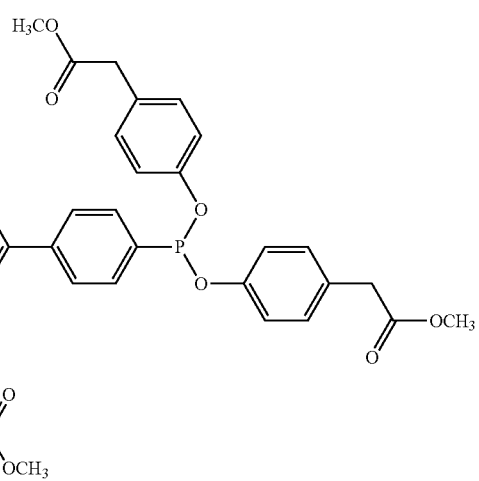

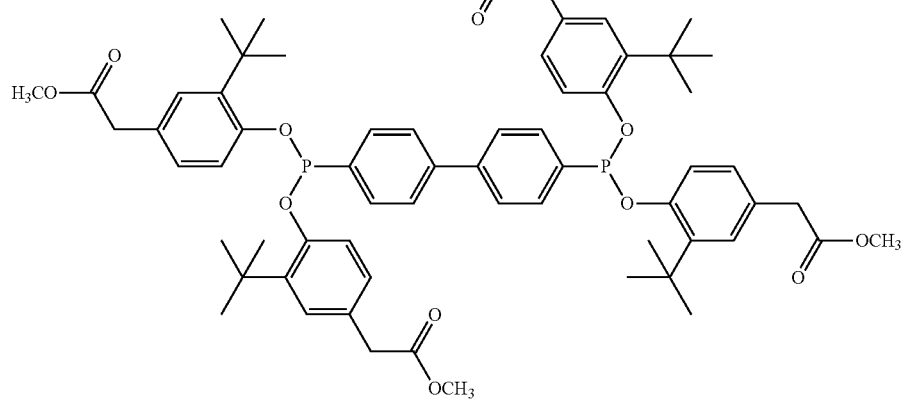
P18
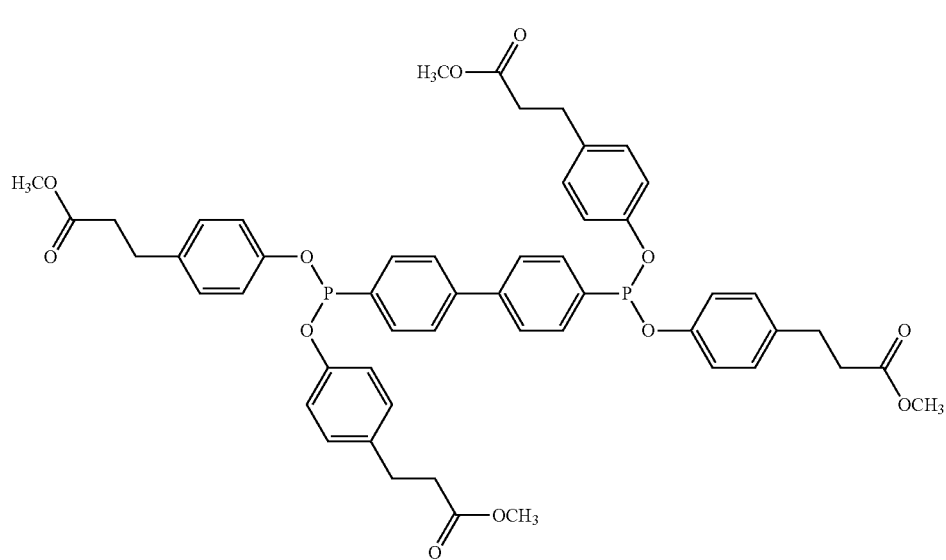
P19
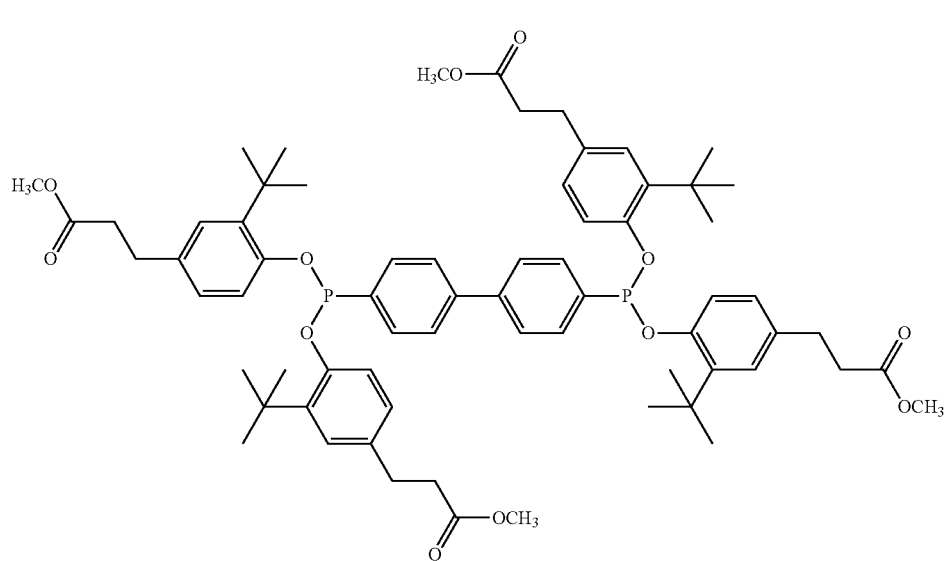
P20

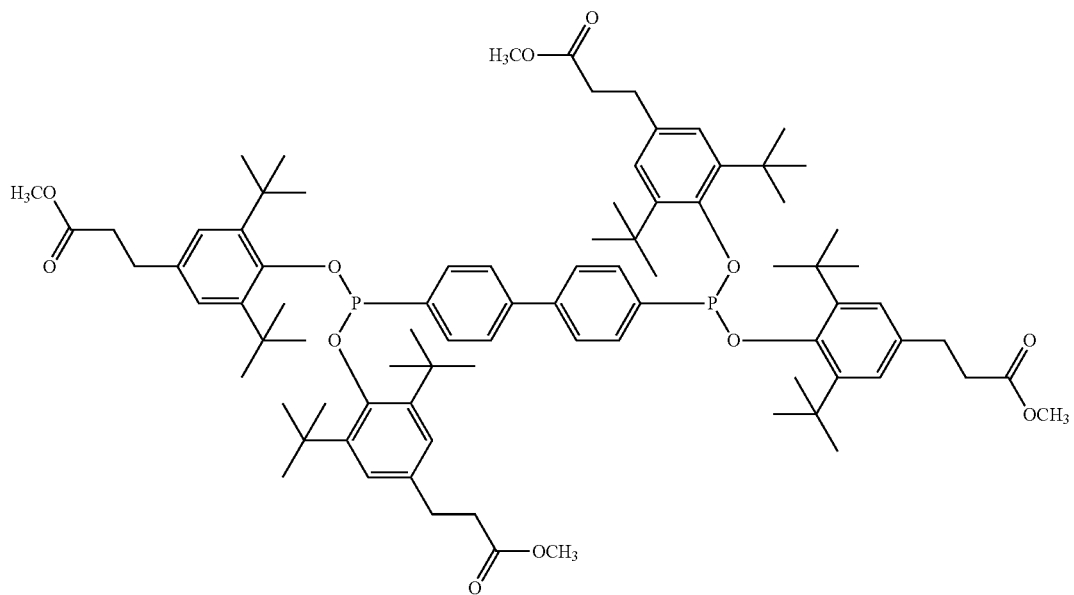

P21

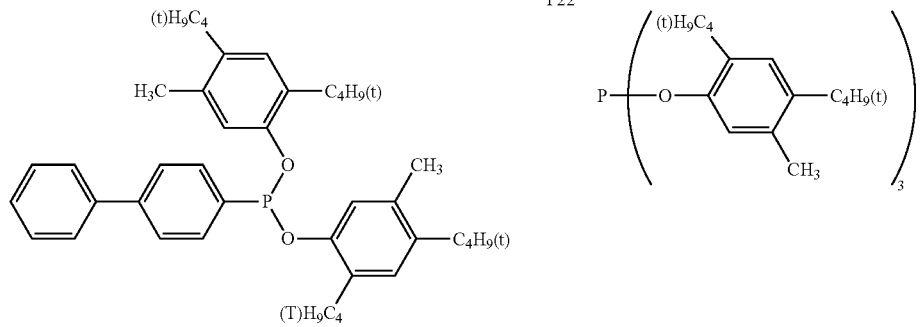

P22    P23

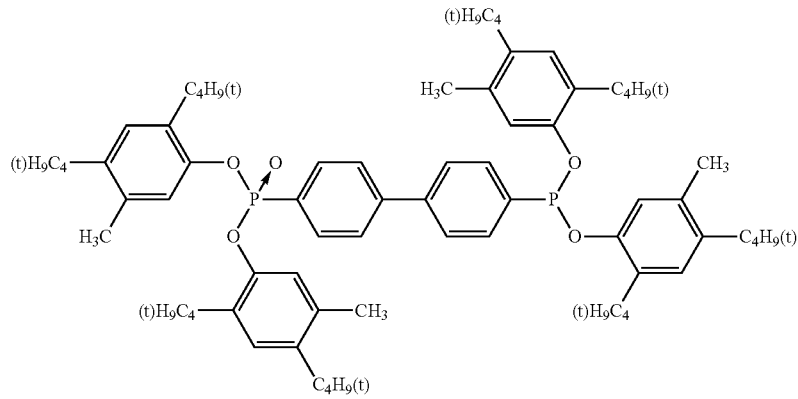

P24

(Sulfur-Containing Compound)

In the present invention, a sulfur-containing compound represented by Formula (D) is preferably used as one of the useful antioxidants.

$$R_{31}-S-R_{32}$$  Formula (D)

In Formula (D), $R_{31}$ and $R_{32}$ each represent one of the substituents which are common to the substituents $R_{11}$-$R_{16}$ described in Formula (A).

Examples of a sulfur-containing compound include: dilauryl-3,3-thio-dipropionate, dimyristyl-3,3'-thio-dipropionate, distearyl-3,3-thio-dipropionate, laurylstearyl-3,3-thio-dipropionate, pentaerythritol-tetrakis(β-lauryl-thio-propionate), 3,9-bis(2-dodecylthioethyl)-2,4,8,10-tetra-oxaspiro[5,5]undecane.

The above sulfur-containing compounds have been commercialized, for example, as "Sumilezer TPL-R" and "Sumilezer TP-D" from Sumitomo Chemical Co., Ltd.

Similarly to the case of the aforementioned cellulose ester, the antioxidant is preferably treated to remove the impurities such as residual acid, inorganic salt and organic low-molecule compound that have been carried over from the process of manufacturing, or that have occurred during preservation. The antioxidant has more preferably a purity of 99% or more.

The amount of residual acid and water is preferably 0.01 through 100 ppm. This reduces thermal deterioration in the melt-casting film formation of the cellulose ester, and improves the film formation stability, film optical property and mechanical property.

The adding amount of the antioxidant is preferably 0.1-10% by weight, more preferably 0.2-5% by weight, and still more preferably 0.3-2% by weight, based on the weight of cellulose ester. Two or more types of antioxidants may be used in combination.

If the amount of the antioxidant to be added is too small, expected advantages cannot be achieved due to lower stabilizing effect at the time of melting. If the amount to be added is too much, transparency of the film may be reduced from the viewpoint of compatibility with the cellulose ester, and the film may become brittle, which is not preferred.

(Acid Scavenger)

Under a high temperature condition where melt-casting film formation of cellulose ester is carried out, decomposition of cellulose ester may also be accelerated with an acid. Accordingly, an acid scavenger is preferably contained as one of the stabilizers in the polarizer protective film of the present invention. As the acid scavenger, any compound which react with an acid to inactivate the acid can be used without limitation in the present invention. Of these, preferable is, for example, a compound having an epoxy group as disclosed in U.S. Pat. No. 4,137,201. Such epoxy compounds as the acid acavenger have been known in the field of the art, and examples thereof include glycidyl ether of various polyglycols, particularly a polyglycol driven by condensation of approximately 8 to 40 moles of ethylene glycol per mole of the polyglycol, diglycidyl ether of glycerol, an metal epoxy compound (for example, ones usually used in a vinyl chloride polymer composition, or one usually used together with a vinyl chloride polymer composition), an epoxide ether condensate, diglycidyl ether of bisphenol A (namely, 4,4'-dihydroxydiphenyldimethylmethane), an epoxide unsaturated fatty acid ester (specifically, an ester of alkyl having 2-4 carbon atoms of a fatty acid having 2-22 carbon atoms such as butyl epoxystearate), and a triglyceride of one of various epoxide long chain fatty acids (for example, an epoxide soybean oil composition. The examples further include an epoxide of plant oil or another unsaturated natural oil. The epoxide oils are sometimes called as epoxide of natural glyceride or epoxide of unsaturated fatty acid and these fatty acids are each contains 12-22 carbon atoms. As an epoxy group-containing epoxide resin compound available on the market, EPON 815C, and an epoxide ether oligomer condensation product represented by Formula (5) are preferably employed.

In the above formula, n represents an integer of 0-12. Further employable acid scavenger includes those disclosed in JP-A No. 5-194788, paragraphs 87 to 105.

The adding amount of the acid scavenger is preferably 0.1-10% by weight, more preferably 0.2-5% by weight, and still more preferably 0.5-2% by weight, based on the weight of the polarizer protective film. Two or more types of acid scavengers may be used in combination.

An acid scavenger is also referred to as an acid remover, an acid trapping agent, an acid catcher, however, in the present invention, any of these agents are usable regardless of the difference in the address term.

<<UV Absorbent>>

A UV absorbent (an ultraviolet light absorber) preferably has excellent ultraviolet light absorbance for wavelengths of 370 nm or less in view of preventing deterioration of the polarizer film or the display device due to ultraviolet light, and from the viewpoint of the liquid crystal display it is preferable that there is little absorbance of visible light having wavelengths of 400 nm or more. Examples of the UV absorbent include: oxybenzophenone compounds, benzotriazole compounds, salicylic acid ester compounds, benzophenone compounds, cyano acrylate compounds nickel complex compounds, and triazine compounds. Of these, preferable are benzophenone compounds, benzotriazole compounds which exhibit little coloration and triazine compounds. In addition, UV absorbents disclosed in JP-A Nos. 10-182621 and 8-337574, and polymer UV absorbents disclosed in JP-A Nos. 6-148430 and 20003-113317 are also applicable.

Specific examples of the benzotriazole UV absorbents include 2-(2'-hydroxy-5'-methylphenyl)benzotriazole, 2-(2'-hydroxy 3',5'-di-tert-butylphenyl)benzotriazole, 2-(2'-hydroxy-3'-tert-butyl-5'-methylphenyl)benzotriazole, 2-(2'-hydroxy 3',5'-di-tert-butylphenyl)-5-chlorobenzotriazole, 2-(2'-hydroxy-3'-(3",4",5",6"-tetrahydrophthalimide methyl)-5'-methylphenyl)benzotriazole, 2,2-methylenebis(4-(1,1,3,3,-tetramethylbutyl)-6-(2H-benzotriazole-2-yl)phenyl), 2-(2'-hydroxy-3'-tert-butyl-5'-methylphenyl)-5-chlorobenzotriazole, 2-(2H-benzotriazole-2-yl)-6-(straight chain or side chain dodecyl)-4-methylphenol, 2-(2'-hydroxy-3',5'-di-(1-methyl-1-phenylethyl)-phenyl)benzotriazole, 6-(2-benzotriazole)-4-t-octyl-6'-t-butyl-4'-methyl-2,2'-methylenebisphenol, a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate and 2-(2'-hydroxy-3'-(1-methyl-1-phenylethyl)-5'-(1,1,3,3-tetramethylbutyl)-phenyl)benzotriazole and 2-(2'-hydroxy-3'-(1-methyl-1-

Formula (5)

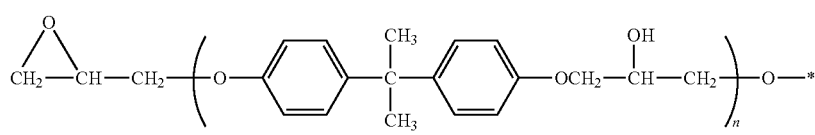

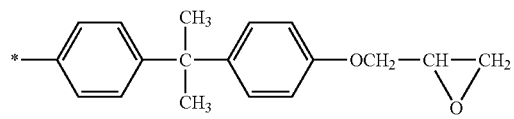

phenylethyl)-5'-(1,1,3,3-tetramethylbutyl)-phenyl) benzotriazole. However, the present invention is not limited thereto.

As commercially available UV absorbents, TINUVIN 171, TINUVIN 234, and TINUVIN 360, TINUVIN 928 and TINUVIN 109 (all of which are manufactured by Chiba Specialty Chemical Co., Ltd.); LA31 (manufactured by ADEKA Corp.); JAST-500 (manufactured by JOHOKU CHEMICAL Co., Ltd.); and Sumisorb 250 (manufactured by Sumitomo Chemical Co., Ltd.) are cited.

Examples of the benzophenone compound include: 2,4-dihydroxy benzophenone, 2,2'-dihydroxy-4-methoxy benzophenone, 2-hydroxy-4-methoxy-5-sulfobenzophenone, bis(2-methoxy-4-hydroxy-5-benzoylphenylmethane), however, the present invention is not limited thereto.

The amount of the UV absorbent used in the present invention is preferably 0.1-5 weight %, and more preferably 0.2-3 weight %, and still more preferably 0.5-2 weight %, based on the weight of the polarizer protective film. Two or more UV absorbents may be used in combination.

Also, these benzotriazole structure or benzophenone structure may be partially or regularly pendant to a polymer, or may be introduced in a part of the molecular structure of an additive such as a plasticizer, an antioxidant or an acid scavenger.

<<Plasticizer>>

In the production process of the cellulose ester film of the present invention, specifically, of the cellulose ester film, at least one plasticizer is preferably added.

A plasticizer, as described herein, commonly refers to an additive which decreases brittleness and result in enhanced flexibility upon being incorporated in polymers. In the present invention, a plasticizer is added so that the melting temperature of a cellulose ester resin is lowered, and at the same temperature, the melt viscosity of the film forming materials including a plasticizer is lower than the melt viscosity of a cellulose ester resin containing no additive. Further, addition is performed to enhance hydrophilicity of cellulose ester so that the water vapor permeability of cellulose ester films is lowered. Therefore, the plasticizers of the present invention have a property of an anti-moisture-permeation agent.

The melting temperature of a film forming material, as described herein, refers to the temperature at which the above materials are heated to exhibit a state of fluidity. In order that cellulose ester results in melt fluidity, it is necessary to heat cellulose ester to a temperature which is at least higher than the glass transition temperature. At or above the glass transition temperature, the elastic modulus or viscosity decreases due to heat absorption, whereby fluidity is observed. However, at higher temperatures, cellulose ester melts and simultaneously undergoes thermal decomposition to result in a decrease in the molecular weight of the cellulose ester, whereby the dynamical characteristics of the resulting film may be adversely affected.

Consequently, it is preferable to melt cellulose ester at a temperature as low as possible. Lowering the melting temperature of the film forming materials is achieved by the addition of a plasticizer having a melting point or a glass transition temperature which is equal to or lower than the glass transition temperature of the cellulose ester.

The polarizer protective film of the present invention preferably contains 1-25 weight % of an ester compound, as a plasticizer, having a structure obtained by condensing the organic acid represented by Formula (1) and a polyalcohol having a valence of trivalent or more. The amount of the plasticizer is preferably 1 weight % or more since the effect of improving the flatness of the film can be obtained, while the amount of the plasticizer is preferably 25 weight % or less since bleeding can be suppressed, resulting in improving the long term stability of the film. More preferable is a cellulose ester film containing 3-20 weight % of plasticizer, based on the weight of cellulose ester, and still more preferable is a cellulose ester film containing 5-15 weight % of plasticizer.

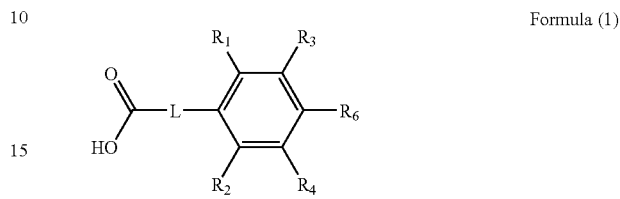

Formula (1)

In above Formula (1), $R_1$-$R_5$ each independently represent a hydrogen atom, a cycloalkyl group, an aralkyl group, an alkoxy group, a cycloalkoxy group, an aryloxy group, an aralkyloxy group, an acyl group, a carbonyloxy group, an oxycarbonyl group, or an oxycarbonyloxy group, any of which may further be substituted. L represents a linkage group, which includes a substituted or unsubstituted alkylene group, an oxygen atom or a direct bond.

Preferred as the cycloalkyl group represented by $R_1$-$R_5$ is a cycloalkyl group having 3-8 carbon atoms, and specific examples include cycloproyl, cyclopentyl and cyclohexyl groups. These groups may be substituted. Examples of preferred substituents include: halogen atoms such as a chlorine atom, a bromine atom and a fluolinr atom, a hydroxyl group, an alkyl group, an alkoxy group, an aralkyl group (the phenyl group may further be substituted with an alkyl group or a halogen atom), an alkenyl group such as a vinyl group or an allyl group, a phenyl group (the phenyl group may further be substituted with an alkyl group, or a halogen atom), a phenoxy group (the phenyl group may further be substituted with an alkyl group or a halogen atom), an acyl group having 2-8 carbon atoms such as an acetyl group or a propionyl group, and a non-substituted carbonyloxy group having 2-8 carbon atoms such as an acetyloxy group and a propionyloxy group.

The aralkyl group represented by $R_1$-$R_5$ includes a benzyl group, a phenetyl group, and a γ-phenylpropyl group, which may be substituted. Listed as the preferred substituents may be those which may substitute the above cycloalkyl group.

The alkoxy group represented by $R_1$-$R_5$ include an alkoxy group having 1-8 carbon atoms. The specific examples include an methoxy group, an ethoxy group, an n-propoxy group, an n-butoxy group, an n-octyloxy group, an isopropoxy group, an isobutoxy group, a 2-ethylhexyloxy group and a t-butoxy group. The above groups may further be substituted. Examples of preferred substituents include: halogen atoms such as a chlorine atom, a bromine atom and a fluorine atom; a hydroxyl group; an alkoxy group; a cycloalkoxy group; an aralkyl group (the phenyl group may be substituted with an alkyl group or a halogen atom); an alkenyl group; a phenyl group (the phenyl group may further be substituted with an alkyl group or a halogen atom); an aryloxy group (for example, a phenoxy group (the phenyl group may further be substituted with an alkyl group or a halogen atom)); an acyl group having 2-8 carbon atoms such as an acetyl group or a propionyl group; an acyloxy group such as a propionyloxy group; and an arylcarbonyloxy group such as a benzoyloxy group.

The cycloalkoxy groups represented by $R_1$-$R_5$ include an cycloalkoxy group having 1-8 carbon atoms as an unsubstituted cycloalkoxy group. Specific examples include a cyclopropyloxy group, a cyclopentyloxy group and a cyclohexyloxy group. These groups may further be substituted. Listed as the preferred substituents may be those which may substitute the above cycloalkyl group.

The aryloxy groups represented by $R_1$-$R_5$ include a phenoxy group, the phenyl group of which may further be substituted with the substituent listed as a substituent such as an alkyl group or a halogen atom which may substitute the above cycloalkyl group.

The aralkyloxy group represented by $R_1$-$R_6$ includes a benzyloxy group and a phenethyloxy group, which may further be substituted. Listed as the preferred substituents may be those which may substitute the above cycloalkyl group.

The acyl group represented by $R_1$-$R_5$ includes an unsubstituted acyl group having 1-8 carbon atoms such as an acetyl group and a propionyl group (an alkyl, alkenyl, or alkynyl group is included as a hydrocarbon group of the acyl group), which may further be substituted. Listed as the preferred substituents may be those which may substitute the above cycloalkyl group.

The carbonyloxy group represented by $R_1$-$R_5$ includes an unsubstituted acyloxy group (an alkyl, alkenyl, or alkynyl group is included as a hydrocarbon group of the acyl group) having 2-8 carbon atoms such as an acetyloxy group or a propionyloxy group, and an arylcarbonyloxy group such as a benzoyloxy group, which may further be substituted with the group which may substitute the above cycloalkyl group.

The oxycarbonyl group represented by $R_1$-$R_5$ includes an alkoxycarbonyl group such as a methoxycarbonyl group, an ethoxycarbonyl group or a propyloxycarbonyl group, and an aryloxycarbonyl group such as a phonoxycarbonyl group, which may further be substituted. Listed as the preferred substituents may be those which may substitute the above cycloalkyl group.

The oxycarbonyloxy group represented by $R_1$-$R_5$ includes an alkoxycarbonyloxy group having 1-8 carbon atoms such as a methoxycarbonyloxy group, which may further be substituted. Listed as the preferred substituents may be those which may substitute the above cycloalkyl group.

Further, any of $R_1$-$R_5$ may be combined with each other to form a ring structure.

Further, the linkage group represented by L includes a substituted or unsubstituted alkylene group, an oxygen atom, or a direct bond. The alkylene group includes a methylene group, an ethylene group, and a propylene group, which may further be substituted with the substituent which is listed as the substituent which may substitute the groups represented by above $R_1$-$R_5$.

Of these, one which is particularly preferred as the linking group is the direct bond which forms an aromatic carboxylic acid.

In the organic acid represented by Formula (1), which constitutes an ester compound to be used as a plasticizer in the present invention, at least one of $R_1$ and $R_2$ is preferably the above mentioned alkoxy group, acyl group, oxycarbonyl group, carbonyloxy group or oxycarbonyloxy group. Further, the organic acids represented by above Formula (1) may contain a plurality of substituents.

In the present invention, the organic acids which substitute the hydroxyl groups of a polyalcohol having a valence of trivalent or more may either be of a single kind or of a plurality of kinds.

In the present invention, the polyalcohol of trivalent or more which reacts with the organic acid represented by above Formula (1) to form a polyalcohol ester is preferably an aliphatic polyalcohol having a valence of 3-20. In the present invention, preferred as a polyalcohol having a valence of trivalent or more is represented by following Formula (3).

   Formula (3)

wherein R' represents a m-valent organic group, m represents an integer of 3 or more, and the OH group represents an alcoholic hydroxyl group. Specifically preferable is a polyalcohol with a "m" value of 3 or 4.

The following examples of a polyalcohol are cited, however, the present invention is not limited thereto. Examples of the preferred polyalcohol include: adonitol, arabitol, 1,2,4-butanetriol, 1,2,3-hexanetriol, 1,2,6-hexanetriol, glycerin, diglycerin, erythritol, pentaerythritol, dipentaerythritol, tripentaerythritol, galactitol, glucose, cellobiose, inositol, mannitol, 3-methylpentane-1,3,5-triol, pinacol, sorbitol, trimethylolpropane, trimethylolethane, and xylitol. Of these, specifically preferable are glycerin, trimethylolethane, trimethylolpropane, and pentaerythritol.

An ester of an organic acid represented by Formula (1) and a polyalcohol having a valence of trivalent or more can be synthesized employing methods known in the art. Typical synthesis examples are shown in the examples. Examples of the synthetic method include: (i) a method in which an organic acid represented by Formula (1) and a polyalcohol undergo etherification via condensation in the presence of, for example, an acid; (ii) a method in which an organic acid is converted to an acid chloride or an acid anhydride which is allowed to react with a polyalcohol; and (iii) a method in which a phenyl ester of an organic acid is allowed to react with a polyalcohol. Depending on the targeted ester compound, it is preferable to select an appropriate method which results in a high yield.

As an example of a plasticizer containing an ester of an organic acid represented by Formula (1) and a polyalcohol having a valence of trivalent or more, the compound represented by Formula (2) is cited.

Formula (2)

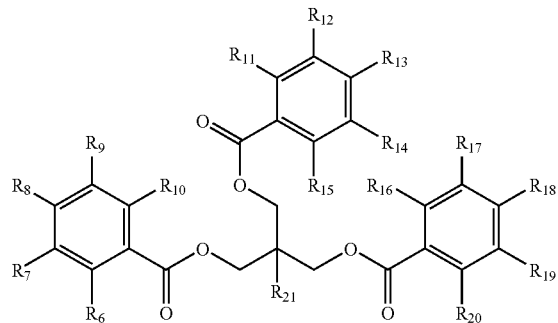

In Formula (2), $R_6$ to $R_{20}$ each independently represent a hydrogen atom, a cycloalkyl group, an aralkyl group, an alkoxy group, a cycloalkoxy group, an aryloxy group, an aralkyloxy group, an acyl group, a carbonyloxyl group, an oxycarbonyl group or an oxycarbonyloxy group, provided that $R_6$ to $R_{20}$ may further have a substituent. $R_6$ to $R_{10}$ each preferably represent a hydrogen atom or an alkoxy group. $R_{21}$ represents a hydrogen atom or an alkyl group.

As examples of the above described cycloalkyl group, aralkyl group, alkoxy group, cycloalkoxy group, aryloxy group, aralkyloxy group, acyl group, carbonyloxyl group, oxycarbonyl group and oxycarbonyloxy group represented by $R_6$ to $R_{20}$, the same groups as described for $R_1$ to $R_5$ in Formula (1) can be cited.

The molecular weight of the polyalcohol esters prepared as above is not particularly limited, but is preferably 300-1,500, more preferably 400-1,000. A greater molecular weight is preferred due to reduced volatility, while a smaller molecular weight is preferred in view of reducing water vapor permeability and improving the compatibility with cellulose ester.

Specific compounds of polyalcohol esters according to the present invention will be exemplified below.

1

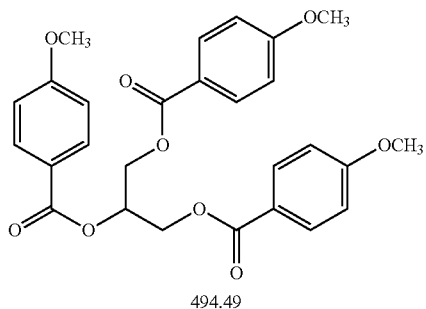

494.49

2

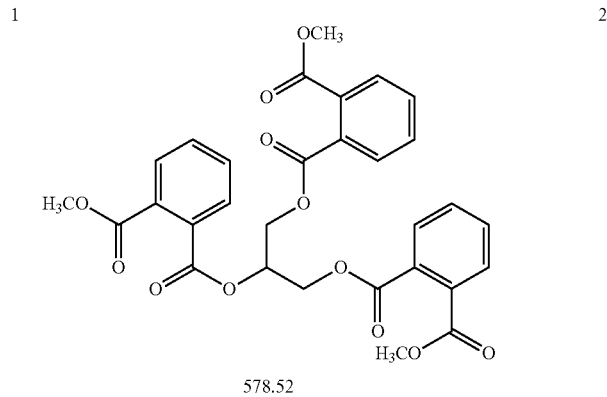

578.52

3

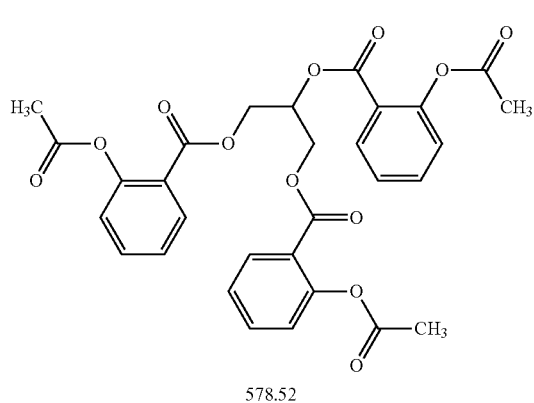

578.52

4

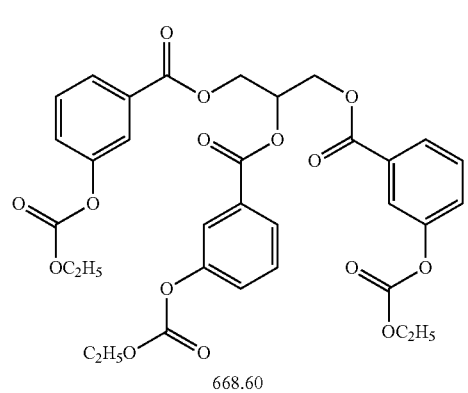

668.60

5

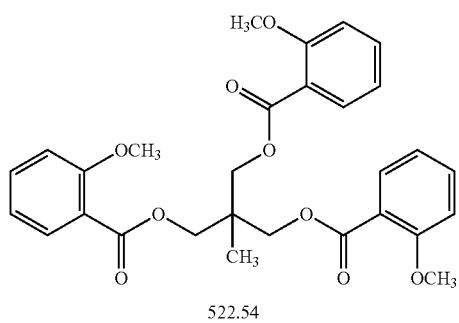

522.54

6

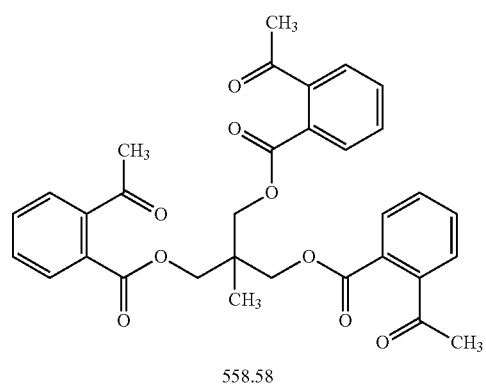

558.58

-continued
7
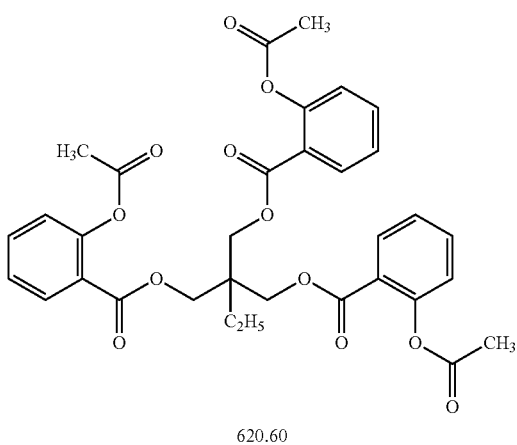
620.60
8
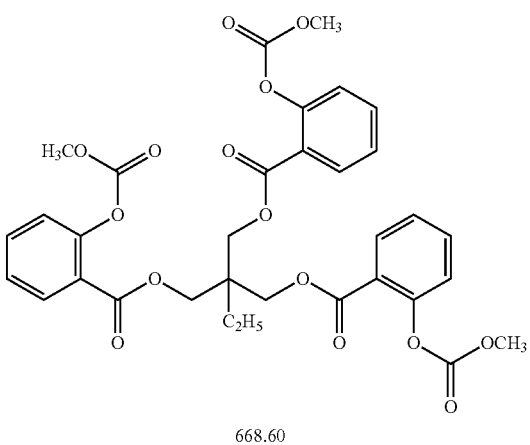
668.60
9
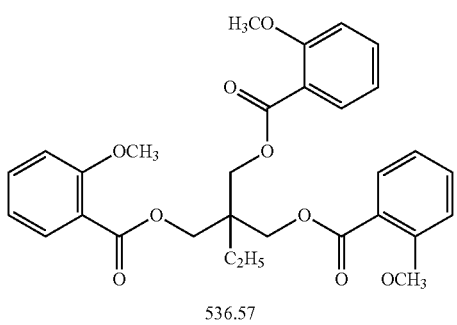
536.57
10
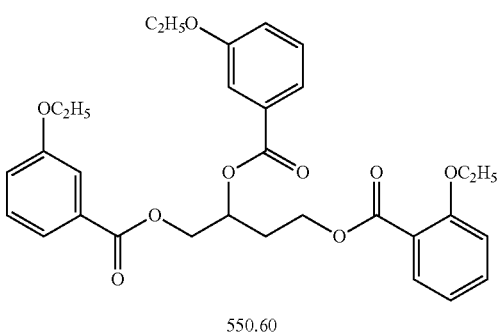
550.60
11
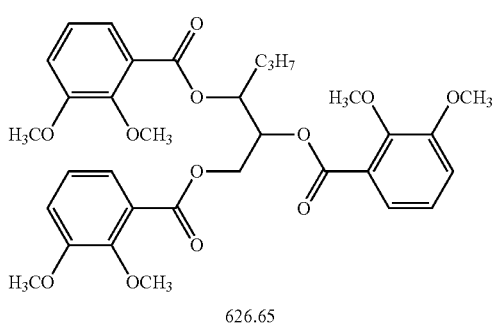
626.65
12
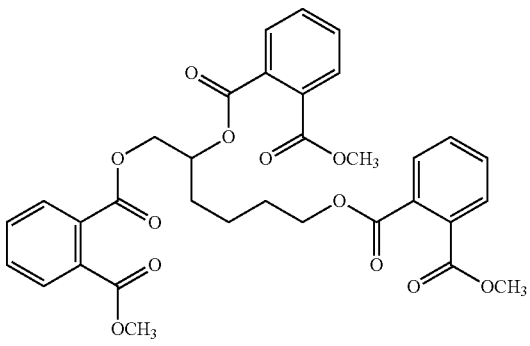
620.60
13
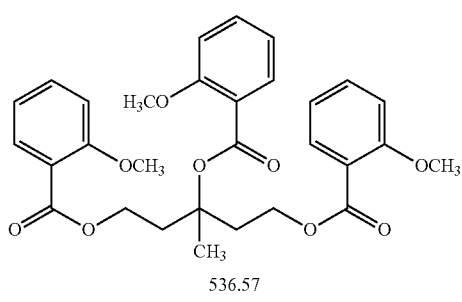
536.57
14
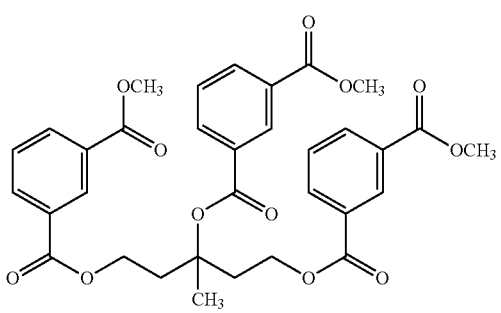
620.60

15
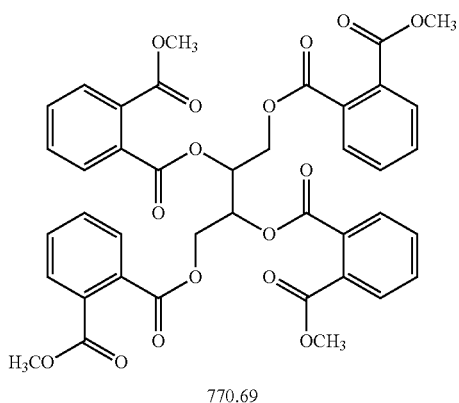
770.69
16
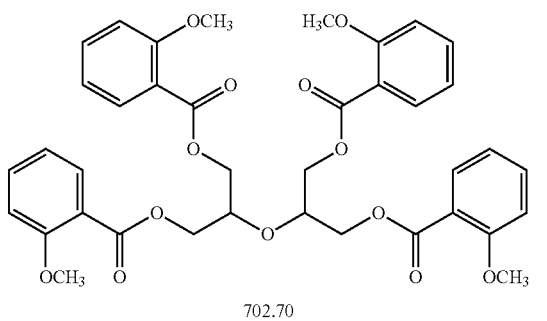
702.70
17
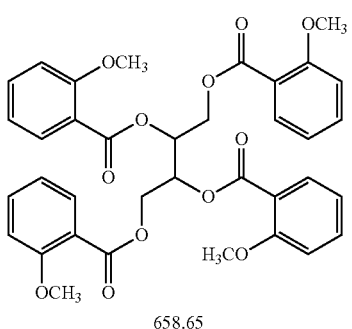
658.65
18
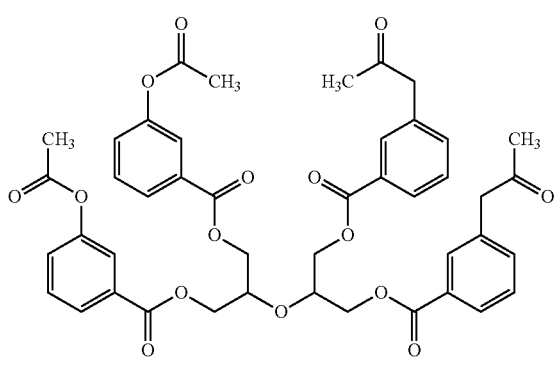
814.74
19
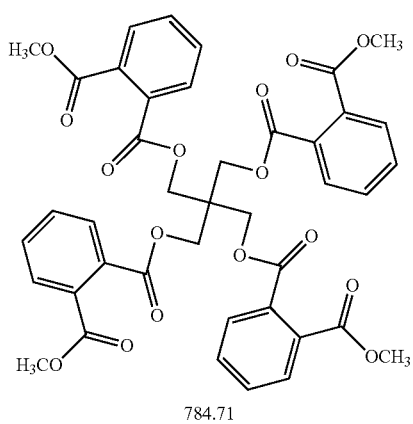
784.71
20
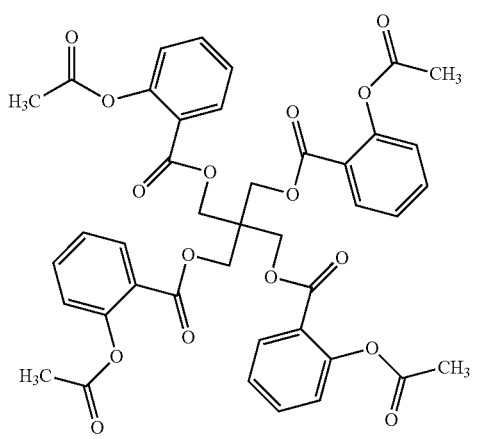
784.71

-continued
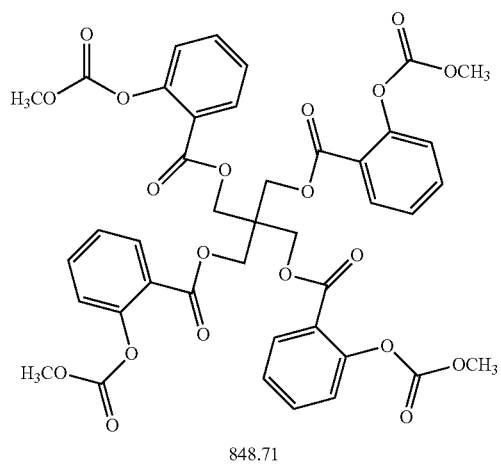
848.71
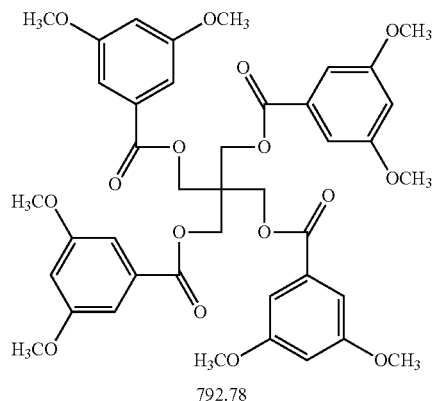
792.78
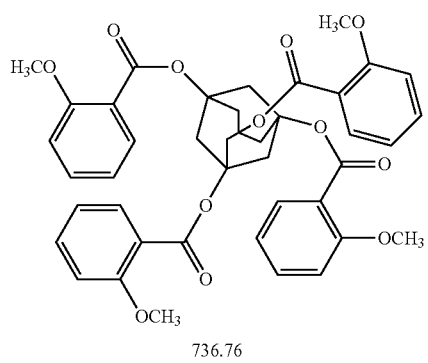
736.76
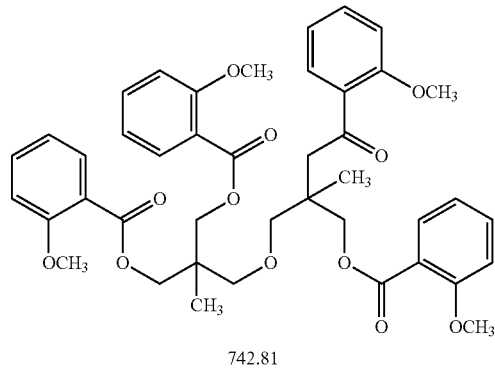
742.81
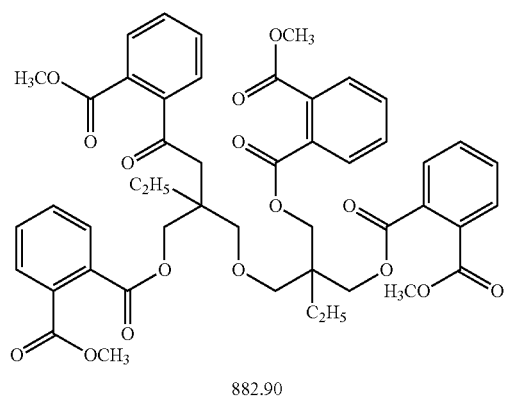
882.90
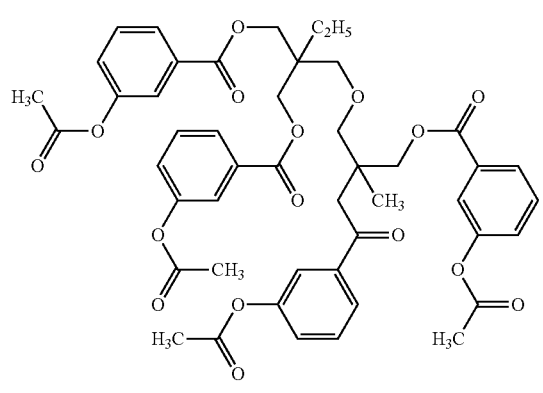
868.87

27
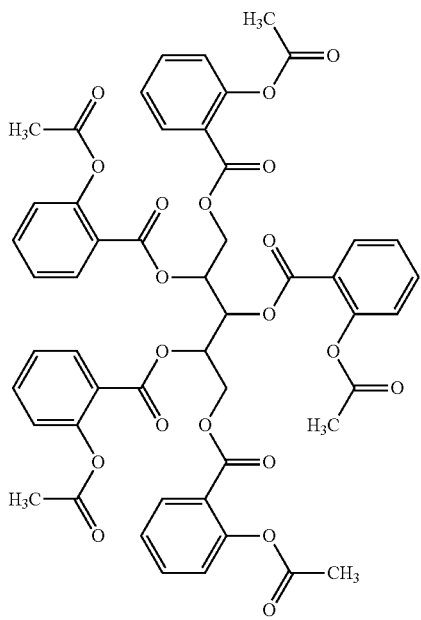
962.86
28
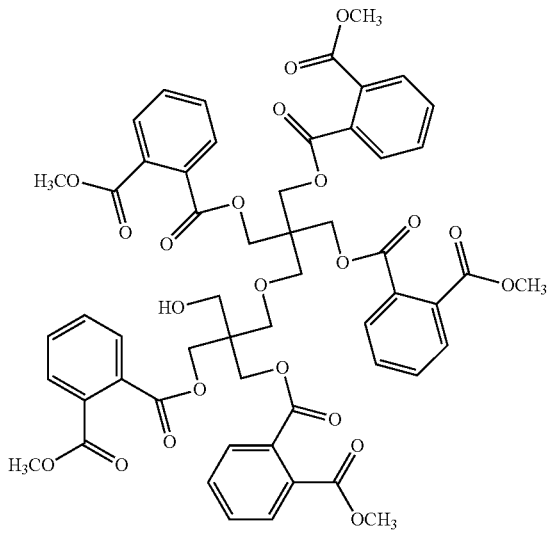
1064.99
29
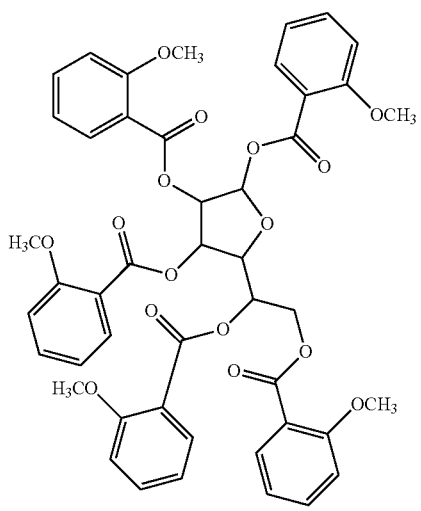
850.82
30
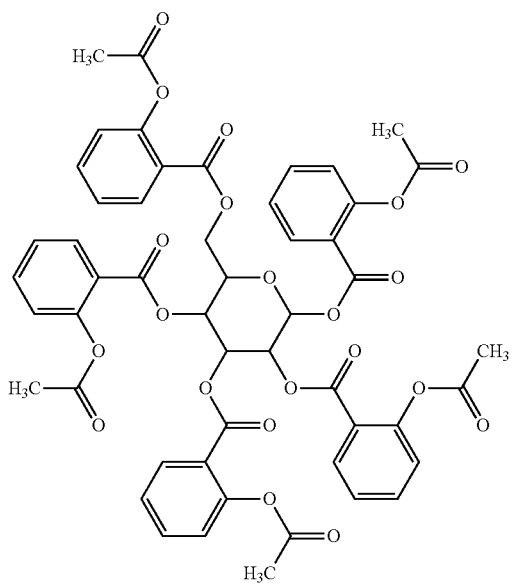
990.87

31
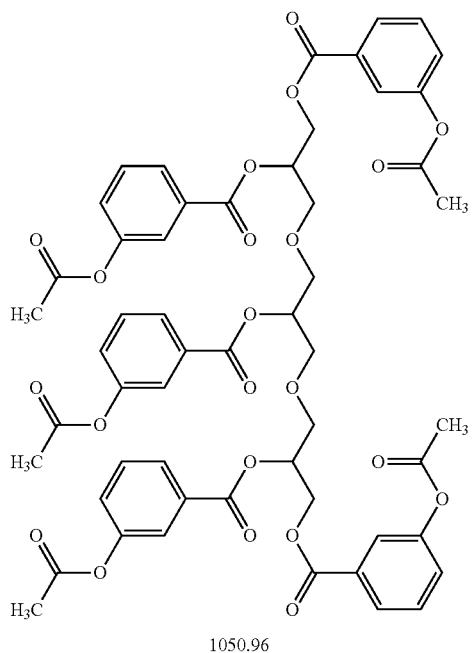
1050.96
32
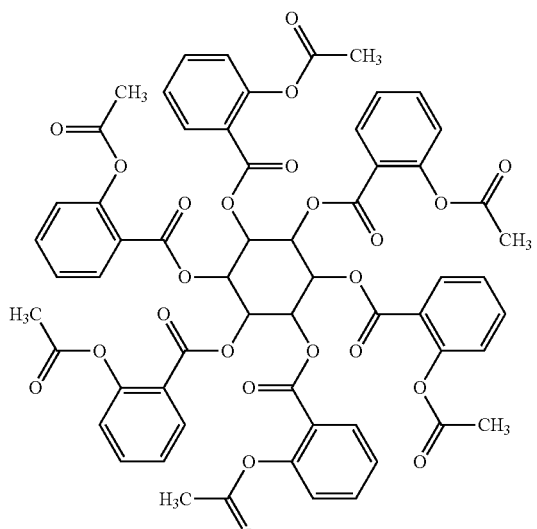
1153.01
33
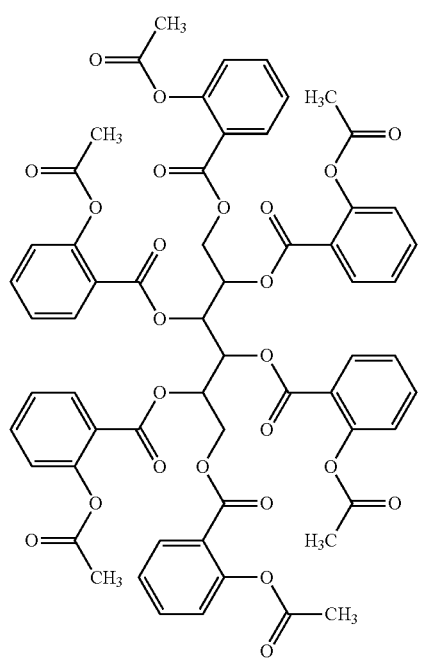
1155.02
34
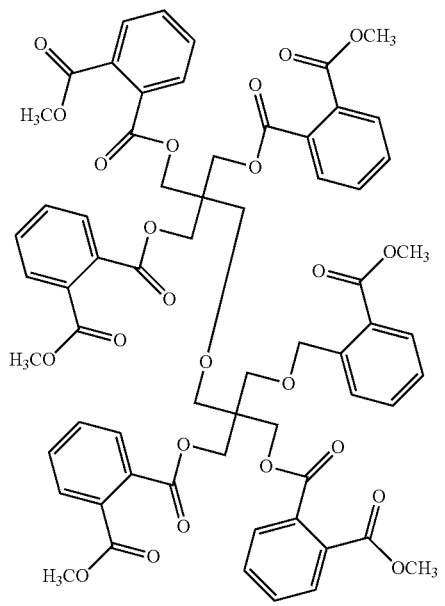
1213.15

35
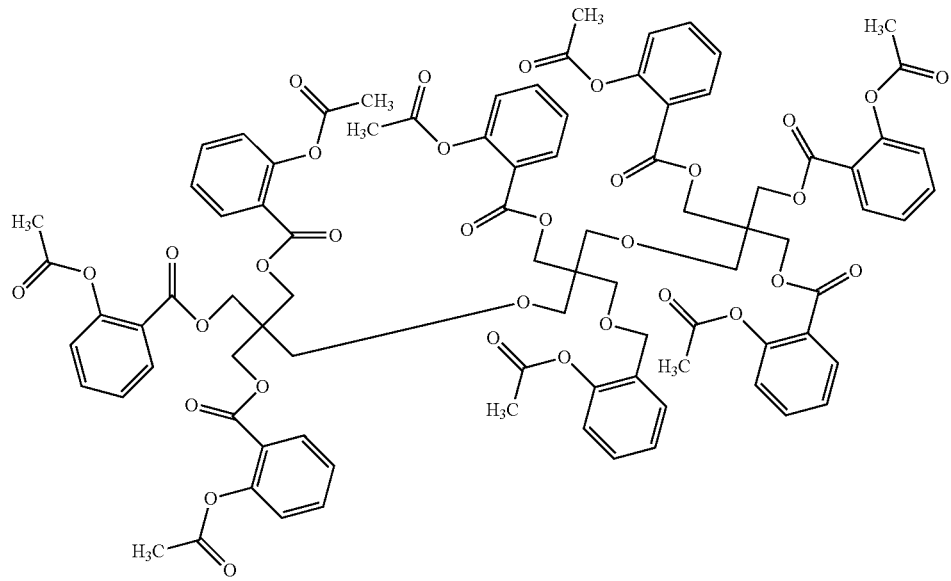
1669.59
36
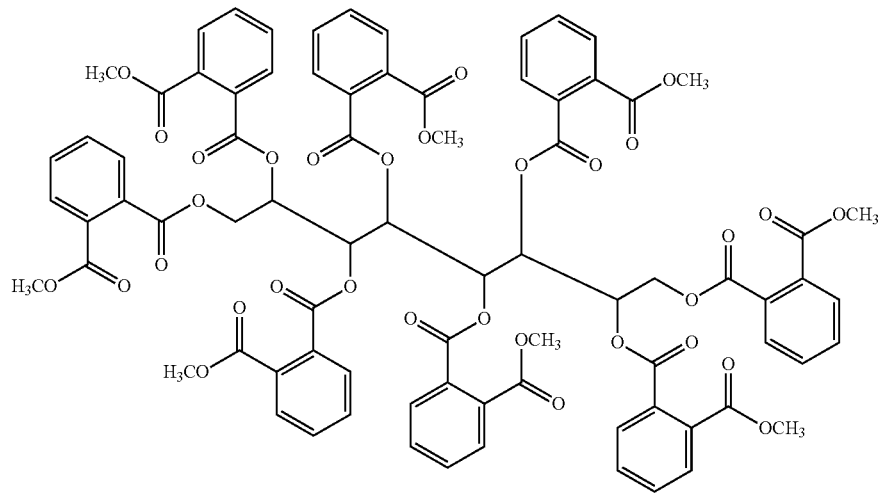
1539.36
37
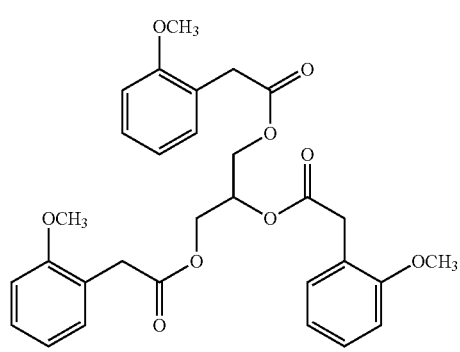
536.57
38
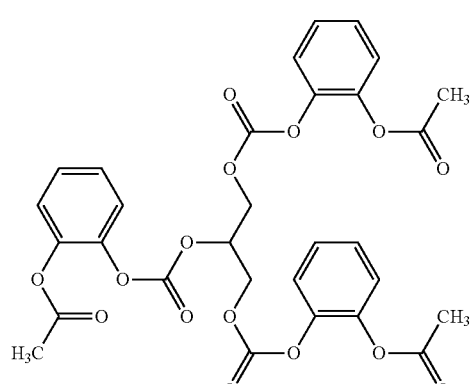
626.52

39
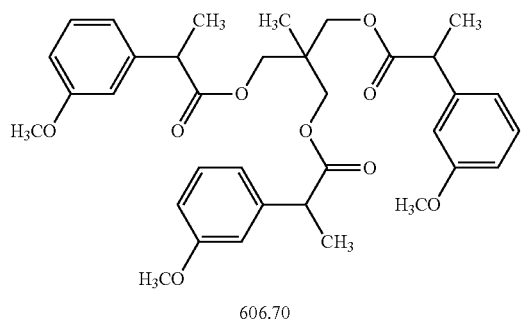
606.70
40
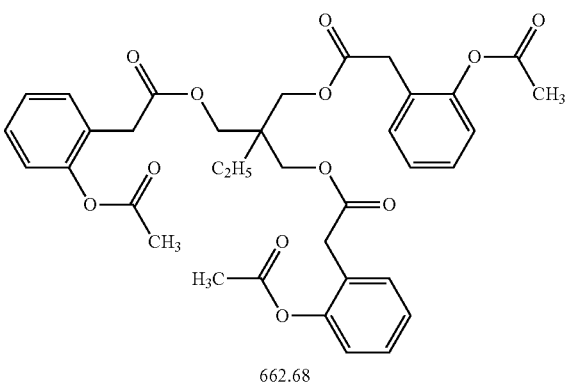
662.68
41
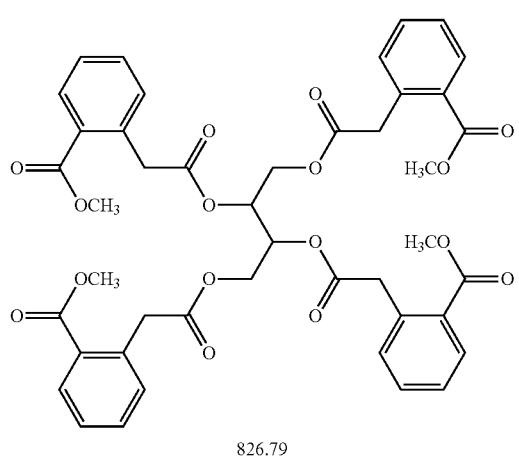
826.79
42
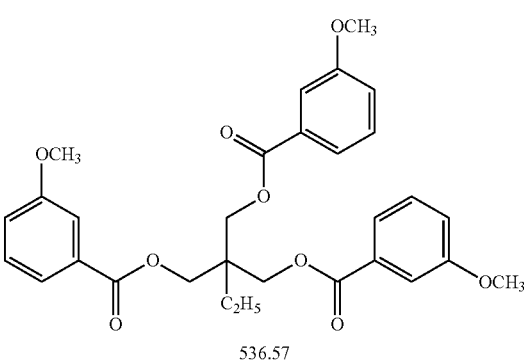
536.57
43
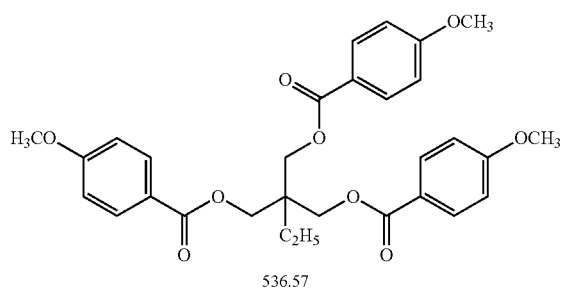
536.57
44
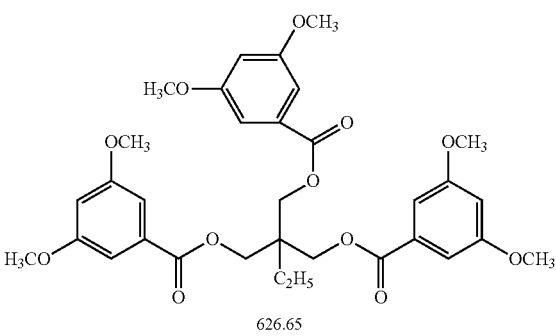
626.65
45
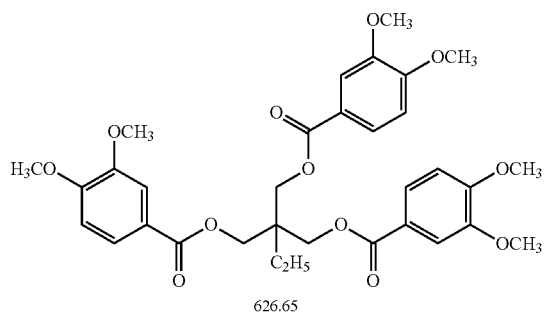
626.65
46
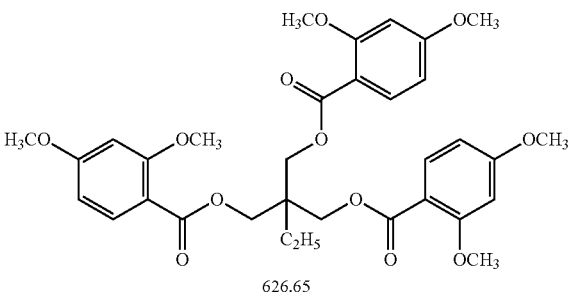
626.65

-continued
47
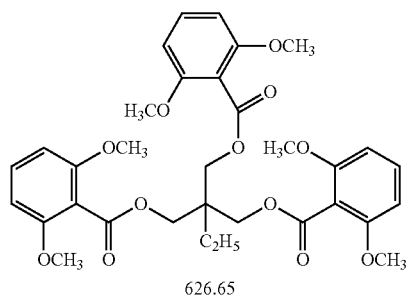
626.65
48
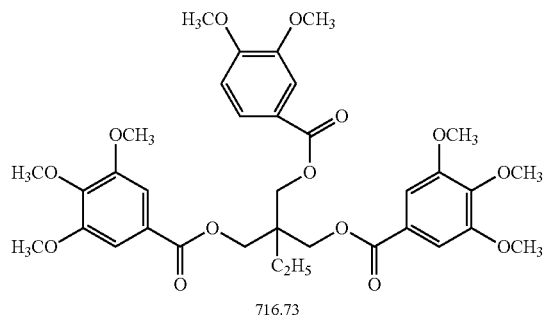
716.73
49
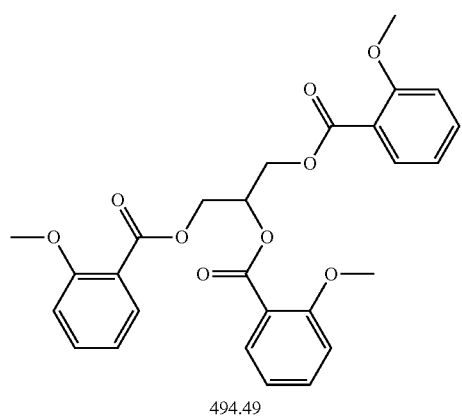
494.49
50
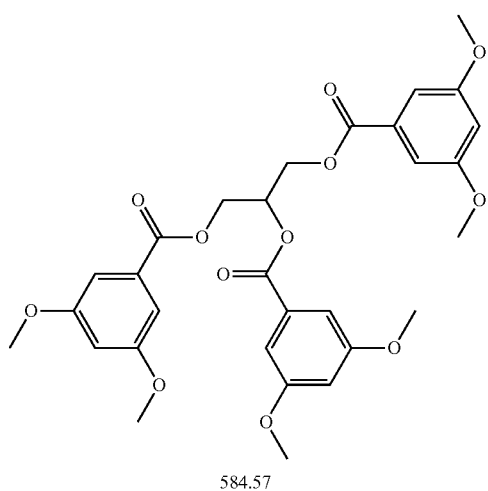
584.57
51
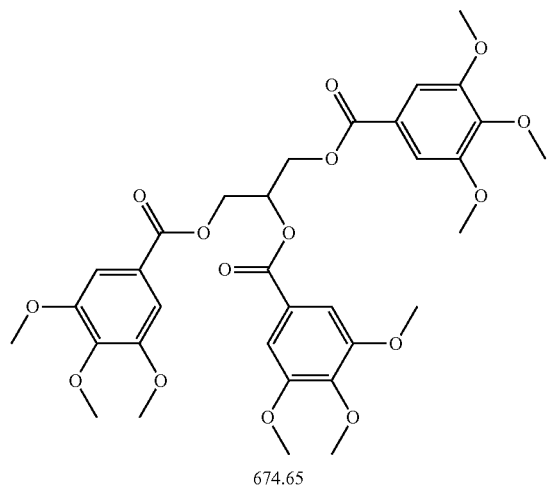
674.65
52
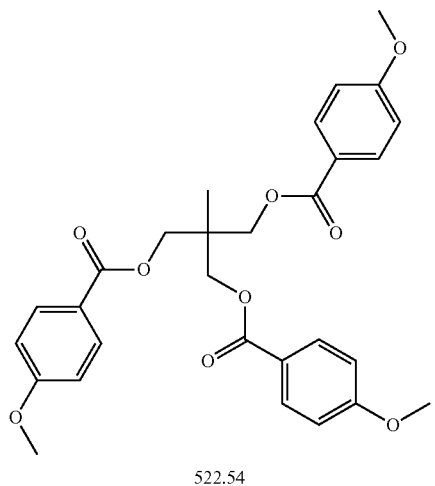
522.54

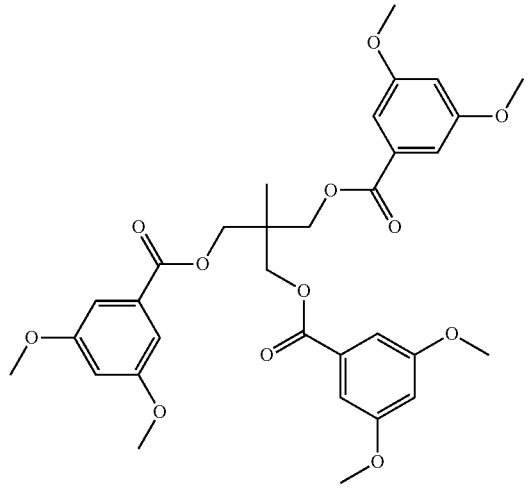
53
612.62
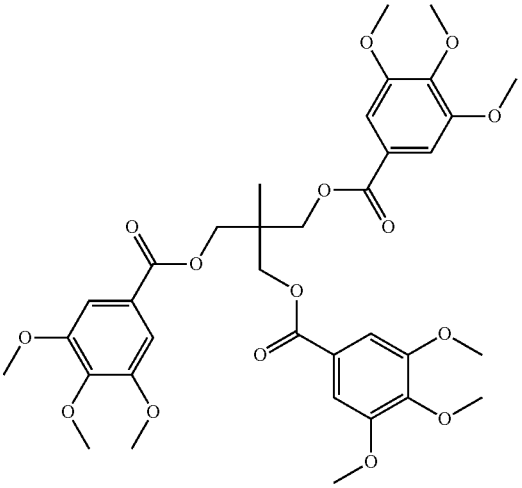
54
702.70
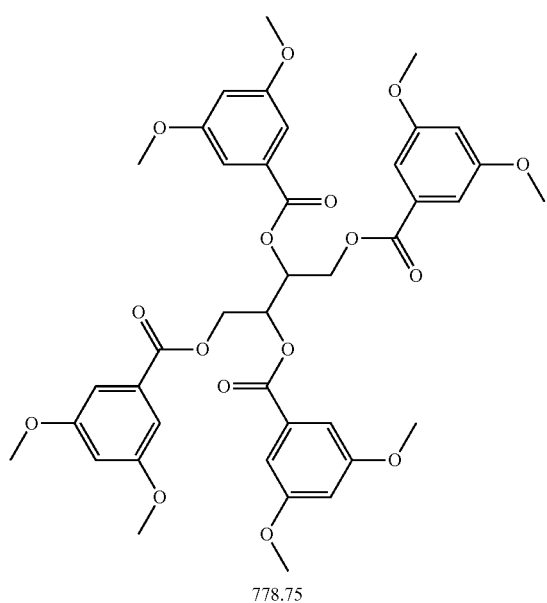
55
778.75
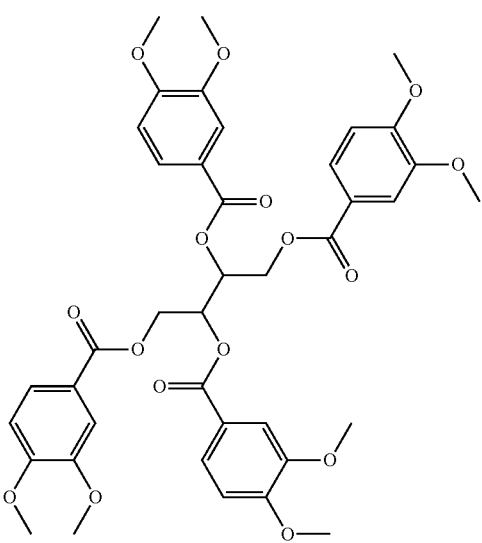
56
778.75

121 122
-continued
57
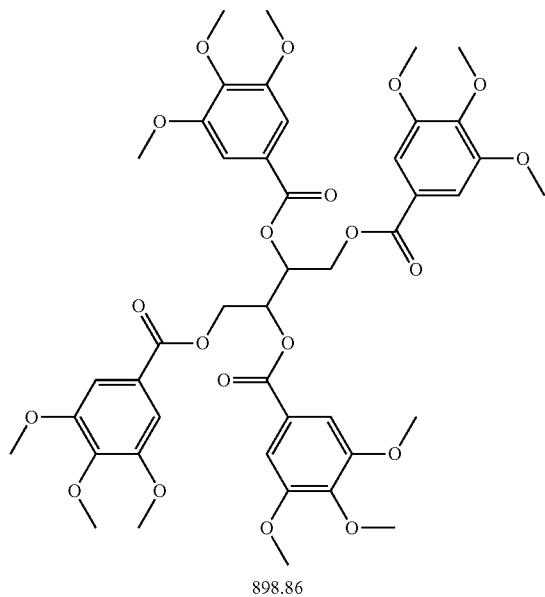
898.86
58
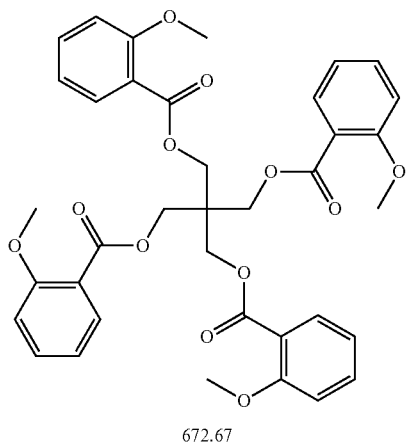
672.67
59
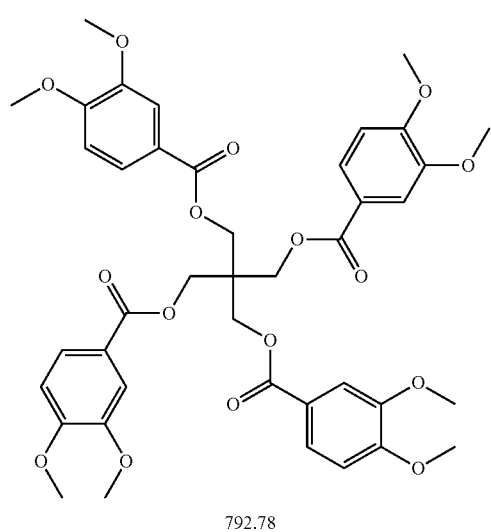
792.78
60
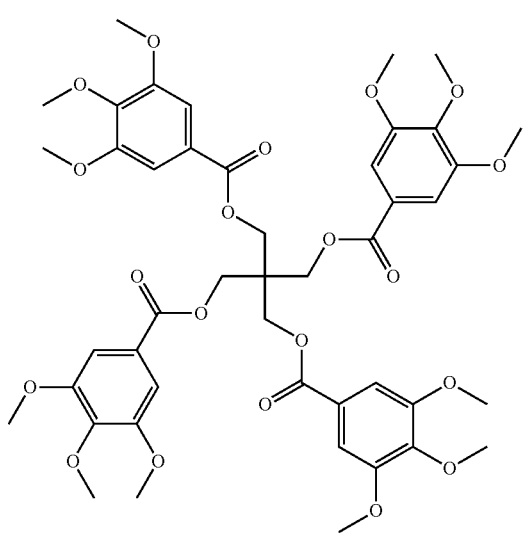
912.88
61
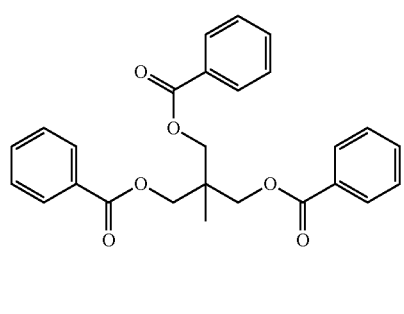
62
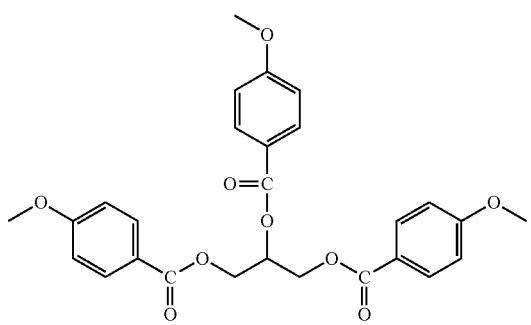

TMPTB

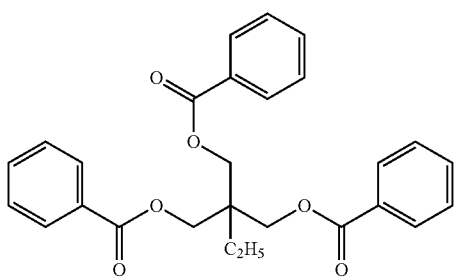

PETB

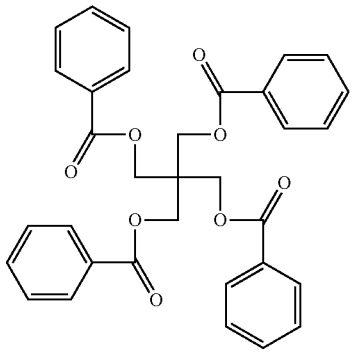

GTB

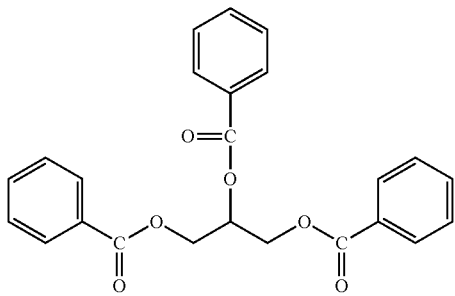

In the production of the cellulose ester of the present invention, an ester compound derived from an organic acid represented by Formula (1) and a polyalcohol having a valence of trivalent or more is preferably contained in the amount of 1-25 weight based on the weight of the polarizer protective film as a plasticizer. This ester compound may be used in combination with other plasticizers.

The ester compound derived from an organic acid represented by Formula (1) and a polyalcohol having a valence of trivalent or more exhibits high compatibility with cellulose ester and can be incorporated in the cellulose ester at a high addition content. Consequently, bleeding-out tends not to occur even when another plasticizer or additive is used together, whereby other plasticizer or additive can be easily used together, if desired.

Further, when another plasticizer is simultaneously employed, the ratio of the above described plasticizers of the present invention is preferably at least 50 percent by weight, more preferably at least 70 percent, but still more preferably at least 80 percent, based on the total weight of the plasticizers. When the plasticizer of the present invention is employed in the above range, it is possible to achieve a definite effect that the flatness of cellulose ester film produced by a melt-casting method is improved even under simultaneous use of other plasticizers.

Examples of other plasticizers which are simultaneously employed include: an aliphatic carboxylic acid-polyalcohol based plasticizer; an unsubstituted aromatic carboxylic acid or cycloalkylcaroboxylic acid-polyalcohol based plasticizer disclosed in paragraphs 30-33 of JP-A No. 2002-12823; dioctyl adipate; dicyclohexyl adipate; diphenyl succinate; di-2-naphthyl-1,4-cyclohexane dicarboxylate; tricyclohexyl tricarbalate; tetra-3-methylphenyltetrahydrofurane-2,3,4,5-tetracarboxylate; tetrabutyl-1,2,3,4-cyclopentane teracarboxylate; triphenyl-1,3,5-cyclohexyl tricarboxylate; triphenylbenzne-1,3,5-tetracarboxylate; multivalent carboxylates such as phthalic acid based plasticizers (for example, diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate, dicyclohexyl terephthalate, methylphthalyl methyl glycolate, ethylphthalyl ethyl glycolate, propylphthalyl propyl glycolate, and butylphthalyl butyl glycolate) and citric acid based plasticizers (acetyltrimethyl citrate, acetyltriethyl citrate and acetyltributyl citrate); phosphoric acid ester based plasticizers such as triphenyl phosphate, biphenyl diphenyl phosphate, butylenebis(diethyl phosphate), ethylenebis(diphenyl phosphate), phenylenebis(dibutyl phosphate), phenylenebis(diphenyl phosphate) (ADK STAB PFR, produced by ADEKA Corp.), phenylenebis(dixylenyl phosphate) (ADK STAB FP500, produced by ADEKA Corp.) and bisphenol A diphenyl phosphate (ADK STAB FP600, produced by ADEKA Corp.); carbohydrate ester based plasticizers; polymer plasticizers; polymer polyesters disclosed in paragraphs 49-56 of JP-A No. 2002-22956; polyether based plasticizers; and polymer plasticizers described below.

Polymer Plasticizer:

Specific examples of a polymer plasticizer include: an aliphatic hydrocarbon polymer; a cycloaliphatic hydrocarbon polymer; acryl polymers such as poly(ethyl acrylate), poly(methyl methacrylate) and a copolymer of methyl methacrylate and 2-hydroxyethyl methacrylate (for example, an arbitrary copolymerization ration of 1:99 to 99:1); vinyl polymers such as polyvinyl isobutyl ether and poly N-vinyl pyrrolidone; a copolymer of methyl methacrylate and N-vinyl pyrrolidone (for example, an arbitrary copolymerization ration of 1:99 to 99:1); styrene polymers such as polystyrene and poly 4-hydroxy styrene; a copolymer of methyl methacrylate and 4-hydroxystyrene (for example, an arbitrary copolymerization ration of 1:99 to 99:1); polyesters such as polybutylene succinate, polyethylene terephthalate and polyethylenenaphthalate; polyethers such as polyethylene oxide, and polypropylene oxide; polyamide; polyurethane; and polyurea. The number average molecular weight of the polymer plasticizers is preferably 1,000-500,000, and specifically preferably 1000-200,000, in order to obtain the effect of the present invention.

<Polymer X and Polymer Y>

In the present invention, polymer X and polymer Y each can also be preferably used as one of the polymer plasticizers.

The polarizer protective film of the present invention preferably contains Polymer X which is a copolymer having a weight average molecular weight of 5000-30000, prepared by copolymerizing an ethylenically unsaturated monomer Xa having neither an aromatic ring nor a hydrophilic group in the molecule and an ethylenically unsaturated monomer Xb having no aromatic ring but having a hydrophilic group in the molecule. More preferably, the polarizer protective film of the present invention further contains Polymer Y which is a polymer having a weight average molecular weight of 500-3000, prepared by polymerizing an ethylenically unsaturated monomer Ya having no aromatic ring.

Xa is preferably an acryl monomer or a methacryl monomer having neither an aromatic ring nor a hydrophilic group in the molecule, and Xb is preferably an acryl monomer or a methacryl monomer having no aromatic ring but having a hydrophilic group in the molecule.

Polymer X of the present invention is represented by Formula (6).

-(Xa)m-(Xb)n-(Xc)p-    Formula (6)

Polymer X is more preferably a polymer represented by the following Formula (6-1).

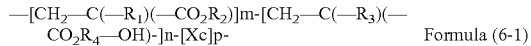

—[CH$_2$—C(—R$_1$)(—CO$_2$R$_2$)]m-[CH$_2$—C(—R$_3$)(—CO$_2$R$_4$—OH)-]n-[Xc]p-    Formula (6-1)

wherein R$_1$ and R$_3$ each represents H, or CH$_3$; R$_2$ represents an alkyl group having 1-12 carbon atoms, R$_4$ represents —CH$_2$—, —C$_2$H$_4$— or —C$_3$H$_6$—, Xc represents a monomer unit polymerizable with Xa, Xb, and m, n and p each represents the molar ratio, provided that m≠0, n≠0, and m+m+p=100.

In the following, monomers as a monomer unit constituting Polymer X of the preset invention will be cited, however the present invention is not limited thereto. In polymer X, a hydrophilic group includes a group having a hydroxyl group or an ethylene oxide chain.

Examples of ethylenically unsaturated monomer Xa having neither an aromatic ring nor a hydrophilic group in the molecule include: methyl acrylate, ethyl acrylate, propyl (i- or n-) acrylate, butyl (n-, i-, s-, or t-) acrylate, pentyl (n-, i-, or s-) acrylate, hexyl (n- or i-) acrylate, heptyl (n- or i-) acrylate, octyl (n- or i-) acrylate, nonyl (n- or i-) acrylate, myristyl (n- or i-) acrylate, 2-ethylhexyl acrylate, ε-caprolactone acrylate, 2-hydroxyethyl acrylate, and 2-ethoxyethyl acrylate, and those in which the above acrylate esters are converted to methacrylate esters. Of these, preferred are methyl acrylate, ethyl acrylate, methyl methacrylate, ethyl methacrylate, and propyl (i- or n-) methacrylate.

Preferred as ethylenically unsaturated monomer Xb having no aromatic ring but having a hydrophilic group in the molecule are acrylic or methacrylic acid esters as a monomer unit having a hydroxyl group, examples of which include 2-hydroxyethyl acrylate, 2-hydroxypropyl acrylate, 3-hydroxypropyl acrylate, 4-hydroxybutyl acrylate, and 2-hydroxybutyl acrylate, as well as those in which the above acrylate esters are converted to methacrylate esters. Of these, preferable are 2-hydroxyethyl acrylate, 2-hydroxyethyl methacrylate, 2-hydroxypropyl acrylate and 3-hydroxypropyl acrylate.

Xc is not specifically limited provided that it is a copolymerizable ethylenically unsaturated monomer other than Xa and Xb, however, Xc preferably contains no aromatic ring.

The ratio of use of Hydrophobic Monomer Xa to Hydrophilic Monomer Xb during synthesis is preferably in the range of 99:1-65:35, but is more preferably in the range of 95:5-75:25. The p value of Xc is 0-10. Xc may be a plurality of monomer units.

The weight average molecular weight of polymer X is preferably 5000-30000 and more preferably 8000-25000.

A weight average molecular weight of 5000 or more is preferred since it results in advantages such that the dimensional varitation of a cellulose ester film under high temperature and high humidity is significantly decreased and the resulting polarizer protective film exhibits reduced curling. When the weight average molecular weight is 30,000 or less, the compatibility of polymer X with cellulose ester is improved, bleed-out under high temperature and high humidity is reduced and haze formation immediately after casting is suppressed.

It is possible to control the weight average molecular weight of polymer X of the present invention, employing a molecular weight controlling method known in the art. An example of such a method includes a method in which a chain transfer agents such as carbon tetrachloride, lauryl mercaptan, or octyl thioglycolate is used. The polymerization temperature is commonly room temperature to 130° C., but is preferably 50 to 100° C. It is also possible to control the weight average molecular weight by controlling the above temperature or the polymerization reaction time.

The weight average molecule weight can be determined employing the following method.

(Method of Measurement of Weight Average Molecular Weight)

The weight average molecular weight is determined employing gel permeation chromatography. Measurement conditions are as follows:

Solvent: methylene chloride

Columns: SHODEX K806, K805, and K803G (produced by Showa Denko K.K., employed by connecting above three columns)

Column temperature: 25° C.

Sample concentration: 0.1% by weight

Detector: RI Model 504 (produced by GL Science Co.)

Pump: L6000 (produced by Hitachi, Ltd.)

Flow rate: 1.0 ml/min

Calibration curve: a calibration curve based on 13 samples of standard POLYSTYRENE STK standard POLYSTYRENE (produced by TOHSOH Corp.) at an Mw of 500-1,000,000 is employed. Thirteen samples, at almost equal intervals, are employed.

Polymer Y, employed in the present invention, includes a polymer at a weight average molecular weight of 500-3,000, prepared by polymerizing ethylenically unsaturated monomer Ya having no aromatic ring. Ya is preferably an acryl or a methacryl monomer having no aromatic ring.

Polymer Y of the present invention is represented by the following Formula (7).

-(Ya)k-(Yb)q-    Formula (7)

Polymer Y is more preferably represented by Formula (7-1).

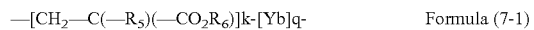

—[CH$_2$—C(—R$_5$)(—CO$_2$R$_6$)]k-[Yb]q-    Formula (7-1)

wherein R$_5$ represents H or CH$_3$; R$_6$ represents an alkyl group having 1-12 carbon atoms or a cycloalkyl group; Yb represents a monomer unit copolymerizable with Ya; k and q each represent a molar ratio, provided that k≠0 and k+q=100.

Yb is not specifically limited, provided that it is an ethylenically unsaturated monomer polymerizable with Ya. Yb may be a plurality of monomer unit. The value of q is preferably 0-30.

Examples of ethylenically unsaturated monomer Ya constituting Polymer Y, prepared by polymerizing ethylenically unsaturated monomers having no aromatic ring, include: acrylate esters such as, methyl acrylate, ethyl acrylate, propyl (i- or n-) acrylate, butyl (n-, i-, s-, or t-) acrylate, pentyl (n-, i-, or s-) acrylate, hexyl (n- or i-) acrylate, heptyl (n- or i-) acrylate, octyl (n- or i-) acrylate, nonyl (n- or i-) acrylate, myristyl (n- or i-) acrylate, cyclohexyl acrylate, 2-ethylhexyl acrylate, ε-caprolactone acrylate, 2-hydroxyethyl acrylate, 2-hydroxypropyl acrylate, 3-hydroxypropyl acrylate, 4-hydroxybutyl acrylate, or 2-hydroxybutyl acrylate, 2-methoxyethyl acrylate, 2-ethoxyethyl acrylate; methacrylate esters which are derived from the above acrylate esters by changing acrylate esters to methacrylate esters; and unsaturated acids such as acrylic acid, methacrylic acid, maleic acid anhydride, crotonic acid and itaconic acid.

Yb is not specifically limited, however, preferable are vinyl esters such as vinyl acetate, vinyl propionate, vinyl butyrate, vinyl valerate, vinyl pivarate, vinyl caprate, vinyl laurate, vinyl myristate, vinyl palmate, vinyl stearate, vinyl cyclohexane carboxylate, vinyl octylate, vinyl methacrylate, vinyl crotonate, vinyl sorbate, and vinyl cinnamate. Yb may be a plurality of monomer units.

In order to synthesize polymer X and polymer Y, it is preferable to employ a method in which the molecular weight is not excessively increased, but the molecular weight is uniform as much as possible, since it is difficult to control the molecular weight employing a common polymerization method. Examples of such methods include: a method in which peroxide polymerization initiators such as cumene peroxide or t-butylhydroperoxide are employed; a method in which polymerization initiators in a larger amount than the common polymerization is employed; a method in which a chain transfer agent such as a mercapto compound or carbon tetrachloride are employed in addition to a polymerization initiator; a method in which a polymerization terminating agent such as benzoquinone or dinitrobenzene is employed in addition to a polymerization initiator; and a method in which block polymerization is carried out employing polymerization catalysts employing a compound having one thiol group and a secondary hydroxyl group, or incorporating the above compound and organic metal compounds, described in JP-A Nos. 2000-128911 and 2000-344823. Any of the above methods is preferably employed in the present invention, however, for the preparation of polymer Y, the polymerization method in which a compound having one thiol group and a secondary hydroxyl group in the molecule is used as a chain transfer agent is preferable. In this method, a hydroxyl group or a thioether originated from the polymerization catalyst or from the chain transfer agent is provided at the terminal of polymer Y. The compatibility of polymer Y with cellulose ester can be adjusted by the amount of the terminal residue.

The hydroxyl values of Polymer X and polymer Y each is preferably 30-150 mg KOH/g.

(Measurement Method of Hydroxyl Value)

Hydroxyl value, as described herein, is determined based on JIS K 0070 (1992), and is defined as mg of potassium hydroxide consumed to neutralize acetic acid bonded to a hydroxyl group when 1 g of the sample is acetylated. More specifically, X g (approximately 1 g) of a sample, which has been accurately weighed, is placed in a flask, and precisely 20 ml of an acetylation reagent (prepared in such a manner that pyridine is added to 20 ml of acetic anhydride to reach a total volume of 400 ml) is added. An air cooling pipe is fitted to the opening of the flask and the flask is heated at 95-100° C. in a glycerin bath. After one hour and a half, the temperature is lowered and 1 ml of pure water is fed through the air cooling pipe, whereby acetic anhydride is decomposed to acetic acid. Subsequently, by employing a potentiometric titrator, titration is carried out via a 0.5 mol/L potassium hydroxide ethanol solution, and when the titration curve results in inflection, titration is terminated. Further, as a blank test, titration is carried out without adding the sample and the inflection point of the titration curve is recorded. The hydroxyl value is calculated based on the following formula:

$$\text{Hydroxyl value} = \{(B-C) \times f \times 28.05/X\} + D$$

wherein B represents the volume (ml) of the 0.5 mol/L potassium hydroxide methanol solution employed in the blank test; C represents the volume (ml) of the 0.5 mol/L potassium hydroxide methanol solution employed for titration; f represents the factor of the 0.5 mol/L potassium hydroxide methanol solution; and D represents the acid value, while 28.05 is ½ of 56.11 which is the amount of one mol of potassium hydroxide.

Both of above described polymer X and polymer Y exhibit excellent compatibility with cellulose ester, excellent productivity without evaporation nor sublimation, excellent retention as a polarizer protective film, minimal moisture vapor permeability, and excellent dimensional stability.

It is preferable that the content of Polymer X and Polymer Y in the cellulose ester films is preferably in the range satisfying following Formulas (i) and (ii):

$$5 \leq Xg + Yg \leq 35 \text{ (\% by weight)} \qquad \text{Formula (i)}$$

$$0.05 \leq Yg/(Xg+Yg) \leq 0.4 \qquad \text{Formula (ii)}$$

wherein Xg (% by weight) represents the content of Polymer X, while Yg (% by weight) represents the content of Polymer Y.

The preferred range of formula (i) is 10-25% by weight.

These polymer plasticizers may be a monopolymer or may be a copolymer containing a plurality of monomer repeat units. Also, two or more of the above polymers may be used in combination.

However, a phosphorus-containing plasticizer generates a strong acid when it is hydrolyzed, whereby hydrolysis of the plasticizer itself and the cellulose ester is accelerated. Accordingly, a phosphorus-containing plasticizer may have problems in that it exhibits a poorer storage stability and coloration of a cellulose ester film tends to occur when the film is produced via a melt-casting method. Therefore, a phthalate ester plasticizer, a polyalcohol ester plasticizer, a citrate ester plasticizer, a polyester plasticizer and a polyether plasticizer are preferably used in the present invention.

In the cellulose ester film of the present invention, coloration of the film affects the optical property of the film. Accordingly, the yellow index YI of the film is preferably 3.0 ore less, and more preferably 1.0 or less. The yellow index can be determined according to the method of JIS-K7103.

(Matting Agents)

In order to provide a lubricant property, as well as optical and mechanical functions, a matting agent is incorporated into to the cellulose ester film of the present invention. Listed as such matting agents are, particles of inorganic or organic compounds.

Preferably employed matting agents are spherical, rod-shaped, acicular, layered and tabular. Examples of a matting agent include: inorganic particles of metal oxides, metal phosphates, metal silicates and metal carbonates such as silicon dioxide, titanium dioxide, aluminum oxide, zirconium oxide, calcium carbonate, kaolin, talc, calcined calcium silicate, hydrated calcium silicate, aluminum silicate, magnesium silicate, or calcium phosphate; and crosslinking polymer particles. Of these, silicon dioxide is preferred due to a resulting decrease in film haze. It is preferable that these particles are subjected to a surface treatment, since it is possible to lower the film haze.

The above surface treatment is preferably carried out employing halosilane, alkoxysilane, silazane, or siloxane. As the average diameter of the particles increases, lubricant effect is enhanced, while, as the average diameter decreases, the transparency of the film increases. The average diameter of the primary particles is 0.01-1.0 μm, preferably 5-50 nm, but is more preferably 7-14 nm. These particles are preferably employed to form unevenness of 0.01-1.0 μm on the surface of the film.

Examples of silicon dioxide particles include AEROSIL 200, 200V, 300, R972, R972V, R974, R202, R812, OX50, TT600 and NAX50 (all of which are produced by Nihon Aerosil Co., Ltd); KE-P10, KE-P30, KE-P100, KE-P150 (Produced by NIPPON SHOKUBAI Co., Ltd.). Of these, preferred are AEROSIL 200V, R972, NAX50, KE-P30 and KE-P100.

When two types of the particles are employed in combination, they may be mixed at an optional ratio to use. It is possible to use particles different in the average particle diameter or in materials, for example, AEROSIL 200V and R972V can be used at a weight ratio in the range of 0.1:99.9 to 99.9:0.1.

These matting agents are preferably added by kneading, or, alternatively, the matting agent is added by: (i) previously dispersing a matting agent in a solvent; (ii) further dispersing the matting agent after mixed with a cellulose ester and/or a plasticizer and/or a UV absorbent; (iii) separating the solid content by evaporating the solvent or by precipitation of the solid content; and (iv) using the product in the production process of a melt of cellulose ester. The latter method is preferable because the matting agent can be more uniformly dispersed in the cellulose ester.

The above matting agent may also be used in order to improve a mechanical property, an electric property or an optical property of the film.

The addition of more amount of matting agent into the cellulose ester film of the present invention results in improving the lubricant property of the film, however, haze of the film also increases. Accordingly, the content of a matting agent in the film is preferably 0.001-5 weight %, more preferably 0.005-1 weight %, and still more preferably 0.01-0.5 weight %, based on the weight of the polarizer protective film.

The polarizer protective film of the present invention is characterized in that the polarizer protective film contains a cellulose ester, an above mentioned saccharide ester compound and a compound represented by above Formula (R) or (Ra), whereby a cellulose ester film exhibiting a stable property, in which variation of retardation values due to humidity change is reduced, and exhibiting reduced deformation defects of a film master roll such as a horseback defect or a convex defect even after a long term storage is obtained. Also, the polarizer protective film of the present invention may preferably contain a compound represented by following Formula (4) which may work as a carbon radical scavenger. It is also preferable in the the present invention to further contain one of or both of an above mentioned phosphonite compound and a phenol compound such as represented by above Formula (A).

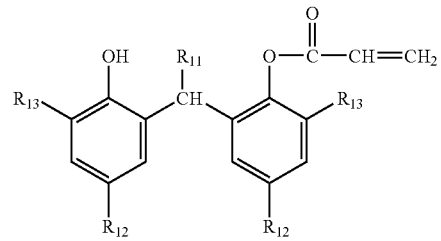

Formula (4)

The compound represented by Formula (R) or (Ra) or the compound represented by Formula (4) has a role of a "carbon radical scavenger". The carbon radical scavenger has a group which promptly reacts with carbon radicals (for example, an un saturated group such as a double bond or a triple bond), while avoiding a subsequent reaction such as polymerization after the compound reacted with carbon radicals to form a stable compound. As a carbon radical scavenger, a group which promptly reacts with carbon radicals (for example, unsaturated groups such as a (meth)acryloyl group or an aryl group), a phenol compound or a lactone compound is preferable. Specifically, a compound represented by Formula (R) or (Ra) or a compound represented by Formula (4) is preferable.

In Formula (4), $R_{11}$ represents a hydrogen atom or an alkyl group having 1-10 carbon atoms, preferably a hydrogen atom or an alkyl group having 1-4 carbon atoms, and specifically preferably a hydrogen atom of a methyl group.

R12 and R13 each independently represent an alkyl group having 1-8 carbon atoms, which may be of a straight chain, branched structure or a ring structure.

$R_{12}$ and $R_{13}$ preferably have a structure represented by "*—$C(CH_3)_2$—R'" containing a quaternary carbon atom (* represents a linkage position to an aromatic ring, R' represents an alkyl group having 1-5 carbon atoms)

$R_{12}$ is more preferably a tert-butyl group, a tert-amyl group or a tert-octyl group. $R_{13}$ is more preferably a tert-butyl, tert-amyl group. Commercially available compound represented by Formula (4) include Sumilizer GM, Sumilizer GS (both are trade names produced by Sumitomo Chemical Co., Ltd.).

Specific examples of the compounds represented by Formula (4) will be shown below (I-1 to I-18), however, the present invention in not limited thereto.

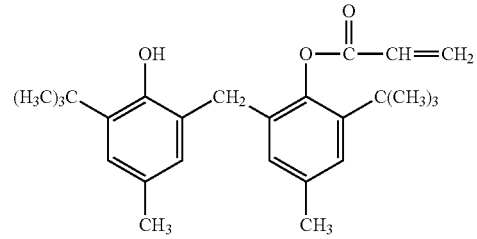

I-1

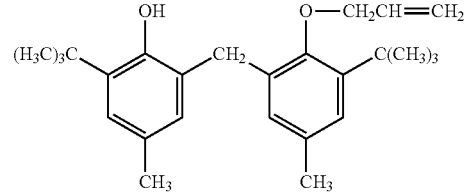

I-2

I-3
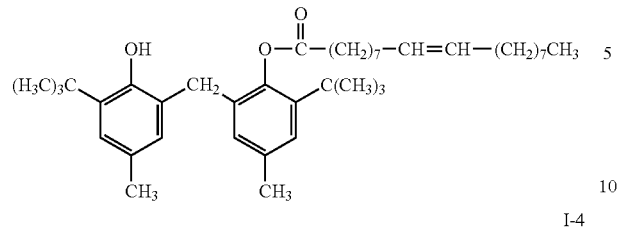
I-4
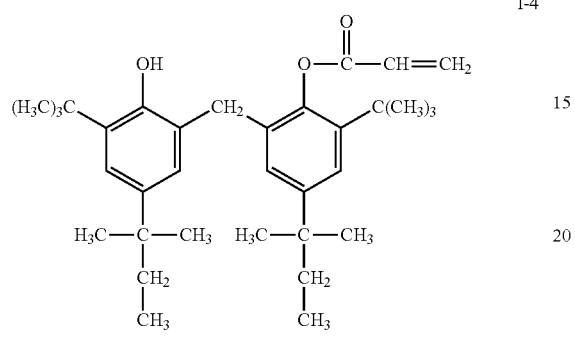
I-5
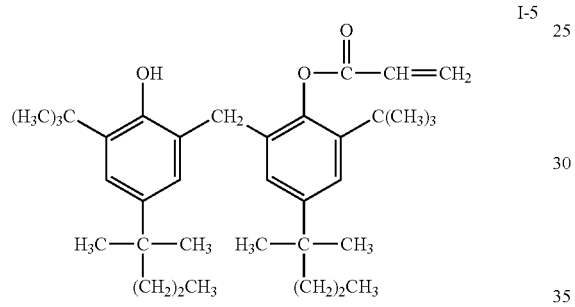
I-6
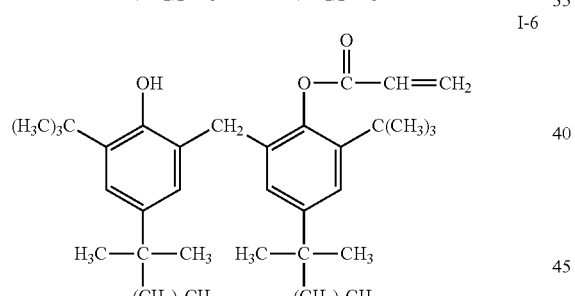
I-7
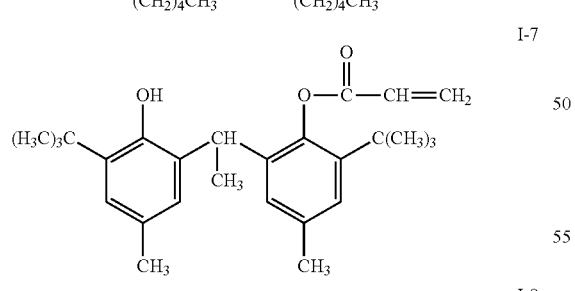
I-8
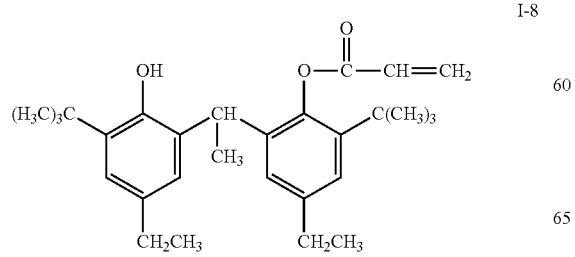
I-9
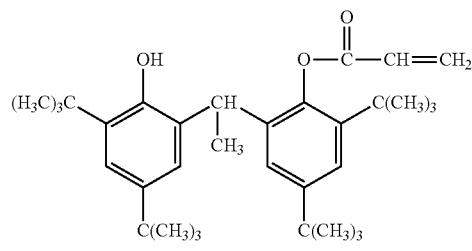
I-10
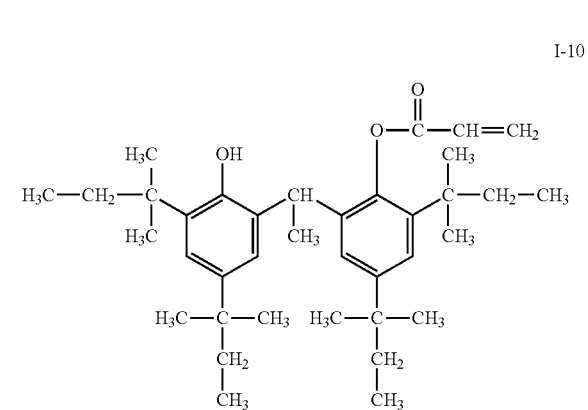
I-11
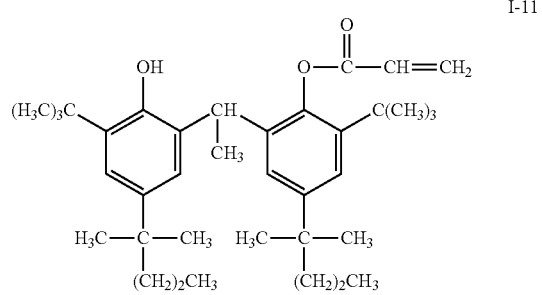
I-12
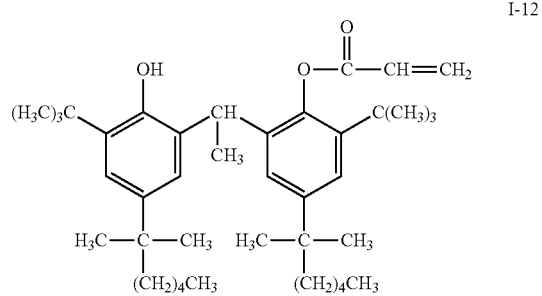
I-13
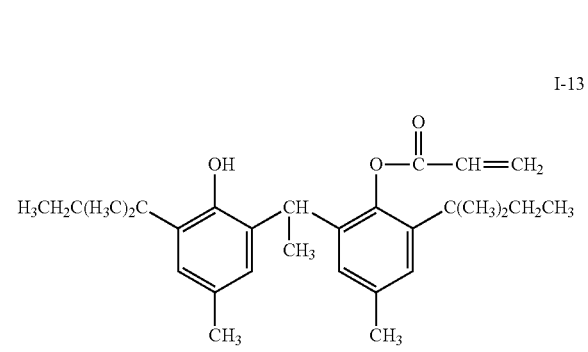

-continued

I-14
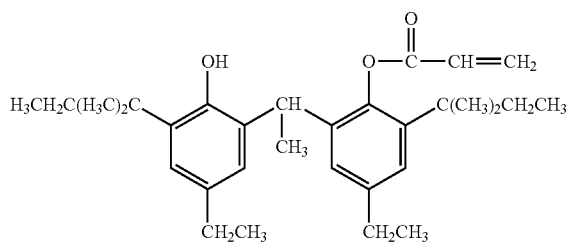

I-15
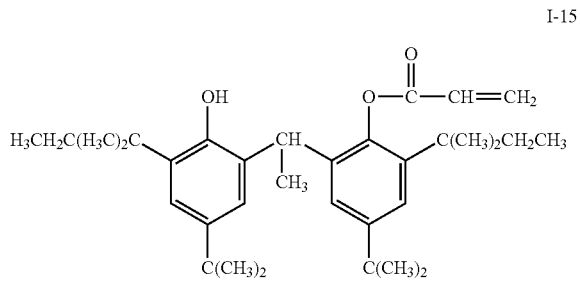

I-16
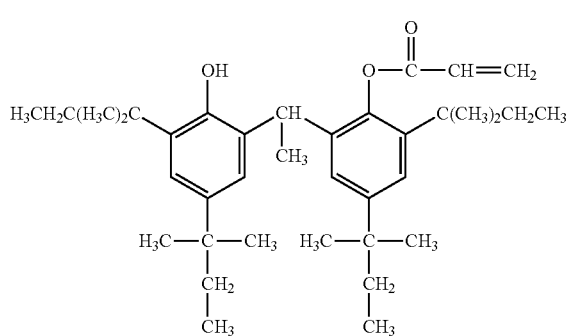

I-17
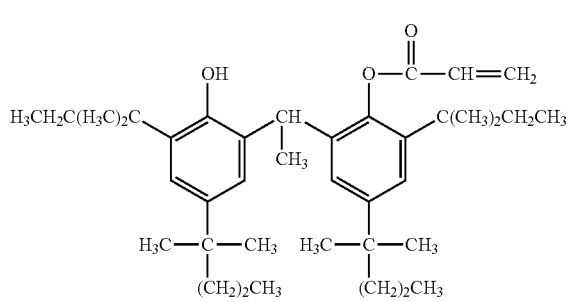

I-18
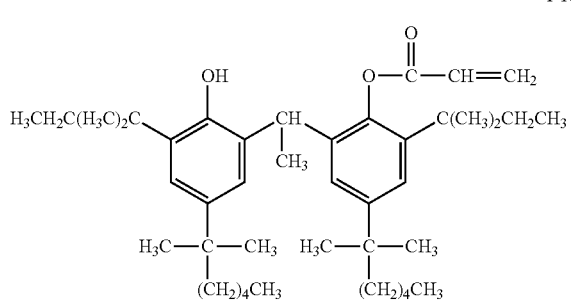

The haze value of the cellulose ester film of the present invention is preferably less than 1.0%, but is more preferably less than 0.5%, since the haze of 1% or more may affect the optical property of the film. The haze value is determined according to the method of JIS K 7136.

The film constituting material preferably generates only a small amount of volatile matter or no volatile matter at all in the melting and film formation process. This is intended to ensure that the foaming occurs at the time of heating and melting to remove or avoid the defect inside the film and poor flatness on the film surface.

When the film constituting material is molten, the amount of the volatile matter contained is 1% by mass or less, preferably 0.5% by mass or less, more preferably 0.2% by mass or less, still more preferably 0.1% by mass or less. In the present invention, a differential thermogravimetric apparatus (differential weight calorimetry (TG/DTA 200 by Seiko Denshi Kogyo Co., Ltd.) is used to get a weight loss on heating from 30° C. through 250° C. The result is used as the amount of the volatile matter contained.

Before film formation or at the time of heating, the moisture and the volatile components represented the aforementioned solvent are preferably removed from the film constituting material to be used. They can be removed by the conventional known method. A heating method, depressurization method, or heating/depressurization method can be used to remove them in air or in nitrogen atmosphere as an inert gas atmosphere. When the known drying method is used, this procedure is carried out in the temperature range wherein the film constituting material is not decomposed. This is preferred to ensure good film quality.

Generation of the volatile components can be reduced by the drying step prior to film formation. It is possible to dry the resin independently, or dry the resin and film constituting materials by separating into a mixture or compatible substances made of at least one or more types other than the resin. The drying temperature is preferably 70° C. or more. If the material to be dried contains any substance having a glass-transition temperature, and is heated up to a drying temperature higher than that glass-transition temperature, the material will be fused and will become difficult to handle. To avoid this, the drying temperature is preferably kept at a level not exceeding the glass-transition temperature. If a plurality of substances has a glass-transition temperature, the glass-transition temperature of the substance having a lower glass-transition temperature should be used as a standard. This temperature is preferably 70° C. or more through (glass-transition temperature −5) ° C. or less, more preferably 110° C. or more through (glass-transition temperature −20) ° C. or less. The drying time is preferably 0.5 through 24 hours, more preferably 1 through 18 hours, still more preferably 1.5 through 12 hours. If the drying temperature is too low, the rate of removing the volatile components will be reduced and much time will be required for drying. The drying process can be divided into two or more steps. For example, the drying process may includes a pre-drying step for storing the material, and a preliminary drying step for the period one week before film formation through the period immediately before film formation.

<Melt Casting Method>

The cellulose ester film of the present invention is preferably formed by melt casting of the cellulose ester. The molding by melt casting wherein heating and melting are conducted without using the solvent used in the solution casting method (e.g., methylene chloride) can be divided into a melt-extrusion molding method, press molding method, inflation method, injection molding method, blow molding method, stretch molding method, and others. Of these methods, melt-extrusion molding method is preferred to produce a polarizer protective film characterized by excellent mechanical strength and surface accuracy.

Figure 2:
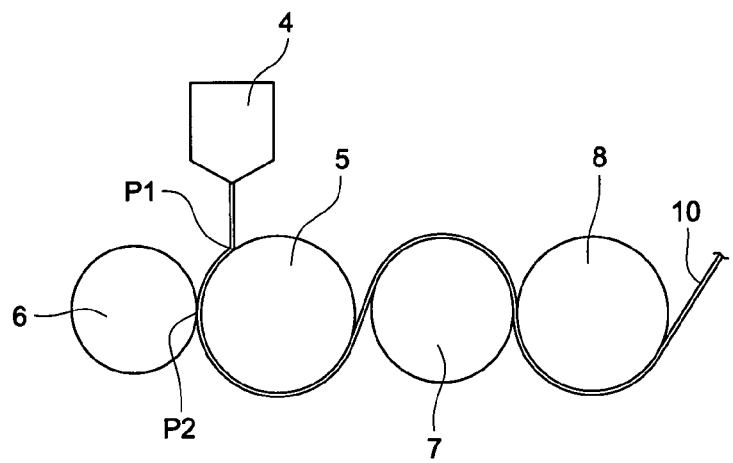
FIG. 2 is an enlarged flow sheet of a primary portion of the manufacturing apparatus of FIG. 1.

The following describes the film manufacturing method of the present invention with reference to the melt extrusion method:

FIG. 1 is a schematic flow sheet showing the overall structure of the apparatus for practicing the cellulose ester film manufacturing method of the present invention. FIG. 2 is an enlarged view of the cooling roll portion from the flow casting die.

In the cellulose ester film manufacturing method shown in FIG. 1 and FIG. 2, the film material such as cellulose resin is mixed, then melt extrusion is conducted on a first cooling roll 5 from the flow casting die 4 using the extruder 1. The material is be circumscribed on a first cooling roll 5, second cooling roll 7 and third cooling roll 8—a total of three cooling rolls—sequentially. Thus, the material is cooled, solidified and formed into a film 10. With both ends gripped by a stretching apparatus 12, the film 10 peeled by a peeling roll 9 is stretched across the width and is wound by a winding apparatus 16. To correct flatness, a touch roll 6 is provided. This is used to press the film against the surface of the first cooling roll 5. This touch roll 6 has an elastic surface and forms a nip with the first cooling roll 5. The details of the touch roll 6 will be described later.

The conditions for the cellulose ester film manufacturing method are the same as those for thermoplastic resins such as other polyesters. The material is preferably dried in advance. A vacuum or depressurized dryer, or dehumidified hot air dryer is used to dry the material until the moisture is reduced to 1000 ppm or less, preferably 200 ppm or less.

For example, the cellulose ester based resin having been dried under hot air, vacuum or depressurized atmosphere is extruded by the extruder 1 and is molten at a temperature of about 200 through 300° C. The leaf disk filter 2 is used to filter the material to remove foreign substances.

When the material is fed from the feed hopper (not illustrated) to the extruder 1, the material is preferably placed in the vacuum, depressurized or insert gas atmosphere to prevent oxidation and decomposition.

When additives such as plasticizer are not mixed in advance, they can be kneaded into the material during the process of extrusion. To ensure uniform mixing, a mixer such as a static mixer 3 is preferably utilized.

In the present invention, the cellulose resin and the additives such as a stabilizer to be added as required are preferably mixed before being molten. It is more preferred that the cellulose resin and stabilizer should be mixed first. A mixer may be used for mixing. Alternatively, mixing may be completed in the process of preparing the cellulose resin, as described above. It is possible to use a commonly used mixer such as a V-type mixer, conical screw type mixer, horizontal cylindrical type mixer, Henchmen mixer and ribbon mixer.

As described above, subsequent to mixing of the film constituting material, the mixture can be directly molten by the extruder 1 to form a film. Alternatively, it is also possible to palletize the film constituting material, and the resultant pellets may be molten by the extruder 1, whereby a film is formed. The following arrangement can also be used: When the film constituting material contains a plurality of materials having different melting points, so-called patchy half-melts are produced at the temperature wherein only the material having a lower melting point is molten. The half-melts are put into the extruder 1, whereby a film is formed. Further, the following arrangement can also be used: If the film constituting material contains the material vulnerable thermal decomposition, a film is directly formed without producing pellets, thereby reducing the frequency of melting. Alternatively, a film is produced after patchy half-melts have been formed, as described above.

Various types of commercially available extruders can be used as the extruder 1. A melt-knead extruder is preferably utilized. Either a single-screw extruder or a twin-screw extruder can be used. When producing a film directly without pellets being formed from the film constituting material, an adequate degree of mixing is essential. In this sense, a twin-screw extruder is preferably used. A single-screw extruder can be used if the screw is changed into a kneading type screw such as a Madoc screw, Unimelt screw or Dulmage screw, because a proper degree of mixing can be obtained by this modification. When pellets or patchy half-melts are used as film constituting materials, both the single screw extruder and twin screw extruder can be used.

In the cooling process inside the extruder 1 and after extrusion, oxygen density is preferably reduced by an inert gas such as nitrogen gas or by depressurization.

The preferred conditions for the melting temperature of the film constituting material inside the extruder 1 vary according to the viscosity and discharge rate of the film constituting material as well as the thickness of the sheet to be produced. Generally, it is Tg or more through Tg+130° C. or less with respect to the glass-transition temperature Tg of the film, preferably Tg+10° C. or more through Tg+120° C. or less. The melt viscosity at the time of extrusion is 10 through 100000 poises, preferably 100 through 10000 poises. The retention time of the film constituting material inside the extruder 1 should be as short as possible. It is within five minutes, preferably within three minutes, more preferably within two minutes. The retention time varies according to the type of the extruder and the conditions for extrusion. It can be reduced by adjusting the amount of the material to be supplied, the L/D, the speed of screw and the depth of screw groove.

The shape and speed of the screw of the extruder 1 are adequately selected in response to the viscosity and discharge rate of the film constituting material. In the present invention, the shear rate of the extruder 1 is 1/sec. through 10000/sec., preferably 5/sec. through 1000/sec., more preferably 10/sec. through 100/sec.

The extruder 1 that can be used in the present invention can be obtained as a plastic molding machine generally available on the market.

The film constituting material extruded from the extruder 1 is fed to the flow casting die 4, and the slit of the flow casting die 4 is extruded as a film. There is no restriction to the flow casting die 4 if it can be used to manufacture a sheet or film. The material of the flow casting die 4 are exemplified by hard chromium, chromium carbonate, chromium nitride, titanium carbide, titanium carbonitride, titanium nitride, cemented carbide, ceramic (tungsten carbide, aluminum oxide, chromium oxide), which are sprayed or plated. Then they are subjected to surface processing, as exemplified by buffing and lapping by a grinder having a count of #1000 or later planar cutting (in the direction perpendicular to the resin flow) by a diamond wheel having a count of #1000 or more, electrolytic grinding, and electrolytic complex grinding. The preferred material of the lip of the flow casting die 4 is the same as that of the flow casting die 4. The surface accuracy of the lip is preferably 0.5 S or less, more preferably 0.2 S or less.

Figure 3:
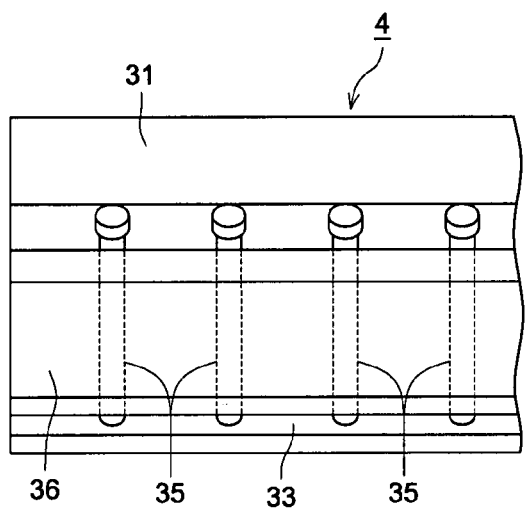
FIG. 3(a) is an outlook drawing of a casting die.
FIG. 3(b) is a cross-sectional view of the primary portion of a casting die.
Figure 3:
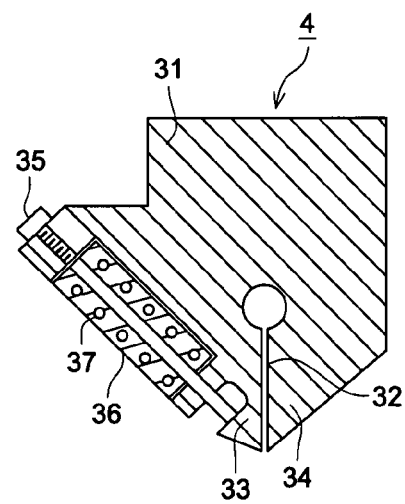

The slit of this flow casting die 4 is designed in such a way that the gap can be adjusted. This is shown in FIG. 3. Of a pair of lips forming the slit 32 of the flow casting die 4, one is the flexible lip 33 of lower rigidity easily to be deformed, and the other is a stationary lip 34. Many heat bolts 35 are arranged at a predetermined pitch across the flow casting die 4, namely, along the length of the slit 32. Each heat bolt 5 includes a block 36 containing a recessed type electric heater 37 and a cooling medium passage. Each heat bolt 35 penetrates the block 36 in the vertical direction. The base of the heat bolt 35 is fixed on the die (main body) 31, and the front end is held in engagement with the outer surface of the flexible lip 33. While the block 36 is constantly cooled, the input of the recessed type electric heater 37 is adjusted to increase or decrease the temperature of the block 36, this adjustment causes thermal extension and contraction of the heat bolt 35, and hence, displacement of the flexible lip 33, whereby the film thickness is adjusted. The following arrangement can also be used: A thickness gauge is provided at predetermined positions in the wake of the die. The web thickness information detected by this gauge is fed back to the control apparatus. This thickness information is compared with the preset thickness information of the control apparatus, whereby the power of the heat generating member of the heat bolt or the ON-rate thereof is controlled by the signal for correction control amount sent from this apparatus. The heat bolt preferably has a length of 20 through 40 cm, and a diameter of 7 through 14 mm. A plurality of heat bolts, for example, several tens of heat bolts are arranged preferably at a pitch of 20 through 40 mm. A gap adjusting member mainly made up of a bolt for adjusting the slit gap by manually movement in the axial direction can be provided, instead of a heat bolt. The slit gap adjusted by the gap adjusting member normally has a diameter of 200 through 1000 μm, preferably 300 through 800 μm, more preferably 400 through 600 μm.

The first through third cooling roll is made of a seamless steel pipe having a wall thickness of about 20 through 30 mm. The surface is mirror finished. It incorporates a tune for feeding a coolant. Heat is absorbed from the film on the roll by the coolant flowing through the tube.

In the meantime, the touch roll 6 held in engagement with the first cooling roll 5 has an elastic surface. It is deformed along the surface of the first cooling roll 5 by the pressure against the first cooling roll 5, and forms a nip between this roll and the first roll 5. To be more specific, the touch roll 6 corresponds to the pressure rotary member of the present invention.

Figure 4:
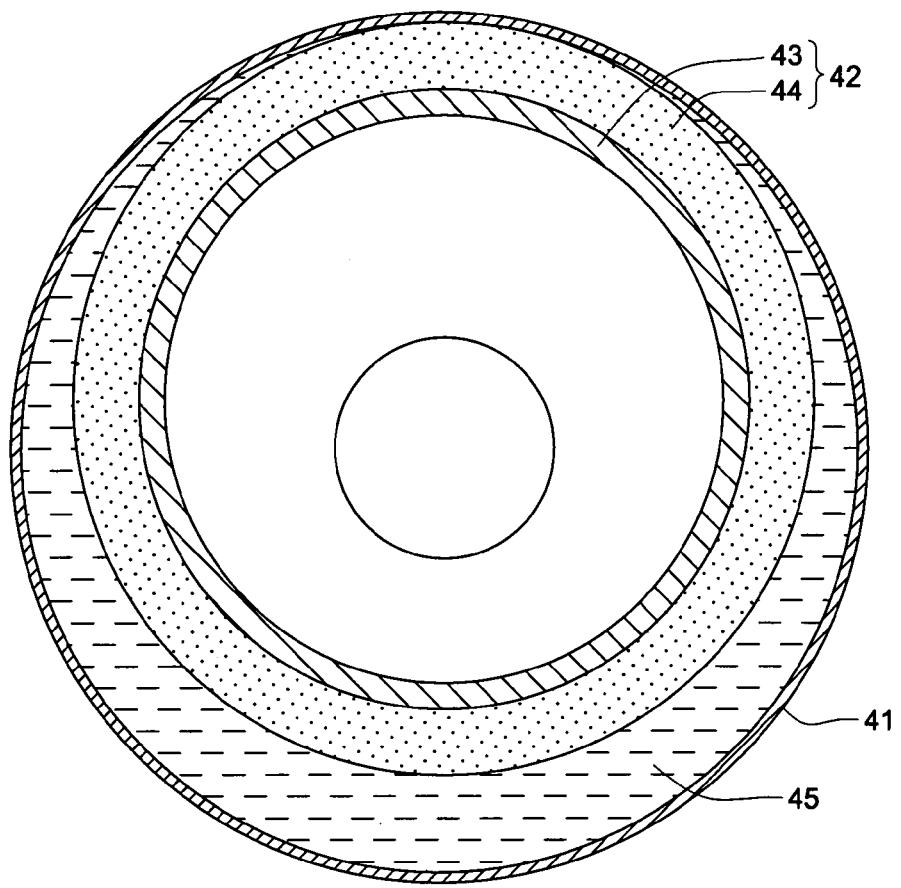
FIG. 4 is a cross-sectional view of the first embodiment of a sandwich press rotator.

FIG. 4 is a schematic cross section of the touch roll 6 as an embodiment of the present invention (hereinafter referred to as "touch roll A"). As illustrated, the touch roll A is made up of an elastic roller 42 arranged inside the flexible metallic sleeve 41.

The metallic sleeve 41 is made of a stainless steel having a thickness of 0.3 mm, and is characterized by a high degree of flexibility. If the metallic sleeve 41 is too thin, strength will be insufficient. If it is too thick, elasticity will be insufficient. Thus, the thickness of the metallic sleeve 41 is preferably 0.1 through 1.5 mm. The elastic roller 42 is a roll formed by installing a rubber 44 on the surface of the metallic inner sleeve 43 freely rotatable through a bearing. When the touch roll A is pressed against the first cooling roll 5, the elastic roller 42 presses the metallic sleeve 41 against the first cooling roll 5, and the metallic sleeve 41 and elastic roller 42 is deformed, conforming to the shape of the first cooling roll 5, whereby a nip is formed between this roll and the first cooling roll. The cooling water 45 is fed into the space formed inside the metallic sleeve 41 with the elastic roller 42.

Figure 5:
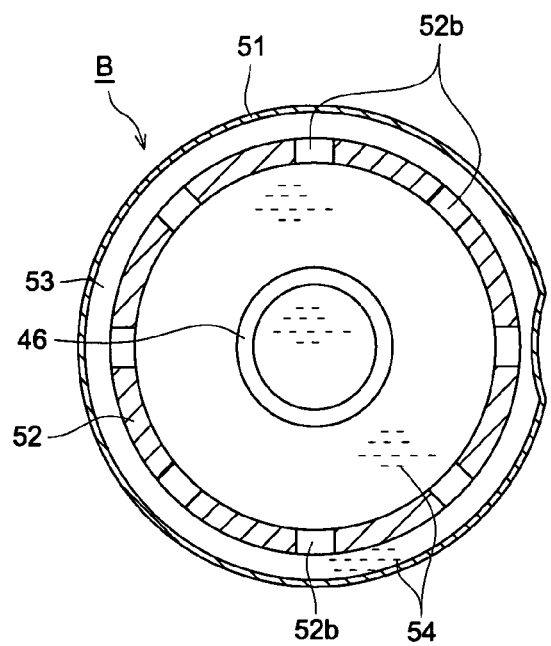
FIG. 5 is a cross-sectional view of the second embodiment of a sandwich press rotator at a plane perpendicular to the rotation axis.
Figure 6:
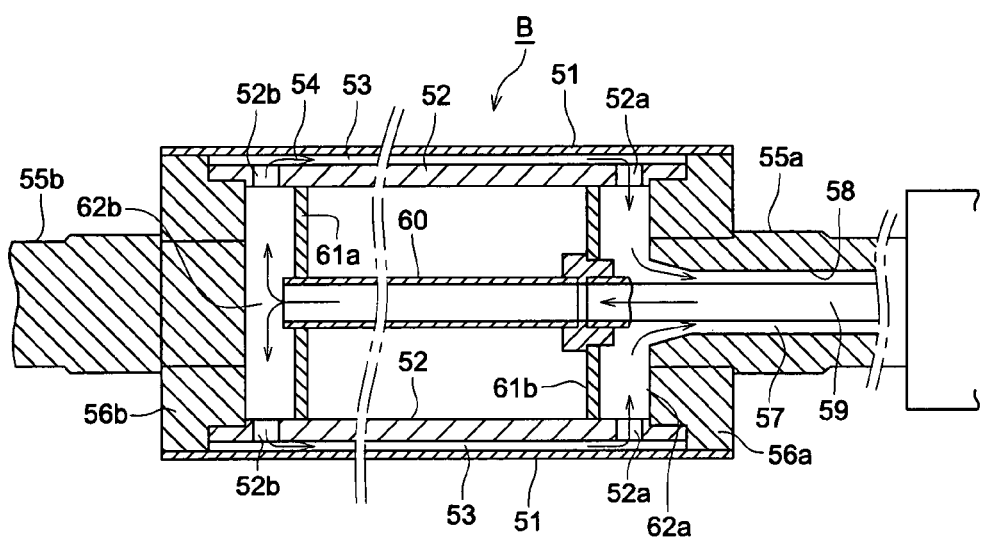
FIG. 6 is a cross-sectional view of the second embodiment of a sandwich press rotator at a plane including the rotation axis.

FIG. 5 and FIG. 6 show a touch roll B as another embodiment of the pressure rotary member. The touch roll B is formed of an outer sleeve 51 of flexible seamless stainless steel tube (having a thickness of 4 mm), and metallic inner sleeve 52 of high rigidity arranged coaxially inside this outer sleeve 51. Coolant 54 is led into the space 53 formed between the outer sleeve 51 and inner sleeve 52. To put it in greater details, the touch roll B is formed in such a way that the outer sleeve supporting flanges 56a and 56b are mounted on the rotary shafts 55a and 55b on both ends, and a thin-walled metallic outer sleeve 51 is mounted between the outer peripheral portions of these outer sleeve supporting flanges 56a and 56b. The fluid supply tube 59 is arranged coaxially inside the fluid outlet port 58 which is formed on the shaft center of the rotary shaft 55a and constitutes a fluid return passage 57. This fluid supply tube 59 is connected and fixed to the fluid shaft sleeve 60 arranged on the shaft center which is arranged inside the thin-walled metallic outer sleeve 51. Inner sleeve supporting flanges 61a and 61b are mounted on both ends of this fluid shaft sleeve 60, respectively. A metallic inner sleeve 52 having a wall thickness of about 15 through 20 mm is mounted in the range from the position between the outer peripheral portions of these inner sleeve supporting flanges 61a and 61b to the outer sleeve supporting flange 56b on the other end. For example, a coolant flow space 53 of about 10 mm is formed between this metallic inner sleeve 52 and thin-walled metallic outer sleeve 51. An outlet 52a and an inlet 52b communicating between the flow space 53 and intermediate passages 62a and 62b outside the inner sleeve supporting flanges 61a and 61b are formed on the metallic inner sleeves 52 close to both ends, respectively.

To provide pliability, flexibility and restoring force close to those of the rubber, the outer sleeve 51 is designed thin within the range permitted by the thin cylinder theory of elastic mechanics. The flexibility evaluated by the thin cylinder theory is expressed by wall thickness t/roll radium r. The smaller the t/r, the higher the flexibility. The flexibility of this touch roll B meets the optimum condition when $t/r \leq 0.03$. Normally, the commonly used touch roll has a roll diameter R=200 through 500 mm (roll radius r=R/2), a roll effective width L=500 through 1600 mm, and an oblong shape of r/L<1. As shown in FIG. 6, for example, when roll diameter R=300 mm and the roll effective width L=1200 mm, the suitable range of wall thickness t is 150×0.03=4.5 mm or less. When pressure is applied to the molten sheet width of 1300 mm at the average linear pressure of 98 N/cm, the wall thickness of the outer sleeve 51 is 3 mm. Then the corresponding spring constant becomes the same as that of the rubber roll of the same shape. The width k of the nip between the outer sleeve 51 and cooling roll in the direction of roll rotation is about 9 mm. This gives a value approximately close to the nip width of this rubber roll is about 12 mm, showing that pressure can be applied under the similar conditions. The amount of deflection in the nip width k is about 0.05 through 0.1 mm.

Here, $t/r \leq 0.03$ is assumed. In the case of the general roll diameter R=200 through 500 mm, sufficient flexibility is obtained if $2\ mm \leq t \leq 5$ mm in particular. Thickness can be easily reduced by machining. Thus, this is very practical range. If the wall thickness is 2 mm or less, high-precision machining cannot be achieved due to elastic deformation during the step of processing.

The equivalent value of this $2\ mm \leq t \leq 5$ mm can be expressed by $0.008 \leq t/r \leq 0.05$ for the general roll diameter. In practice, under the conditions of $t/r \approx 0.03$, wall thickness is preferably increased in proportion to the roll diameter. For example, selection is made within the range of t=2 through 3 mm for the roll diameter: R=200; and t=4 through 5 mm for the roll diameter: R=500.

These touch rolls A and B are energized toward the first cooling roll by the energizing section (not illustrated). The F/W (linear pressure) obtained by dividing the energizing force F of the energizing section by the width W of the film in the nip along the rotary shaft of the first cooling roll 5 is set at 9.8 through 147 N/cm. According to the present embodiment, a nip is formed between the touch rolls A and B, and the first cooling roll 5. Flatness should be corrected while the film passes through this nip. Thus, as compared to the cases where the touch roll is made of a rigid body, and no nip is formed between the touch roll and the first cooling roll, the film is sandwiched and pressed at a smaller linear pressure for a longer time. This arrangement ensures more reliable correction of flatness. To be more specific, if the linear pressure is smaller than 9.8 N/cm, the die line cannot be removed sufficiently. Conversely, if the linear pressure is greater than 147 N/cm, the film cannot easily pass through the nip. This will cause uneven thickness of the film.

The surfaces of the touch rolls A and B are made of metal. This provides smooth surfaces of the touch rolls A and B, as compared to the case where touch rolls have rubber surfaces. The elastic body 44 of the elastic roller 42 can be made of ethylene propylene rubber, neoprene rubber, silicone rubber or the like.

To ensure that the die line is removed sufficiently by the touch roll 6, it is important that the film viscosity should lie within the appropriate range when the film is sandwiched and pressed by the touch roll 6. Further, cellulose ester is known to be affected by temperature to a comparatively high degree. Thus, to set the viscosity within an appropriate range when the cellulose ester film is sandwiched and pressed by the touch roll 6, it is important to set the film temperature within an appropriate range when the cellulose ester film is sandwiched and pressed by the touch roll 6. When the glass-transition temperature of the cellulose ester film is assumed as Tg, the temperature T of the film immediately before the film is sandwiched and pressed by the touch roll 6 is preferably set in such a way that $Tg<T<Tg+110°$ C. can be met. If the film temperature T is lower than T, the viscosity of the film will be too high to correct the die line. Conversely, if the film temperature T is higher than $Tg+110°$ C., uniform adhesion between the film surface and roll cannot be achieved, and the die line cannot be corrected. This temperature is preferably $Tg+10°$ C.$<T<Tg+90°$ C., more preferably $Tg+20°$ C.$<T<Tg+70°$ C. To set the film temperature within the appropriate range when the cellulose ester film is sandwiched and pressed by the touch roll 6, one has only to adjust the length L of the nip between the first cooling roll 5 and touch roll 6 along the rotating direction of the first cooling roll 5, from the position P1 wherein the melt pressed out of the flow casting die 4 comes in contact with the first cooling roll 5.

In the present invention, the material preferably used for the first roll 5 and second roll 6 is exemplified by carbon steel, stainless steel and resin. The surface accuracy is preferably set at a higher level. In terms of surface roughness, it is preferably set to 0.3 S or less, more preferably 0.01 S or less.

In the present invention, the portion from the opening (lip) of the flow casting die 4 to the first roll 5 is reduced to 70 kPa or less. This procedure has been found out to correct the die line effectively. Pressure reduction is preferably 50 through 70 kPa. There is no restriction to the method of ensuring that the pressure in the portion from the opening (lip) of the flow casting die 4 to the first roll 5 is kept at 70 kPa or less. One of the methods is to reduce the pressure by using a pressure-resistant member to cover the portion from the flow casting die 4 to the periphery of the roll. In this case, the vacuum suction machine is preferably heated by a heater or the like to ensure that a sublimate will be deposited on the vacuum suction machine. In the present invention, if the suction pressure is too small, the sublimate cannot be sucked effectively. To prevent this, adequate suction pressure must be utilized.

In the present invention, the film-like cellulose ester based resin in the molten state from the T-die 4 is conveyed in contact with the first roll (the first cooling roll) 5, second cooling roll 7, and third cooling roll 8 sequentially, and is cooled and solidified, whereby an unoriented cellulose ester based resin film 10 is produced.

In the embodiment of the present invention shown in FIG. 1, the unoriented film 10 cooled, solidified and peeled from the third cooling roll 8 by the peeling roll 9 is passed through a dancer roll (film tension adjusting roll) 11, and is led to the stretching machine 12, wherein the film 10 is stretched in the lateral direction (across the width). This stretching operation orients the molecules in the film.

A known tender or the like can be preferably used to stretch the film across the width. Especially when the film is stretched across the width, the lamination with the polarized film can be preferably realized in the form of a roll stretching across the width ensures that the slow axis of the cellulose ester film made up of a cellulose ester based resin film is found across the width.

In the meantime, the transmission axis of the polarized film also lies across the width normally. If the polarizing plate wherein the transmission axis of the polarized film and the slow axis of the optical film will be parallel to each other is incorporated in the liquid crystal display, the display contrast of the liquid crystal display can be increased and an excellent viewing angle is obtained.

The glass transition temperature Tg of the film constituting material can be controlled when the types of the materials constituting the film and the proportion of the constituent materials are made different. When the retardation film is manufactured as a cellulose ester film, Tg is 120° C. or more, preferably 135° C. or more. In the liquid crystal display, the film temperature environment is changed in the image display mode by the temperature rise of the apparatus per se, for example, by the temperature rise caused by a light source. In this case, if the Tg of the film is lower than the film working environment temperature, a big change will occur to the retardation value and film geometry resulting from the orientation status of the molecules fixed in the film by stretching. If the Tg of the film is too high, temperature is raised when the film constituting material is formed into a film. This will increase the amount of energy consumed for heating. Further, the material may be decomposed at the time of forming a film, and this may cause coloring. Thus, Tg is preferably kept at 250° C. or less.

The process of cooling and relaxation under a known thermal setting conditions can be applied in the stretching process. Appropriate adjustment should be made to obtain the characteristics required for the intended optical film.

The aforementioned stretching process and thermal setting process are applied as appropriate on an selective basis to provide the retardation film function for the purpose of improving the physical properties of the retardation film and to increase the viewing angle in the liquid crystal display. When such a stretching process and thermal setting process are included, the heating and pressing process should be performed prior to the stretching process and thermal setting process.

When a retardation film is produced as a cellulose ester film, and the functions of the polarizer protective film are combined, control of the refractive index is essential. The refractive index control can be provided by the process of stretching. The process of stretching is preferred. The following describes the method for stretching:

In the retardation film stretching process, the retardations Ro and Rth can be controlled and the flatness of the film can be improved by stretching at a stretch ratio of 1.0 through 2.0 times in one direction of the cellulose ester film, and at a stretch ratio of 1.01 through 2.5 times in the direction perpendicular to the above direction. Here Ro denotes an in-plane retardation. It is obtained by multiplying the thickness by the difference between the refractive index in the longitudinal direction MD in the same plane and that across the width TD. Rth denotes the retardation along the thickness, and is obtained by multiplying the thickness by the difference between the refractive index (an average of the values in the longitudinal direction MD and across the width TD) in the same plane and that along the thickness. Ro and Rth are represented by the following equations:

$$Ro=(nx-ny) \times d$$

$$Rth=\{(nx+ny)/2-nz\} \times d$$

(wherein, nx is a refractive index in the slow axis direction in the film plane, ny is a refractive index in the fast axis direction in the film plane, nz is a refractive index in the thickness direction of the film and d is a thickness of film (nm).)

Stretching can be performed sequentially or simultaneously, for example, in the longitudinal direction of the film and in the direction perpendicular thereto in the same plane of the film, namely, across the width. In this case, if the stretching ratio at least in one direction is insufficient, sufficient retardation cannot be obtained. If it is excessive, stretching difficulties may occur and the film may break.

Stretching in the biaxial directions perpendicular to each other is an effectively way for keeping the film refractive indexes nx, ny and nz within a predetermined range. Here nx denotes a refractive index in the longitudinal direction MD, ny indicates that across the width TD, and nz represents that along the thickness.

When the material is stretched in the melt-casting direction, the nz value will be excessive if there is excessive shrinkage across the width. This can be improved by controlling the shrinkage of the film across the width or by stretching across the width. In the case of stretching across the width, distribution may occur to the refractive index across the width. This distribution may appear when a tenter method is utilized. Stretching of the film across the width causes shrinkage force to appear at the center of the film because the ends are fixed in position. This is considered to be what is called "bowing". In this case, bowing can be controlled by stretching in the casting direction, and the distribution of the retardation across the width can be reduced.

Stretching in the biaxial directions perpendicular to each other reduces the fluctuation in the thickness of the obtained film. Excessive fluctuation in the thickness of the retardation film will cause irregularity in retardation. When used for liquid crystal display, irregularity in coloring or the like will occur.

The fluctuation in the thickness of the cellulose ester film along the longitudinal direction and the lateral direction of the film is preferably kept within the range of ±3%, preferably ±1%. To achieve the aforementioned object, it is effective to use the method of stretching in the biaxial directions perpendicular to each other. The magnification rate of stretching in the biaxial directions perpendicular to each other is preferably 1.0 through 2.0 times in the casting direction, and 1.01 through 2.5 times across the width. Stretching in the range of 1.01 through 1.5 times in the casting direction and in the range of 1.05 through 2.0 times across the width will be more preferred to get a retardation value.

When the absorption axis of the polarizer is present in the longitudinal direction, matching of the transmission axis of the polarizer is found across the width. To get a longer polarizing plate, the retardation film is preferably stretched so as to get a slow axis across the width.

When using the cellulose ester to get positive double refraction with respect to stress, stretching across the width will provide the slow axis of the retardation film across the width because of the aforementioned arrangement. In this case, to improve display quality, the slow axis of the retardation film is preferably located across the width. To get the target retardation value, it is necessary to meet the following condition:

(Stretching magnification across the width)>(stretching magnification in casting direction)

After stretching, the end of the film is trimmed off by a slitter 13 to a width predetermined for the product. Then both ends of the film are knurled (embossed) by a knurling apparatus made up of an emboss ring 14 and back roll 15, and the film is wound by a winder 16. This arrangement prevents sticking in the cellulose ester film F (master winding) or scratch. Knurling can be provided by heating and pressing a metallic ring having a pattern of projections and depressions on the lateral surface. The gripping portions of the clips on both ends of the film are normally deformed and cannot be used as a film product. They are therefore cut out and are recycled as a material.

In the film winding process, the film is wound on the winding roll while the shortest distance between the outer peripheral surface of the cylindrically wound film and the outer peripheral surface of the traveling type conveyance roll immediately before is kept at a minimum. Further, the front side of the winding roll is provided with a blower or the like that removes or reduces the potential on the film surface.

The winding machine to be used in the manufacture of a polarizer protective film of the present invention can be the one commonly employed. The film can be wound according to such a winding method as a constant tension method, constant torque method, taper tension method, and program tension control method of constant internal stress. In this case, the initial winding tension at the time of winding the polarizer protective film is preferably 90.2 through 300.8 N/m.

In the film winding process of the present invention, the film is wound preferably at a temperature of 20° C. through 30° C., with a relative humidity of 20% through 60% RH. When the temperature and humidity in the film winding process are controlled in this manner, the resistance of the retardation (Rth) along the length against the fluctuation in humidity can be improved.

If the temperature in the winding process is less than 20° C., wrinkles will occur and film winding quality is deteriorated so that the film cannot be put into practical use. This must be avoided. If the temperature in the film winding process has exceeded 30° C., wrinkles will also occur and film winding quality is deteriorated so that the film cannot be put into practical use. This must be avoided.

If the humidity in the film winding process is less than 20% RH, electrostatic charge will occur easily and the film winding quality is deteriorated so that the film cannot be put into practical use. If the humidity in the film winding process has exceeded 60% RH, the winding quality, sticking trouble and conveyance property will be deteriorated.

When the polarizer protective film is wound in a roll, any core located on the cylinder can be used as a winding core. It is preferably a hollow plastic core. Any material can be used as a plastic material, if it is a heat resistant plastic material capable of resisting the temperature at the time of heating. It can be exemplified by phenol resin, xylene resin, melamine resin, polyester resin, and epoxy resin. The thermosetting resin reinforced by such a filler as a glass fiber is preferably used, and is exemplified by a hollow plastic winding ore of FRP having an outer diameter of 6 inches (hereinafter an inch is equivalent to 2.54 cm) and an inner diameter of 5 inches.

The number of turns on such a winding core is preferably 100 or more, more preferably 500. The winding width is preferably 5 cm or more. The length of the film is 500-10000 m. The width of the film of the present invention is preferably 1-5 m and more preferably 1.5-4 m. It is also preferably carried out that a wide film is formed first and then slit to obtain 2-3 rolls of film.

The thickness of the polarizer protective film of the present invention is preferably 10-500 μm, more preferably 20-150 μm and specifically preferably 25-90 μm. When the retardation film is a polarizer protective film, the thickness of the protective film is preferably 10 through 500 μm. In particular, the lower limit is 20 μm, preferably 35 μm. The upper limit is 150 μm, preferably 120 μm. The particularly preferred range is 25 through 90 μm. If the polarizer protective film is too thick, the polarizing plate subsequent to machining will be too thick. This fails to meet low-profile light weight requirements when employed in the liquid crystal display for a notebook PC or mobile type electronic equipment. Conversely, if the retardation film is too thin, retardation as a retardation film cannot occur easily. Further, the film moisture permeability will be increased, with the result that the polarizer cannot be effectively protected from moisture. This must be avoided.

The polarizer protective film preferably has a slow axis or a fast axis in the film plane. When the angle formed between the casting direction of the film and the slow axis or the fast axis is expressed as θ1, θ1 is preferably −1° to +1°, and more preferably −0.5° to +0.5°. Specifically, when the polarizer protective film provides a retardation function, θ1 is preferably −0.1° to +0.1°

This θ1 can be defined as an orientation angle. It can be measured by an automatic double refractometer KOBRA-21ADH (by Oji Scientific Instruments).

If θ1 meets the aforementioned formula, a high degree of brightness is ensured in the display image and a leakage of light is reduced or prevented, with the result that faithful color representation is provided in the color liquid crystal display.

The polarizer protective film of the present invention is preferably used as a retardation film. When the retardation film is used in the multiple-domain VA mode, the retardation film is arranged in the aforementioned range wherein the fast axis of the retardation film is θ1. This arrangement improves the display quality of the image.

Figure 7:
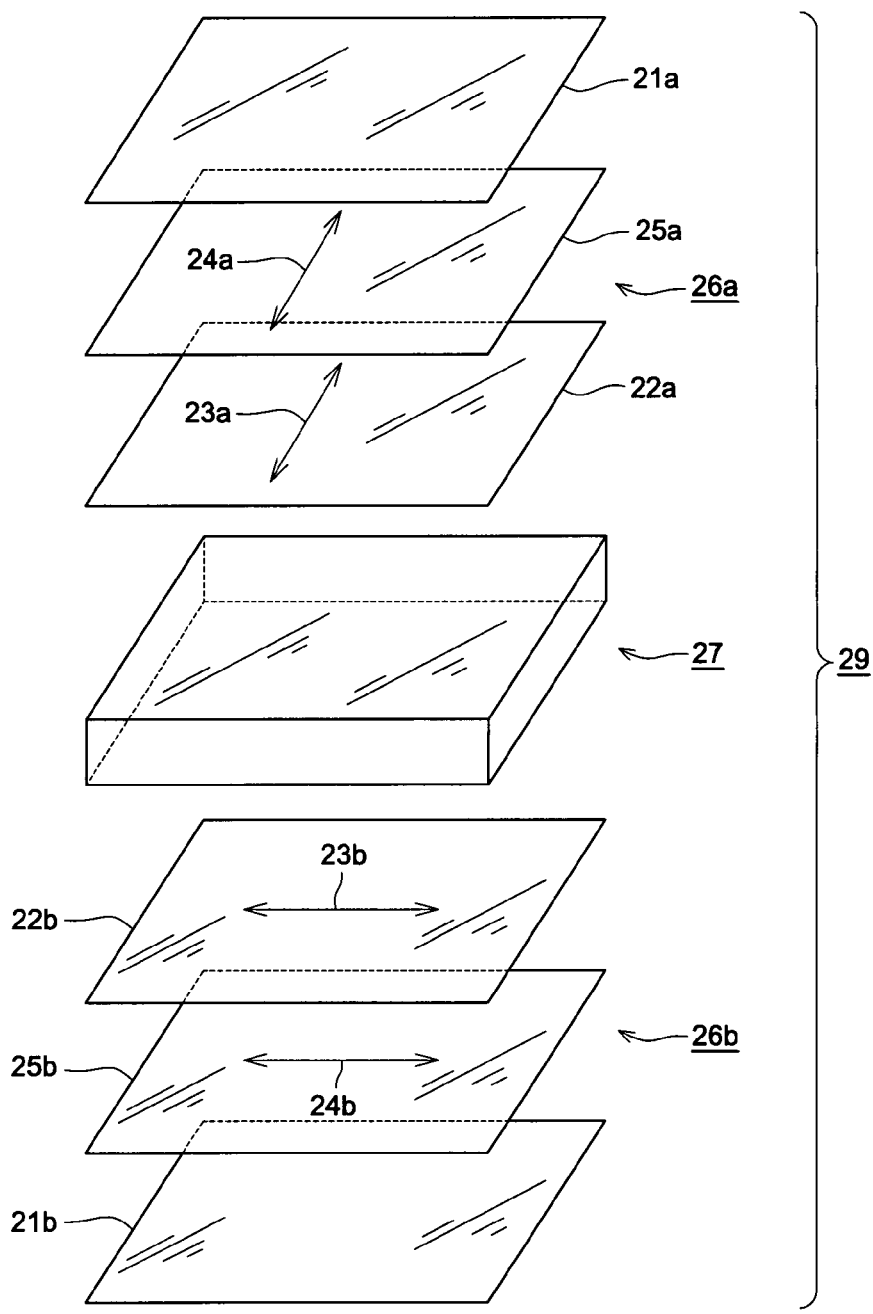
FIG. 7 is an analytical oblique view to show a brief constitution of a liquid crystal display.

In FIG. 7, the reference numerals 21a and 21b indicate protective films, 22a and 22b represent retardation films, 25a and 25b show polarizers, 23a and 23b indicate the slow axis directions of the film, 24a and 24b show the directions of the polarizer transmission axis, 26a and 26b denote polarizing plates, 27 shows a liquid crystal cell, and 29 denotes a liquid crystal display.

The distribution of the retardation Ro in the in-plane direction of the cellulose ester film is adjusted to preferably 5% or less, more preferably 2% or less, still more preferably 1.5% or less. Further, the distribution of retardation Rth along the thickness of the film is adjusted to preferably 10% or less, more preferably 2% or less, still more preferably 1.5% or less.

In the retardation film, the fluctuation in the distribution of the retardation value is preferred to be as small as possible. When a polarizing plate containing the retardation film is used in the liquid crystal display, a smaller fluctuation in the distribution of the aforementioned retardation distribution is preferred for the purpose of preventing color irregularity.

In order to adjust the retardation film so as to provide the retardation value suited for improvement of the display quality of the liquid crystal cell in the VA mode or TN mode and to divide into the aforementioned multi-domain especially in the VA mode for preferable use in the MVA mode, adjustment is preferably made to ensure that the in-plane retardation Ro is greater than 30 nm without exceeding 95 nm, and retardation Rth along the thickness is greater than 70 nm without exceeding 400 nm.

The aforementioned in-plane retardation Ro has the following function: In the configuration shown in FIG. 7 wherein two polarizing plates are arranged in a crossed-Nicols configuration and a liquid crystal cell is arranged between the polarizing plates, assume a crossed-Nicols configuration with respect to the standard wherein observation is made from the direction normal to the display surface. When viewed obliquely from the line normal to the display surface, a deviation occurs from the crossed-Nicols arrangement of the polarizing plate, and causes the leakage of light. This leakage is mainly compensated for by the aforementioned in-plane retardation Ro. In the aforementioned TN mode and VA mode, particularly in the MVA mode, when the liquid crystal cell is set to the black-and-white display mode, the retardation along the thickness mainly compensates for the double refraction of the liquid crystal cell recognized when viewed obliquely in the same manner as above.

As shown in FIG. 7, when two polarizing plates are arranged on the upper and lower portions of the liquid crystal cell in the liquid crystal display, the reference numerals 22a and 22b in FIG. 7 are cable of selecting the distribution of retardation Rth along the thickness. It is preferred to ensure that the requirements of the aforementioned range are met, and the total of both retardations Rth along the thickness is preferably greater than 140 nm without exceeding 500 nm. In this case, the in-plane retardation Ro of the 22a and 22b and retardation Rth along the thickness retardation Rth are the same. This is preferred to improve the productivity of industrial polarizing plates. It is particularly preferred that the in-plane retardation Ro is greater than 35 nm without exceeding 65 nm, the retardation Rth along the thickness retardation Rth is greater than 90 nm without exceeding 180 nm, and the structure shown in FIG. 7 is applied to the liquid crystal cell in the MVA mode.

In the liquid crystal display, assume that the TAC film having an in-plane retardation Ro of 0 through 4 nm, a retardation Rth along the thickness of 20 through 50 nm and a thickness of 35 through 85 μm is used at the position 22b in FIG. 7 as one of the polarizing plates, for example, as a commercially available polarizer protective film. In this case, the polarizing film arranged on the other polarizing plate, for example, the polarizing film arranged in 22a of FIG. 7 is preferred to have an in-plane retardation Ro of greater than 30 nm without exceeding 95 nm, and the retardation Rth along the thickness of greater than 140 nm without exceeding 400 nm. This arrangement improves the display quality and film productivity.

<Liquid Crystal Display>

The polarizing plate including the polarizer protective film of the present invention provides higher display quality than the normal polarizing plate. This is particularly suited for use in a multi-domain type liquid crystal display, more preferably to the multi-domain type liquid crystal display in the double refraction mode.

The polarizing plate of the present invention of the present invention can be used in the MVA (Multi-domain Vertical Alignment) mode, PVA (Patterned Vertical Alignment) mode, CPA (Continuous Pinwheel Alignment) mode and OCB (Optical Compensated Bend) mode, without being restricted to a specific liquid crystal mode or polarizing plate arrangement.

The liquid crystal display is coming into practical use as a colored and animation display. The display quality is improved by the present invention. The improved contrast and enhanced polarizing plate durability ensure faithful animation image display without easy fatigue on the part of the viewer.

In the liquid crystal display containing at least the polarizing plate incorporating a retardation film, one polarizing plate containing the polarizer protective film of the present invention is arranged on the liquid crystal cell, or two polarizing plates are arranged on both sides of the liquid crystal cell. In this case, the display quality is improved when means are provided to ensure that the side of the polarizer protective film of the present invention contained in the polarizing plate faces the liquid crystal cell of the liquid crystal display. Then the films 22a and 22b of FIG. 7 face the liquid crystal cell of the liquid crystal display.

In the aforementioned structure, the polarizer protective film of the present invention provides optical compensation of the liquid crystal cell. When the polarizing plate of the present invention is used in the liquid crystal display, at least one of the polarizing plates of the liquid crystal display should be used as a polarizing plate of the present invention. Use of the polarizing plate of the present invention improves the display quality and provides a liquid crystal display having excellent viewing angle.

In the polarizing plate of the present invention, a polarizer protective film of cellulose derivative is used on the surface opposite the polarizer protective film of the present invention as viewed from the polarizer. A general-purpose TAC film or the like can be employed. The polarizer protective film located far from the liquid crystal cell can be provided with another functional layer for the purpose of improving the quality of the display. The polarizer protective film of the present invention can also be preferably used for such a purpose described above.

For example, the polarizer protective film of the present invention may contain or may be adhered with a layer having a function of, for example, antireflectioin, antiglare, scratch resistance, antidust or luminance enhancement, which are commonly known as functions to be provided for a display, however, the present invention is not limited thereto.

Generally, to ensure stable optical characteristics, the retardation film is desired to exhibit small fluctuations in the Ro or Rth as the aforementioned retardation value. Especially, these fluctuations may cause irregularities of an image in the liquid crystal display in the double refraction mode.

The polarizer protective film manufactured in the present invention is mainly made of a cellulose resin. This arrangement makes it possible to use the process of alkaline treatment based on the saponification inherent to the cellulose ester. Similarly to the case of the conventional polarizer protective film, this can be bonded with the polarizer protective film, using an aqueous solution containing a completely saponified polyvinyl alcohol, when the resin constituting the polarizer is polyvinyl alcohol. Thus, the embodiment of the present invention is superior in that the conventional method for manufacturing the polarizing plate can be applied. It is especially advantageous in that a longer roll polarizing plate can be obtained.

The production advantage of the present invention is remarkable especially in the case of a longer roll in excess of 100 meters. Greater advantages are observed in the production of a polarizing plate when it is longer, for example, in the order of 1500 m, 2500 m and 5000 m.

For example, in the production of a polarizer protective film, the roll length is 1000-6000 m and preferably 1000-4500 m, when the productivity and transportability are taken into account. The width of the film in this case can be selected to suit the width of the polarizer or the width suitable for the production line. It is possible to produce a film having a width of 0.5 m or more without exceeding 4.0 m, preferably 0.6 m or more without exceeding 3.0 m, and to wind the film in the form of a roll, which can be used to process a polarizing plate. It is also possible to manufacture a film having a width twice or more as great as the intended width, and to wind it in the form of a roll, which is cut to get the roll of an intended width. This roll can be used to process the polarizing plate.

When manufacturing the polarizer protective film, a functional layer such as antistatic layer, hard coated layer, lubricant layer, adhesive layer, antiglare layer and barrier layer can be coated before and/or after stretching. In this case, various forms of surface treatment such as corona discharging, plasma processing, medical fluid treatment can be provided if necessary.

In the film making process, the gripping portions of the clips on both ends of the film having been cut can be recycled as the material of the same type or different type of films, after having been pulverized, or after having been palletized as required.

A cellulose ester film of lamination structure can be produced by co-extrusion of the compositions containing cellulose esters having different concentrations of additives such as the aforementioned plasticizer, ultraviolet absorber and matting agent. For example, a cellulose ester film made up of a skin layer, core layer and skin layer can be produced. For example, a large quantity of matting agent can be put into the skin layer or the matting agent can be put only into the skin layer. Larger amounts of plasticizer and ultraviolet absorber can be put into the core layer than the skin layer. They can be put only in the core layer. Further, the types of the plasticizer and ultraviolet absorber can be changed in response to the core layer or skin layer. For example, it is also possible to make such arrangements that the skin layer contains a plasticizer and/or ultraviolet absorber of lower volatility, and the core layer contains a plasticizer of excellent plasticity or an ultraviolet absorber of excellent ultraviolet absorbing performance. The glass transition temperatures between the skin layer and core layer can be different from each other. The glass transition temperature of the core layer is preferably lower than that of the skin layer. In this case, the glass transition temperatures of both the skin and core are measured, and the average value obtained by calculation from the volume fraction thereof is defined as the aforementioned glass transition temperature Tg so that it is handled in the same manner. Further, the viscosity of the melt including the cellulose ester at the time of melt-casting can be different according to the skin layer or core layer. The viscosity of the skin layer can be greater than that of the core layer. Alternatively, the viscosity of the core layer can be equal to or greater than that of the skin layer.

In the cellulose ester film of the present invention, assume that the dimensional stability is based on the standard dimensions of the film which has been left to stand for 24 hours at a temperature of 23° C. with a relative humidity of 55% RH. On this assumption, the dimensional stability of the cellulose ester film of the present invention is such that the fluctuation of the dimension at 80° C. and 90% RH is within ±2.0% (excl.), preferably within ±1.0% (excl.), more preferably within ±0.5% (excl.).

The cellulose ester film of the present invention, particularly the cellulose ester film, is used as a polarizer protective film, there is no restriction to the method of producing the polarizing plate. The polarizing plate can be manufactured by a commonly used method. The cellulose ester film having been obtained is subjected to alkaline treatment. In one method, using an aqueous solution of completely saponified polyvinyl alcohol, the polarizer protective film is adhered on both surfaces of the polarizer manufactured by immersion of the polyvinyl alcohol film in an iodonium solution. When this method is used, the polarizer protective film of the present invention is directly adhered to at least one of the surfaces of the polarizer. It is possible to adhere the polarizer protective film of the present invention also on the other surface of the polarizer, however, alternatively, the following film may be adhered on the other surface of the polarizer: for example, a commercial cellulose ester film produced by a solution cast method (Konica Minolta TAC, for example, KC8UX2M, KC4UX, KC5UX, KC4UY, KC8UY, KC12UR, KC8UCR-3, KC8UCR-4, KC8UCR-5, KC4FR-1, KC4FR-2, KC4FR-3, KC4UE, KC8UE, KC8UY-HA, KC8UX-RHA, KC8UXW-RHA-C, KC8UXW-RHA-NC and KC4UXW-RHA-NC produced by Konica Minolta Opto, Inc.), a polyester film or a cycloolefin film (ARTON film, produced by JSR Co., or ZEONOA film, produced by Nihon Zeon Co.), the thickness of the film being 10-150 μm.

Instead of the aforementioned alkaline treatment, the film can be provided with simplified adhesion as disclosed in JP-A Nos. 6-94915 and 6-118232.

The polarizing plate is made of a polarizer and a protective film for covering both surfaces thereof. Further, a protective film can be bonded onto one of the surfaces of the aforementioned polarizing plate and a separate film can be bonded on the opposite surface. The protective film and separate film are used to protect the polarizing plate at the time of product inspection before shipment of the polarizing plate. In this case, the protective film is bonded to protect the surface of the polarizing plate, and is used on the surface opposite to the surface wherein the polarizing plate is bonded to the liquid crystal substrate. Further, the separate film is used to cover the adhesive layer to be bonded to the liquid crystal substrate, and is used on the surface wherein the polarizing plate is bonded to the liquid crystal cell.

The polarizer as the major component of the polarizing plate is an element that allows the passage of only the light on the plane of polarization in a predetermined direction. The typical polarizer currently known is a polyvinyl alcohol film such as a ethylenically modified polyvinyl alcohol, having an ethylene unit content (or polyvinyl alcohol content) of 1-4 mol %, polymerization degree of 2000-4000 and saponification degree of 99.0-99.99 mol %, which is stained by iodine, a dichromatic dye. The polarizer is produced as follows: A film is formed from an aqueous solution containing polyvinyl alcohol. This is either stained after having been stretched uniaxially, or stretched uniaxially after having been stained. Preferably, the film is treated by a boric acid compound to improve durability. One surface of the polarizer protective film of the present invention is adhered on the surface of this polarizer, whereby a polarizing plate is produced. An aqueous adhesive mainly made up of completely saponified polyvinyl alcohol is preferably used for the adhesion. The polarizer film preferably used has a thickness of 5 through 30 μm.

EXAMPLES

In the following, the present invention will be specifically explained referring to examples, however, the present invention is not limited thereto.

Cellulose esters, plasticizers and additives, which will be utilized in the following examples, were synthesized according to following synthesis examples 1-11.

Synthesis Example 1

Cellulose Ester

Referring to the method disclosed in example B of Japanese Translation of PCT International Application Publication No. 6-501040, three cellulose esters having the following acetyl substitution degrees and propionyl substitution degrees were synthesized by adjusting the adding amounts of propionic acid and acetic acid.

C-1: acetyl substitution degree 1.4, propionyl substitution degree 1.4, and total acyl substitution degree 2.8

C-2: acetyl substitution degree 1.5, propionyl substitution degree 1.3, and total acyl substitution degree 2.8

C-3: acetyl substitution degree 1.4, propionyl substitution degree 1.3, and total acyl substitution degree 2.7

The substitution degrees of thus obtained cellulose esters were calculated according to the method of ASTM-D817-96.

Synthesis Example 2

Synthesis of Plasticizer and Trimethylolpropane Tribenzoate (TMPTB)

A mixed solution of 45 weight parts of trimethylolpropane and 101 weight parts of triethylamine kept at 100° C. was titrated with 71 weight parts of benzoyl chloride over 30 minutes while stirring, and the resulting solution was further stirred for 30 minutes. The resulting mixture was cooled to room temperature after finishing the reaction and the precipitate was filtered. Then, the filtrate was washed by addition of ethyl acetate pure water; the organic phase was separated and ethyl acetate was removed by evaporation under reduced pressure; whereby 126 weight parts (yield of 85%) of white crystals were obtained. Herein, the molecular weight of this compound was 446.

Synthesis Example 3

Plasticizer, Compound Example 48

A mixed solution, comprising 36 weight parts of trimethylol propane, 107 weight parts of pyridine and 300 weight parts of ethyl acetate, kept at 10° C. was titrated with a solution, in which 250 weight parts of 3,4,5-trimethoxybenzoyl chloride were dissolved in 300 weight parts of ethyl acetate, over 30 minutes while stirring, followed by being heated to 80° C. and stirred for 5 hours. After finishing the reaction, the resulting mixture was cooled to room temperature and the precipitate was filtered. After the filtrate was washed by addition of 1 mol/L HCl aqueous solution, followed by being further washed by addition of 1% $Na_2CO_3$ aqueous solution, the organic phase was separated and the organic solvents were eliminated by evaporation under reduced pressure, whereby 153 weight parts (yield of 80%) of white crystals were prepared. Herein the molecular weight of this compound was 717.

Synthesis Example 4

Plasticizer, Compound Example 51

Into a mixed solution of 54 weight parts of 2-hydroxymethyl-propane-1,3-diol, 190 weight parts of pyridine and 450 weight parts of ethyl acetate, kept at 10° C., 240 weight parts of benzoylchloride was dropped for over 30 minutes while stirring, followed by being heated to 80° C. and stirred for 3 hours. After the reaction was completed, the resulting mixture was cooled to room temperature and the precipitate was filtered. After the filtrate was washed with a mixture of ethyl acetate-pure water, the organic phase was separated and ethyl acetate was eliminated by evaporation under reduced pressure, whereby target compound was obtained. The molecular weight of the compound was 675.

Synthesis Example 5

Plasticizer, Compound Example 62

Into a mixed solution of 45 weight parts of 2-hydroxymethyl-propane-1,3-diol, 190 weight parts of pyridine and 450 weight parts of ethyl acetate, kept at 10° C., 390 weight parts of p-methoxybenzoylchloride was dropped for over 30 minutes while stirring, followed by being heated to 80° C. and stirred for 3 hours. After the reaction was completed, the resulting mixture was cooled to room temperature and the precipitate was filtered. After the filtrate was washed by addition of 1 mol/L HCl aqueous solution, followed by being further washed by addition of 1% Na$_2$CO$_3$ aqueous solution, the organic phase was separated and ethyl acetate was eliminated by evaporation under reduced pressure, whereby target compound was obtained. The molecular weight of the compound was 494.

Synthesis Example 6

Compound Represented by Formula (R), Compound 101

5,7-di-tert-Bu-3-(2,5-dimethylphenyl)-3H-benzofuran-2-one (compound 101) was synthesized starting from 5,7-di-tert-Bu-3-hydroxy-3H-benzofuran-2-one, p-xylene and Fulcat 22B as a catalyst.

a) Synthesis of 5,7-di-tert-Bu-3-hydroxy-3H-benzofuran-2-one 2,4-di-tert-Bu-phenol (97%) of 212.5 g (1.00 mol), 163.0 g (1.10 mol) of 50% water based glyoxylic acid and 0.5 g (2.6 mmol) of p-toluene sulfonic acid monohydrate in 300 ml of 1,2-dichloroethane were refluxed on a water separator in a nitrogen gas flow for 3.5 hours. Thereafter, the reaction mixture was concentrated by use of a reduced pressure rotary evaporator. The residue was dissolved in 800 ml of hexane and washed by water three times. In a separating funnel, the water phase was separated and further extracted by 300 ml of hexane. The organic phase was collected to be dried with magnesium sulfate and concentrated by a reduced pressure evaporator. Analytically purified 5,7-di-tert-Bu-3-hydroxy-3H-benzofuran-2-one of 262.3 g (approximately 100%), which had a deep yellow resin form, were prepared from the residue.

b) Synthesis of 5,7-di-tert-Bu-3-(2,5-dimethylphenyl)-3H-benzofuran-2-one (Compound 101)

A solution of 5,7-di-tert-Bu-3-(2,5-dimethylphenyl)-3-hydroxy-3H-benzofuran-2-one of 262.3 g (1.00 mol) in 500 ml of p-xylene (4.05 mol) was added with 40 g of Fulcat 22B, and the mixture was refluxed for 1.5 hours on a water separator. Next Fulcat 22B catalyst was removed by filtration and excess p-xylene was removed by use of a reduced pressure evaporator. 5,7-di-tert-Bu-3-(2,5-dimethylphenyl)-3H-benzofuran-2-one (Compound 101) having a melting point of 93-97° C., of 280.6 g (yield of 80%) was obtained by crystallization of the residue with 400 ml of methanol.

Synthesis Example 7

Synthesis of a Compound Represented by Formula (R); Mixture of Compounds 103 and 103A An approximately 5.7:1 mixture of 3-(3,4-dimethylphenyl)-5,7-di-tert-Bu-3H-benzofuran-2-one (compound 103) and 3-(2,3-dimethylphenyl)-5,7-di-tert-Bu-3H-benzofuran-2-one isomer (compound 103A) were synthesized stating from 2,4-di-tert-Bu-phenol, glyoxylic acid, o-xylene, and Fulcat or Fulmont as a catalyst.

2,4-di-tert-Bu-phenol of 206.3 g (1.0 mol), 485 g (5.5 mol) of o-xylene, 0.5 g (2.6 mmol) of p-toluene sulfonic acid monohydrate and 163 g (1.1 mol) of 50% water-based glyoxylic acid were charged in a 1500 ml double layer reactor equipped with a water separator. The mixture was heated to 85-90° C. with stirring and the equipment was simultaneously evacuated at approximately 450 mbar. Immediately when the temperature in the reactor reached 85-90° C., o-xylene began to be evaporated and refluxed while water was eliminated from the system. The pressure was continuously raised to keep the temperature of the reactor at 85-90° C., and all the water of approximately 90-100 ml was evaporated over 3-4 hours. Reduced pressure was released by nitrogen, and 40 g of a catalyst (Fulcat 30 or 40, or Fulmont XMP-3 or XMP-4) were added to the transparent yellow solution. The equipment was evacuated at 700 mbar and the suspension was stirred at a heating bath temperature of 165° C. Reaction water began to be removed by evaporation as a co-boiling product at approximately 128° C. The temperature of the equipment was raised to 140° C. at the highest in the ending of the reaction. The total volume of approximately 20 ml of water was removed by evaporation from the system in 1-2 hours. Next, reduced pressure was released by nitrogen. The reaction mixture was cooled to 90-100° C. and filtered. The equipment and filter residue were rinsed with 100 g of o-xylene. The filtrate was transferred into a double layer reaction vessel to be concentrated under reduced pressure, and recovered with 360 g of o-xylene. The slightly reddish yellow residue was cooled to 70° C., and was carefully added with 636 g of methanol from a titrating funnel while keeping the temperature at 60-65° C. Crystal seeds were added into the solution to perform crystallization by stirring for approximately 30 minutes at 60-65° C. Next the crystallized slurry was cooled to −5° C. over 2 hours, and stirring was continued for further 1 hour at this temperature. The crystals were collected by suction filtration, and the residue was washed in 5 times by use of 400 ml of cold methanol (−5° C.). The sufficiently drying pressed product was dried in a vacuum drier of 50-60° C. to prepare 266 g of a white solid. The gas chromatographic analysis showed this substance was comprised of approximately 85% of 3-(3,4-dimethylphenyl)-5,7-di-tert-Bu-3H-benzofuran-2-one (compound 103) and approximately 15% of 3-(2,3-dimethylphenyl)-5,7-di-tert-Bu-3H-benzofuran-2-one isomer (compound 103A).

Synthesis Example 8

Synthesis of a Compound Represented by Formula (R); Compound 105

5,7-di-tert-Bu-3-(4-ethylphenyl)-3H-benzofuran-2-one (compound 105) was synthesized starting from 5,7-di-tert-Bu-3-hydroxy-3H-benzofuran-2-one, ethylbenzene and Fulcat 22B as a catalyst.

5,7-di-tert-Bu-3-hydroxy-3H-benzofuran-2-one of 262.3 g (1.00 mol) in 500 ml (4.08 mol) of ethylbenzene was added with 40 g of Fulcat 22B, and the mixture was refluxed for 1.5 hours on a water separator. Next Fulcat 22B catalyst was removed by filtration and excess ethylbenzene was removed by a reduced pressure evaporator. GC-MS analysis showed the residue was comprised of 59.2% of para-isomer (compound 105), 10.8% of meta-isomer (compound 105A) and 21.1% of ortho-isomer (compound 105B). 5,7-di-tert-Bu-3-(4-ethylphenyl)-3H-benzofuran-2-one (compound 105) (para-isomer) of 163.8 g (47%) was obtained by crystallization of the residue from 400 ml of methanol, which further contained 5.7% of meta-isomer 5,7-di-tert-Bu-3-(3-ethylphenyl)-3H-benzofuran-2-one (compound 105A) and 1.3% of ortho-isomer 5,7-di-tert-Bu-3-(2-ethylphenyl)-3H-benzofuran-2-one (compound 105B). By further crystallization from methanol, almost pure para-isomer (compound 105) having a melting point of 127-132° C. was prepared.

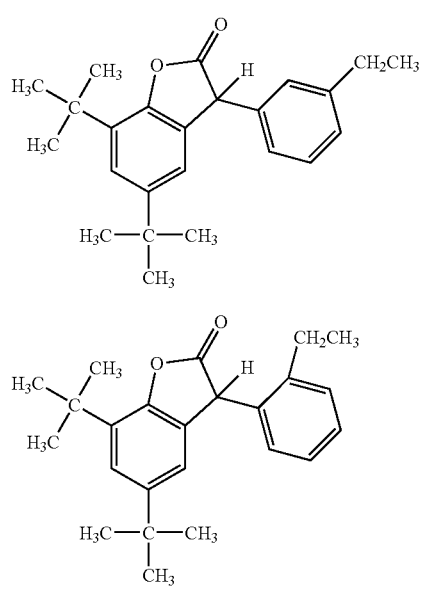

Synthesis Example 9

Compound Represented by Formula (R); Compound 111

5,7-di-tert-Bu-3-(2,3,4,5,6-pentamethylphenyl)-3H-benzofuran-2-one (compound 111) was synthesized starting from 5,7-di-tert-Bu-3-hydroxy-3H-benzofuran-2-one, pentamethylbenzene and tin tetrachloride as a catalyst.

Pentamethylbenzene of 11.5 g (77.5 mmol) and 10 ml (85.0 mmol) of tin tetrachloride were added in a solution of 19.7 g (75.0 mmol) of 5,7-di-tert-Bu-3-hydroxy-3H-benzofuran-2-one is 50 ml of 1,2-dichloromethane, and the reaction mixture was refluxed for 1 hour. The reaction mixture was diluted with water and extracted 3 times with toluene. The organic phase was collected, washed with water, dried with sodium sulfate and concentrated by a reduced pressure evaporator. By crystallization of the residue from ethanol, 26.3 g (yield of 89%) of 5,7-di-tert-Bu-3-(2,3,4,5,6-pentamethylphenyl)-3H-benzofuran-2-one (compound 111) having a melting point of 185-190° C. were prepared.

Synthesis Example 10

Compound Represented by Formula (R), Compound 108

5,7-di-tert-Bu-3-(4-methylphenyl)-3H-benzofuran-2-one (compound 108) was synthesized starting from 5,7-di-tert-Bu-3-hydroxy-3H-benzofuran-2-one, tioanisole and aluminum trichloride as a catalyst.

A solution of 26.2 g (0.10 mol) of 5,7-di-tert-Bu-3-hydroxy-3H-benzofuran-2-one dissolved in 25 ml (0.21 mol) of thioanisole was added by dropping into a solution of 14.7 g (0.11 mol) of aluminum trichloride dissolved in 15 ml (0.13 mol) of thioanisole at 35-40° C. The reactive mixture was stirred for 30 min. at 30° C. and then stirred for 2 hours at 80° C. After the mixture was cooled, 50 ml of water was added and then concentrated hydrochloric acid and methylene chloride were carefully add in an amount sufficient for forming a homogeneous two-layer mixture. The organic phase was then separated, washed with water, dried with sodium sulfate and concentrated in a rotatory evaporator. By the ethanol crystallization of the residue, 6.7 g of 5,7-di-tert-Bu-3-(4-methylphenyl)-3H-benzofuran-2-one (compound 108) having a melting point of 125-131° C. was obtained.

Synthesis Example 11

Compound Represented by Formula (R), Compound 104

5,7-di-tert-Bu-3-(4-methylphenyl)-3H-benzofuran-2-one (compound 104) was synthesized starting from 5,7-di-tert-Bu-3-hydroxy-3H-benzofuran-2-one, glyoxylic acid, toluene and Fulcat 22B as a catalyst.

A mixture of 2,4-di-tert-Bu-phenol (97%) of 21.2 g (0.10 mol), 16.3 g (0.11 mol) of 50% water-based glyoxylic acid, 2.0 g of Fulcat 22B and 50 ml of toluene was refluxed under a nitrogen gas flow for 8 hours over a water separator. Next, Fulcat 22B catalyst was eliminated by filtration and excess toluene was removed by use of a reduced pressure evaporator. 5,7-di-tert-Bu-3-(4-methylphenyl)-3H-benzofuran-2-one (compound 104) having a melting point of 130-133° C. of 14.2 g (yield of 42%) was prepared by crystallization of the residue from 40 ml of ethanol.

PETB used in example 1 stands for pentaerythritol tetrabenzoate and it was purchased from Sigma-Aldrich Co.

Example 1

Preparation of Polarizer Protective Film 101

Utilizing the various compounds prepared in the above synthesis examples and various compounds available on the market as a plasticizer, polarizer protective film 101 was prepared by means of a melt casting method.

| | |
|---|---|
| Cellulose ester (C-1: acetyl substitution degree of 1.4, a propionyl substitution degree of 1.4 and a total acyl substitution degree of 2.8) | 84 weight parts |
| Additive 1 (Compound of Synthesis example 1 having a furanose structure or a pyranose structure of the present invention (Compound 1)) | 5 weight parts |
| Additive 2 (PETB) | 10 weight parts |
| Additive 3 (Mixture of approximately 5.7:1 of 3-(3,4-dimethylphenyl)-5,7-di-tert-Bu-3H-benzofuran-2-one (compound 103) and 3-(2,3-dimethylphenyl)-5,7-di-tert-Bu-3H-benzofuran-2-one isomer (compound 103A) | 0.5 weight parts |
| Irganox 1010 (manufactured by Ciba Specialty Chemicals Corp.) | 0.5 weight parts |

Cellulose ester, after having been dried at 70° C. under reduced pressure for 3 hours and cooled to room temperature, was mixed with additives.

This pellet was melt at 240° C. and extruded from casting die 4 onto first cooling roll 5 under a nitrogen atmosphere, and film was molded by sandwiching pressed between first cooling roll 5 and touch roll 6. Further, from a hopper opening at the middle portion of extruder 1, silica particles (manufactured by Nippon Aerosil Co., Ltd.) as a sliding agent was added so as to make 0.1 weight parts.

A heat bolt was adjusted so as to make the gap width of casting die 4 of 0.5 mm within 30 mm from the film edge portions in the width direction, and of 1 mm at the other portion. As a touch roll, touch roll A was utilized, and in the interior thereof, water of 80° C. was flown as cooling water.

The length L along the circumference surface of first cooling roll from position P1, where resin being extruded from casting die 4 contacts first cooling roll 5, to position P2, that is the upstream edge by 5 revolutions of first cooling roll 5 from the nip of first cooling roll 5 and touch roll 6, was set to 20 mm. Thereafter, touch roll 6 is separated from first cooling roll 5, and measured was temperature T at the melting portion immediately before resin was sandwiching pressed between first cooling roll 5 and touch roll 6. Temperature T at the melting portion immediately before resin was sandwiching pressed between first cooling roll 5 and touch roll 6 was measured by a thermometer (HA-200E, produced by Anritsu Instruments Co., Ltd.) at the position of further upstream side by 1 mm from nip upstream edge P2. As a result of measurement in this example, temperature T was 141° C. The line pressure of touch roll 6 against first cooling roll 5 was set to 14.7 N/cm. Further, the film was introduced into a tenter and cooled to 30° C. while being relaxed by 3% in the width direction after having been stretched at 160° C. by 1.3 times in the width direction. Then the film was released from clips to cut off the clipped portion, being subjected to a knurling treatment of 10 mm wide and 5 μm high at the both film edges, and was wound up on a core at a winding tension of 220 N/m and a taper of 40%. The winding core had an inside diameter of 152 mm, an outside diameter of 165 mm and a length of 1550 mm. As a base material of this core, utilized was a prepreg resin in which an epoxy resin was impregnated in glass fibers or carbon fibers. Epoxy conductive resin was coated on the surface of a core, and the surface was polished to make finish surface roughness Ra of 0.3 μm. Herein the film thickness was 80 μm and the roll length was 3,500 m. This master roll sample of the present invention was designated as Polarizer protective film No. 101.

Polarizer protective film Nos. 102-123 and comparative Polarizer protective film Nos. 201-207 were produced in the same manner as Polarizer protective film No. 101 except that the additives and the used amount thereof were changed as shown in Tables 1 and 2.

When the additives were added, the adding amount of cellulose ester was adjusted so that the total adding amount was 100 weight parts. Addition of liquid additives at an ambient temperature was carried out by a feeder immediately before the film composition entered into a biaxial extruder.

As the polymer UV absorbent (UVM-1), 1-(2-benzotriazole)-2-hydroxy-5-(2-vinyloxycarbonylethyl)benzene was employed.

TABLE 1

| *1 | *2 | Additive 1 (saccharide ester) | *3 | Additive 2 | *4 | Additive 3 (Formula (R) compound) | *5 |
|---|---|---|---|---|---|---|---|
| 101 | C-1 | Compound 1 | 5 | PETB | 10 | Compound 103 | 0.5 |
| 102 | C-1 | Compound 1 | 10 | PETB | 10 | Compound 103 | 0.5 |
| 103 | C-1 | Compound 1 | 15 | PETB | 5 | Compound 103 | 0.5 |
| 104 | C-1 | Compound 1 | 20 | PETB | 5 | Compound 103 | 0.5 |
| 105 | C-1 | Compound 1 | 25 | PETB | 5 | Compound 103 | 0.5 |
| 106 | C-1 | Compound 1 | 30 | — | — | Compound 103 | 0.5 |
| 107 | C-2 | Compound 2 | 15 | PETB | 5 | Compound 103 | 0.5 |
| 108 | C-2 | Compound 3 | 15 | PETB | 5 | Compound 103 | 0.5 |
| 109 | C-2 | Compound 4 | 15 | PETB | 5 | Compound 103 | 0.5 |
| 110 | C-2 | Compound 5 | 15 | PETB | 5 | Compound 103 | 0.5 |
| 111 | C-2 | Compound 6 | 15 | PETB | 5 | Compound 103 | 0.5 |
| 112 | C-2 | Compound 7 | 15 | PETB | 5 | Compound 103 | 0.5 |
| 113 | C-2 | Compound 8 | 15 | PETB | 5 | Compound 103 | 0.5 |
| 114 | C-2 | Compound 9 | 15 | PETB | 5 | Compound 103 | 0.5 |
| 115 | C-2 | Compound 10 | 15 | PETB | 5 | Compound 103 | 0.5 |
| 116 | C-2 | Compound 1 | 15 | GTB | 10 | Compound 103 | 0.5 |
| 117 | C-3 | Compound 1 | 20 | GTB | 5 | Compound 101 | 0.5 |
| 118 | C-3 | Compound 1 | 20 | TMPTB | 5 | Compound 104 | 0.5 |
| 119 | C-3 | Compound 1 | 20 | TMPTB | 10 | Compound 105 | 0.5 |
| 120 | C-3 | Compound 1 | 20 | Compound 48 | 5 | Compound 111 | 0.5 |
| 121 | C-3 | Compound 1 | 20 | Compound 51 | 5 | Compound 108 | 0.5 |
| 122 | C-3 | Compound 1 | 20 | Compound 62 | 5 | Compound 103 | 0.5 |
| 123 | C-3 | Compound 1 | 20 | Compound 62 | 5 | Compound 103 | 0.5 |
| 201 | C-2 | Compound 1 | 25 | — | — | — | — |
| 202 | C-2 | Compound 5 | 25 | — | — | — | — |
| 203 | C-2 | Compound 6 | 25 | — | — | — | — |
| 204 | C-2 | Compound 7 | 25 | — | — | — | — |
| 205 | C-2 | — | — | PETB | 15 | — | — |
| 206 | C-2 | — | — | GTB | 15 | Compound 103 | 0.5 |
| 207 | C-2 | — | — | Compound 48 | 15 | Compound 101 | 0.5 |

*1 Polarizer protective film No.,
*2 Cellulose ester
*3 Adding amount of Additive 1 (weight parts)
*4 Adding amount of Additive 2 (weight parts)
*5 Adding amount of Additive 3 (weight parts)

TABLE 2

| *1 | Additive 4 | *6 Additive 5 | *7 Additive 6 | *8 Remarks |
|---|---|---|---|---|
| 101 | — | — Irganox 1010 | 0.5 — | — Inv. |
| 102 | GSY-P-101 | 0.5 Irganox 1010 | 0.5 — | — Inv. |
| 103 | GSY-P-101 | 0.5 Irganox 1010 | 0.5 — | — Inv. |
| 104 | GSY-P-101 | 0.5 Irganox 1010 | 0.5 — | Inv. |

TABLE 2-continued

| *1 | Additive 4 | *6 | Additive 5 | *7 | Additive 6 | *8 | Remarks |
|---|---|---|---|---|---|---|---|
| 105 | GSY-P-101 | 0.5 | Irganox 1010 | 0.5 | — | — | Inv. |
| 106 | GSY-P-101 | 0.5 | Irganox 1010 | 0.5 | — | — | Inv. |
| 107 | ADKSTABPEP-36 | 0.5 | Irganox 1010 | 0.5 | — | — | Inv. |
| 108 | ADKSTABPEP-36 | 0.5 | Irganox 1010 | 0.5 | — | — | Inv. |
| 109 | ADKSTABPEP-36 | 0.5 | Irganox 1010 | 0.5 | — | — | Inv. |
| 110 | ADKSTABPEP-36 | 0.5 | Irganox 1010 | 0.5 | — | — | Inv. |
| 111 | ADKSTABPEP-36 | 0.5 | Irganox 1010 | 0.5 | — | — | Inv. |
| 112 | ADKSTABPEP-36 | 0.5 | Irganox 1010 | 0.5 | — | — | Inv. |
| 113 | ADKSTABPEP-36 | 0.5 | Irganox 1010 | 0.5 | — | — | Inv. |
| 114 | ADKSTABPEP-36 | 0.5 | Irganox 1010 | 0.5 | — | — | Inv. |
| 115 | ADKSTABPEP-36 | 0.5 | Irganox 1010 | 0.5 | — | — | Inv. |
| 116 | GSY-P-101 | 0.5 | ADKSTABLA-52 | 0.5 | UVM-1 | 1 | Inv. |
| 117 | ADKSTABPEP-36 | 0.5 | Tinuvin-144 | 0.5 | UVM-1 | 1 | Inv. |
| 118 | GSY-P-101 | 0.5 | ADKSTABLA-52 | 0.5 | UVM-1 | 1 | Inv. |
| 119 | ADKSTABPEP-36 | 0.5 | Irganox 1010 | 0.5 | UVM-1 | 1 | Inv. |
| 120 | GSY-P-101 | 0.5 | Tinuvin-144 | 0.5 | UVM-1 | 1 | Inv. |
| 121 | ADKSTABPEP-36 | 0.5 | Irganox 1010 | 0.5 | UVM-1 | 1 | Inv. |
| 122 | Irgafos 38 | 0.5 | Irganox 1010 | 0.5 | UVM-1 | 1 | Inv. |
| 123 | Irgafos 38 | 0.5 | Irganox 1010 | 0.5 | UVM-1 | 1 | Inv. |
| 201 | — | — | Irganox 1010 | 0.5 | — | — | Comp. |
| 202 | — | — | Irganox 1010 | 0.5 | — | — | Comp. |
| 203 | — | — | Irganox 1010 | 0.5 | — | — | Comp. |
| 204 | — | — | Irganox 1010 | 0.5 | — | — | Comp. |
| 205 | — | — | Irganox 1010 | 0.5 | — | — | Comp. |
| 206 | — | — | Irganox 1010 | 0.5 | — | — | Comp. |
| 207 | — | — | Irganox 1010 | 0.5 | — | — | Comp. |

*1 Polarizer protective film No.
*6 Adding amount of Additive 4 (weight parts)
*7 Adding amount of Additive 5 (weight parts)
*8 Adding amount of Additive 6 (weight parts)
Inv. Inventive sample,
Comp. Comparative sample Evaluations were carried out for the polarizer protective films obtained as above according to the methods described below. The results will be shown in Tables 3 and 4.

(Horseback Defect, Core Set)

Figure 8:
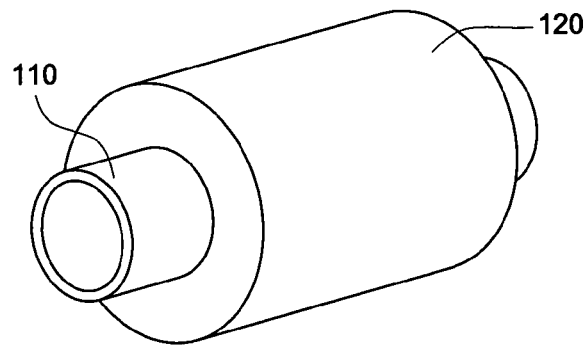
FIGS. 8(a)-8(c) are drawings to show a storing state of a film master roll for a display.
Figure 8:
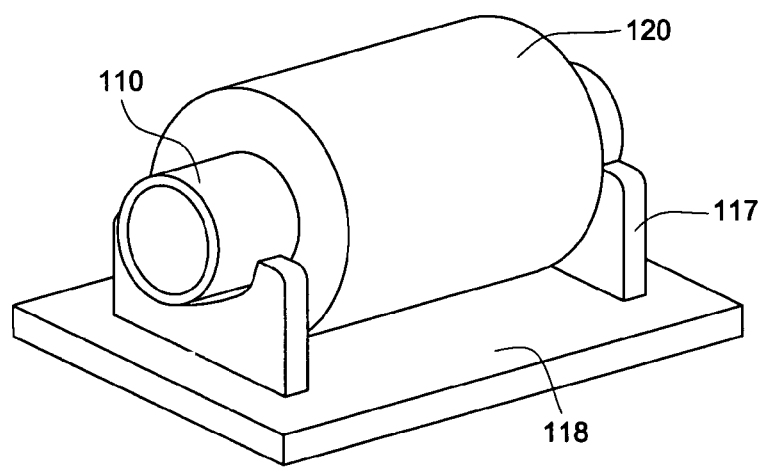
Figure 8:
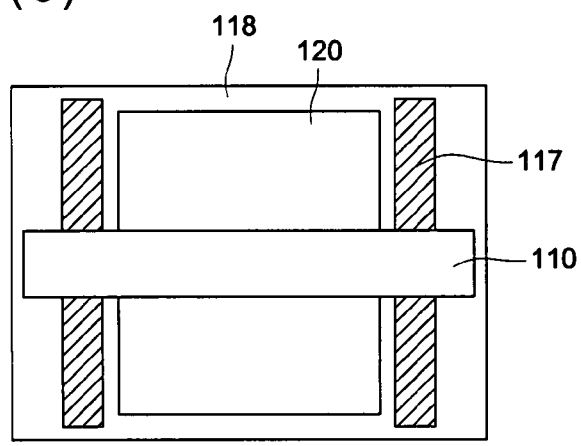

Each of the polarizer protective film master roll samples was doubly wrapped with a polyethylene sheet and stored for 30 days under a condition of 25° C., 50% RH by a storing method shown in FIG. 8. Thereafter, the samples were taken out of the box, polyethylene sheet being opened, and distortion or fine irregularities were observed by reflecting a lit fluorescent tube on the surface of the film master roll sample, whereby the horseback defect was ranked based on the following criteria.

A: The fluorescent tube is observed to be straight.
B: The fluorescent tube is observed to be partly curved.
C: The fluorescent tube is observed to be curved.
D: The fluorescent tube is observed to be reflected dappled.

Further, film master roll samples after having been stored were rewound, and the length of the film from the core side end of the film directly wound to the core, in which "core set" was observed, was measured for the evaluation, the "core set" being a defect in which spot deformations of 50 µm or more of the film, or band shaped deformations along the width direction of the film was clearly observed. The core set was evaluated according to the following criteria.

A: Core set was observed in less than 10 m from the core side end of the film.
B: Core set was observed in 10 m or more but less than 25 m from the core side end of the film.
C: Core set was observed in 25 m or more but less than 50 m from the core side end of the film.
D: Core set was observed in 50 m or more from the core side end of the film.

(Wrinkle at Start of Winding)

An operation to wind up master roll film on a core was performed, and then the master roll film was rewound from the core to restart the winding operation in the case that wrinkles were generated at the start of winding, which resulted in a poor product. The times of this occurrence were counted. This operation was repeated ten times to determine the average value. The evaluation was carried out based on the following criteria.

A: Never occurred.
B: One or two times.
C: Three or four times.
D: Five times or more.

In FIG. 8, 110 represents a core of a roll, 117 represents a support board, 118 represents a mount, and 120 represents a master roll of cellulose ester film.

(Variation of Retardation Value Against Humidity Change)

Retardation values of the obtained polarizer protective films were determined and Rth(a) variations were obtained from the results.

Rth(a) variation was determined as follows: A polarizer protective film was conditioned by keeping the film under a condition of 23° C. and 20% RH for 5 hours, followed by measuring the Rth value under the same condition, the Rth value thus obtained being represented by Rth(b). The film was further conditioned by keeping the film under a condition of 23° C. and 80% RH for 5 hours, followed by measuring the Rth value under the same condition (23° C. and 80% RH), the Rth value thus obtained being represented by Rth(c). Rth (a) variation was calculated by the following equation:

$$Rth(a)=|Rth(b)-Rth(c)|$$

The Rth value of the polarizer protective film thus treated was further measured under a condition of 23 C and 55% RH to confirm that the variation of Rth value was reversible.

In FIG. 8, 110 represents a core of a roll, 117 represents a support board, 118 represents a mount, and 120 represents a master roll of polarizer protective film.

TABLE 3

| *1 | Horse-back defect | Core set | Wrinkles at the start of winding | Variation of retardation due to humidity change *2 | Remarks |
|---|---|---|---|---|---|
| 101 | A | A | A | 8 | Inventive |
| 102 | A | A | A | 8 | Inventive |
| 103 | A | A | A | 8 | Inventive |
| 104 | A | A | A | 6 | Inventive |
| 105 | A | A | A | 7 | Inventive |
| 106 | A | A | A | 8 | Inventive |
| 107 | B | A | A | 10 | Inventive |
| 108 | B | A | A | 10 | Inventive |
| 109 | B | A | A | 12 | Inventive |
| 110 | B | A | A | 15 | Inventive |
| 111 | B | A | A | 15 | Inventive |
| 112 | B | A | A | 15 | Inventive |
| 113 | B | A | A | 15 | Inventive |
| 114 | B | A | A | 15 | Inventive |
| 115 | B | A | A | 10 | Inventive |
| 116 | A | A | A | 5 | Inventive |
| 117 | A | A | A | 5 | Inventive |
| 118 | A | A | A | 5 | Inventive |
| 119 | A | A | A | 8 | Inventive |
| 120 | A | A | A | 9 | Inventive |
| 121 | A | A | A | 7 | Inventive |
| 122 | A | A | A | 10 | Inventive |
| 123 | A | A | A | 5 | Inventive |
| 201 | C | C | B | 25 | Comparative |
| 202 | C | C | C | 26 | Comparative |
| 203 | C | C | C | 22 | Comparative |
| 204 | C | C | C | 27 | Comparative |
| 205 | D | D | D | 30 | Comparative |
| 206 | B | B | B | 35 | Comparative |
| 207 | B | B | B | 32 | Comparative |

*1 Polarize protective film No.
*2 ΔRth (20% RH-80% RH)

TABLE 4

| *1 | *3 | Unevenness in front contrast | Degradation of viewing angle | Remarks |
|---|---|---|---|---|
| 101 | 101 | A | A | Inventive |
| 102 | 102 | A | A | Inventive |
| 103 | 103 | A | A | Inventive |
| 104 | 104 | A | A | Inventive |
| 105 | 105 | A | A | Inventive |
| 106 | 106 | A | A | Inventive |
| 107 | 107 | A | A | Inventive |
| 108 | 108 | A | A | Inventive |
| 109 | 109 | A | A | Inventive |
| 110 | 110 | A | B | Inventive |
| 111 | 111 | A | B | Inventive |
| 112 | 112 | A | B | Inventive |
| 113 | 113 | A | B | Inventive |
| 114 | 114 | A | B | Inventive |
| 115 | 115 | A | B | Inventive |
| 116 | 116 | A | A | Inventive |
| 117 | 117 | A | A | Inventive |
| 118 | 118 | A | A | Inventive |
| 119 | 119 | A | A | Inventive |
| 120 | 120 | A | A | Inventive |
| 121 | 121 | A | A | Inventive |
| 122 | 122 | A | A | Inventive |
| 123 | 123 | A | A | Inventive |
| 201 | 201 | B | C | Comparative |
| 202 | 202 | B | C | Comparative |
| 203 | 203 | B | C | Comparative |
| 204 | 204 | B | C | Comparative |
| 205 | 205 | C | D | Comparative |
| 206 | 206 | C | D | Comparative |
| 207 | 207 | C | D | Comparative |

*1 Polarize protective film No.
*3 Polarizing plate/Liquid crystal display No.

It is clear from Tables 3 and 4 that polarizer protective film Nos. 101-123 each containing a compound having a furanose structure or a pyranose structure and a compound represented by Formula (R) or (Ra) each has reduced horseback defects and reduced core sets and tends not to cause deformation defects of a film master roll such as wrinkles at the start of winding. It is also clear that the variation of the retardation value due to humidity change was reduced. Also, the polarizer protective film prepared in the same manner as polarizer protective film 101 except that the same amount of compound 235 was used instead of compound 103 exhibited reduced horseback defects, reduced core sets, reduced deformation defects of a film master roll such as wrinkles at the start of winding and reduced variation of the retardation value due to humidity change, compared to those observed for the comparative polarizer protective films.

<<Preparation of Polarizing Plate>>

Using the master roll samples for polarize protective film Nos. 101-123 and comparative polarizer protective film Nos. 201-207, the following alkali saponification treatment and preparation of polarizing plates were carried out.

<Alkali Saponification Treatment>

| Saponification process: | 2M-NaOH | 50° C., 90 s |
| Washing process: | water | 30° C., 45 s |
| Nuetralization process: | 10 weight % HCl | 30° C., 45 s |
| Washing process: | water | 30° C., 45 s |

After a saponification process, washing, neutralization, washing were carried out in that order, followed by drying at 80° C.

<Preparation of Polarizer>

A long roll polyvinyl alcohol film having a thickness of 120 mm was dipped in 100 weight parts of aqueous solution containing 1 weight part of iodine, and stretched in the ratio of 5 times in the transport direction of the long roll film at 50° C. to form a polarizer.

Each of polarizer protective film Nos. 101-123 and 201-207 saponified as above was adhered on both surfaces of the above described polarizer using a 5% aqueous solution of fully-saponified polyvinyl alcohol as an adhesive. Thus obtained films were dried to obtain polarizing plates P101-P123 and P201-P 207.

<<Fabrication of Liquid Crystal Display>>

Each of polarizing plates P101-P123 and P201-P 207 prepared as above was adhered on the glass plate of the liquid crystal cell of a 15 size VA mode color liquid crystal display VL-150SD (produced by FUJITSU) from which the polarizing plate had been removed. Thus liquid crystal displays 101-123 and 201-207 were fabricated, wherein each of the polarizing plates was adhered so that the absorption axis of the polarizing plate lay in the same direction as the absorption axis of the previously adhered polarizing plate.

(Evaluation of Unevenness in Front Contrast)

Under the condition of 23° C. and 55% RH, the backlight of each liquid crystal display was turned on for one week, and then measurements were carried out. As for the measurement, EZ-Contrast 160D produced by ELDIM Co., Ltd. was utilized and luminances at a white display portion and a black display portion on the display screen was measured from the perpendicular direction of the display screen. The ratio of the above luminances was designated as a front contrast.

Front contrast=(luminance of a white display portion measured from the perpendicular direction of the display screen)/(luminance of a black display portion measured from the perpendicular direction of the display screen)

Front contrast values were measured at arbitrarily selected five points and evaluated according to the following criteria.

A: Fluctuation of the front contrast values was less than 5% based on the average value, namely, unevenness was small.

B: Fluctuation of the front contrast values was 5% or more, but less than 10% based on the average value, namely, unevenness was observable.

C: Fluctuation of the front contrast values was 10% or more based on the average value, namely, unevenness was large.

(Degradation of Viewing Angle)

Under the condition of 23° C. and 55% RH, the viewing angle of each liquid crystal display was measured using EZ-Contrast 160D produced by ELDIM Co., Ltd. Subsequently, under the condition of 23° C. and 20% RH, and then under the condition of 23° C. and 80% RH, the viewing angle of each liquid crystal display was measured. Finally, the viewing angle was measured again under the condition of 23° C. and 55% RH to confirm that the changes in the viewing angle observed in the above measurements were reversible. Each of the above measurements was carried out after the liquid crystal display was placed under each of the above conditions for 5 hours.

A: No degradation of viewing angle was observed.

B: Degradation of viewing angle was in the acceptable level for practical use.

C: Degradation of viewing angle was slightly observed.

D: Degradation of viewing angle was clearly observed.

The results were shown in Table 4.

It was confirmed that, when compared with comparative liquid crystal displays 201-207, liquid crystal displays 101-123 of the present invention exhibited notably stable display properties in which unevenness in front contrast and degradation of viewing angle due to humidity change were only limited. Also, the liquid crystal display employing the polarizer protective film prepared in the same manner as polarizer protective film 101 except that the same amount of compound 235 was used instead of compound 103 exhibited notably stable display properties in which unevenness in front contrast and degradation of viewing angle due to humidity change were only limited, compared to those observed for the comparative liquid crystal displays 201-207.

What is claimed is:

1. A polarizer protective film comprising:
    a cellulose ester;
    a saccharide ester having:
    an ester of compound (A), the compound (A) having one furanose structure or one pyranose structure in the molecule, wherein all or a part of OH groups in the compound (A) are esterified, or
        an ester of compound (B), the compound (B) having two to twelve of at least one of a furanose structure and a pyranose structure bonded in the molecule, wherein all or a part of OH groups in the compound (B) are esterified; and
    a compound represented by Formula (R):

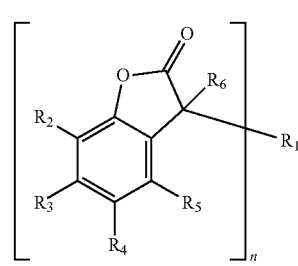

Formula (R)

wherein $R_2$ to $R_5$ each independently represent a hydrogen atom or a substituent; $R_2$ and $R_3$, $R_3$ and $R_4$, and $R_4$ and $R_5$ may be combined to form a ring; $R_6$ represents a hydrogen atom or a substituent; n represents an integer of 1 or 2; when n equals to 1, $R_1$ represents a substituent; and when n is 2, $R_1$ represents a divalent linkage group, and wherein the polarizer protective film has a variation of 5 to 15 nm in thickness direction retardation value due to a humidity change between 20% RH and 80% RH conditions at 23° C. when the film has a film thickness of 80 μm.

2. The polarizer protective film of claim 1, wherein $R_1$ in Formula (R) is a conjugated substituent when n is 1.

3. The polarizer protective film of claim 1, wherein the compound represented by Formula (R) is a compound represented by Formula (R-1):

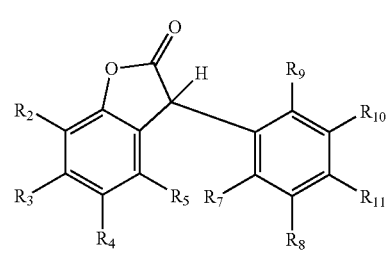

Formula (R-1)

wherein $R_2$ to $R_5$ each independently represent a hydrogen atom or a substituent; $R_7$ to $R_{11}$ each independently represent a hydrogen atom, an alkyl group having 1 to 18 carbon atoms or an alkoxy group having 1 to 18 carbon atoms.

4. The polarizer protective film of claim 1 further comprising a phosphonite compound.

5. The polarizer protective film of claim 4 further comprising a hindered phenol compound.

6. The polarizer protective film of claim 1, wherein a content of the saccharide ester is 1 to 35% by weight based on a weight of the polarizer protective film.

7. The polarizer protective film of claim 1, wherein the compound (A) is glucose, galactose, mannose, fructose, xylose, or arabinose.

8. The polarizer protective film of claim 1, wherein the compound (B) comprises at least one furanose structure and at least one pyranose structure bonded in the molecule of the compound (B).

9. The polarizer protective film of claim 1, wherein the compound (B) is lactose, sucrose, nystose, 1F-fructosylnystose, stachyose, maltitol, lactitol, lactulose, cellobiose, maltose, cellotriose, maltotriose, raffinose, kestose, gentiobiose, gentiotriose, gentiotetraose, xylotriose or galactosyl-sucrose.

10. The polarizer protective film of claim 9, wherein the compound (B) is sucrose.

11. A polarizing plate comprising a polarizer and the polarizer protective film of claim 1 provided on at least one surface of the polarizer.

12. A liquid crystal display comprising a liquid crystal cell and the polarizing plate of claim 11 provided on at least one surface of the liquid crystal cell.

* * * * *